US011361292B2

(12) United States Patent
Rathod

(10) Patent No.: US 11,361,292 B2
(45) Date of Patent: Jun. 14, 2022

(54) SELECTED PLACE ON MAP OR FROM CATEGORY SPECIFIC LIST OF NEARBY PLACES ASSOCIATED PAYMENT INTERFACE FOR MAKING PAYMENT

(71) Applicant: Yogesh Rathod, Mumbai (IN)

(72) Inventor: Yogesh Rathod, Mumbai (IN)

( * ) Notice: Subject to any disclaimer, the term of this patent is extended or adjusted under 35 U.S.C. 154(b) by 103 days.

(21) Appl. No.: 17/003,110

(22) Filed: Aug. 26, 2020

(65) Prior Publication Data

US 2021/0042724 A1 Feb. 11, 2021

Related U.S. Application Data

(63) Continuation of application No. PCT/IB2020/050281, filed on Jan. 15, 2020, which is a continuation of application No. PCT/IB2019/050436, filed on Jan. 18, 2019.

(51) Int. Cl.
*G06Q 20/10* (2012.01)
*H04W 4/029* (2018.01)
*G06Q 20/22* (2012.01)
*G06Q 20/42* (2012.01)

(52) U.S. Cl.
CPC ......... *G06Q 20/102* (2013.01); *G06Q 20/227* (2013.01); *G06Q 20/42* (2013.01); *H04W 4/029* (2018.02)

(58) Field of Classification Search
None
See application file for complete search history.

(56) References Cited

U.S. PATENT DOCUMENTS

| 6,332,134 | B1 | 12/2001 | Foster | |
|---|---|---|---|---|
| 6,816,778 | B2 | 11/2004 | Diaz et al. | |
| 7,857,212 | B1 | 12/2010 | Matthews | |
| 8,024,234 | B1 * | 9/2011 | Thomas | G06Q 10/02 705/26.61 |
| 8,577,734 | B2 * | 11/2013 | Treyz | G06Q 30/0641 705/26.1 |
| 8,694,366 | B2 * | 4/2014 | Barnes, Jr. | G06Q 30/06 705/14.1 |

(Continued)

FOREIGN PATENT DOCUMENTS

| WO | 2012087834 A2 | 6/2012 | |
|---|---|---|---|
| WO | 2015031805 A1 | 3/2015 | |
| WO | WO-2020148658 A2 * | 7/2020 | G06Q 30/00 |

*Primary Examiner* — Narayanswamy Subramanian
*Assistant Examiner* — Ayal I. Sharon

(57) ABSTRACT

Various embodiments of a system, methods, server, client, and graphical user interface to displaying on map interface, place(s) associated with particular location of place wherein places including current, nearest, nearby, category specific, searched and any combination thereof for enabling user to select or identify specific place or place of business on map and view associated standardized and integrated payment user interface with/in said selected or identified place or place icon or place user interface which enable user to make entered or inputted or selected or displayed or pre-set or default or pushed particular amount of payment from user's account to said selected or identified place associated automatically identified merchant's account, without the user having to enter the account information related to merchant.

29 Claims, 55 Drawing Sheets

(41 of 55 Drawing Sheet(s) Filed in Color)

(56) References Cited

U.S. PATENT DOCUMENTS

| | | | |
|---|---|---|---|
| 9,721,283 B2* | 8/2017 | Tanaka | G06Q 30/0613 |
| 9,824,376 B1* | 11/2017 | Amacker | G06Q 30/06 |
| 9,990,624 B2* | 6/2018 | Todasco | G06Q 20/3223 |
| 10,497,022 B2* | 12/2019 | Carlson | G06Q 30/0261 |
| 2005/0027705 A1* | 2/2005 | Sadri | G06F 16/29 |
| 2007/0192229 A1 | 8/2007 | Rowan et al. | |
| 2009/0327134 A1* | 12/2009 | Carlson | G06Q 20/3223 |
| | | | 705/44 |
| 2009/0327151 A1* | 12/2009 | Carlson | G06Q 30/02 |
| | | | 705/80 |
| 2011/0238514 A1* | 9/2011 | Ramalingam | G06Q 20/10 |
| | | | 705/21 |
| 2011/0282700 A1* | 11/2011 | Cockcroft | G06Q 30/06 |
| | | | 705/5 |
| 2012/0166960 A1* | 6/2012 | Salles | G06Q 10/087 |
| | | | 715/738 |
| 2012/0209768 A1* | 8/2012 | Nuzzi | G06Q 40/02 |
| | | | 705/44 |
| 2013/0191195 A1* | 7/2013 | Carlson | G06Q 30/0224 |
| | | | 705/14.17 |
| 2014/0006253 A1* | 1/2014 | Nuzzi | G06Q 40/02 |
| | | | 705/38 |
| 2014/0164241 A1* | 6/2014 | Neuwirth | G06Q 20/12 |
| | | | 705/44 |
| 2014/0201081 A1* | 7/2014 | Neuwirth | G06Q 20/40145 |
| | | | 705/44 |
| 2015/0112864 A1* | 4/2015 | Wallaja | G06Q 20/384 |
| | | | 705/44 |
| 2015/0161578 A1* | 6/2015 | Ahmed | G06Q 20/32 |
| | | | 705/40 |
| 2015/0242827 A1* | 8/2015 | Guo | G06Q 50/30 |
| | | | 705/13 |
| 2016/0098790 A1* | 4/2016 | Herman | G06Q 30/0633 |
| | | | 705/39 |
| 2016/0104132 A1* | 4/2016 | Abbatiello | G06Q 20/386 |
| | | | 705/39 |
| 2017/0061420 A1* | 3/2017 | Serrano | G06F 3/04847 |
| 2017/0364900 A1* | 12/2017 | Hudson | G06Q 20/3224 |
| 2018/0005219 A1* | 1/2018 | Pujals | G06Q 20/32 |
| 2018/0150868 A1 | 5/2018 | Stone et al. | |
| 2018/0350144 A1* | 12/2018 | Rathod | A63F 13/216 |
| 2019/0087815 A1* | 3/2019 | Goldschmidt | G06Q 20/4014 |
| 2019/0147741 A1* | 5/2019 | Rosas-Maxemin | G08G 1/012 |
| | | | 701/425 |
| 2019/0163876 A1* | 5/2019 | Remme | B65C 9/0015 |
| 2020/0219164 A1* | 7/2020 | Kohli | G06F 3/0482 |

\* cited by examiner

Figure 26

SELECTED PLACE ON MAP OR FROM CATEGORY SPECIFIC LIST OF NEARBY PLACES ASSOCIATED PAYMENT INTERFACE FOR MAKING PAYMENT

FIELD OF INVENTION

The present invention relates to enabling user to directly make payment to current or nearest place or particular place or searched or selected place on map associated merchant or user. In another embodiment identifying and scanning QR code image or file based on current location of user device and directly make payment from user's account to said QR code associated merchant's account from user's mobile device, wherein QR code associated with particular place of business. In an embodiment the present invention also relates to facilitating location based and geofence based financial transactions over a network. A user's location is identified or determined by location information communicated by a user device, such as a smart phone. Merchants near the user location are identified or determined and selected. Merchant associated one or more types of unique identity or code(s) including QR code(s) and/or merchant associated geofence and associated account information and details is identified so that the user can easily make a payment to the merchant through the user device. The present invention also relates to displaying multi-tasking control labeled as location or geofence specific geofilters and enable user to capture photo or video and integrate selected geofilter with said captured or recorded or selected one or more types of media or contents. Present invention also relates to displaying multi-tasking control labeled as suggestion for taking particular type of media at particular place or location or pre-defined geofence. Present invention also relates to view products from augmented reality system or application or specific camera application and select one or more products to ad to cart to make order. Present invention also relates to displaying location or pre-defined geofence specific contextual QR codes including payment QR code and automatically scan displayed QR code including payment QR code to make payment of particular amount from user's account to merchant's account. Present invention also relates to preparing contents an attach or integrate one or more controls with said prepared contents and share with one or more types of contacts, users of network and destinations.

BACKGROUND OF THE INVENTION

At present Google Map™, provides place or location associated one or more types of information and actions or call to actions and reactions including ratings, reviews, address, website link, phone number, details, photos, videos, rankings, save, view nearby places surround particular place, send to phone and directions. Present invention enable owner or user of network or user associated with particular place or location or address or geo-coordinates or verified place of business to select and associate one or more types of one or more actions, call-to-actions, reactions and survey controls with particular place or geo-coordinates or pre-defined or drawn geo-fence or address or location information and displaying to users or customers or viewers, or members or attendees or patients or guests or clients who check in said place or enter in to said place or geofence boundary and enable to select one or more actions, call-to-actions, reactions and survey controls, wherein displaying said one or more types of one or more actions, call-to-actions, reactions and survey controls based on monitored and tracked current location and date and time of user device, opening, closing and schedule date and time of place of business, target criteria specific users, user or visitor profile, profile of place of business, current logged activities, actions, transactions, status, interactions of user with aid place of business, rank and pre-defined sequences of actions, call-to-actions, reactions and survey controls, pre-defined rules, type of customer or user including past customer, current customer, prospective customer, paid user, ticket holder, member. For example new visitor of shop is presented with custom offer, provide contact details, become member, follow or connect with place of business, view videos or stories or reviews controls on map and for example current customer is presented with one or more types of controls including custom offer, discounts based on past purchases, number of times purchases and call-to-actions, past customers but presently not customers are presented with survey forms, feedback, complaints and like. In another example visitor of particular restaurant, at the time of visit present search food items, menu, order, view reviews and ratings, view photos, videos and stories, custom offers controls, after placing order display follow, connect, share, refer, view videos, photos, stories, register controls, after providing or serving food as per order, displaying on map payment, tips controls, after making payments, display ratings, reviews controls and survey forms on map location associated with said restaurant. System identifies various status associated with particular user or visitor or customer inside said place of business based on user provided status including plan or schedule to visit, check in, visit, viewing products, make order, pick ordered items, purchase or order, book ticket, interval, enter in to hotel room, check out, automatically identify based on monitored and tracked current location, duration of stay at particular place, exit from place, recorded voice or talks of user, linked system, indication from owner or staff or administrator associated with said place of business, conducted one or more types of actions, reactions, providing or selecting of survey questions and options. Present invention facilitates in dynamically displaying on map, type of place, type or category of business, type of customers or users or visitors, type of action, current status, displaying one or more types of actions, call-to-actions and other one or more types of controls on map, for enabling user to conduct said place or type of activity or need specific actions or call-to-actions, wherein various types of call-to-actions comprises sign now, take a tour, download now, contact now, shop now, upload, search, register, add to cart, learn more, buy now, apply now, subscribe, bookmark, Like us on Facebook, subscribe to channel, view our photos, add us, connect on LinkedIn, follow us on Twitter, listen music, fill form, upload file, create account, book ticket, view trailer, comments, sell, reserve your seat, download whitepaper, vote, call now, upload video, post, upload photos, apply for job, add to customer list, add to prospective customer list, provide requirement specification, get free quote, get your free e-book and like.

Currently social network like Facebook™ enables user to prepare post and send to connected users and enabling connected users to provide one or more types of reactions on said post, wherein reactions comprises select one or more types of emoticons or expressions including like, wow, provide comments and share post. Each post associated with said provided or integrated particular types of reactions with posts. Google AdWords™ enables advertiser to publish text advertisement with one or more types of call-to-actions among target criteria specific searching user. Facebook U.S. Pat. No. 7,669,123 enables monitoring user's activities, and generating news items, attaching link and enable viewing user to participate in same activities. Present invention enables user to prepare one or more types of contents, media, post or message and select one or more controls or geofence or place or location or place of business associated controls including actions, call-to-actions, reactions, survey, tasks, workflow, activities, status, communication, participation, collaboration controls and attach or integrate or link or embedded with said user to prepared one or more types of contents, media, post or message and send to one or more contacts, connections, groups, followers, one or more types of users of network and destinations including one or more third parties applications, web sites, web pages, graphical user interface (GUI) or limit access of user prepared one or more types of contents, media, post or message to a set of viewing users.

U.S. patent application Ser. No. 16/101,612 (title: SYSTEM, METHOD AND PLATFORM FOR USER CONTENT SHARING WITH LOCATION-BASED EXTERNAL CONTENT INTEGRATION) of Yogesh Rathod et. el. enables user to integrate one or more types of user generated or user created or user prepared contents or post or message or photo or video and select and integrate one or more types of location specific contents and send to or share with one or more contacts, connections, groups, followers, one or more types of users of network and destinations including one or more third parties applications, web sites, web pages, graphical user interface (GUI) or limit access of user prepared one or more types of contents, media, post or message to a set of viewing users. Present invention enables user to take visual media including photo or video and apply one or more types of gestures including single tap on one of the geofilter or sticker or icon or clipart or emoticon or emoji or frame or image or artistic design from displayed set of geofence or location or place specific geofilters or automatically determined activities specific and in the event of applying one or more types of gestures including single tap on particular geofilter, capture photo or record pre-set duration video and integrate or attach or embedded or image overlay or merge said selected geofilter or sticker or icon or clipart or emoticon or emoji or frame or image or artistic design with said captured photo and one or more images of recorded video and send to or share with one or more contacts, connections, groups, followers, one or more types of users of network and destinations including one or more third parties applications, web sites, web pages, graphical user interface (GUI) or limit access of user prepared one or more types of contents, media, post or message to a set of viewing users. In an embodiment displaying multi-taking controls with labeled as geofilter and in the event of applying one or more types of gestures including single tap on particular region inside displayed geofilter, conduct or execute associated one or more functions or instructions or take one or more types of associated actions.

Google U.S. Pat. No. 9,014,726 (Title: Systems and methods for recommending photogenic locations to visit) of Foster; Andrew et. el. suggests or notify photogenic location to user based on monitored and racked user device current location and location associated collection of photos. Present invention suggest one or more types of photo or video that user can capture or record at particular place or location or place of business or point of interests or geofence in the form of labeled control and in the event of applying one or more type of pre-defined gestures on said control or part of control, capture photo or record pre-set duration video and send to one or more contacts, connections, groups, followers, one or more types of users of network and destinations including one or more third parties applications, web sites, web pages, graphical user interface (GUI) or limit access of user prepared one or more types of contents, media, post or message to a set of viewing users.

Amazon Go™, the store concept uses several technologies, including computer vision, deep learning algorithms, and sensor fusion to automate much of the purchase, checkout, and payment steps associated with a retail transaction. Many applications are developed for self-checkout. Present invention enables user to make order by viewing displayed product(s) in shelf by using augmented reality system or application and in the event of applying gesture including single tap on particular viewing product, add to cart said selected product. After finishing of shopping user can make payment and ordered products can send to user's shipping address or collected ordered products hand over to user. Retailer need to display only sample products and user need to only select products by using augmented reality system. It will save retailers space cost, security cost, maintain inventory cost. Customer does not need to pick up products and use trolley. Retailers can open multiple small stores with samples and enhance availabilities of products.

At present automatically tracking of kitchen inventory application relies on sensing the weight of a kitchen storage container to track food consumption. This data can provide insights around consumption patterns and help chefs predict and replenish their inventory just in time. There are three components of this application: Inventory Tracking Server (ITS): Monitors all the kitchen containers and records daily consumption and replenishment statistics. IoT hardware: Detects the weight changes in containers and connects them to ITS and Mobile application: Provides an easy interface to see the current state of inventory and also offers analytics to view inventory history.

Present invention enables automatically tracking of kitchen inventory by identifying changes of level of each container or bin viewing from camera based on object recognition and optical characters recognition techniques.

U.S. patent publication number 20120084177 (Tanaka et el), title location based transactions describes "a user's location is determined by location information communicated by a user device, such as a smart phone. Merchants near the user location are determined and selected. Merchant payment information is transmitted to the user device so that the user can easily make a payment to the merchant through the user device. Merchant offerings may also be sent to the user device for purchase and subsequent payment, where the merchant offerings may be specifically selected for the user." Tanaka disclose displaying list of nearby merchants based on current location of user device and enable user to select from a list of merchant names, locations, logos. Tanka does not discloses displaying nearby places including current place on map, so user can easily identify current place based on place surround location information and other places and view other details, shared by place associated merchant or owner or admins or staff or users of network, including reviews, ratings, photos, videos and can trust place and make payment. Identifying current place associated merchant based on merchant names, locations, logos is time consuming, and tedious. User does not know merchant name, logo, address. User need great effort to ask and verify that and then able to trust and make payment which very time consuming and tedious process. Tanaka does not discloses enabling user to view current place on map based on monitored and tracked user device's current location or search map to view searched places on map and select place and directly make particular amount payment from user's account to said place associated merchant's account. User can trust on place displayed in map with associated one or more types of information and media including name, address, contact information, reviews, ratings, photos and videos and easily identify current place based on place surround location information and other places. User can search places on map and can view associated reviews, ratings, photos and videos to identify whether to visit or not visit place and if user like to visit then user can bookmark place, so when user visit said place and consume, book, subscribe, buy or order one or more products and/or services and at the time of making payment easily make payment by tapping on bookmarked place and transfer billed amount to said place associated merchant's account. User can also bookmark previous, current and next visiting place.

At present QR codes can be used to store bank account information or credit card information, or they can be specifically designed to work with particular payment provider applications. QR codes are commonly used in the field of cryptographic currencies, particularly those based on and. Payment addresses, cryptographic keys and transaction information are often shared between digital wallets in this way. Disadvantages of QR code based payment is users need to download a QR code reader. This is the big drawback for many. Mobile users have to download a (normally free) QR reader app before they can even begin to use them, which limits the audience. Other disadvantages of QR code based payment are scanning can be a long process. As Tim Dunn outlined in his recent article on QR, the actual process of scanning a code can be a pain. Users have to get their phone out, fire up the code reader, before scanning and waiting for the landing page. There is lack of awareness and familiarity of the QR code among people. QR code can be distorted or not read properly. Possible interface issues, directs to a site that is not best for mobile phone use, abuse of technology. Diversity of QR software makes it incredibly difficult to standardize the experience of following a QR code to a landing page. Present invention enables user to view or access location or geo-fence or place or geo-coordinates associated one or more type of QR codes. For example user check in at particular place or enter in to particular place or geo-fence, automatically identifying, retrieving or displaying said identified place or geofence or location information associated one or more QR codes including QR code for making payment to said place associated seller or shop or place of business via scanning image of said QR code to decode and access encoded merchant information. For business person or seller there is no need to print and paste QR codes. For customer there is no need to find out QR code, install scanner application, open scanner and scan QR code.

The DDR court differentiated the claims of the '399 patent from those that "merely recite the performance of some business practice known from the pre-Internet world along with the requirement to perform it on the Internet." Instead, the court explained, the claims of patent '399 "address the problem of retaining website visitors that, if adhering to the routine, conventional functioning of Internet hyperlink protocol, would be instantly transported away from a host's website after clicking on an advertisement and activating a hyperlink." Because the invention "overrides the routine and conventional sequence of events ordinarily triggered by the click of a hyperlink," it did not employ mere ordinary use of a computer or the Internet.

Further, the court held, the claims included additional features that limit their scope to not preempt every application of any of the abstract ideas suggested by NLG. Viewed individually and as an ordered combination, the DDR court concluded that the claims these aspects of the invention established an "inventive concept" for resolving an Internet-centric problem and were therefore directed to patent-eligible subject matter.

Similarly current place or selected place from nearby or searched places based payments embodiment of present invention related to maps and payments at least two different classes comprises maps (host) including browser based or smart mobile client based maps comprises places or places of business and associated merchants, each place associated standardized (pre-defined fields and values) structured data and contents (e.g. business name, category, phone no., email, website, business hours, photos, videos), host's contents and user provided contents (e.g. ratings, reviews, each place associated standardized active links or user actions or call-to-actions.

Content provided by places associated merchants or owners or authorized admins or staffs is accessed by users without leaving the maps (host). The "look and feel" presented here is that of the maps (host). It will have links permitting the user to make a payment (for anything purchase, order, book, subscription, service charges, fees etc.) from the host (maps) to the third parties merchants associated with places and listed their places on maps (host). Pay to current location associated place (in-store) or selected place on map associated merchant. If purchased is made in-store, the transaction will be processed through the host (maps) or from single source.

This is the structured contents of the third party's (places associated merchants or authorized persons). The third party's structured contents will appear unchanged on the host website. The user is not aware that the content is provided by different places associated owners or authorized persons. It will seem as if this material is part of the host (maps). The "look and feel" presented here is that of the third party.

Inventive concept of present invention is, in spite of the business-related nature of the claims (making payment from user's account to identified current place or selected place on map associated merchant without providing merchant payment or account details and without redirecting user to different website related to each place or external website or application including booking or table reservation application) retaining or increasing maps traffic. The claims addressed a technological problem "particular to the internet" by implementing a solution specific to that technological environment and different from the manner suggested by routine or conventional use within the field. Present invention enables businesses to create, claim, verify and list places on map for making them available for users of network. Each place of business owner or authorized person can provide merchant account information which verify by server and activate acceptance of in-store payments for their customers based on location of the user device. User can physically visit any type of place and place of business (e.g. store, college, school, toll, patrol pump, parking, classes, home, office, hotel, hospital, medicine store, restaurant and like), identify and view current place or select place from nearby place from map, view details and after purchasing or consuming services from place of business, make different types of payments (e.g. pay for order, purchase, booking, subscription, rent, fees, charges, on-demand service, installment, pending dues, pay later, on behalf of other user and like) directly from their account and directly from integrated and standardized user interface within maps application of their mobile device to said currently visited specific place associated merchant's account without the user having to enter the account information related to merchant and without redirect to external or different website or application or user interface or booking, e-commerce, reservation applications. So many users visit many places many different times and make many types of in-place (e.g. in-store or offline store) payments from maps application to many merchants and many places associated many merchants accepts in-store payments from many customers from maps application.

The majority opinion characterized the problem as "the ephemeral nature of an Internet 'location' [and] the near-instantaneous transport between these locations made possible by standard communication protocols. The majority distinguished this problem, which they found was "particular to the Internet," from the circumstances inherent in the "store within a store" schemes—in traditional "brick and mortar" warehouse stores with cruise vacation package kiosks, visitors to the kiosk are still inside the warehouse store when making their kiosk purchases. The claimed solution is necessarily rooted in computer technology in order to overcome a problem specifically arising in the realm of computer networks.

Therefore, it is with respect to these considerations and others that the present invention has been made.

OBJECT OF THE INVENTION

The object of present invention is to identifying and displaying current location of user mobile device related places or nearby places including current place or enabling user to search location or places based on one or more types of search queries or selections and enable to view each searched or particular place surround information including road name, neighbor place, and landmarks to identify current or particular place and select and view selected place associated one or more types of information including place name, brand, logo, reviews, ratings, photos and videos related to place or place of business or store name, logo, products, staff, different types and angles of interior and inside or outside or exterior views to identify current or particular place and with trust enable to tap on "Pay Now" button, enter amount, select account or use default account and make payment of said entered or pushed or default amount from said selected or pre-set or default user's account to said selected place associated merchant's or user's account by tapping or clicking on send or pay button. So there is no need for user to scan QR code, carry cash or various types of cards including debt or credit cards or NFC enabled cards, remember passwords of cards or wallets, wait in queue, show face for face recognition based payment and there is no need for merchant to print and paste and maintain non-secure QR code, implement and maintain costly POS, card or NFC card reader, appointing staff for collecting money.

The object of present invention is to identify, retrieve, access or display location or geofence associated one or more types of QR codes including payment QR code and location or geofence associated one or more types of actions, call-to-actions, reactions controls and enable system to identify or decode QR code associated encrypted data for conducting or executing associated actions. For example identify, retrieve and access or displaying place of business associated payment QR code for enabling system to transfer entered or displayed particular amount from user's account to QR code associated merchant's account via automatically scanning said identified, retrieved or displayed or stored or received place associated image or file of QR code.

The object of present invention is to enable to select one or more places or locations or define or draw geofence boundaries and associate one or more object models or object images associated to products related to said selected or predefined one or more locations or places or geofences and enable visiting user of place of business to view one or more products from augmented reality system or application and apply one or more types of pre-defined gestures including single tap on particular object including particular product to add to cart said tapped product and make order.

The object of present invention is to automatically monitor inventory of home or restaurant kitchen by viewing storage containers or bins from particular identified camera associated with particular identified user and based on received one or more photos or images of videos identify changes in level, usage, crossing of set threshold of inventory of one or more storage containers or bins and in the event of identifying of crossing of set threshold of inventory of one or more storage containers or bins, automatically make order of said identified storage containers or bins associated products.

The object of present invention is to display location or geofence associated one or more types of QR codes including payment QR code and location or geofence associated one or more types of actions, call-to-actions, reactions controls and enable system to identify or decode QR code associated encrypted data for conducting or executing associated actions. For example, displaying place of business associated payment QR code for enabling system to transfer entered or displayed particular amount from user's account to QR code associated merchant's account.

DETAIL DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" posted or shared contents & communication and any types of multimedia contents from a device or component includes receiving the shared or posted contents & communication and any types of multimedia contents indirectly, such as when forwarded by one or more other devices or components. Similarly, "sending" shared contents & communication and any types of multimedia contents to a device or component includes sending the shared contents & communication and any types of multimedia contents indirectly, such as when forwarded by one or more other devices or components.

As used herein, the term "client application" refers to an application that runs on a client computing device. A client application may be written in one or more of a variety of languages, such as 'C', 'C++', 'J2ME', Java, ASP.Net, VB.Net and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Embodiments described herein enabling to selecting or taking one or more photos or videos or preparing one or more types of contents; enabling to selecting one or more types of controls or objects including actions, call-to-actions, reactions from list of controls; enabling to associating or attaching or integrating or embedding said selected one or more types of one or more controls, objects, functions, contents and interfaces and any combination thereof including actions, call-to-actions, reactions controls from list of controls with said user prepared one or more types of contents including photos or videos or message or post; enabling to selecting one or more contacts, contacts of contacts, followers, groups or one or more types of users of network or limiting access to a set of viewing users; and displaying said content with associated or attached or integrated or embedded one or more types of one or more controls, objects, functions, contents and interfaces and any combination thereof including actions, call-to-actions, reactions, survey controls to said selected one or more contacts, contacts of contacts, followers, groups or one or more types of users of network or at least one viewing user of the predetermined set of viewing users.

In an embodiment identify location or location associated place or geofence or address or geo-coordinates based on monitored and track location of user device; identifying said identified location or location associated place or geofence or address or geo-coordinates associated one or more controls including actions, call-to-actions, reactions controls; enabling to selecting or taking one or more photos or videos or preparing one or more types of contents; enabling to selecting one or more types of controls or objects including actions, call-to-actions, reactions from said displayed recognized object associated list of controls; enabling to associating or attaching or integrating or embedding said selected one or more types of one or more controls, objects, functions, contents and interfaces and any combination thereof including actions, call-to-actions, reactions controls from list of controls with said user prepared one or more types of contents including photos or videos or message or post; enabling to selecting one or more contacts, contacts of contacts, followers, groups or one or more types of users of network or limiting access to a set of viewing users; and displaying said content with associated or attached or integrated or embedded one or more types of one or more controls, objects, functions, contents and interfaces and any combination thereof including actions, call-to-actions, reactions, survey controls to said selected one or more contacts, contacts of contacts, followers, groups or one or more types of users of network or at least one viewing user of the predetermined set of viewing users.

In an embodiment detect that a client device of the server has conducting scanning or augmented reality (AR) scanning or taken a photograph or provide a raw photo or scanned data; identifying or recognizing an object in the photograph or scanned data; displaying said recognized object associated one or more controls including actions, call-to-actions, reactions controls; enabling to selecting or taking one or more photos or videos or preparing one or more types of contents; enabling to selecting one or more types of controls or objects including actions, call-to-actions, reactions from said displayed recognized object associated list of controls; enabling to associating or attaching or integrating or embedding said selected one or more types of one or more controls, objects, functions, contents and interfaces and any combination thereof including actions, call-to-actions, reactions controls from list of controls with said user prepared one or more types of contents including photos or videos or message or post; enabling to selecting one or more contacts, contacts of contacts, followers, groups or one or more types of users of network or limiting access to a set of viewing users; and displaying said content with associated or attached or integrated or embedded one or more types of one or more controls, objects, functions, contents and interfaces and any combination thereof including actions, call-to-actions, reactions, survey controls to said selected one or more contacts, contacts of contacts, followers, groups or one or more types of users of network or at least one viewing user of the predetermined set of viewing users.

In an embodiment identify location or location associated place or geofence or address or geo-coordinates based on monitored and track location of user device; identifying said identified identify location or location associated place or geofence or address or geo-coordinates associated one or more geofence or geofence controls; present a user interface to a user of a client device, wherein the user interface includes, visual data captured by a video recording device displayed simultaneously with the plurality of geofilters or geofilter controls, each wherein the displayed geofilters or geofilter controls visually appear as geofilter that are associated with one or more types of functions, actions, call-to-actions, reactions, interfaces, and destinations to which media data can be sent, and a camera view representing the view currently viewed by a camera of the client device, and wherein the plurality of geofilters or geofilter controls are automatically or manually overlaid on the camera view; receive only a single user action from a user selecting one of the plurality of displayed geofilters or geofilter controls, wherein the single user action is touching and holding the selected geofilters or geofilter controls on a touch screen; and responsive to the single user action and not based on any subsequent input from the user, capture the visual data from the video recording device, wherein the captured visual data is a video clip representing images taken over time, and wherein the video clip is taken over a window of time corresponding to the touching and holding the selected geofilters or geofilter controls, and send, to the one or more types of destinations associated with the selected geofilters or geofilter controls, the captured visual data.

In an embodiment multi-tasking geofilter control associated with one or more pre-defined area on said multi-tasking geofilter control and said each pre-defined area associated with one or more actions or custom actions, functions, controls, interfaces and one or more types of contents and any combination thereof.

In an embodiment in the event of applying pre-defined gesture or multi-touch or sense including single tap, double tap, long press, swipe or slide left or right or up or down or pre-defined direction, hover on first pre-defined area on said multi-tasking geofilter control, execute first one or more or set of instructions or functions or actions or displaying one or more interfaces or one or more types of contents, data, metadata and media.

In an embodiment determining, identifying, selecting and displaying geofilters or geofilters controls based on identified place based on monitored and tracked current location of user device, identified place associated provided or published or related geofilters or geofilters controls, identified place associated provided or published or related object models or object images associated geofilters or geofilters controls, and voice commands associated geofilters or geofilters controls, logged user activities, actions, call-to-actions, interactions, status, transactions, participations, communications, collaborations, sharing, reactions, applied gestures, multi-touches and senses, provided voice, eye and body or expression commands, pre-set preferences, privacy settings, user profile, connected or accompanied users and associate relations including family members, wife, girlfriend, friend, best friend, employee, employer, college or associates, client, guest, member, subscriber, customer and any combination thereof.

In an embodiment identify location or location associated place or geofence or address or geo-coordinates based on monitored and track location of user device; identifying said identified location or location associated place or geofence or address or geo-coordinates associated one or more visual media controls or multi-tasking visual media controls; present a user interface to a user of a client device, wherein the user interface includes, visual data captured by a video recording device displayed simultaneously with the plurality of visual media controls or multi-tasking visual media controls, each wherein the displayed visual media controls or multi-tasking visual media controls visually appear as suggested labeled visual media controls or multi-tasking visual media controls that are associated with one or more types of functions, actions, call-to-actions, reactions, interfaces, and destinations to which media data can be sent, and a camera view representing the view currently viewed by a camera of the client device, and wherein the plurality of visual media controls or multi-tasking visual media controls are automatically or manually overlaid on the camera view; receive only a single user action from a user selecting one of the plurality of displayed visual media controls or multi-tasking visual media controls, wherein the single user action is touching and holding the selected visual media control or multi-tasking visual media control on a touch screen; and responsive to the single user action and not based on any subsequent input from the user, capture the visual data from the video recording device, wherein the captured visual data is a video clip representing images taken over time, and wherein the video clip is taken over a window of time corresponding to the touching and holding the selected visual media control or multi-tasking visual media control, and send, to the one or more types of destinations associated with the selected visual media control or multi-tasking visual media control, the captured visual data.

In an embodiment multi-tasking visual media control associated with one or more pre-defined area on said multi-tasking visual media control and said each pre-defined area associated with one or more actions or custom actions, functions, controls, interfaces and one or more types of contents and any combination thereof.

In an embodiment in the event of applying pre-defined gesture or multi-touch or sense including single tap, double tap, long press, swipe or slide left or right or up or down or pre-defined direction, hover on first pre-defined area on said multi-tasking visual media control, execute first one or more or set of instructions or functions or actions or displaying one or more interfaces or one or more types of contents, data, metadata and media.

In an embodiment determining, identifying, selecting and displaying visual media controls based on identified place based on monitored and tracked current location of user device, identified place associated provided or published or related geofilters or geofilters controls, identified place associated provided or published or related object models or object images associated geofilters or geofilters controls, and voice commands associated geofilters or geofilters controls, logged user activities, actions, call-to-actions, interactions, status, transactions, participations, communications, collaborations, sharing, reactions, applied gestures, multi-touches and senses, provided voice, eye and body or expression commands, pre-set preferences, privacy settings, user profile, connected or accompanied users and associate relations including family members, wife, girlfriend, friend, best friend, employee, employer, college or associates, client, guest, member, subscriber, customer and any combination thereof.

In an embodiment identifying or recognizing provided one or more types of pre-defined or particular type of gestures or touches or multi-touches or pre-defined or particular type of voice commands or eye commands or body expression and any combination thereof to filter displaying of visual media controls or multi-tasking visual media controls.

In an embodiment detect that a client device of the server has conducting scanning or augmented reality (AR) scanning or taken a photograph or provide a raw photo or scanned data; identifying or recognizing an object in the photograph or scanned data; and displaying said recognized object associated one or more visual media controls or multi-tasking visual media controls.

In an embodiment multi-tasking visual media control associated with one or more pre-defined area on said multi-tasking visual media control and said each pre-defined area associated with one or more actions or custom actions, functions, controls, interfaces and one or more types of contents and any combination thereof.

In an embodiment in the event of applying pre-defined gesture or multi-touch or sense including single tap, double tap, long press, swipe or slide left or right or up or down or pre-defined direction, hover on first pre-defined area on said multi-tasking visual media control, execute first one or more or set of instructions or functions or actions or displaying one or more interfaces or one or more types of contents, data, metadata and media.

In an embodiment identifying or recognizing provided one or more types of pre-defined or particular type of gestures or touches or multi-touches or pre-defined or particular type of voice commands or eye commands or body expression and any combination thereof to filter displaying of visual media controls or multi-tasking visual media controls.

In an embodiment detect that a client device of the server has conducting scanning or augmented reality (AR) scanning or taken a photograph or provide a raw photo or scanned data; identify location or location associated place based on monitored and track location of user device at the time of scanning or augmented reality scanning; identifying or recognizing an object in the photograph or scanned data based on sufficiently matching said objects inside said received one or more photographs or images of video with said identified location associated one or more object models, object images and object criteria; displaying recognized object associated with identified location associated one or more types of visual media controls or multi-tasking visual media controls.

In an embodiment multi-tasking visual media control associated with one or more pre-defined area on said multi-tasking visual media control and said each pre-defined area associated with one or more actions or custom actions, functions, controls, interfaces and one or more types of contents and any combination thereof.

In an embodiment in the event of applying pre-defined gesture or multi-touch or sense including single tap, double tap, long press, swipe or slide left or right or up or down or pre-defined direction, hover on first pre-defined area on said multi-tasking visual media control, execute first one or more or set of instructions or functions or actions or displaying one or more interfaces or one or more types of contents, data, metadata and media.

In an embodiment identifying or recognizing provided one or more types of pre-defined or particular type of gestures or touches or multi-touches or pre-defined or particular type of voice commands or eye commands or body expression and any combination thereof to filter displaying of visual media controls or multi-tasking visual media controls.

In an embodiment access or receive one or more object models of real world objects including product, item, food item as object criteria and associated information including location or geofence information, product information including name, price and payment information; storing data specifying an association between the real world object, location or geofence information and the object criteria; detect that a client device of the server has conducting scanning or augmented reality (AR) scanning or taken a photograph or provide a raw photo or scanned data; identifying location or place; identifying or recognizing an object in the photograph or scanned data; based on the identified object satisfying the object criteria associated with the location or geofence information in the stored data, display or provide the associated information about real world object including information about product or menu item; automatically receive payment instructions from the user device; and send a payment to a merchant responsive to the payment instructions.

In an embodiment automatically receive payment instructions from the user device after expiration of started timer based on timer duration.

In an embodiment store or access account information of users of network.

In an embodiment detect that a client device of the server has conducting scanning or augmented reality (AR) scanning or taken a photograph or provide a raw photo or scanned data; identifying or recognizing an object in the photograph or scanned data; and automatically make payment and store payment information for said recognized object associated product or item or service based on said recognized object associated unique identity associated information including price information and payment information associated with uniquely identified user who has conducted augmented reality scanning.

In an embodiment detect that a client device of the server has conducting scanning or augmented reality (AR) scanning or taken a photograph or provide a raw photo or scanned data; receiving haptic contact engagement on screen; in the event of haptic contact engagement and persist, identifying area of haptic contact engagement and persist; identifying or recognizing an object in the photograph or scanned data based on identified area of haptic contact engagement and persist; and automatically make payment and store payment information for said recognized object associated product or item or service based on said recognized object associated unique identity associated information including price information and payment information associated with uniquely identified user who has conducted augmented reality scanning.

In an embodiment detect that a client device of the server has conducting scanning or augmented reality (AR) scanning or taken a photograph or provide a raw photo or scanned data; identifying or recognizing an object in the photograph or scanned data; and automatically taking order or add to cart instruction by automatically storing and associating order or adding to shopping cart instruction with said recognized unique object and unique identity of user who has conducted augmented reality scanning or taking of photo or video or media.

In an embodiment detect that a client device of the server has conducting scanning or augmented reality (AR) scanning or taken a photograph or provide a raw photo or scanned data; receiving haptic contact engagement on screen; in the event of haptic contact engagement and persist, identifying area of haptic contact engagement and persist; in the event of haptic contact release, identifying or recognizing an object in the photograph or scanned data based on identified area of haptic contact engagement and persist; and automatically taking order or add to cart or add to cart one quantity instruction by automatically storing and associating order or adding to shopping cart instruction with said recognized unique object and unique identity of user who has conducted augmented reality scanning or taking of photo or video or media.

In an embodiment detect that a client device of the server has conducting scanning or augmented reality (AR) scanning or taken a photograph or provide a raw photo or scanned data; enabling to draw on screen or select region or area boundaries on screen; receiving selection of region or area boundaries on screen; in the event of haptic contact release, identifying or recognizing an object and number of similar objects in the photograph or scanned data based on said selected or drawn region or area boundaries on screen; and automatically taking order or add to cart instruction by automatically storing and associating order or adding to shopping cart instruction with said recognized unique object, identified similar number of said objects and unique identity of user who has conducted augmented reality scanning or taking of photo or video or media.

In an embodiment detect that a client device of the server has conducting scanning or augmented reality (AR) scanning or taken a photograph or provide a raw photo or scanned data; identifying or recognizing an object in the photograph or scanned data; start timer; enable user to cancel or discard or update transaction before expiration of timer; in the event of expiration of timer, automatically make payment and store payment information for said recognized object associated product or item or service based on said recognized object associated unique identity associated information including price information and payment information associated with uniquely identified user who has conducted augmented reality scanning.

In an embodiment detect that a client device of the server has conducting scanning or augmented reality (AR) scanning or taken a photograph or provide a raw photo or scanned data; identifying or recognizing an object in the photograph or scanned data; start timer; enable user to cancel or remove or update order before expiration of timer; in the event of expiration of timer, automatically taking order or add to cart instruction by automatically storing and associating order or adding to shopping cart instruction with said recognized unique object and unique identity of user who has conducted augmented reality scanning or taking of photo or video or media.

In an embodiment detect that a client device of the server has conducting scanning or augmented reality (AR) scanning or taken a photograph or provide a raw photo or scanned data; receiving order or add to cart instruction; identifying or recognizing an object in the photograph or scanned data; storing and associating order or adding to shopping cart instruction with said recognized unique object and unique identity of user who has conducted augmented reality scanning or taking of photo or video or media.

In an embodiment receiving and storing number of quantities of order instruction.

In an embodiment detect that a client device of the server has conducting first scanning or first augmented reality (AR) scanning or taken a first photograph or provide a raw photo or scanned data for identifying product or item; detect that a client device of the server has conducting second scanning or second augmented reality (AR) scanning or taken a second photograph or provide a raw photo or scanned data for providing product or item customization information; receiving order or add to cart instruction; identifying or recognizing an object in the first and second photograph or scanned data; storing and associating order or adding to shopping cart instruction with said recognized unique object from first scanned data and second scanned data and unique identity of user who has conducted augmented reality scanning or taking of photo or video or media, wherein based on first scanned data identify product and item identity and based on second scanned data identify customization information of said first identified product or item.

In an embodiment identify product identity, product details including description, ingredients, health effect, other details, price, discount or offer, weight, number of pieces or quantities in package, color, availability shop numbers and addresses, current inventory, offer rules, tax and associated or related one or more types of information, data, and metadata.

In an embodiment receiving and storing number of quantities of order instruction.

In an embodiment object model or images or criteria comprises one or more images of product or one or more images of product from one or more angels or parts, one or more types of product or item associated unique codes including QR code, bar code.

In an embodiment detect that a client device of the server has taken one or more photograph or videos; identify location or location associated place based on unique identity (UID or GUID) associated with camera device or connected smart phone device associated application associated registered user's unique identity, wherein camera device including Wi-Fi camera or Wi-Fi IP camera, Internet Protocol camera, or IP camera or web camera or received unique code from beacon or monitored and track location of a client device of the server at the time of capturing of one or more photograph or recording of videos; recognizing and identifying one or more storage containers or bins and recognizing and identifying raw ingredients or products or food items or filled items and associate level or number of items or products or packages in said each recognized and identified storage container in the one or more photograph or images of videos; and in the event of identifying crossing of pre-set level or pre-set number of particular identified raw ingredients or products or food items or items in particular identified storage container, automatically place order of said identified raw ingredients or products or food items or items base on pre-selected brand name, location or place of availability, number of quantities or weights in selected unit of measurement or particular amount equivalent raw ingredients or products or food items or items.

In an embodiment detect that a client device of the server has taken first one or more photograph or videos; identify location or location associated place based on unique identity (UID or GUID) associated with camera device or connected smart phone device associated application associated registered user's unique identity, wherein camera device including Wi-Fi camera or Wi-Fi IP camera, Internet Protocol camera, or IP camera or web camera or received unique code from beacon or monitored and track location of a client device of the server at the time of capturing of first one or more photograph or recording of videos; recognizing and identifying one or more storage containers or bins and recognizing and identifying raw ingredients or products or food items or filled items and associate level or number of items or products or packages in said each recognized and identified storage container in the first one or more photograph or images of videos; detect that a client device of the server has taken second one or more photograph or videos; identify location or location associated place based on unique identity (UID or GUID) associated with camera device or connected smart phone device associated application associated registered user's unique identity, wherein camera device including Wi-Fi camera or Wi-Fi IP camera, Internet Protocol camera, or IP camera or web camera or received unique code from beacon or monitored and track location of a client device of the server at the time of capturing of second one or more photograph or recording of videos; recognizing and identifying one or more storage containers or bins and recognizing and identifying raw ingredients or products or food items or filled items and associate level or number of items or products or packages in said each recognized and identified storage container in the second one or more photograph or images of videos; and identifying usage based on comparing identified level or available number of items or products or packages of raw ingredients or products or food items or filled items in particular recognized and identified storage container in the first one or more photograph or images of videos with identified level or available number of items or products or packages of raw ingredients or products or food items or filled items in particular recognized and identified storage container in the second one or more photograph or images of videos.

In an embodiment in the event of continuously receiving live streaming video from camera further recognizing and identifying person who access recognized and identified particular storage container by comparing identified level or available number of items or products or packages of raw ingredients or products or food items or filled items in said accessed particular recognized and identified storage container in the first one or more photograph or images of videos and with identified level or available number of items or products or packages of raw ingredients or products or food items or filled items in in said accessed particular recognized and identified storage container in the second one or more photograph or images of videos, wherein first one or more photograph or images of videos taken before accessing of said particular identified storage container by said identified person and second one or more photograph or images of videos taken after accessing of said particular identified storage container by said identified person;

In an embodiment displaying view of one or more storage containers or bins from camera; in the event of detecting that a user has applied one or more types of pre-defined gestures including single tap on particular storage container in displayed view or photograph or particular image of video or live streaming of video of one or more storage containers or bins from camera, recognizing and identifying said tapped storage container and recognizing and identifying raw ingredients or products or food items or filled items and associate level or number of items or products or packages in said tapped or clicked recognized and identified storage container in the one or more photograph or images of videos; displaying one or more type of options on said tapped or clicked storage container in viewing photo or video; enabling user to select one or more options including remove said tapped storage container from automatically making of order of associated raw ingredients or products or food items or items, view or select or update brand and quantities or weight or numbers of items to order said tapped recognized and identified storage container associated raw ingredients or products or food items or items while automatically placing of order by system when level cross set threshold, requesting return of said tapped recognized and identified storage container associated raw ingredients or products or food items or items, view one or more types of contextual contents, data, media and offers associated with said tapped recognized and identified storage container associated raw ingredients or products or food items or filled items, report as not as per quality and other one or more types of complaint, provide one or more types of reactions including like, dislike, provide one or more types of emoticon, expressions, emoji, stickers, provide comments including review, feedback, instruction, notes, complaints, suggestions, fill contextual structured survey form, and provide video comments, make call or send or receive messages to/from contextual or associated persons or staff or authorized user, and manually make order of said tapped recognized and identified storage container associated raw ingredients or products or food items or items.

In an embodiment monitoring, tracking and storing logs of inventories comprise ordered products details including name, brand name, quantities or weights, date and time of order, amount of order, payment details, date and time associated usage including percentage or numbers from each identified container associated named or branded raw ingredients, raw materials, packaged food items, food items and products, name of person who accessed identified container associated raw ingredients, raw materials, packaged food items, food items and products.

In an embodiment monitoring, tracking and storing logs of activities, actions and call-to actions including date and time, type, description, triggering of events including used, cross set threshold level or numbers, automatically ordered, filled, storage container added, storage container removed, brand changed, update in quantities or numbers, request return, replace requested return, and report issues, transactions including make payment for automatically or manually place order, reactions including, various types of status including empty, filled, use, particular percentage of level, particular number of quantity, equal or below set threshold level or numbers, ordered, order shipped, order pending, order complete, payment made.

In an embodiment in the event of crossing of set threshold level or number of particular one or more storage containers or bins associated or filled raw ingredients or raw materials or product or food items, automatically send notification including name, brand name, quantities or weights, amount or price of said raw ingredients or raw materials or product or food items, date and time, total order amount and receive updates if any and confirmation of order from user before making order and/or making payment.

In an embodiment enabling user to provide privacy settings indulging schedules of automatically starting and stopping of camera, ask and confirm from user before making order and payment for order, enable administrator rights user to create one or more users or member in multi-user or enterprise application and provide one or more types of access roles, rights and privileges including view camera view from one or more selected shelfs associated storage containers or bins, confirm order, make payment, update profile or payment details, view statistics and analytics, view logs, change settings, manually make order, request replacement, provide reactions and reports, view usage details and reports, communicate with providers or sealers or suppliers, view and check highlighted filled products or raw materials.

In an embodiment in the event of adding new storage container and pasting label on said storage container, recognizing and identifying and automatically place order for said labeled raw materials or raw ingredients or food items or products or package products as per selected brands, associated quantities and weights or particular amount equivalent quantities and weights.

In an embodiment display name, brand name, type, unit price, source or provider or seller name, expiration date, filled date, las order date, various types of status including level, order made, payment done, pending to fill, filled as per order, average daily use, and details on each storage container inside capture photo or recorded video or live video stream or view of camera in application and highlight crossed set threshold level storage containers or bins, added storage containers or bins, place of removed storage containers or bins, empty storage containers or bins, filled storage containers or bins, reordered storage containers or bins, automatically ordered storage containers or bins, updated brands and quantities or weights storage containers or bins, request return storage containers or bins with status, notes, product name, selected or changed brand name, In an embodiment associate and store QRcode or merchant account information with location information including selected location or place on map, geo-coordinates including latitude and longitude, pre-defined or drawn geofence on map, and address, wherein QR code comprises encrypted merchant account information; identifying monitored and tracked current location of user device; identifying said identified current location associated QRcode or merchant account information based on sufficiently matching user device location with stored locations of QR codes; displaying said identified current location associated QRcode or full or part of merchant account information; and enable to make payment or transfer particular amount of fund from user's account to said identified current location associated stored merchant account details or identified current location associated QRcode associated merchant account based on decoding QR code associated encrypted merchant account details.

In an embodiment enable user to enter amount and enable to make payment or transfer particular amount of fund from user's account to said identified current location associated QRcode or merchant's account.

In an embodiment receive payment amount and enable to make payment or transfer particular amount of fund from user's account to said identified current location associated QRcode or merchant's account.

In an embodiment receive payment amount; initiate and start pre-set duration timer; in the event of expiration of said timer automatically make payment or transfer particular amount of fund from user's account to said identified current location associated QRcode or merchant's account.

In an embodiment automatically scan said identified current location associated QRcode to make payment or transfer particular amount of fund from user's account to said identified current location associated QRcode or merchant's account.

In an embodiment associate QRcode or merchant account information with location information; store QRcode or merchant account information with location information; identifying monitored and tracked current location of user device; identifying said identified current location associated one or more QR codes or merchant accounts information; displaying said identified current location associated one or more QR codes or merchant accounts information; enable to select one QRcode or merchant account information from list of identified current location associated one or more QR codes or merchant accounts information; and make payment make payment or transfer particular amount of fund from user's account to said identified current location associated QRcode or merchant's account.

In an embodiment associate QRcode or merchant account information with location information and beacon unique code or identity; store QRcode or merchant account information with location information and beacon unique code or identity; receiving unique code or identity from beacon; identifying said received unique code or identity associated QRcode or merchant account information; displaying said identified unique code or identity associated QRcode or merchant account information; and enable to make payment from user's account to said identified unique code or identity associated QRcode or merchant's account.

In an embodiment generate code including QR code, wherein QR code comprises encrypted unique code and mobile phone number; storing said unique code with mobile phone number; provide or display said QR code; in the event of receiving instruction to decode said QR code associated encrypted unique code and mobile phone number, automatically receive logged in user account or installed application or user device associated mobile phone number from registered application; decode said QR code associated encrypted unique code and mobile phone number; matching said received unique code with list of unique codes and identify matched unique code; identify said identified or matched unique code associated mobile phone number and matching said identified mobile phone number with said user account associated mobile phone number; and in the event of matching said identified mobile phone number with said user account associated mobile phone number, mark said unique code associated ticket as checked in by associating and storing cheeked in flag with said unique code.

In an embodiment display said unique code and cheeked in flag to authorized user.

In an embodiment identifying or decoding location information associated with QR code and sufficiently matching said identified and decoded location information associated with QR code with monitored and tracked current location of user device and notifying about sufficiently matching or not matching current location of user device with location information associated with QR code.

In an embodiment identifying or decoding location information and date and time associated with QR code and sufficiently matching said identified and decoded location information associated with QR code with monitored and tracked current location of user device and sufficiently matching said identified and decoded date and time associated with QR code with current date and time of user device and notifying about sufficiently matching or not matching current location and date and time of user device with location information and date and time associated with QR code.

In an embodiment determining, by the processor, a financial account for providing funds for the payment transaction; receiving, by the processor, a user input comprising a payment amount for the payment transaction; generating, by the processor, a QR code comprising a representation of the payment amount; and displaying, by the processor, the QR code on a display of the mobile device.

In an embodiment receiving, by the processor, a notification that the financial account contains funds equal to or greater than the received payment amount; and transmitting a notification indicating the generation of the QR code to a server.

In an embodiment determine, by the processor, a financial account for providing funds for a payment transaction; receive, by the processor, a user input comprising a payment amount for the payment transaction; generate, by the processor, a QR code comprising a representation of the payment amount; and display, by the processor, the QR code on the display.

In an embodiment receive a notification that the financial account contains funds equal to or greater than the received payment amount.

In an embodiment configuring, by the processor, the camera to scan one or more QR codes; scanning, by the camera, a QR code, wherein the QR code comprises data representing a payment transaction; determining, by the processor, that the scanning of the QR code is completed; displaying, on a display associated with the mobile device, a notification that the scanning of the QR code is completed; and transmitting, by the processor, the data representing the payment transaction to a server, wherein the data is obtained from the scanned QR code.

In an embodiment the data representing the payment transaction within the QR code comprises one or more of the payment amounts, the date and time that the QR code was generated, the date and time that the QR code was scanned, the identity of a user associated with generating the QR code, or the identity of a user associated with scanning the QR code.

In an embodiment receive a transmission from a mobile device comprising data representing a payment transaction, wherein the data is obtained from a scanned QR code; analyze information contained within the data representing the payment transaction, wherein the information comprises at least an amount of the payment transaction, the identity of a financial institution associated with a financial account that is the source of the funds for the transaction, and the identity of a financial institution associated with a financial account that is the destination of the funds for the transaction; determine that the financial institution associated with a financial account that is the source of the funds for the transaction authorizes the transaction; request the funds for the transaction from the financial institution associated with a financial account that is the source of the funds for the transaction; and transmit the funds for the transaction to the financial institution associated with a financial account that is the destination of the funds for the transaction.

In an embodiment determine that the data representing the payment transaction comprises a transaction token comprising identification information associated with a user of a mobile device that is associated with the financial account that is the source of the funds for the transaction; read the transaction token; and validate the identification information within the transaction token.

In an embodiment transmit a notification comprising a confirmation that the payment transaction was completed to one or more of the financial institution associated with a financial account that is the source of the funds for the transaction, and the financial institution associated with a financial account that is the destination of the funds for the transaction.

In an embodiment determining that the financial institution associated with the financial account that is the source of the funds for the transaction authorizes the transaction further comprises: determining the amount of the payment transaction; transmitting a notification to the financial institution comprising the amount of the transaction and information associated with the financial account; and receiving a notification that the financial institution authorizes withdrawal of the amount of the payment transaction from the financial account.

In an embodiment associate one or more types of actions, call-to-actions, reactions and survey controls with particular identified place, location, pre-defined or drawn geo-fence boundary, geocoordinate and address information; sufficiently matching monitored and tracked current location of user device with said particular identified place, location, pre-defined or drawn geo-fence boundary, geocoordinate and address information; and in the event of sufficiently identifying monitored and tracked current location of user device as said particular identified place, location, pre-defined or drawn geo-fence boundary, geocoordinate and address information, displaying said particular identified place, location, pre-defined or drawn geo-fence boundary, geocoordinate and address information associate one or more types of actions, call-to-actions, reactions and survey controls.

In an embodiment in the event of sufficiently identifying monitored and tracked current location of user device as said particular identified place, location, pre-defined or drawn geo-fence boundary, geocoordinate and address information, displaying said particular identified place, location, pre-defined or drawn geo-fence boundary, geocoordinate and address information associate one or more types of actions, call-to-actions, reactions and survey controls on map.

In an embodiment in the event of sufficiently identifying monitored and tracked current location of user device as said particular identified place, location, pre-defined or drawn geo-fence boundary, geocoordinate and address information, displaying said particular identified place, location, pre-defined or drawn geo-fence boundary, geocoordinate and address information associate one or more types of actions, call-to-actions, reactions and survey controls on prominent place of map including beside or surround or on or with identified place or location name.

In an embodiment enabling user to select and associate or integrate or attach or automatically identify, recognize and determine and automatically associate or integrate or attach one or more types of one or more actions, user to user or user to business or business to user or business to business call-to-actions and reactions controls including custom actions and reactions controls with one or more types of contents, post and message; select one or more contacts, groups, followers, one or more types of users of network for sending said one or more types of contents, post and message with selected or associated or integrated or attached or embedded one or more types of one or more actions, call-to-actions and reaction controls; send or share or present one or more types of contents, post and message with associated or integrated or attached or embedded one or more types of one or more actions, call-to-actions and reaction controls; and enable receiving user to access said received message or post or content associated or integrated or attached or embedded one or more types of one or more actions, call-to-actions and reaction controls.

In an embodiment control comprises name, icon, title, image, associated one or more functions, other one or more actions, call-to-actions, survey, task and reaction controls, graphical user interfaces (GUIS), data, one or more types of contents or media, templates, preferences, privacy settings including allow to access control to one or more authorized person, contacts, groups, one or more types of users of network and followers, provide one or more types of access rights, privileges, roles, apply security polices, allow to access control to target criteria specific users and as per triggering of rules, allow to access within particular place or range surround particular place or within pre-defined or drawn geofence boundary, allow to access and view control associated logged information or data about activities, actions, interactions, transactions, participations, communications, collaborations, tasks, workflow, numbers or statistics and status, settings including allow to access control for pre-set duration, message, request, command, instruction, status, location information, links or web addresses, photos, videos, text, emoticons, schedules, calendar, date and time, product or service details including name, brand name, photos, videos, price, offers, availability location and inventory.

In an embodiment monitoring, tracking, logging and storing one or more types of data, metadata and content associated with said accessed one or more types of actions and reactions controls including provided reactions, participations, conducted actions and call to actions, sharing, communications including sent or received messages, participation in events or group deals or group purchasing, transactions, collaborations, activities, status, interactions, connections, tasks, workflow, behavior, and applying of one or more types of gestures and senses.

In an embodiment displaying said one or more types of logged one or more types of data, metadata, and content, and statistics related to one or more types of activities, invitations, collaborations, tasks, transactions and status.

In an embodiment identify or determine one or more controls based on selection by user from list of controls In an embodiment identify or determine one or more controls based on recognizing and identifying scanned object(s) based on object recognition techniques In an embodiment identify or determine one or more controls based on identifying particular place or pre-defined geofence boundary based on monitored and tracked current location of user device and check-in or visiting or visited or bookmarked or liked places In an embodiment identify or determine one or more controls based on recognizing face or body parts of person based on face or body parts recognition techniques.

In an embodiment identify or determine one or more controls based on providing and identifying voice commands.

In an embodiment identify or determine one or more controls based on message or part of message content.

In an embodiment automatically identify, select and integrate one or more controls based on message or post contents In an embodiment enable sponsor to publish one or more controls or custom controls based on detecting pre-defined geofence boundary defined by sponsor, at particular pre-defined schedules, fulfil target criteria, recognizing and identifying scanned objects or code including QR code based on sponsor provided one or more object models, object images, object keywords, code including QR code and object criteria and triggering of one or more rules, conditions and events and conducting of one or more types of call-to-actions by user or visitor or customer or past customer.

In an embodiment enable 3rd parties' developers to register, develop, upload, verify, publish, sell and make searchable or available one or more controls for users of network.

In an embodiment enable user to search, match, browse, download, install, uninstall, update, upgrade, order, sort, categories, share, re-share, share link of control, hide, show, remove, apply privacy settings and access rights, create group for particular control, customize, make payment, subscribe, access as free, select, select based on object recognition, select based on current location or place or place of business or place of event or geofence associated with user device, select based on current date and time, select from suggested, wherein displaying suggested controls based on message, post, content, user profile, user device current location, user scanned object(s), voice command, user status, user activities, interactions with particular type of entities, participated event, conducted transaction, online activities including online purchase or order or booking or add to cart particular products or subscribing particular service.

In an embodiment providing full feature editor to draft, prepare, and update or edit one or more types of contents o post and enable to select and associate or attach or integrate or embed or package one or more types of one or more controls.

In an embodiment generating message or post based on user identity and associated information including profile photo, profile link, name, monitored and tracked user device current location information and associated place information, date and time, identified information including product or person name, product photos, videos, price, offers based on recognized scanned object and identified object associated information, user provided structured and unstructured information, content and data including question, request, instruction, command, photos, videos, product information, purposes, requirement specification, budget and user selected, associated, attached, integrated, attached and embedded one or more controls including actions, user to user or business to user call-to-actions, survey, advertisement, tasks, workflow and reactions controls.

In an embodiment enabling user to select and associate or integrate or attach or automatically identify, recognize and determine and automatically associate or integrate or attach one or more types of one or more actions, user to user or user to business or business to user or business to business call-to-actions and reactions controls including custom actions and reactions controls with one or more types of contents, post and message and associate view duration and life duration with said selected or associated or integrated or attached one or more types of one or more actions, call-to-actions and reactions controls; select one or more contacts, groups, followers, one or more types of users of network for sending said one or more types of contents, post and message with selected or associated or integrated or attached or embedded one or more types of one or more actions, call-to-actions and reaction controls; send or share or present one or more types of contents, post and message with associated or integrated or attached or embedded one or more types of one or more actions, call-to-actions and reaction controls; and in the event of receiving of said message or post or content and associated or integrated or attached or embedded one or more types of one or more actions, call-to-actions and reaction controls, initiate timer; start timer; in the event of expiration of said received message or post or content associated or integrated or attached or embedded one or more types of one or more actions, call-to-actions and reaction controls associated life duration or ending of associated session including shopping cart session or before checkout, remove or hide or disable said received message or post or content associated or integrated or attached or embedded displayed one or more types of one or more actions, call-to-actions and reaction controls.

Embodiments of the present disclosure relate to location and/or geofence based facilitating financial transactions over a network. In various embodiments, systems and methods for facilitating financial transactions over a network include first identifying or determining a location of a user or consumer, based on the user's mobile device/client application. Merchants, shops, or other sellers near the user are located and presented to the user on the mobile device. If there is more than one merchant, the user may select a preferred one of the merchants.

Once selected or determined, identifying and retrieving associated one or more types of code(s) e.g. QR code and decrypting or decoding code e.g. QR code to identify or access or retrieve associated encrypted or coded payment information, the user may make a payment to the merchant through the user's mobile device. For example, the merchant's account information with a payment provider including external payment provider in the form of one or more types of code(s) e.g. QR code may be associated with the particular merchant location or place of business. The user may be shown one or more types of code(s) e.g. QR code or decrypted or decoded account information for the merchant to allow the user to make a payment through the payment provider on the user's mobile device. In one embodiment, the user simply needs to log in, enter a payment amount, and confirm the payment. There would be no need to enter any recipient or merchant account information, such as an email address or phone number or account details. After the payment has been processed, the user and/or the merchant may receive a confirmation (or denial) of the payment request. If approved, the user may then simply take possession of the purchase. For example, the user may pick up the item(s) at the particular store associated with particular pre-defined location or geofence or at a check-out counter and have the merchant confirm or pay restaurant bills at location or place of business or pre-defined associated geofence of particular restaurant, pay bill at location or pre-defined associated geofence of particular hospital, pay for petrol at location or pre-defined associated geofence of particular patrol pumps, pay toll at location or pre-defined associated geofence of particular toll, book railway or bus or boat or show or movie or amusement park tickets at location or pre-defined associated geofence of particular railway or bus or boat or show or movie or amusement park, pay bill at location or pre-defined associated geofence of particular hawker.

In another embodiment, inventory or items from the merchant may be presented to the user on the user's mobile device when the merchant is selected or determined for enabling user to search, match and select or browse categories directories or catalogues of products and services and select or select from suggested, bookmarked list. The user can then select desired items. Payment can be processed as discussed above.

In other embodiments, the merchant may be able to offer goods and services through a mobile device, where the merchant inventory is stored in a cloud storage medium. As a result, the merchant may upload item or items for sale at a physical location (e.g., a physical shop)

In an embodiment receiving, by a hardware processor of a server coupled to a user mobile device via a network interface component and a network, location information of a user from the user mobile device; determining, by the hardware processor, a location of the user based on the location information; determining, by the hardware processor, one or more types of locations including point of interests, places, place of businesses including shops, restaurants, malls, walls, patrol pumps, tolls, hospitals, movie or show theatres, place of event and pre-defined geofences that are within the threshold distance of the location of the user; transmitting, by the hardware processor via the network interface component and the network and after determining the one or more types of locations, one or more types of codes including QR code(s) and associated one or more types of information of each of the one or more determined types of locations to the user mobile device; receiving, by the hardware processor via the network interface component and the network, a selection of one of the type of location by the user from among the determined types of locations; receiving, by the hardware processor via the network interface component and the network, a next selection of at least one of the one or more code(s) including QR code(s) by the user; automatically decrypting or decoding, by the hardware processor, said selected one or more code(s) including QR code(s) to identify or retrieve information contained or coded or encrypted in said selected one or more code(s) including QR code(s); and processing, by the hardware processor, the request based on the said decoded information.

In an embodiment processing, actions and results or outputs or response may comprises take one or more actions including send email, make call, view offer, participate in offer or deal, buy product(s), subscribe services, opt-in information, follow, connect, provide contact details, save business card, book tickets, view video including movie trailer, become member, request sample, provide feedback or fill survey form, provide one or more types of reactions including like, dislike, comment, share and select one or more types of emoticons, order food, pay toll, pay fees, pay rent, pay installment, pay bill, present product demonstrations and reviews, present details, present posts, display advertisement, present calendar and schedules, get appointment, connect user to coupon provided by particular place of business, connect user to social media of particular place of business, send, receive, store, display one or more types of contents including data, media, form, web page, website, application, user action, object, link based on the said decoded information.

In an embodiment receiving, by a hardware processor of a server coupled to a user mobile device via a network interface component and a network, location information of a user from the user mobile device; determining, by the hardware processor, a location of the user based on the location information; determining, by the hardware processor, one or more merchants that are within the threshold distance of the location of the user; transmitting, by the hardware processor via the network interface component and the network and after determining the one or more merchants, one or more types of code(s) including merchant QR codes which contains encrypted or coded information including account information and payment information of each of the one or more determined merchants to the user mobile device; receiving, by the hardware processor via the network interface component and the network, a selection of one of the merchants by the user from among the determined merchants; automatically decrypting or decoding, by the hardware processor, said selected merchant associated one or more code(s) including QR code(s) to identify or retrieve information contained or coded or encrypted in said one or more code(s) including QR code(s); receiving, by the hardware processor via the network interface component and the network, a payment request from the user; automatically populating, by the hardware processor, the next selection and associated account information and payment information into a checkout process without the user having to enter the account information and payment information on the user mobile device; and processing, by the hardware processor, the payment request based on the account information and payment information.

In an embodiment transmitting a list of the merchants to the user mobile device when more than one merchant is within the threshold distance of the location of the user.

In an embodiment transmitting payment information of the selected one of the merchants to the user mobile device via the network interface component and the network, the payment information comprises data for use by the user mobile device in populating a payment request form.

In an embodiment the location information comprises GPS coordinates.

In an embodiment the server is managed by a payment provider.

In an embodiment the merchant information identifies an account of the selected one of the merchants to the payment provider.

In an embodiment receiving from a user or a merchant or server admin or external source, by a hardware processor of a server coupled to a user mobile device via a network interface component and a network, selected place or defined geofence or particular place or place of business related or associated details including payment information and account information related to user or merchant associated with said place, wherein the account information comprises merchant account identifiers and merchant location information; storing, by a hardware processor of a server coupled to a user mobile device via a network interface component and a network, said selected place or defined geofence or particular place or place of business related or associated details including payment information and account information related to user or merchant associated with said place; receiving, by a hardware processor of a server coupled to a user mobile device via a network interface component and a network, one or more criteria and monitored and tracked location information of a user from the user mobile device; determining, by the hardware processor, a location of the user based on the location information; determining, by the hardware processor, one or more places based on criteria and a location of the user; generating, using the hardware processor, a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within the predetermined threshold distance of the location of the user, search query including provided or selected location information specific nearby places, selected category specific places and any combination thereof; dynamically displaying on said generated map, by the hardware processor via the network interface component and the network, one or more graphical place indicators to indicate locations of the identified places, wherein in the event of user selecting of particular graphical representation or graphical indicator or icon on a map display, after the map is generated and after the graphical indicator of each identified place is displayed, displaying graphical user interface (GUI), wherein graphical user interface (GUI) enables user to select make payment option and enable to enter amount or use pushed or default amount and instructing, to a hardware processor, make payment from the user's account to the selected graphical representation or graphical indicator associated identified place associated account including merchant account or user account; receiving, by the hardware processor, a request for a payment indication, wherein the request comprises payment amount, identity of a user to identify user selected or pre-set account information and identity of selected graphical representation or graphical indicator associated place or place associated merchant to identify associated merchant account information or user account information; processing, by the hardware processor, a payment request to the selected graphical representation or graphical indicator associated identified place associated identified merchant or identified user, received from the user mobile device via the network interface component, without the user having to enter the account information related to user or merchant; and debiting, by the hardware processor, said amount from user's account and crediting, by the hardware processor, said amount to the merchant's account including merchant bank account or debit card account.

In an embodiment display, claim pay control including pay button or link or image with each place or place associated one or more types of graphical user interface (GUIs) on map; enabling user to claim place associated pay control by providing registration details and payment and account information; and after verification of details activate or enable or display play control and make them available for customers for making payment to said place associated registered and verified user or merchant and enable said registered and verified user or merchant to accept payment from customers via said place associated pay control.

In an embodiment merchant registration details comprises Business Name, Registration name, personal details, including first and last name, and copies of personal ID documents, Mobile Number including Mobile Number linked with bank account, Email address (optional), Shop Name/Display Name, Select Business Category, Select Business Sub Category, contact person name and contact information, country specific Business Address format including Shop/Office Number, Street Name, Area/Sector/Village, Pin code, City/Town, State, government identification numbers for person identity proof, financial information and tax identification information and business identity and permission proof including social security number, pan card number, Aadhaar number, account information including bank account information including country specific Bank code, Bank Identifier Code, SWIFT code and account number, debit card number, upload image of payments QR code generated and verified by one or more external sources.

In an embodiment enabling user to register with the server system for making payment from user's account to place associated merchant's account or other user's account.

In an embodiment registration details comprises registration details comprises mobile number, email address, user name, password, one or more types of payment method including add and verify one or more debit cards, credit cards, wallets, and bank accounts including provide bank account code and account number.

In an embodiment place and place of business related or associated details including place name, icon, location information including geo-coordinates or GPS coordinates including latitude and longitude, selected or updated location on map, address, geocode, geofence including predefined, selected and drawn geofence, one or more types, categories, contact information including phone number, email, messaging account name, website, business hours, media including photos, videos, 360 degree views, data fields and associated values, description, products and services details, menu, one or more types of offers including discounts, sale, voucher, free samples or trails, redeemable points, cashback offer, group deals or deals, ratings, reviews, reactions including like, dislike, and emoticons, distance, estimated time to reach or arrive from particular place, routes, traffic conditions, one or more types of user actions or call-to-actions, including directions, share, bookmark, save, view nearby places, make voice call, send message, send e-mail, make video call and report, associated or related merchant information including payment information, account information, bank account information, and one or more types of unique identities and accounts details.

In an embodiment types of places includes shopping stores, restaurants, grocery stores, pharmacies and chemists, patrol pumps, ATMs, selling counters inside shop, hospital, banks, beauty parlor and salon, lounge, coffee shop, hotel, toll, pathology labs, multiplexes theatres, bust stop, railway stations, home or apartment or building, office, industry and manufacturing, warehouse or storage, stations, centers, school, college, class, hawkers or venders, spiritual center including temple, auditorium, museum, art gallery, boat station, cycle stand, dealers or distributors, small shops, parking including car parking, mall, garden, point of interest, tourist places, canteen, gym, service centers, clubs including sports clubs, halls, stadium, swimming pool, beach, beach stores, race course, amusement park, resorts, zoo, park, sub-place inside place, library, cab stations, government buildings and dynamic indoor or outdoor event space or event places including fair, exhibitions, conference, festival, party, circus.

In an embodiment enabling place owner or authorized user to associate one or more sub-places within place by providing name, icon, unique number and code to each added sub-places and/or selected sub-place associate person and associate with place or location of place, so place visitor or customer or user can manually select sub-place within location or geofence of place by selecting particular sub-place from list of sub-places associated with place or current place which identified based on current location of user device and make payment of particular amount from user's account to said place associated selected sub-place associated merchant's account or counter's account or user's account or associate particular sells with particular counter or user associated with counter.

In an embodiment enabling place owner or authorized user to associate one or more sub-places within place by providing name, icon, unique number and code, wing number, building no, flat or office number to each added sub-places and associate with place or location of place, so place visitor or other user can manually select sub-place within location or geofence of place by selecting particular sub-place from list of sub-places associated with place or current place which identified based on current location of user device and make payment of particular amount from user's account to said place associated selected sub-place associated user's account or selected sub-place associated selected one of the user from the group or list of users or contacts associated with said selected sub-place (e.g. Place=Super Tower, NYC and Sub place=A-Wing/Flat No.-1234 and User=Yogesh Rathod).

In an embodiment dynamically change or update merchant account information or user account information for same place or place of business or particular place (e.g. event location or place, particular defined and named geofence) by authorized person or administrator manually or automatically as per rules, instruction, request, order, booking, reservation, schedule (date and time) or duration, calendar entries.

In an embodiment enable to define, verify, store and list geofence and associated merchant's information including merchant's account information or payment account's information, associated particular amount of price or particular amount of charges or toll or fees for particular duration associated with all or each or corresponding one or more types of vehicles or persons or selected specific vehicles or persons or users. In the event of detection or identification or recognition of entering of, dwelling or moving and exiting of particular vehicle or user or entity from location of said defined geofence, automatically deducting or transferring default or pre-set or identified or determined amount from user's account to said defined geofence associated merchant's account or user's account or selected sub-place associated merchant's account or user's account as discussed above.

In an embodiment in the event of physically visiting at particular place or place of business or branch of place or type of place or search and/or select place on map, displaying said current place or selected place associated and type of place associated graphical user interface comprises ticking booking user interface, hotel room booking user interface, order food (e.g. at restaurant, vendor, stall, canteen, hospital, station, movie theater, event place, store etc.) user interface, purchase or order products and services (grocery store, medical store etc.) user interface, wherein graphical user interface associated with book and collect ticket type of place enables user at said physical place to select movie, number of seats and show time and make billed amount payment from user's account to said place associated merchant's account and collect physical tickets from particular counter. Merchant or authorized users can view photo, name and identity of users who has made payments but not yet collected tickets and during or after providing tickets, merchant or authorized users can remove or mark user who has collected tickets. In another example, graphical user interface associated with book and collect ticket type of place enables user at said physical place, for example at railway or metro or boat or bus station to select number of tickets and select or enter destination(s) and make payments from user's account to said station associated payment's account or station associated counter associated payment's account.

In another example, in the event of physically visiting at specific hotel, displaying hotel room booking user interface to said user for enabling user to select type and number of rooms and make automatically calculated or billed or invoice amount of payments from user's account to said hotel associated merchant's account. In another example, in the event of physically visiting at specific restaurant, displaying said restaurant menu and enable user to select food items and numbers of plates and make automatically calculated or billed or invoice amount of payments from user's account to said restaurant associated merchant's account. User can make advance order and make payment and eat at restaurant, or ser can make order from restaurant and wait for order ready, when ready get notified and pick order, eat at restaurant and make payment or user can order from remote or at place of restaurant and pick delivery or user order from restaurant, eat and before leaving make payment or user can make order remotely and make payment and choose home delivery option. In another example, in the event of physically visiting at specific grocery store, displaying said store associated purchase or order products and services (grocery store, medical store etc.) user interface and enabling user to (look & feel products, make customization request, ask queries or converse) select products, make order from store and make billed amount (pushed by merchant or enter by user or automatically calculated amount as per selected products from digital menu) payments from user's account to said store associated merchant's account and select home delivery or store pickup option, wherein displaying current location of user device specific current lace or nearest place or list of nearby places for user selection and based on current place or selection of place, displaying said place associated graphical user interface, applications, user actions, call-to-actions, ratings, reviews, contents, data, media and information.

In an embodiment enabling user to create, claim and verify home type place by providing required details including home address or selected location or pointer on map or defined geofence or geocode or geo coordinates, name and photo(s) of owner and family members resides at said place of home, proof of residence and identity of owner and each member of home, if multi stories or multi floors or multi house buildings or apartments then in addition of address provide wing number, building number, house number, floor number, flat or office number and room number to uniquely identify home place within said location of building or place. After verifying said place of home and associated owner and associated family members or users, enable various types of authorized utilities services providers including mobile carrier, DTH, Electricity, Credit cards, Piped Gas, Broadband, Landline, Water, Insurance, School/College/Class, Society, Data service provider to push monthly bills, invoice, pending amount, installments, premium, rent, fees, charges, penalty, offers, advance order option or any types of bills related to mobile recharge, DTH, electricity, credit cards, piped gas, broadband, landline, water, insurance, School/College/Class fees, home rent, society maintenance bills, employee salaries, data card and pending tax (e.g. Municipal). User can view from single interface said all types of bills and can make payments for selected bill or invoice or with one tap or automatically (based on privacy settings and authorization settings) can make all pending dues payments from user's account to said respective service provider associated with corresponding bills.

In an embodiment displaying one or more types of applications, graphical user interfaces, forms, wizards, lists, directories and catalogues of products and services and associated details, menu, web page, web site, one or more types of data, information, content and media, notifications, messages, status, logs, offers, user actions, reactions, call-to actions and controls before, while and after making of payment.

In another embodiment identifying movable vehicle (e.g. cab or taxi) on map in which user or accompanied users or contacts is/are currently travelling based on monitored and tracked location of the user mobile device(s). Identifying said vehicle associated driver based on monitored and tracked location of the driver mobile device who is associated with said vehicle. Enabling user to tap on said vehicle on map and destination name, view current meters, estimated time to reach, and status and in the event of reaching near to said destination place or after reaching at said destination place, notifying user and enable user to make said metered or billed amount of payment (plus tips, toll, tax, food, patrol, waiting and other charges) from user's account to said vehicle associated user's or driver's or vehicle owner's account and provide confirmation notification and bill or invoice or transaction details.

In an embodiment the location information comprises GPS coordinates.

In an embodiment the server is managed by or connected with a payment provider.

In an embodiment the merchant information identifies an account of the selected one of the merchants to the payment provider.

In an embodiment associate one or more merchant information including one or more payments and accounts information with one or more selected or identified places on map.

In an embodiment mapping existing payment and account information related to merchant and user to identified place based on said payment and account information associated verified address or identified place based on said address and enable visitor user of said place to make in-store payment at physical place including store or place of business location based on monitored and tracked current location of the user device and enable said merchant or user to accept payment from place visitor users of digital map.

In an embodiment creating place on map based on payment and account information and associated address or business address, name of business or place of business or store, categories, sub-categories, contact information including phone number, email address, website name or address or URL and one or more types of information associated or related to place or address associated place, wherein identify geo coordinates or GPS coordinates including latitude and longitude based on said address for displaying or positioning or making place searchable or locating place or place associated or related one or more types of information and call-to-actions on map.

In an embodiment enable user or place associated merchant or staff to provide or update or access said place related or associated one or more types of information including business hour, keywords, tags, categories, sub-categories, hours of business, one or more types of media including photos, videos, 360 degree views, and use place associate one or more types of user actions, controls and call-to-actions including provide ratings, reviews, share place or place location, make call, send message, access website, view directions, view navigation, view route, view estimated time to reach or arrive from/to current place from/to particular place, save or bookmark or add list place, view nearby places or nearby one or more types of places.

In an embodiment creating place on map based on already exists data records or one or more types of contents in one or more types of storage medium from one or more sources.

In an embodiment enable user to select particular place on map and claim place or place of business or request manage listing of said place by sending request to server system and provide required one or more types of data or information or documents including to confirm business information including name, address, contact information, website, location information, business, identity of business, identity of place of business and identity of person who claimed or made said request whether said place owned to said requestor or not.

In an embodiment enable user to add new place or place of business and or register or sign up or list or verify business or place by providing required information including business name, business category, address including country, street address, pin code, state, confirm that user wants to add a location customers can visit, like a store or office to show up said place or place of business on maps and enable to search when customers are looking for your business or place or place of business, show or select on map location of place or place of business by dragging and zooming the map and position the marker on the exact spot where place or business is located, confirm acceptance of terms of service and privacy policy associated with maps or maps service provider(s), select preferred verification option including verify business listing by mail, email, phone and based on verified website or verify business or place based on external verification service providers including verify place or place of business from mobile app by providing mobile number and entering one time password (OTP) received on said mobile device or automatically verifying by identifying received one time password (OTP) and providing bank account information including bank code and account number linked or associated with said mobile number, make payment for listing based on one or more types of memberships, subscriptions, payment models and modes.

In an embodiment enable user to manage place, promote business with posting photos and posts, track business analytics to understand customers, respond to customer reviews, offline merchant associated with place can accept digital payments offline on the retail store based on place associated payment and account information or accept in-store payments via location or place associated payment control or graphical user interface (GUI) or accept Payments from place of business on map or request money including send payment links to customers to get paid instantly, conduct bank settlements including direct settlement into merchant's or user's bank account to transfer money directly into merchant's or user's bank account either instantly or within particular period of time, supports all payment methods, track their transactions and payments on a real-time basis, publish deals and offers, provide custom offers, add photos and videos to demonstrate products and services to customers, answer questions of customers, chat directly with customers, report inappropriate reviews, add or remove users to manage listings and provide rights and privileges including view payment transaction details, conduct bank settlement, edit contents including profile, photo, video, logos, URLs, contact information, categories, tags, publish posts, respond to review, make call or send and view received messages, close place or deactivate payment service, edit business hours, edit service, manage multiple places and update said details for selected one or more places, transfer ownership of listings, promote or advertise one or more places or listings of places on map and view detail reports and analytics.

In an embodiment receiving from a user or a merchant or server admin or external source, via the network interface component and a network, selected place or defined geofence or particular place or place of business related or associated details including payment information and account information related to user or merchant associated with said place, wherein the account information comprises merchant account identifiers and merchant location information.

In an embodiment storing said selected place or defined geofence or particular place or place of business related or associated details including payment information and account information related to user or merchant associated with said place in the non-transitory memory, wherein the account information comprises merchant account identifiers and merchant location information.

In an embodiment receiving, via the network interface component and a network, one or more criteria and monitored and tracked location information of a user from the user mobile device.

In an embodiment determining a location of the user based on the location information.

In an embodiment determining one or more places based on criteria and a location of the user.

In an embodiment generating a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within predetermined threshold distance of the location of the user, search query including provided or selected location information specific nearby places, selected category specific places and any combination thereof.

In an embodiment dynamically displaying on said generated map, via the network interface component and a network, one or more graphical place indicators to indicate locations of the identified places, wherein in the event of user selecting of particular graphical representation or graphical indicator or icon on a map display, after the map is generated and after the graphical indicator of each identified place is displayed, displaying graphical user interface (GUI), wherein graphical user interface (GUI) enables user to select make payment option and enable to enter amount or use pushed or default amount and instruct to make a payment from the user's account to the selected graphical representation or graphical indicator associated identified place associated account including merchant account or user account.

In an embodiment receiving, via the network interface component and a network, a request for a payment indication, wherein the request comprises payment amount, identity of a user to identify user selected or pre-set account information and identity of selected graphical representation or graphical indicator associated place or place associated merchant to identify associated merchant account information or user account information.

In an embodiment processing a payment request to the selected graphical representation or graphical indicator associated identified place associated identified merchant or identified user, received from the user mobile device via the network interface component, without the user having to enter the account information related to user or merchant.

In an embodiment debiting said amount from the user's account and crediting said amount to the merchant's account.

In an embodiment outputting, by a mobile computing device and for display at a presence-sensitive display, a one or more types of graphical user interface comprising map graphical user interface including at least an icon or graphical representation or name of place associated with a place or location of place or location on map or defined geofence associated with a place executable by the mobile computing device; receiving, by the mobile computing device and from the presence-sensitive display, an indication of a first user input detected by the presence-sensitive display at a location of the presence-sensitive display associated with the icon or graphical representation or name of place; responsive to receiving the indication of the first user input, outputting, by the mobile computing device and for display at the presence-sensitive screen, a payment control including button, link, icon, menu or graphical user interface including a payment control; receiving, by the mobile computing device and from the presence-sensitive display, an indication of a second user input detected by the presence-sensitive display at a location of the presence-sensitive display associated with the payment control; responsive to receiving the indication of the second user input, transferring or deducting or debiting fund or particular amount or one or more types of digital money from user associated or related or accessed or authorized source of fund or one or more types of user account or one or more types of mode of payments including one or more types of one or more bank accounts, credit cards, debit cards, wallets, crypto currencies including bitcoins to said selected place associated account or fund storage medium.

In an embodiment output, for display at the presence-sensitive display, a one or more types of graphical user interface comprising map graphical user interface including at least an icon or graphical representation or name of place associated with a place or location of place or location on map or defined geofence associated with a place executable by the computing device.

In an embodiment receive, from the presence-sensitive display, an indication of a first user input detected by the presence-sensitive display at a location of the presence-sensitive display associated with the icon or graphical representation or name of place.

In an embodiment responsive to receiving the indication of the first user input: output, for display at the presence-sensitive screen, a payment control including button, link, icon, menu or graphical user interface including a payment control.

In an embodiment receive, from the presence-sensitive display, an indication of a second user input detected by the presence-sensitive display at a location of the presence-sensitive display associated with the icon.

In an embodiment responsive to receiving the indication of the second user input: transfer or deduct or debit fund or particular amount or one or more types of digital money from user associated or related or accessed or authorized source of fund or one or more types of user account or one or more types of mode of payments including one or more types of one or more bank accounts, credit cards, debit cards, wallets, crypto currencies including bitcoins to said selected place associated account or fund storage medium.

In an embodiment enabling an owner of a QR code or an owner or an authorized user related to a place to capture or take a photo or a video including series of images and upload or provide one or more payments QR codes related to said place from a location of the place and/or enabling a user to capture or take a photo or a video including series of images and upload or provide one or more payments QR codes related to a particular place from a location of the place; directly receiving, from the camera of a mobile device, from the user or the owner of QR code or the owner or the authorized user related to place, by a hardware processor of a server coupled to a user mobile device via a network interface component and a network, said uploaded or provided one or more QR codes and location information of a user from the user mobile device, where user is not allowed to edit, alter, augment said captured image of QR code; determining, by the hardware processor, a location of the user based on the location information; storing, by a hardware processor of a server coupled to a user mobile device via a network interface component and a network, said uploaded or provided one or more QR codes and associating said location information of a user device with said uploaded or provided one or more QR codes; verifying, by a hardware processor of a server coupled to a user mobile device via a network interface component and a network, said uploaded or provided one or more QR codes to determine QR code associated place, location of place and place associated merchant information including payment and account information; generating, using the hardware processor, a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within the predetermined threshold distance of the location of the user, search query including provided or selected location information specific nearby places, selected category specific places and any combination thereof; dynamically displaying on said generated map, by the hardware processor via the network interface component and the network, one or more graphical place indicators to indicate locations of the identified places, wherein in the event of user selecting of particular graphical representation or graphical indicator or icon on a map display, after the map is generated and after the graphical indicator of each identified place is displayed, displaying graphical user interface (GUI), wherein graphical user interface (GUI) enables user to select make payment option and enable to enter amount or use pushed or default amount and instructing, to a hardware processor, make payment from the user's account to the selected graphical representation or graphical indicator associated identified place associated account including merchant account or user account; receiving, by a hardware processor of a server coupled to a user mobile device via a network interface component and a network, a request for a payment indication and location information of a requesting user from the user mobile device; determining, by the hardware processor, a location of the requesting user based on the location information; identifying, by the hardware processor, said location associated place associated QR code; scanning, by the hardware processor, said location associated place associated QR code to identify merchant information including payment and account information; processing, by the hardware processor, the payment request based on the payment information; and debiting, by the hardware processor, said amount from the user's account and crediting, by the hardware processor, said amount to the merchant's account including merchant bank account or debit card account.

In an embodiment enable an owner of a QR code or an owner or an authorized user related to a place to capture or take a photo or a video including series of images and upload or provide one or more payments QR codes related to said place from a location of the place and/or enable a user to capture or take a photo or a video including series of images and upload or provide one or more payments QR codes related to a particular place from a location of the place.

In an embodiment directly receiving, from the camera of a mobile device, from the user or the owner of QR code or the owner or the authorized user related to place, via the network interface component and a network, said uploaded or provided one or more QR codes and location information of a user from the user mobile device, where user is not allowed to edit, alter, augment said captured image of QR code.

In an embodiment determining a location of the user based on the location information.

In an embodiment storing said uploaded or provided one or more QR codes in the non-transitory memory and associating said location information of a user device with said uploaded or provided one or more QR codes.

In an embodiment verifying said uploaded or provided one or more QR codes to determine QR code associated place, location of place and place associated merchant information including payment and account information.

In an embodiment generating a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within the predetermined threshold distance of the location of the user, search query including provided or selected location information specific nearby places, selected category specific places and any combination thereof.

In an embodiment dynamically displaying on said generated map, via the network interface component and a network, one or more graphical place indicators to indicate locations of the identified places, wherein in the event of user selecting of particular graphical representation or graphical indicator or icon on a map display, after the map is generated and after the graphical indicator of each identified place is displayed, displaying graphical user interface (GUI), wherein graphical user interface (GUI) enables user to select make payment option and enable to enter amount or use pushed or default amount and instructing, to a hardware processor, make payment from the user's account to the selected graphical representation or graphical indicator associated identified place associated account including merchant account or user account.

In an embodiment receiving, via the network interface component and a network, a request for a payment indication and location information of a requesting user from the user mobile device.

In an embodiment determining a location of the requesting user based on the location information.

In an embodiment identifying, via the network interface component and a network, said location associated place associated QR code.

In an embodiment scanning said location associated place associated QR code to identify merchant information including payment and account information.

In an embodiment processing, via the network interface component and a network, the payment request based on the payment information.

In an embodiment debiting, via the network interface component and a network, said amount from the user's account and crediting, by the hardware processor, said amount from the merchant's account.

In an embodiment enabling an owner of a QR code or an owner or an authorized user related to a place to capture or take a photo or a video including series of images and upload or provide one or more payments QR codes related to said place from a location of the place and/or enabling a user to capture or take a photo or a video including series of images and upload or provide one or more payments QR codes related to a particular place from a location of the place; directly receiving, from the camera of a mobile device, from the user or the owner of QR code or the owner or the authorized user related to place, by a hardware processor of a server coupled to a user mobile device via a network interface component and a network, said uploaded or provided one or more QR codes and location information of a user from the user mobile device, where user is not allowed to edit, alter, augment said captured image of QR code; determining, by the hardware processor, a location of the user based on the location information; storing, by a hardware processor of a server coupled to a user mobile device via a network interface component and a network, said uploaded or provided one or more QR codes and associating said location information of a user device with said uploaded or provided one or more QR codes; verifying, by a hardware processor of a server coupled to a user mobile device via a network interface component and a network, said uploaded or provided one or more QR codes to determine QR code associated place, location of place and place associated merchant information including payment and account information; generating, using the hardware processor, a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within the predetermined threshold distance of the location of the user, search query including provided or selected location information specific nearby places, selected category specific places and any combination thereof; dynamically displaying on said generated map, by the hardware processor via the network interface component and the network, one or more graphical place indicators to indicate locations of the identified places, wherein in the event of user selecting of particular graphical representation or graphical indicator or icon on a map display, after the map is generated and after the graphical indicator of each identified place is displayed, displaying graphical user interface (GUI), wherein graphical user interface (GUI) enables user to select make payment option and enable to enter amount or use pushed or default amount and instructing, to a hardware processor, make payment from the user's account to the selected graphical representation or graphical indicator associated identified place associated account including merchant account or user account; receiving, by a hardware processor of a server coupled to a user mobile device via a network interface component and a network, a request for a payment indication and location information of a requesting user from the user mobile device; determining, by the hardware processor, a location of the requesting user based on the location information; determining, by the hardware processor, one or more merchants that are within the threshold distance of the location of the user; transmitting, by the hardware processor via the network interface component and the network and after determining the one or more merchants, payments QR code of each of the one or more determined merchants to the user mobile device; receiving, by the hardware processor via the network interface component and the network, a selection of one of the merchants by the user from among the determined merchants; scanning, by the hardware processor, said selected merchant associated QR code to identify merchant information including payment and account information; processing, by the hardware processor, the payment request based on the payment information; and debiting, by the hardware processor, said amount from the user's account and crediting, by the hardware processor, said amount from the merchant's account.

In an embodiment enable an owner of a QR code or an owner or an authorized user related to a place to capture or take a photo or a video including series of images and upload or provide one or more payments QR codes related to said place from a location of the place and/or enable a user to capture or take a photo or a video including series of images and upload or provide one or more payments QR codes related to a particular place from a location of the place.

In an embodiment directly receiving, from the camera of a mobile device, from the user or the owner of QR code or the owner or the authorized user related to place, via the network interface component and a network, said uploaded or provided one or more QR codes and location information of a user from the user mobile device, where user is not allowed to edit, alter, augment said captured image of QR code.

In an embodiment determining a location of the user based on the location information.

In an embodiment storing said uploaded or provided one or more QR codes in the non-transitory memory and associating said location information of a user device with said uploaded or provided one or more QR codes.

In an embodiment verifying said uploaded or provided one or more QR codes to determine QR code associated place, location of place and place associated merchant information including payment and account information.

In an embodiment generating a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within the predetermined threshold distance of the location of the user, search query including provided or selected location information specific nearby places, selected category specific places and any combination thereof.

In an embodiment dynamically displaying on said generated map, via the network interface component and a network, one or more graphical place indicators to indicate locations of the identified places, wherein in the event of user selecting of particular graphical representation or graphical indicator or icon on a map display, after the map is generated and after the graphical indicator of each identified place is displayed, displaying graphical user interface (GUI), wherein graphical user interface (GUI) enables user to select make payment option and enable to enter amount or use pushed or default amount and instructing, to a hardware processor, make payment from the user's account to the selected graphical representation or graphical indicator associated identified place associated account including merchant account or user account.

In an embodiment receiving, via the network interface component and a network, a request for a payment indication and location information of a requesting user from the user mobile device.

In an embodiment determining a location of the requesting user based on the location information.

In an embodiment determining one or more merchants that are within the threshold distance of the location of the user.

In an embodiment transmitting, via the network interface component and a network and after determining the one or more merchants, payments QR code of each of the one or more determined merchants to the user mobile device.

In an embodiment receiving, via the network interface component and a network, a selection of one of the merchants by the user from among the determined merchants.

In an embodiment identifying, via the network interface component and a network, said location associated place associated QR code.

In an embodiment scanning said location associated place associated QR code to identify merchant information including payment and account information.

In an embodiment processing, via the network interface component and a network, the payment request based on the payment information.

In an embodiment debiting, via the network interface component and a network, said amount from the user's account and crediting, by the hardware processor, said amount from the merchant's account including merchant bank account or debit card account.

In an embodiment receiving from a user or a merchant or server admin or external source, via the network interface component and a network, selected place or defined geofence or particular place or place of business related or associated details including payment information and account information related to user or merchant associated with said place, wherein the account information comprises merchant account identifiers and merchant location information; storing said selected place or defined geofence or particular place or place of business related or associated details including payment information and account information related to user or merchant associated with said place in the non-transitory memory, wherein the account information comprises merchant account identifiers and merchant location information; receiving, via the network interface component and a network, one or more criteria and monitored and tracked location information of a user from the user mobile device; determining a location of the user based on the location information; determining one or more places based on criteria and a location of the user; generating a map based on monitored and tracked current location of user device or location information, wherein the generated map comprises plotting on the generated map a selectable and actionable graphical representation or graphical indicator or icon of each identified or determined criteria specific place(s) including current place, nearby place or places that are within predetermined threshold distance of the location of the user, search query including provided or selected location information specific nearby places, selected category specific places and any combination thereof; dynamically displaying on said generated map, via the network interface component and a network, selectable and actionable graphical representation or graphical indicator or icon of each identified place, associated place name and each place associated or integrated graphical user interface (GUI), wherein graphical user interface (GUI) enables user to enter amount or use pre-set or pushed or default amount and instructing, to a hardware processor, make payment from the user's account to the selected graphical representation or graphical indicator associated identified place associated account including merchant account or user account by selecting or clicking or tapping make payment control; receiving, via the network interface component and a network, a request for a payment indication, wherein the request comprises payment amount, identity of a user to identify user selected or pre-set account information and identity of selected graphical representation or graphical indicator associated place or place associated merchant to identify associated merchant account information or user account information; processing a payment request to the selected graphical representation or graphical indicator associated identified place associated identified merchant or identified user, received from the user mobile device via the network interface component, without the user having to enter the account information related to user or merchant; and debiting said amount from the user's account and crediting said amount to the merchant's account including merchant bank account or debit card account.

In an embodiment storing place of business details including at least business name, phone number and business address and associating merchant account details for plurality of places; displaying the current place or one or more nearby places or selected category specific nearby places on map and/or map linked list based on location of the user mobile device or displaying searched places on map and/or map linked list; and receiving instruction from the user from standardized and integrated payment user interface of user mobile device to make payment of particular amount from the user's account to said current place or user selected place associated merchant's account without the user having to enter the account information related to the merchant.

In an embodiment business details comprises business name, business category, business address, business contact information including mobile phone number, email address, website URL, photos, videos, merchant account information including bank code, account number and one or more types of verified identification numbers to identify place, place associated business, place owner or authorized person, and place address.

In an embodiment identifying location of place on map or pointer on map or identifying geo-coordinates and geofence based on business address.

In an embodiment business details including account information provided by place of business including owner or authorized person of place of business or access from one or more sources including databases, applications, and one or more types of external sources.

In an embodiment creating places on map based on each place related data including business name, business category, business address, business contact information including mobile phone number, email address, website URL, photos, videos, merchant account information including bank code, account number and one or more types of verified identification numbers to identify place, place associated business, place owner or authorized person, and place address, wherein identifying location of place or pointer on map or identifying geo-coordinates and geofence based on business address; storing said place and associated details; displaying on map said created places, associated details and one or more types of user actions or call-to-actions including pay control for facilitating location based transactions or payments; displaying the current place or one or more nearby places or selected category specific nearby places on map and/or map linked list based on location of the user mobile device or displaying searched places on map and/or map linked list; and receiving instruction from the user to make payment of particular amount from the user's account to said current place or user selected place associated merchant's account without the user having to enter the account information related to the merchant.

In an embodiment a computer store containing data, for each of a plurality of places; wherein enabling to creating, claiming and verifying place, providing or updating place associated structured details including business name, business category, business address contact information including mobile number, email, website URL, description and merchant payments and account information including bank code, account number, one or more types of legal identification numbers; verifying, storing, listing and making place and associated data accessible to users of network or displaying graphical representation and/or name of said place on map for enabling users of network to select place and view and access associated details and active links or user actions or call-to-actions; enabling users to view and select graphical representation and/or name of current place or place from nearby places, nearby category specific places, searched places on map and view associated details and select or access active link for making payments from user's account to said selected place associated merchant's account; wherein each of the places belongs to one of a plurality of place owners or merchants or authorized persons or admins; wherein each of the places displays at least one active link associated with a commerce object associated with a accepting payment opportunity of a selected one of a plurality of merchants; and wherein the selected place associated merchant, the outsource provider, and the location associated place based transactions and payments service provider are each third parties with respect to one other.

In an embodiment a computer server at the outsource provider, which computer server is coupled to the computer store and programmed to: receive from the client application of a mobile device user a signal indicating activation of one of the links displayed by one of the places, without redirecting user to different website related to each place or external website or application or third parties booking, e-commerce, reservation or payment user interface; automatically identify selected place associated merchant payments and account information on which the link has been activated; in response to identification of the merchant payments and account information, automatically retrieve the stored data associated with selected place associated merchant; and using the data retrieved, automatically transmit particular amount of fund from user's account to said identified merchant's account based on said retrieved merchant's payments and account information, without the user having to enter the account information related to merchant.

Web mapping is the process of using the maps delivered by geographic information systems (GIS) in World Wide Web. A web map on the World Wide Web is both served and consumed, thus web mapping is more than just web cartography, it is a service by which consumers may choose what the map will show. Web GIS emphasizes geodata processing aspects more involved with design aspects such as data acquisition and server software architecture such as data storage and algorithms, than it does the end-user reports themselves. The terms web GIS and web mapping remain somewhat synonymous. Web GIS uses web maps, and end users who are web mapping are gaining analytical capabilities. The term location-based services refer to web mapping consumer goods and services. Web mapping usually involves a web browser or other user agent capable of client-server interactions. Web mapping has brought many geographical datasets, including free ones generated by OpenStreetMap and proprietary datasets owned by for examples Google Maps, Foursquare, Tencent, TomTom and others. Various companies now offer web mapping as a cloud-based software as a service. These service providers allow users to create and share maps by uploading data to their servers (cloud storage). The maps are created either by using an in-browser editor or writing scripts that leverage the service providers API's. Web maps can easily deliver up to date information. If maps are generated automatically from databases, they can display information in almost real-time. Examples: A map displaying election results, as soon as the election results become available, a traffic congestion map using traffic data collected by sensor networks, A map showing the current locations of mass transit vehicles such as buses or trains, allowing patrons to minimize their waiting time at stops or stations, or be aware of delays in service and weather maps. In geography, location and place are used to identify a point or an area on the Earth's surface. Google Maps is a web mapping service developed by Google. It offers satellite imagery, aerial photography, street maps, 360° panoramic views of streets (Street View), real-time traffic conditions, and route planning for traveling by foot, car, bicycle and air, or public transportation.

Mobile payment (also referred to as mobile money, mobile money transfer, and mobile wallet) generally refer to payment services operated under financial regulation and performed from or via a mobile device. Instead of paying with cash, cheque, or credit cards, a consumer can use a mobile to pay for a wide range of services and digital or hard goods. A payment service provider (PSP) offers shops online services for accepting electronic payments by a variety of payment methods including credit card, bank-based payments such as direct debit, bank transfer, and real-time bank transfer based on online banking. Typically, a software as a service model and form a single payment gateway for their clients (merchants) to multiple payment methods. Typically, a PSP can connect to multiple acquiring banks, card, and payment networks. In many cases, the PSP will fully manage these technical connections, relationships with the external network, and bank accounts and therefore takes care of the technical processing of payment methods for online shops. This makes the merchant less dependent on financial institutions and free from the task of establishing these connections directly, especially when operating internationally. Furthermore, a full-service PSP can offer risk management services for card and bank based payments, transaction payment matching, reporting, fund remittance and fraud protection in addition to multi-currency functionality and services. Some PSPs provide services to process other next generation methods (payment systems) including cash payments, wallets, prepaid cards or vouchers, and even paper or e-check processing. Payments as a service (PaaS) is a marketing phrase used to describe a software as a service to connect a group of international payment systems. The architecture is represented by a layer—or overlay—that resides on top of these disparate systems and provides for two-way communications between the payment system and the PaaS. Communication is governed by standard APIs created by the PaaS provider. PaaS is designed to allow merchants and other market participants to utilize local, regional and global payments options through a single interface. The complexity of moving funds between providers is handled by the PaaS layer and is hidden from the user. Generally speaking, there is only one interface between a merchant and PaaS. Because only one interface is required, merchants or users are only required to maintain one financial repository.

QR code payment is a contactless payment method where payment is performed by scanning a QR code from a mobile app. This is an alternative to doing electronic funds transfer at point of sale using a payment terminal. This avoids a lot of the infrastructure traditionally associated with electronic payments such as payment cards, payment networks, payment terminal and merchant accounts. To use a QR code payment the consumers scans the QR code displayed by the merchant with their phones to pay for their goods. They enter the amount they have to pay and finally submit. This is a more secure card-not-present method than others. QR codes are present in retail stores as well making it easy for consumers to make purchases with a single scan. This cuts down on waiting times at checkout counters and users are incentivized with on-going offers.

Present invention may develop own map for implementing place on map based payments and transactions for user $3^{rd}$ parties APIs and SDKs for integrating location based payments feature on/with/in place or place of business on map for enabling map users to view current place or nearest place based on location of the user mobile device or selected place from nearby places or searched places and view associated details and pay control or pay button and enable to enter amount or input amount via voice or use default or pre-set or pushed amount and make payment from user's account to said current place or selected place associated identified merchant's account. $3^{rd}$ parties APIs and SDKs comprises Google Cloud™, Google Maps Platform™, Google Maps™, Microsoft Bing™, Foursquare™, Mapbox™, Apple Maps™ OpenStreetMap™, DigitalGlobe™, Waze™, Tencent Maps™, AutoNavi™, Baidu Maps™ and others, wherein types of maps APIs and SDKs comprises Place Details API including which provides names, addresses, and other rich details like ratings, reviews, or contact information for millions of places of world, Current Place API including identify a place based on real-time signals like time of day or user location, Find Place API including turn a phone number, address, or name into a place, Autocomplete API including automatically return location suggestions while users type, Geocoding API including convert addresses to geographic coordinates, or the reverse, Geolocation API including return the precise location of a device based on Wi-Fi or cell towers, Time Zone API including return a time zone for any location.

The Places API is a service that returns information about places using HTTP requests. Places are defined within this API as establishments, geographic locations, or prominent points of interest. Places API comprises various types of place requests including place search returns a list of places based on a user's location or search string, place details returns more detailed information about a specific place, including user reviews, place photos provides access to the millions of place-related photos stored in Place database, place autocomplete automatically fills in the name and/or address of a place as users type, query autocomplete provides a query prediction service for text-based geographic searches, returning suggested queries as users type. The Places API lets you search for place information using a variety of categories, including establishments, prominent points of interest, and geographic locations. You can search for places either by proximity or a text string. A Place Search returns a list of places along with summary information about each place; additional information is available via a Place Details query. A Find Place request takes a text input and returns a place. The input can be any kind of Places text data, such as a name, address, or phone number. The request must be a string. The Place Autocomplete service is a web service that returns place predictions in response to an HTTP request. The request specifies a textual search string and optional geographic bounds. The service can be used to provide autocomplete functionality for text-based geographic searches, by returning places such as businesses, addresses and points of interest as a user type. The Query Autocomplete service allows you to add on-the-fly geographic query predictions to your application. Instead of searching for a specific location, a user can type in a categorical search, such as "pizza near New York" and the service responds with a list of suggested queries matching the string. As the Query Autocomplete service can match on both full words and substrings, applications can send queries as the user types to provide on-the-fly predictions. Geocoding is the process of converting addresses (like a street address) into geographic coordinates (like latitude and longitude), which you can use to place markers on a map, or position the map. Reverse geocoding is the process of converting geographic coordinates into a human-readable address. Geocoding is the process of converting addresses (like "1600 Amphitheatre Parkway, Mountain View, Calif.") into geographic coordinates (like latitude 37.423021 and longitude −122.083739), which you can use to place markers on a map, or position the map. Use the Geocoding API to find the address for a given place ID. The Geocoding API provides a direct way to access these services via an HTTP request. The Geolocation API returns a location and accuracy radius based on information about cell towers and WiFi nodes that the mobile client can detect.

Web services are an interface for requesting e.g. Maps API data and payment services from external services and using the data within Maps applications.

With the Places service perform the following kinds of searches: Find Place from Query returns a place based on a text query (for example, the name or address of a place), Find Place from Phone Number returns a place based on a phone number, Nearby Search returns a list of nearby places based on a user's location, Text Search returns a list of nearby places based on a search string, e.g. "Pizza", Place Details requests return more detailed information about a specific place, including user reviews, The information returned can include establishments—such as restaurants, stores, and offices—as well as 'geocode' results, which indicate addresses, political areas such as towns and cities, and other points of interest. A Find Place request lets enable to search for a place either by text query or phone number. There are two types of Find Place request: Find Place from Query and Find Place from Phone Number.

Present invention may provide APIs/SDKs and web services for location based payments and transactions for enabling $3^{rd}$ parties maps and applications to integrate "Register to Activate Pay Now", "Register to use Pay Now" and "Pay Now" control, buttons, features, plug and play services, web services, and feature within maps, applications, graphical user interfaces (GUIs), websites and web services including display "Register to Activate Pay Now" button with each or selected or eligible places or each or selected or eligible place associated details or graphical user interface (GUI) on/within map, so existing or newly created place owner or authorized person of said place can register and verify by providing details including merchant information including merchant account or payment account or bank account details and activate "Register to use Pay Now" or "Pay Now" button associated with said place or place of business owner and can enable visitors of physical location of said place or place of business to view said place associated details and "Register to use Pay Now" if visitor or customer or user is un-register user or "Pay Now" button if visitor or customer or user is registered user and enable to log-in or register to use "Pay Now" button by providing and verifying required details including mobile number, bank account details or added one or more types of accounts related to one or more types of payments methods. After registration, verification user can make payment of entered or default or pre-set or pushed particular amount from user's account to said place associated merchant's account. User can make in-store payments from any place by viewing automatically identified current place on map and clicking or tapping on said current place associated "Pay Now" button or user can select place from Neary places or searched places on map and/or linked list and can click or tap said selected place associated "Pay Now" button for making payments from user's account to said current place or selected place associated merchant's account.

Different countries of world developing and implementing Unified Payments Interface including QR code-based payments, unique identity based payments. Unified Payments Interface (UPI) is an instant real-time payment system developed by NPCI facilitating inter-bank transactions and works by instantly transferring funds between two bank accounts on a mobile platform.

Unified Payments Interface is a real time interbank payment system that allows sending or requesting money. Any UPI client app may be used and multiple bank accounts may be linked to single app. Money can be sent or requested with the following methods: Virtual Payment Address (VPA) or UPI ID: Send or request money from/to bank account mapped using VPA. Mobile number: Send or request money from/to the bank account mapped using mobile number.

Account number & IFSC: Send money to the bank account. Aadhaar: Send money to the bank account mapped using Aadhaar number. QR code: Send money by QR code which has enclosed VPA, Account number and IFSC or Mobile number. Any UPI app can use payment and transfer fund from and to UPI enabled banks. Unified Payments Interface (UPI) which is a combination of real time payments with open interfaces with an intention to replace cash, point-of-sale and wallet. The SGQR is a world's first common QR code specifications for e-payments which facilitates the creation of a single multi-tenanted QR for each merchant, supported by a central infrastructure, that will benefit the banks and other industry players within the payment ecosystem in Singapore.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. The patent or application file contains at least one drawing executed in color. Copies of this patent or patent application publication with color drawing(s) will be provided by the Office upon request and payment of the necessary fee.

For a better understanding of the present invention, reference will be made to the following Detailed Description, which is to be read in association with the accompanying drawings, wherein:

FIGS. 26-38 illustrates graphical user interface (GUI) for enabling publisher to publish location associated and/or target criteria specific QR codes and one or more types of controls. Providing graphical user interface (GUI) for enabling user to view location or place or address or geofence associated one or more types of QR codes including payment QR code.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF THE DRAWINGS

Figure 1:
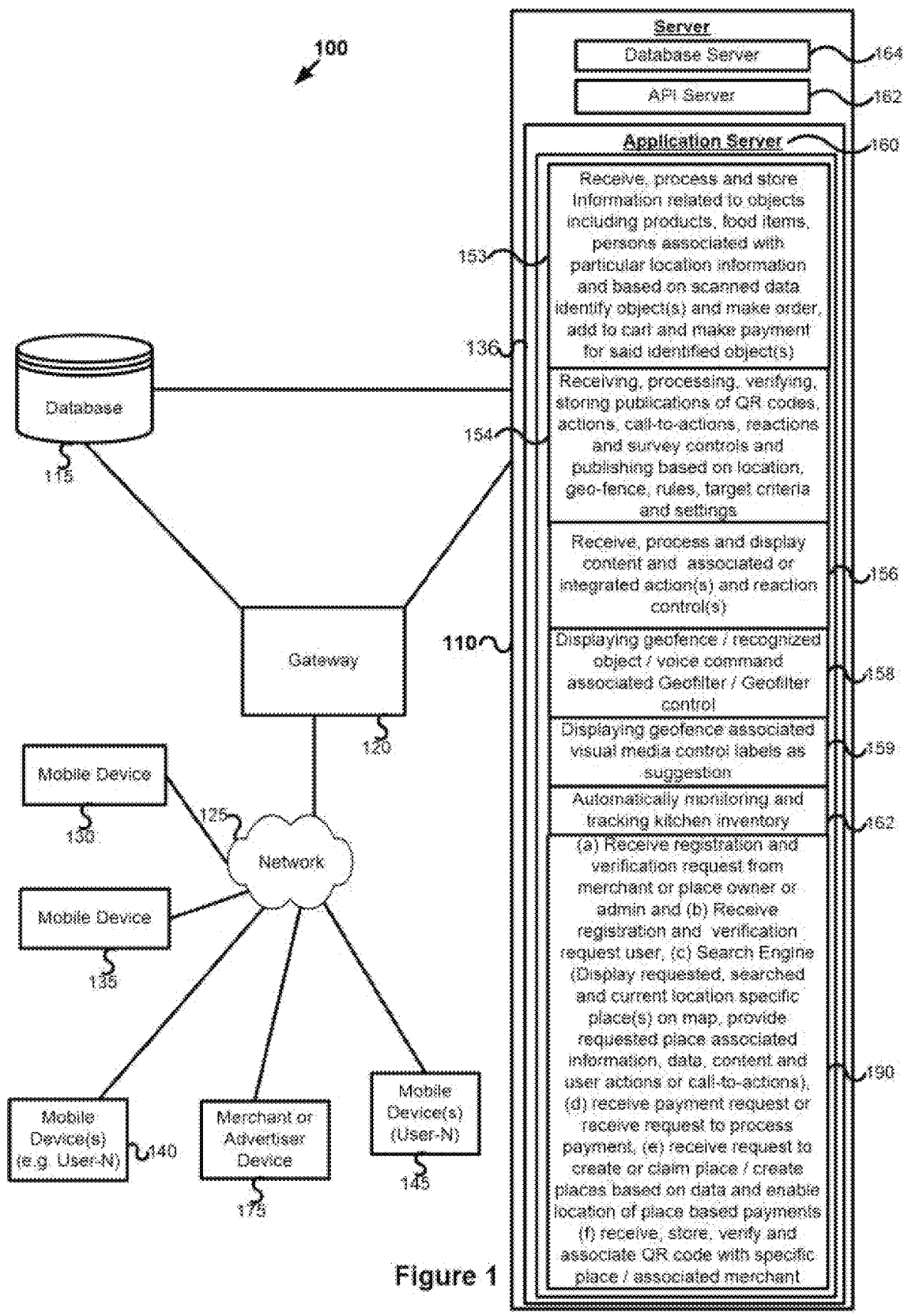
FIG. 1 is a network diagram depicting a network system having a client-server architecture configured for exchanging data over a network implementing various embodiments related to augmented reality based reactions, actions, call-to-actions, order, add to cart and payments.

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions detecting that client device of the sever has conduced augmented reality scanning, receiving scanned data including identity of user who has conducted augmented reality scanning by using augmented reality system, monitored and tracked location of user device at the time of conducting of augmented reality scanning by using augmented reality system, date and time of augmented reality scanning by using augmented reality system, automatically captured one or more raw photos or images of recorded videos, applied one or more types of gestures, multi-touches, senses including device movement direction, angels and degrees or rang of angels and degrees, provided one or more pre-defined voice commands and eye or body expression commands, receive user selected controls associated data, receiving monitored and tracked current location of user device, receive posts or message and associated or integrated controls for sending to one or more sender selected one or more contacts, groups, followers, types of users of network and destinations, send and display geofence or location of place of business associated controls including one or more types of call-to-actions, customer satisfaction survey and reaction controls, send and present geofence or location of place of business associated geofilters, stickers, emojis and images, receive captured photo or recorded video or one or more types of contents with selected geofilter or sticker or emoji or image for integrating or attaching or displaying with said received photo or video or post or message or content for sending to sender selected one or more contacts, groups, followers, types of users of network and destinations, receive drawn geofence or place of business and associated products details and each said product associated one or more object models, and object images, receive selected object viewing from augmented reality system or application and associated data including identity of user who has conducted augmented reality scanning by using augmented reality system, monitored and tracked location of user device at the time of conducting of augmented reality scanning by using augmented reality system, date and time of augmented reality scanning by using augmented reality system, automatically captured one or more raw photos or images of recorded videos and digital mark on user applied gesture area, applied one or more types of gestures including single tap on particular region of said received photo, receive one or more photos or recorded video or live video stream from camera, send and display monitored and tracked level of inventory and usage information, one or more types of notification including automatically ordered products, receive selected or location or geofence associated and provided one or more type of QR codes including payment QR code and one or more types of actions, call-to-actins, and reaction controls and based on monitored and tracked user device current location, display said one or more QR codes and one or more types of actions, call-to-actins, and reaction controls, receiving instruction to make payment by decoding QR code associated encrypted details and transferring fund from user's account to merchant's account, receiving uploaded controls from $3^{rd}$ parties developers for verification and making them available for users of network, receiving one or more types of contents and user selected and attached or integrated one or more controls, sending or displaying said received one or more type of contents with associated or attached or linked or integrated or merged one or more controls to selected contact or user device associated with the network system 100 and its users. Although illustrated herein as client-server architecture, other embodiments may include other network architectures, such as peer-to-peer or distributed network environments.

A platform, in an example, includes a server 110 which includes various applications including Applications 153/154/156/158/159/162, and may provide server-side functionality via a network 125 (e.g., the Internet) to one or more clients. The one or more clients may include users that utilize the network system 100 and, more specifically, the server applications 136, to exchange data over the network 125. These operations may include transmitting, receiving (communicating), and processing data to, from, and regarding content and users of the network system 100.

In various embodiments, the data exchanges within the network system 100 may be dependent upon user-selected functions available through one or more client or user interfaces (UIs). The UIs may be associated with a client machine, such as mobile devices or one or more types of computing device 130, 135, 140, 145, 175. The mobile devices e.g. 130 and 135 may be in communication with the server application(s) 136 via an application server 160. The mobile devices e.g. 130, 135 include wireless communication components, and audio and optical components for capturing various forms of media including photos and videos as described with respect to FIG. 2.

The server applications 136, an application program interface (API) server is coupled to, and provides programmatic interface to the application server 160. The application server 160 hosts the server application(s) 136. The application server 160 is, in turn, shown to be coupled to one or more database servers 164 that facilitate access to one or more databases 115.

The Application Programming Interface (API) server 160 communicates and receives data pertaining to notifications, messages, media items, and communication, among other things, via various user input tools. For example, the API server 162 may send and receive data to and from an application running on another client machine (e.g., mobile devices 130, 135, 140, 145 or one or more types of computing devices e.g. 175 or a third-party server).

The server application(s) 136 provides messaging mechanisms for users of the mobile devices e.g. 130, 135 to send scanned data, messages, post that include text and media content such as pictures and video and controls. The mobile devices 130, 135 can access and view the recognized and identified object associated controls, message or post with controls, location specific controls and QR codes from the server application(s) 136. The server application(s) 136 may utilize any one of a number of message delivery networks and platforms to deliver messages to users. For example, the messaging application(s) 136 may deliver messages using electronic mail (e-mail), instant message (IM), Push Notifications, Short Message Service (SMS), text, facsimile, or voice (e.g., Voice over IP (VoIP)) messages via wired (e.g., the Internet), plain old telephone service (POTS), or wireless networks (e.g., mobile, cellular, Wi-Fi, Long Term Evolution (LTE), Bluetooth).

FIG. 1 illustrates an example platform, under an embodiment. According to some embodiments, system 100 can be implemented through software that operates on a portable computing device, such as a mobile computing device 110. System 100 can be configured to communicate with one or more network services, databases, objects that coordinate, orchestrate or otherwise provide advertised contents of each user to other users of network. Additionally, the mobile computing device can integrate third-party services which enable further functionality through system 100.

While FIG. 1 illustrates a gateway 120, a database 115 and a server 110 as separate entities, the illustration is provided for example purposes only and is not meant to limit the configuration of the system. In some embodiments, gateway 120, database 115 and server 110 may be implemented in the system as separate systems, a single system, or any combination of systems.

As illustrated in FIG. 1, the system may include a posting or sender user device or mobile devices 130/140 and viewing or receiving user device or mobile devices 135/145. Devices or Mobile devices 130/140/135/145 may be particular set number of or an arbitrary number of devices or mobile devices which may be capable of posting, sharing, publishing, broadcasting, advertising, notifying, sensing, sending, presenting, searching, matching, accessing and managing shared contents. Each device or mobile device in the set of posting or sending or broadcasting or advertising or sharing user(s) 130/140 and viewing ore receiving user(s) device or mobile devices 135/140 may be configured to communicate, via a wireless connection, with each one of the other mobile devices 130/140/135/145. Each one of the mobile devices 130/140/135/145 may also be configured to communicate, via a wireless connection, to a network 125, as illustrated in FIG. 1. The wireless connections of mobile devices 130/140/135/145 may be implemented within a wireless network such as a Bluetooth network or a wireless LAN.

As illustrated in FIG. 1, the system may include gateway 120. Gateway 120 may be a web gateway which may be configured to communicate with other entities of the system via wired and/or wireless network connections. As illustrated in FIG. 1, gateway 120 may communicate with mobile devices 130/140/135/145 via network 125. In various embodiments, gateway 120 may be connected to network 125 via a wired and/or wireless network connection. As illustrated in FIG. 1, gateway 120 may be connected to database 115 and server 110 of system. In various embodiments, gateway 120 may be connected to database 115 and/or server 110 via a wired or a wireless network connection.

Gateway 120 may be configured to send and receive scanned data, selected object associated data, automatically captured photos or record video from camera, applied gestures, multi-touches, provide voice or eye or body commands, captured photos or recorded videos, prepared one or more types of contents, message or post, user contents or posts or data to targeted or prospective, matched & contextual viewers based on preferences, wherein user data comprises user profile, user connections, connected users' data, user shared data or contents, user logs, activities, actions, events, senses, transactions, status, updates, presence information, locations, check-in places and like) to/from mobile devices 130/140/135/145. For example, gateway 120 may be configured to receive posted contents provided by posting users or publishers or content providers to database 115 for storage.

As another example, gateway 120 may be configured to send or present posted contents to contextual viewers stored in database 115 to mobile devices 130/140/135/145. Gateway 120 may be configured to receive search requests from mobile devices 130/140/135/145 for searching and presenting posted contents.

As illustrated in FIG. 1, the system may include a database, such as database 115. Database 115 may be connected to gateway 120 and server 110 via wired and/or wireless connections. Database 115 may be configured to store a database of registered user's profile, accounts, posted or shared contents, scanned data, accessed controls related data, captured media with attached or integrated controls, capture media via suggested media capture controls, selected object from augmented reality system or application, automatically captured photos or recorded videos or live streaming, accessed QR codes related data, user data, payments information received from mobile devices 130/140/135/145 via network 125 and gateway 120.

Database 115 may also be configured to receive and service requests from gateway 120. For example, database 115 may receive, via gateway 120, a request from a mobile device and may service the request by providing, to gateway 120, various types of controls, QR codes, geofilters, multi-taking visual media controls, view of storage containers or bins from camera, user profile, user data, posted or shared contents, viewers, contacts or connections, user or provider account's related data which meet the criteria specified in the request. Database 115 may be configured to communicate with server 110.

As illustrated in FIG. 1, the system may include a server, such as server 110. Server may be connected to database 115 and gateway 120 via wired and/or wireless connections. As described above, server 110 may be notified, by gateway 120, of new or updated applying of augmented reality scanning and selection of object via augmented reality system or application, accessing of control, user profile, user data, user posted or shared contents, & various types of status stored in database 115.

FIG. 1 illustrates a block diagram of a system configured to implement the various embodiments related to platform. While FIG. 1 illustrates a gateway 120, a database 115 and a server 110 as separate entities, the illustration is provided for example purposes only and is not meant to limit the configuration of the system. In some embodiments, gateway 120, database 115 and server 110 may be implemented in the system as separate systems, a single system, or any combination of systems.

Figure 2:
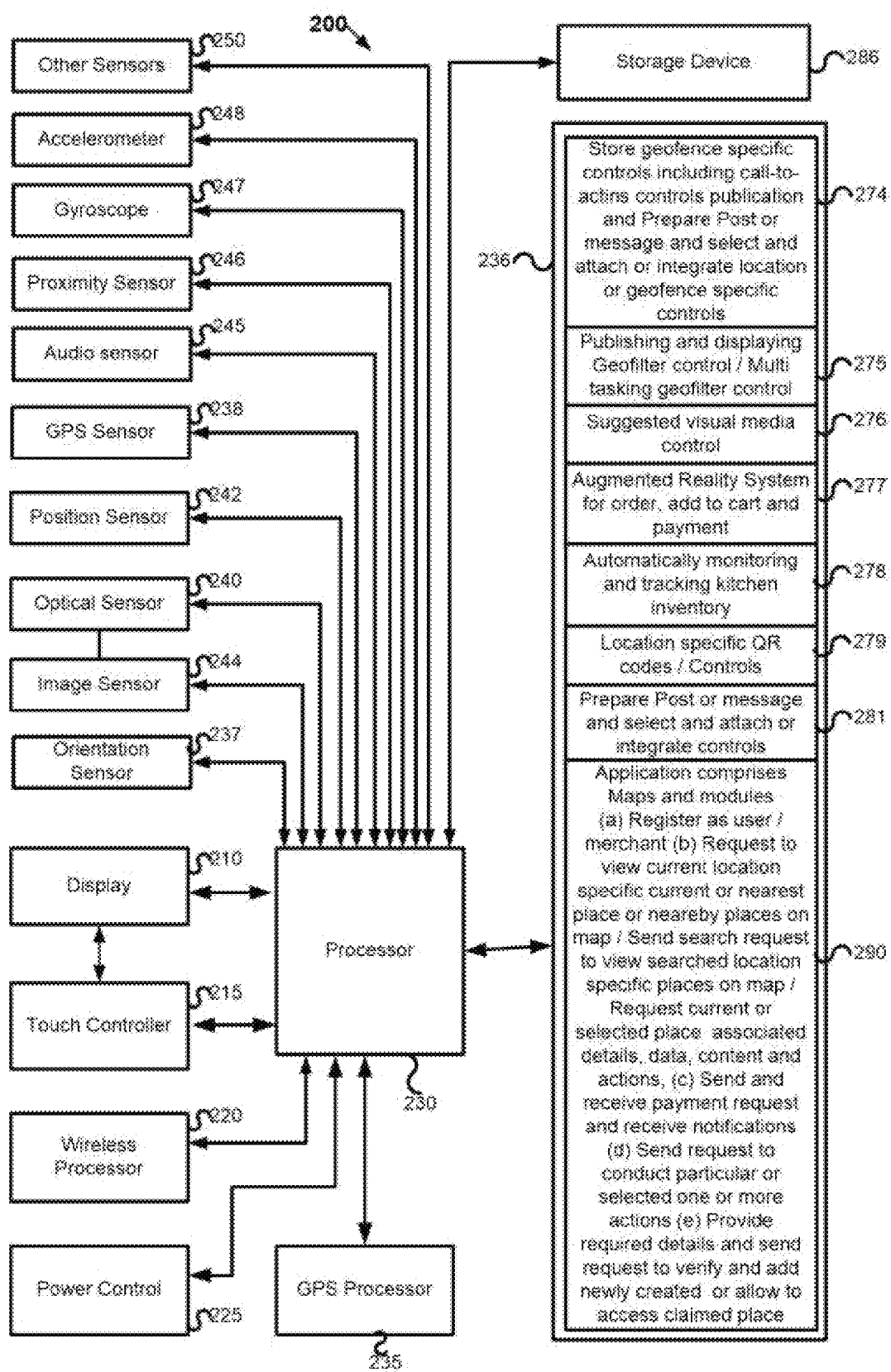
FIG. 2 illustrates components of an electronic device implementing various embodiments related to augmented reality scanning or viewing particular one or more objects in camera application and providing one or more types of reactions one or more types of gestures, senses, facial and body expressions via front camera, pre-define particular duration of timer, voice commands, multi touches on screen, eye command based on eye tracking system and any combination thereof.

FIG. 2 illustrates an electronic device 200 implementing operations of the invention. In one embodiment, the electronic device 200 is a smartphone with a processor 230 in communication with a memory 236. The processor 230 may be a central processing unit and/or a graphics processing unit. The memory 236 is a combination of flash memory and random access memory. The memory 236 stores a publication application for publishing geofence specific controls including call-to-actins controls and prepare post or message and select and attach or integrate location or geofence specific controls application 274 to implement operations of one of the embodiments of the invention. Application 274 may include executable instructions to access a server which coordinates operations disclosed herein. Alternately, the application 274 may include executable instructions to coordinate some of the operations disclosed herein, while the server module 156 implements other operations.

The memory 236 stores a Geofilter control/Multi-tasking geofilter control 275 to implement operations of one of the embodiments of the invention. The Geofilter control/Multi-tasking geofilter control 275 may include executable instructions to access a server which coordinates operations disclosed herein. Alternately, the Geofilter control/Multi-tasking geofilter control 275 may include executable instructions to coordinate some of the operations disclosed herein, while the server module 158 implements other operations.

The memory 236 stores a Suggested visual media control 276 to implement operations of one of the embodiments of the invention. The Suggested visual media control 276 may include executable instructions to access a server which coordinates operations disclosed herein. Alternately, the Suggested visual media control 276 may include executable instructions to coordinate some of the operations disclosed herein, while the server module 159 implements other operations.

The memory 236 stores an Augmented Reality System for order, add to cart and payment 277 to implement operations of one of the embodiments of the invention. The Augmented Reality System for order, add to cart and payment 277 may include executable instructions to access a server which coordinates operations disclosed herein. Alternately, the Augmented Reality System for order, add to cart and payment 277 may include executable instructions to coordinate some of the operations disclosed herein, while the server module 153 implements other operations.

The memory 236 stores an Automatically monitoring and tracking kitchen inventory 278 to implement operations of one of the embodiments of the invention. The Automatically monitoring and tracking kitchen inventory 278 may include executable instructions to access a server which coordinates operations disclosed herein. Alternately, the Automatically monitoring and tracking kitchen inventory 278 may include executable instructions to coordinate some of the operations disclosed herein, while the server module 160 implements other operations.

The memory 236 stores a Location specific QR codes/Controls 279 to implement operations of one of the embodiments of the invention. The Location specific QR codes/Controls 279 may include executable instructions to access a server which coordinates operations disclosed herein. Alternately, the Location specific QR codes/Controls 279 may include executable instructions to coordinate some of the operations disclosed herein, while the server module 154 implements other operations.

The memory 236 stores a Prepare Post or message and select and attach or integrate controls 281 to implement operations of one of the embodiments of the invention. The Prepare Post or message and select and attach or integrate controls 281 may include executable instructions to access a server which coordinates operations disclosed herein. Alternately, the Prepare Post or message and select and attach or integrate controls 281 may include executable instructions to coordinate some of the operations disclosed herein, while the server module 156 implements other operations.

The processor 230 is also coupled to image sensors 238. The image sensors 238 may be known digital image sensors, such as charge coupled devices. The image sensors capture visual media, which is presented on display 210. The image sensors 238 capture visual media and present the visual media on the display 210 so that a user can observe the captured visual media.

A touch controller 215 is connected to the display 210 and the processor 230. The touch controller 215 is responsive to haptic signals applied to the display 210.

The electronic device 200 may also include other components commonly associated with a smartphone, such as a wireless signal processor 220 to provide connectivity to a wireless network. A power control circuit 225 and a global positioning system (GPS) processor 235 may also be utilized. While many of the components of FIG. 2 are known in the art, new functionality is achieved through the application 274 operating in conjunction with a server module 156, application 275 operating in conjunction with a server module 158, application 276 operating in conjunction with a server module 159, application 277 operating in conjunction with a server module 153, application 278 operating in conjunction with a server module 150, application 279 operating in conjunction with a server module 154, application 281 operating in conjunction with a server module 156.

Present invention may use accurate location technologies including round-trip time (RTT) technology, round-trip time (RTT) is the technology that will take us to the one-meter level. The key technologies are Wi-Fi RTT (Round Trip Time), GPS dual-frequency and carrier phase measurements. By suing round-trip time (RTT) APIs in Android 9 Pie, one-meter measurement accuracy can be made available in smartphones. Wi-Fi round-trip time (RTT) will enhance indoor location accuracy and enable indoor navigation. Global Navigation Satellite System (GNSS) will achieve sub-meter location accuracy outdoors in open-sky scenarios. The Wi-Fi RTT (Round-Trip-Time) API measure the distance to nearby RTT-capable Wi-Fi access points and peer Wi-Fi Aware devices.

The Global Positioning System (GPS) sensor 244 determines the geolocation of the mobile device 200 and generates geolocation information (e.g., coordinates including latitude, longitude, aptitude). In another embodiment, other sensors may be used to detect a geolocation of the mobile device 200. For example, a Wi-Fi sensor or Bluetooth sensor or Beacons including iBeacons or other accurate indoor or outdoor location determination and identification technologies can be used to determine the geolocation of the mobile device 200.

FIG. 2 shows a block diagram illustrating one example embodiment of a mobile device 200. The mobile device 200 includes an optical sensor 244 or image sensor 238, a Global Positioning System (GPS) sensor 235, a position sensor 242, a processor 230, a storage device 286, and a display 210.

The optical sensor 244 includes an image sensor 238, such as, a charge-coupled device. The optical sensor 244 captures visual media. The optical sensor 244 can be used to media items such as pictures and videos.

The GPS sensor 238 determines the geolocation of the mobile device 200 and generates geolocation information (e.g., coordinates including latitude, longitude, aptitude). In another embodiment, other sensors may be used to detect a geolocation of the mobile device 200. For example, a WiFi sensor or Bluetooth sensor or Beacons including iBeacons or other accurate indoor or outdoor location determination and identification technologies can be used to determine the geolocation of the mobile device 200.

The position sensor 242 measures a physical position of the mobile device relative to a frame of reference. For example, the position sensor 242 may include a geomagnetic field sensor to determine the direction in which the optical sensor 240 or the image sensor 244 of the mobile device is pointed and an orientation sensor 237 to determine the orientation of the mobile device (e.g., horizontal, vertical etc.).

The processor 230 may be a central processing unit that includes a media capture application 273, a media display application, and a media sharing application.

The media capture application 273 (not shown in figure) includes executable instructions to generate media items such as pictures and videos using the optical sensor 240 or image sensor 244. The media capture application 273 also associates a media item with the geolocation and the position of the mobile device 200 at the time the media item is generated using the GPS sensor 238 and the position sensor 242.

The media sharing application includes executable instructions to enable the user to share one or more types of contents with controls to one or more selected or auto identified destinations or users of network.

The storage device 286 includes a memory that may be or include flash memory, random access memory, any other type of memory accessible by the processor 230, or any suitable combination thereof. The storage device 286 stores the media items generated or shared or received by user and also store the corresponding geolocation information, auto identified system data including date & time, auto recognized keywords, metadata, and user provided information. The storage device 286 also stores executable instructions corresponding to the media capture application, the media display application, the media sharing application, prepare post or message and select and attach or integrate location or geofence specific controls application 274, Geofilter control/Multi-tasking geofilter control 275, Suggested visual media control 276, Augmented Reality System for order, add to cart and payment 277, Automatically monitoring and tracking kitchen inventory 278, Location specific QR codes/Controls 279, Prepare Post or message and select and attach or integrate controls 281.

The display 210 includes, for example, a touch screen display. The display 210 displays the media items generated by the media capture application. A user captures record and selects media items by touching the corresponding media items on the display 210. A touch controller monitors signals applied to the display 210 to coordinate the capturing, recording, and selection of the media items.

The mobile device 200 also includes a transceiver that interfaces with an antenna. The transceiver may be configured to both transmit and receive cellular network signals, wireless data signals, or other types of signals via the antenna, depending on the nature of the mobile device 200. Further, in some configurations, the GPS sensor 238 may also make use of the antenna to receive GPS signals.

Figure 3:
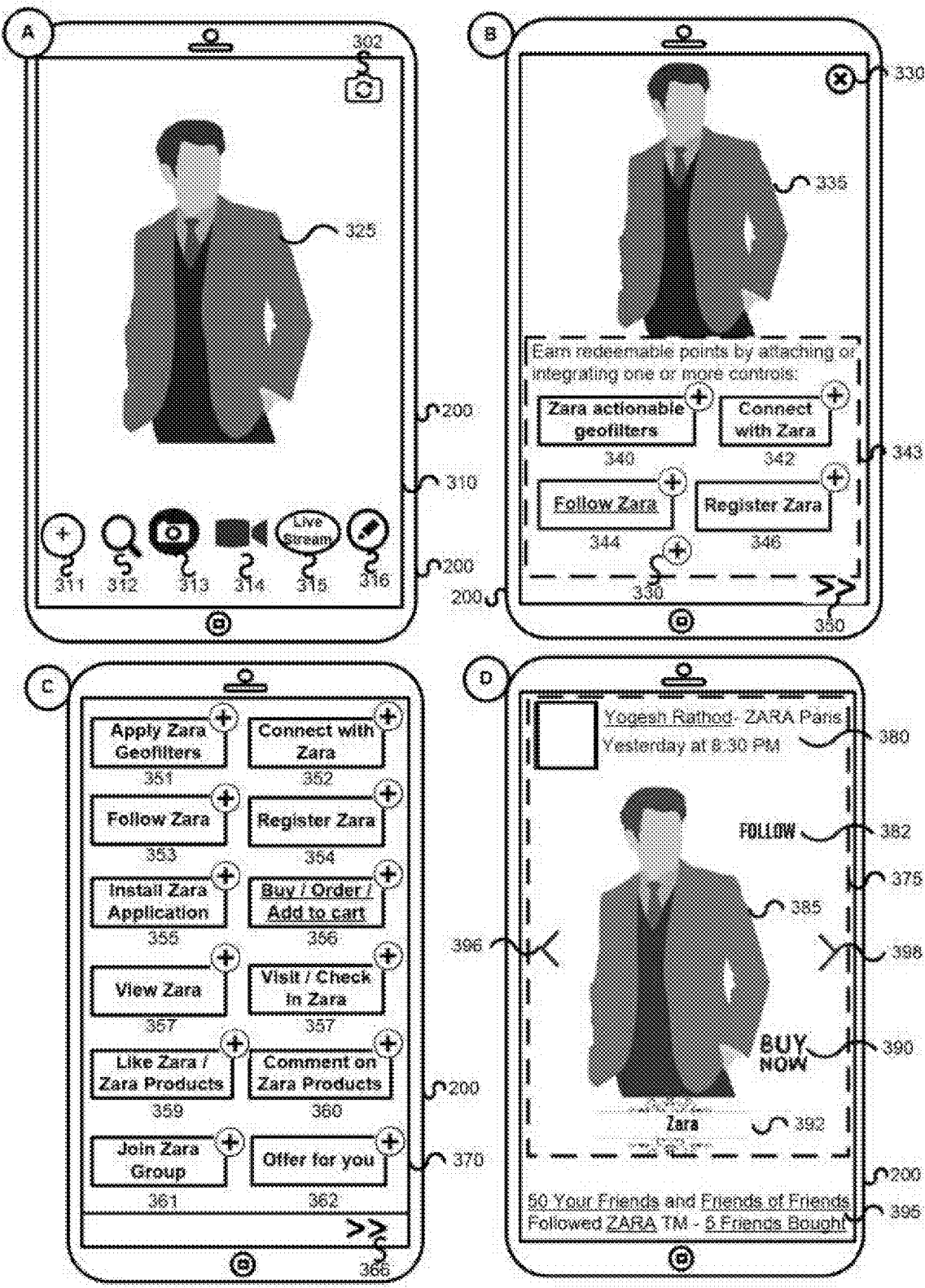
FIG. 3 illustrates graphical user interface (GUI) for preparing one or more types of contents, post, message including selecting or taking one or more photos, videos, text, links or web addresses, emoticons, location information, profile photo, name and profile link and selecting and attaching, integrating, linking, embedding, merging said location or place of business associated one or more controls including reactions, actions, tasks, workflow, status, communication, collaborations, sharing, participations, call-to-actions, task, and survey controls and share with one or more contacts, groups, followers, one or more types of users of network and destinations.

FIG. 3 illustrates enabling publisher or sponsor or owner of place of business to draw or pre-define geofence on map or select place or location on map or provide address to identify location or provide geo-coordinates and select and associate one or more controls including actions, call-to-actions, reactions, survey, tasks and workflow controls with said one or more drawn or pre-define geofences or locations, or selected places or addresses or geo-coordinates for making them available for visitors of said drawn or pre-define geofences or locations, or selected places or addresses or geo-coordinates, apply schedules of availability of said controls for visitors of said drawn or pre-define geofences or locations, or selected places or addresses or geo-coordinates, provide target criteria and rules for making said controls available for said target criteria and rules specific users of network, provide object models and object images associated with said one or more drawn or pre-define geofences or selected or provided locations, or selected places or addresses or geo-coordinates associated products, food items, persons and one or more types of objects in real world for displaying recognized and identified scanned object associated controls, provide voice commands to display said place or geofence specific controls based on user or visitor provided voice commands. In an embodiment enabling user to prepare one or more types of contents including selecting or taking or capturing or recoding one or more photos and videos 325, preparing one or more types of contents, message or post 311/312/313/314/315, wherein server module 156 receives and stores said publication details from client application 274. In an embodiment displaying monitored and tracked user device 200 current location or location associate place or pre-defined geofence or check in place specific one or more types of controls 370 created, defined, customized, configured, uploaded by sponsor or publisher or authorized user or account holder associated with place of business or displaying monitored and tracked user device current location or location associate place or pre-defined geofence or check in place associated sponsor or publisher or authorized user or account holder associated with place of business provided target criteria specific created, defined, customized, configured, uploaded one or more types of controls 343/370 including actions, call-to-actions, reactions controls, by sever module 156 for enabling user to select one or more controls displayed on client application 274 (for example select geofilter option 340 and select particular geofilter from displayed list of geofilters associated with said location or place of business) 344/356 (continue next set or page of controls by clicking on next page icon 350) from said displayed options and controls 343/370 and associate or attach or link or integrate or embedded said selected one or more controls 344/356 (continue next set or page of controls by clicking on next page icon 350) from said displayed controls 343/370 with said captured or recorded or edited or prepared or drafted one or more types of contents 325 including one or more photos, videos, message, post and enable to send or publish share with or to one or more contacts, connections, groups, followers, one or more types of users of networks or one or more types of destinations including 3$^{rd}$ parties' applications and websites or limiting access to a set of viewing users 350/366. Server module 156 receives said contents or message or post 325 by said user and generates posts or message and send said post 375 to said sender instructed one or more contacts, connections, groups, followers, one or more types of users of networks or one or more types of destinations including 3$^{rd}$ parties' applications or access rights specific users for enabling receiving or viewing users to access said integrated or attached one or more call-to-actions 382/390/392 including tap on post 375 associated or attached or integrated or displayed follow control 382 to follow said post 375 associated product or brand or place of business, buy said pot associated photo associated product by tapping on buy now control or button 8590 and make or de and make payment, tap on integrated or movable within photo displayed geofilter 392 for conducting said geofilter associated action or call-to-action or reaction. In an embodiment enabling user to view sender details 380 and said displayed post associated actions and reactions statistics 395.

In an embodiment as per logged and identified visited places, locations, points of interests (POIs), shops, checked-in, enter into predefined geofence based on monitored and tracked location of mobile device of user, recognizing and identifying scanned objects and associated details based on object recognition, logged activities, actions, participated events, conducted transactions, interactions with entities or persons based on nearest connected users' mobile devices for pre-set duration, identify associated one or more types of photos, videos, contents including profiles, name, profile photo and link, map and location information, shop and place information, automatically generate stories, news feed and automatically share with one or more contacts or connections, groups, followers and one or more types of users of networks and destinations.

Figure 4:
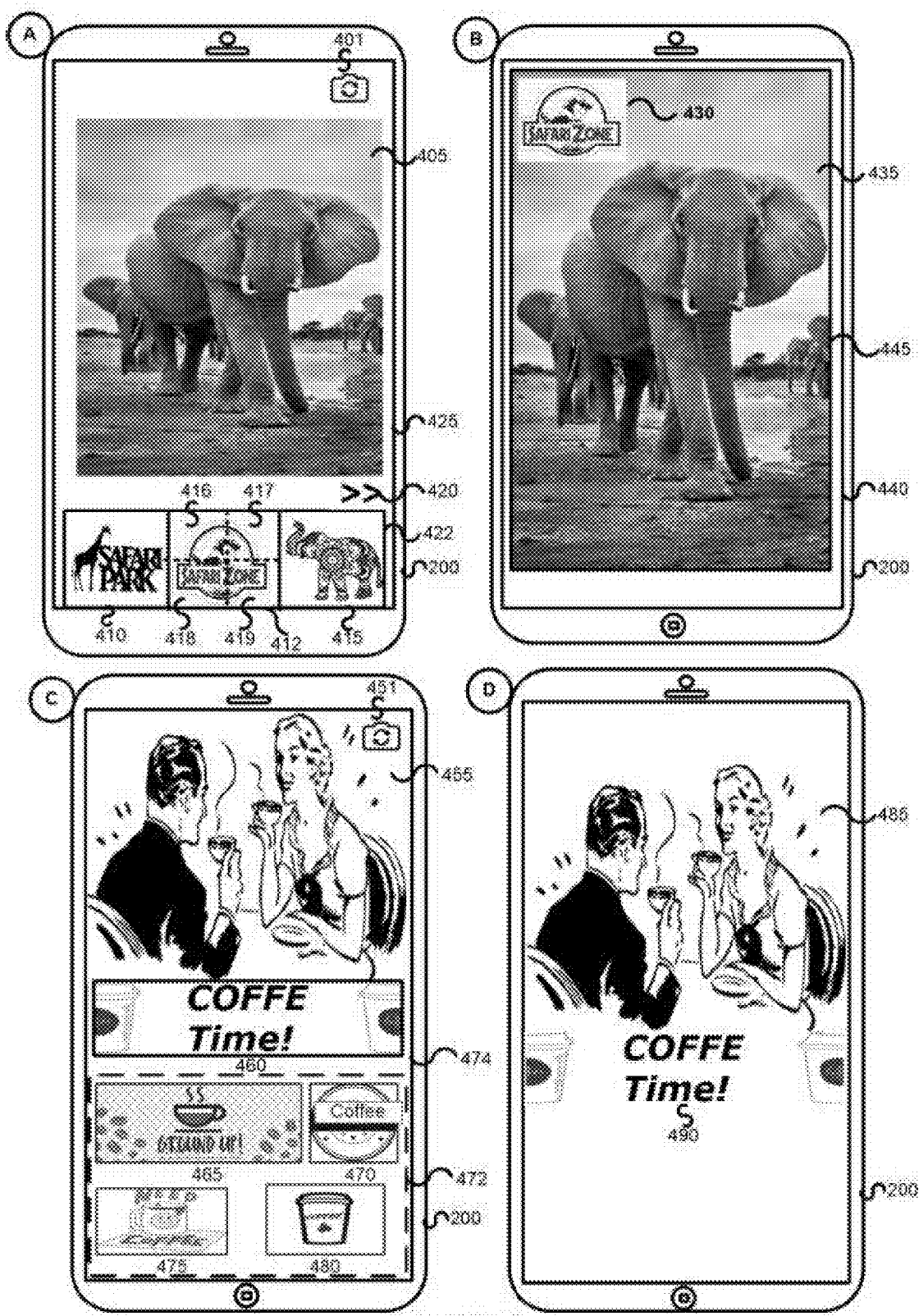
FIG. 4 illustrates graphical user interface (GUI) displaying location or place of business or pre-defined geofence associated one or more types of geofilters, sticker, icons, emojis, emoticons, expressions and images and in the event of applying particular type or pre-defined gesture on particular geofilter, automatically capturing photo or start recording of pre-set duration video and automatically integrated said applied gesture including said tapped geofilter or sticker or emoji or icon or image with said captured photo and one or more images inside said recorded video and automatically send to pre-set one or more contacts, groups, followers, one or more types of users of network and destinations.

FIG. 4 illustrates enabling publisher or sponsor or owner of place of business to draw or pre-define geofence 2670 on map 2660 or select place or location 2651 on map or provide address 2636 to identify location or provide geo-coordinates 2638 and select and associate one or more geofilters 2773, stickers 2774, icons 2775, clipart 2776, emoji 2777, emoticons 2778, images 2779, one or more types of contents, data or structured contents, media including photos, videos, stories, messages and posts 2781 and offers 2782 with said one or more drawn or pre-define geofences 2670 or selected places or locations 2651 or addresses 2636 or geo-coordinates 2638 for making them available for visitors of said drawn or pre-define geofences or locations, or selected places or addresses or geo-coordinates, apply schedules of availability of said controls for visitors of said drawn or pre-define geofences 2670 or selected places or locations 2651 or addresses 2636 or geo-coordinates 2638, provide target criteria 2745/2746 and rules for making said geofilters 2711, stickers 2712, icons 2713, clipart 2714, emoji 2715, emoticons 2716, images 2717 available for said target criteria 2745/2746 and rules specific users of network, provide object models and object images 2705/2710 associated with said one or more drawn or pre-define geofences 2625 or selected or provided locations 2621, or selected places 2611 or addresses 2636 or geo-coordinates 2638 associated products 2701/2702/2703/2704, food items, persons and one or more types of objects in real world for displaying recognized and identified scanned object associated geofilters 2711, stickers 2712, icons 2713, clipart 2714, emoji 2715, emoticons 2716, images 2717, one or more types of contents, data or structured contents, media including photos, videos, stories, messages and posts 2718 and offers 2719, provide voice commands to display said voice command specific or display said place or geofence specific geofilters, stickers, icons, clipart, emoji, emoticons, images, one or more types of contents, data or structured contents, media including photos, videos, stories, messages and posts and offers based on user or visitor provided voice commands, wherein server module 158 receives and stores said publication details to sever 110 database or storage medium 115. In an embodiment enabling provider of said geofilters, stickers, icons, clipart, emoji, emoticons, images, one or more types of contents, data or structured contents, media including photos, videos, stories, messages and posts and offers to define, configure and customize multi-tasking control with said geofilter or integrate or embedded or composite said customized multi-tasking control with said geofilters, stickers, icons, clipart, emoji, emoticons, images, one or more types of contents, data or structured contents, media including photos, videos, stories, messages and posts and offers, so said place visited users or scanning said place associated objects by place visited users or target criteria specific users or viewing user of geofilters can apply one or more types of pre-defined gestures or multi-touches or senses on said displayed geofilter or particular pre-define region of said displayed geofilter, wherein server module 158 receives and stores said publication details to sever 110 database or storage medium 115. For example customize geofilter control or geofilter embedded or integrated or composite control 412 for enabling user to apply particular one or more pre-defined types of gestures including single tap, double tap, long press, swipe left or right or top or bottom or particular direction on particular pre-defined region or area or drawn area 416/417/416/419 on geofilter 412 to take said pre-defined region or area or drawn area 416/417/416/419 associated one or more pre-defined or customized actions or execute associated one or more selected or customized functions. For example in the event of single tap on predefined area 416 on geofilter 412 or geofilter control 412 or specified or customized control 412 take photo 405 from camera 425 of user device 200 and automatically integrate or attach or associate or merge or embedded said tapped or clicked geofilter 412 or geofilter control 412 or specified or customized control 412 associated one or more geofilters or stickers or emojis or emoticons or icons or clipart or images and send to server module 158 from client application 275 to share with pre-set or predefined said action or geofilter or region associated one or more types of users of network including one or more contacts, groups, followers, one or more types or structured query language (SQL) query or natural query specific users of network and one or more types of destinations including websites, webpages, applications, timeline, profile and graphical user interface (GUI), wherein receiving user can view 445 said photo 435 and integrated geofilter 430 on graphical user interface (GUI) of user device 200. In an embodiment enabling user to manually select and send said photo and integrated geofilter to selected one or more contacts, groups, followers, one or more types or structured query language (SQL) query or natural query specific users of network and one or more types of destinations including websites, webpages, applications, timeline, profile and graphical user interface (GUI). In another example in the event of single tap on predefined area 417 on geofilter 412 or geofilter control 412 or specified or customized control 412 automatically start recording of pre-set duration (for example 10 seconds) video 405 from camera 425 of user device 200 and automatically integrate or attach or associate or merge or embedded said tapped or clicked geofilter 412 or geofilter control 412 or specified or customized control 412 associated one or more geofilters or stickers or emojis or emoticons or icons or clipart or images with one or more images of said recorded video and automatically share with or send to pre-set or predefined said action or geofilter or region associated one or more types of users of network including one or more contacts, groups, followers, one or more types or structured query language (SQL) or natural query specific users of network and one or more types of destinations including websites, webpages, applications, timeline, profile and graphical user interface (GUI). In another example in the event of single tap on predefined area 418 on geofilter 412 or geofilter control 412 or specified or customized control 412 take photo 405 or in the event of long press or press for pre-set duration on predefined area 418 on geofilter 412 or geofilter control 412 or specified or customized control 412 automatically start recording of pre-set duration (for example 10 seconds) video 405 from camera 425 of user device 200 and automatically integrate or attach or associate or merge or embedded said tapped or clicked geofilter 412 or geofilter control 412 or specified or customized control 412 associated one or more geofilters or stickers or emojis or emoticons or icons or clipart or images with said captured photo 405 or one or more images of said recorded video 405 and based on associated settings publish to ephemeral stories for enabling pre-set viewing user(s) to view said photo or video with integrated geofilter for pre-set life duration (for example view for 24 hours) or view duration (for example 10 seconds) or number of times of view (for example 5 times or 5 times within 24 hours) and after receiving and displaying of said shared photo or video with integrated geofilter(s) by receiving user, initiate timer, start pre-set view duration timer, display countdown and in the event of expiration of said photo or video associated view duration, hide said photo or video from screen or initiate timer, start pre-set life duration timer, display countdown and in the event of expiration of said life duration, remove said displayed photo or video from screen.

In an embodiment user can switch front camera or back camera by using camera switching icon 401/451.

In an embodiment in the event of check in place by user or staying at particular place for pre-duration or identifying particular place or geofence based on monitored and tracked current location of user device, identifying said identified location or place or address or geo-coordinates or place of business or pre-defined geofence associated geofilters (or stickers, emojis, clipart, expressions, emoticons, icons, images) or geofilters (or stickers, emojis, clipart, expressions, emoticons, icons, images) controls and displaying said identified one or more geofilters (or stickers, emojis, clipart, expressions, emoticons, icons, images) or geofilters (or stickers, emojis, clipart, expressions, emoticons, icons, images) controls 472 on camera application of graphical user interface (GU) 275 or camera view 474 of user device 200. In the event of applying one or more types of predefined gestures or touches or multi-touches or senses (for example hover) including single tap on particular geofilter (or sticker, emoji, clipart, expressions, emoticon, icon, image) 460 or geofilter (or sticker, emoji, clipart, expressions, emoticon, icon, image) control 460 from set of displayed geofilters (or stickers, emojis, clipart, expressions, emoticons, icons, images) or geofilters (or stickers, emojis, clipart, expressions, emoticons, icons, images) controls 472, capturing photo 455 from camera 474 of user device 200 and automatically integrate or attach or associate or link or store or merge or embedded said tapped or clicked or selected geofilter 460 with said captured photo 455 on particular pre-set area on photo or automatically determined area on photo based on or randomly determined area on photo and automatically send and display said photo 485 integrated with said geofilter 490 to pre-set one or more types of users of network including one or more contacts, groups, followers, one or more types or structured query language (SQL) or natural query specific users of network and one or more types of destinations including websites, webpages, applications, timeline, profile and graphical user interface (GUI). In an embodiment enable user to preview said captured photo with integrated geofilter for pre-set duration and enable to move said geofilter 490 within said photo 485 to enable to fix user preferred location of said geofilter on said photo.

In an embodiment in the event of conducting of scanning or augmented reality scanning of particular object from augmented reality system or application, server module 158 receives said scanned data from client application 275 including identity of user who has conducted augmented reality scanning by using augmented reality system, monitored and tracked location of user device at the time of conducting of augmented reality scanning by using augmented reality system, date and time of augmented reality scanning by using augmented reality system, automatically captured one or more raw photos or images of recorded videos, applied one or more types of gestures, multi-touches, senses including device movement direction, angels and degrees or rang of angels and degrees, provided one or more pre-defined voice commands and eye or body expression commands and recognize and identifies said scanned object and display said recognized and identified object or recognized and identified object associated with said received identified location or place or address or geo-coordinates or place of business or pre-defined geofence where user has conducted augmented reality scanning associated geofilters (or stickers, emojis, clipart, expressions, emoticons, icons, images) or geofilters (or stickers, emojis, clipart, expressions, emoticons, icons, images) controls and displaying said identified one or more geofilters (or stickers, emojis, clipart, expressions, emoticons, icons, images) or geofilters (or stickers, emojis, clipart, expressions, emoticons, icons, images) controls 472 on camera application of graphical user interface (GU) or camera view 474 of user device 200. In the event of applying one or more types of predefined gestures or touches or multi-touches or senses (for example hover) including single tap on particular geofilter (or sticker, emoji, clipart, expressions, emoticon, icon, image) 460 or geofilter (or sticker, emoji, clipart, expressions, emoticon, icon, image) control 460 from set of displayed geofilters (or stickers, emojis, clipart, expressions, emoticons, icons, images) or geofilters (or stickers, emojis, clipart, expressions, emoticons, icons, images) controls 472, capturing photo 455 from camera 474 of user device 200 and automatically integrate or attach or associate or link or store or merge or embedded said tapped or clicked or selected geofilter 460 with said captured photo 455 on particular pre-set area on photo or automatically determined area on photo based on or randomly determined area on photo and automatically send and display said photo 485 integrated with said geofilter 490 to pre-set one or more types of users of network including one or more contacts, groups, followers, one or more types or structured query language (SQL) or natural query specific users of network and one or more types of destinations including websites, webpages, applications, timeline, profile and graphical user interface (GUI). In an embodiment enable user to preview said captured photo with integrated geofilter for pre-set duration and enable to move said geofilter 490 within said photo 485 to enable to fix user preferred location of said geofilter on said photo.

In an embodiment enabling user to provide voice commands or speak keywords which server module 158 receives and recognizes based on voice recognition techniques and identifies or matches or determines associated one or more geofilters and displaying to user on graphical user interface (GUI) of user device and enabling to select particular geofilter from displayed list of geofilters and associate or attach or integrate or link or store or merged or embedded with one or more types of contents, data or media including photo, video, live streaming, blog, message, and post and share with one or more contact, groups, followers, one or more types of users of network and destinations including applications, websites, webpages, timeline, feed and one or more types of graphical user interface (GUI).

Figure 5:
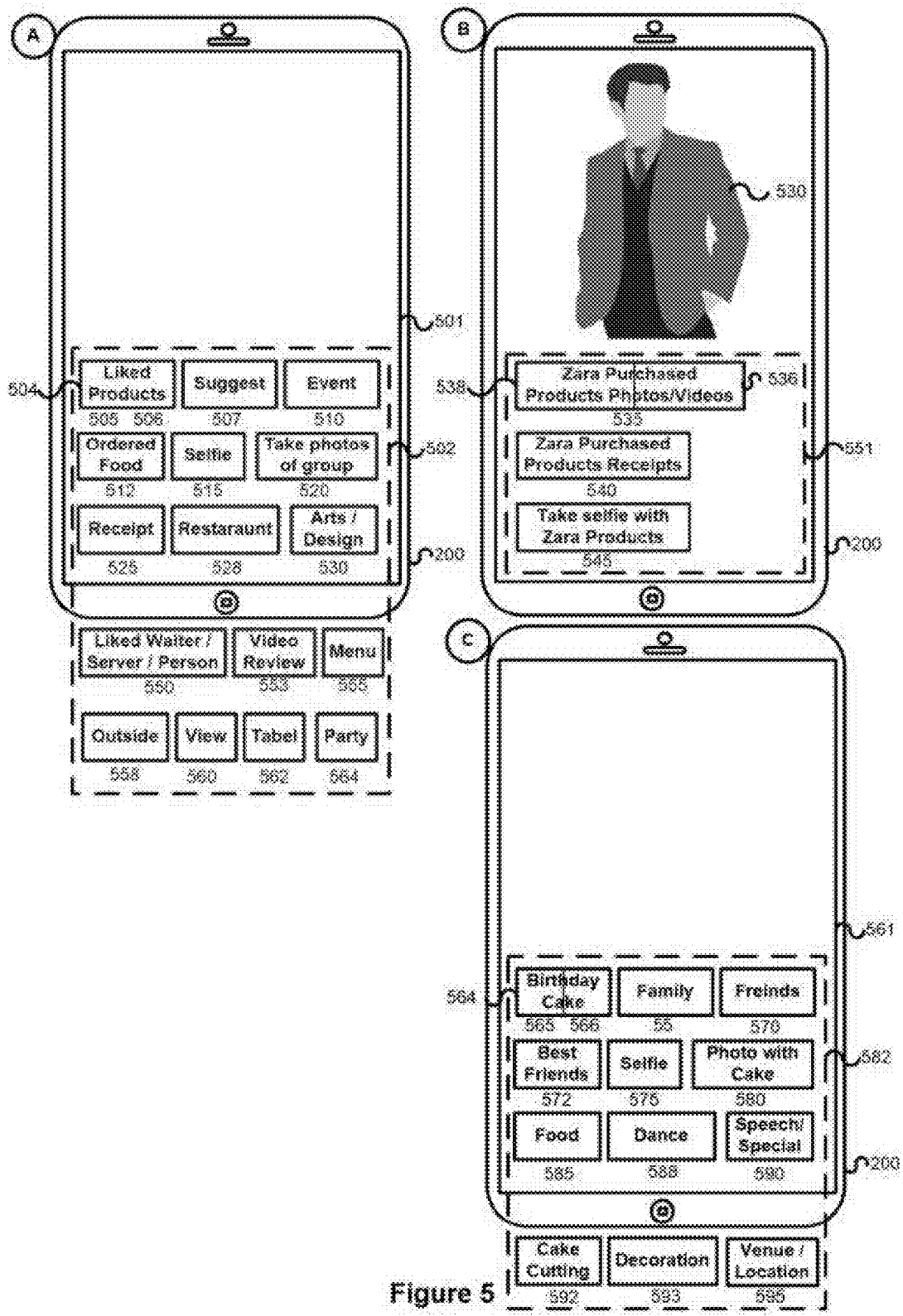
FIG. 5 illustrates graphical user interface (GUI) displaying location or place of business or pre-defined geofence associated one or more types of suggested multi-tasking controls for capturing or recording visual media as per suggested label describing activity, interaction, check-in place, status, one or more types of call-to-actions and interactions.

FIG. 5 illiterates displaying, by server module 159 on client application 276, suggested one or more visual media capture controls labeled as type and name of activity, action, event, status, reaction, transactions, communication, sharing, participations, call-to-action, interaction, task, object, product, food items, person, identified place and identified accompanied users based on monitored and tracked user device and nearest connected users of user devices and one or more keywords or tags or hashtags on camera or camera view or camera application, wherein suggesting one or more visual media capture controls for capturing photos or recording pre-set duration video or live video streaming based on sponsor or advertiser or owner or administrator of place of business or published or user or sever administrator or domain specific experts or third parties developers or service providers provided place or place associated objects including products, food items, persons and any real world named objects or scene or type of activity, action, event, interaction, transaction, call-to-action, status or recognized object or object model or object images or brand or product or service or geofence associated visual media capture controls, associated voice commands, associated target criteria, rules, privacy settings, access rights, provided or set or associated schedules, linked system with particular place or geofence or place of business. In an embodiment in the event of check in by user or staying at particular place for pre-set duration or visiting particular place or conducting of augmented reality scanning via augmented reality system or conducting one or more types of activities or actions or call-to-actions including place order, make payment, install application, register, participate with event, claim offer, share contact details or providing one or more type of reactions including like particular product, provide comments, and ratings, interact with particular nearest device associated users including connected user or staff of place of business, providing of status, and applied one or more types of pre-defined gestures, multi-touches, senses including movement of device at particular direction or angel for particular degree and provided one or more type of pre-defined voice commands and eye or body parts commands or expressions automatically identify visual media capture controls or multi-tasking visual media capture controls and display said automatically identified visual media capture controls or multi-tasking visual media capture controls 402 on graphical user interface (GUI) 401 of user device 200. For example in the event of entering into particular restaurant, display visual media capture controls or multi-tasking visual media capture controls including suggest to take photo 505 or video 506 of liked products by displaying visual media capture control or multi-tasking visual media capture control 504, suggest to take media of suggested particular things 507 including offered discount, new menu, festival, event and share with connected users, capture event associated photo by displaying visual media capture control or multi-tasking visual media capture control 507, suggest or instruct to task media of ordered food 512 by displaying visual media capture control or multi-tasking visual media capture control 512, suggest to take media with accompanied users by displaying visual media capture control or multi-tasking visual media capture control 520, suggest to take photo of receipt of ordered or purchased product or food items by displaying visual media capture control or multi-tasking visual media capture control 525, suggest to take photo or video of said visited restaurant by displaying visual media capture control or multi-tasking visual media capture control 528, suggest to take photo or video of liked staff by displaying visual media capture control or multi-tasking visual media capture control 550, suggest to take video review by displaying visual media capture control or multi-tasking visual media capture control 553, suggest to take photo or video of menu by displaying visual media capture control or multi-tasking visual media capture control 555, likewise suggest to take restaurant interior, furniture, design, outside look, decoration, stencils, facilities and like.

In an embodiment enable to customize and configure visual media capture control or multi-tasking visual media capture control including providing name, title, color, select font type, size and color, provide icon or image, associate one or more functions, interfaces, and contents, wherein server module 159 receives and stores said customized controls to server 110 database 115.

In another embodiment in the event of visiting at particular place of business (for example Zara shop) displaying said place of business provided, uploaded, verified or published or place of business associated one or more visual media capture controls or multi-tasking visual media capture controls 551, by server module 159 on client application 276 and in the event of applying gesture including single tap on particular visual media capture control or multi-tasking visual media capture control 535 from said place associated displayed set of visual media capture control or multi-tasking visual media capture control 555, capture photo or pre-se duration video 530 and send to said control associated pre-set one or more contacts, connections, groups, followers, one or more types of or structured query language (SQL) specific users of network and one or more types of destinations including applications, websites, webpages, timeline, one or more types of social network profile, feed and one or more types of graphical user interfaces (GUIs). In an embodiment in the event of long press on control 535 start recording of video, initiate timer and start pre-set duration timer, display countdown and in the event of expiration of said started timer associated pre-set duration timer, stop recording of video, save video and send to said control associated pre-set one or more contacts, connections, groups, followers, one or more types of or structured query language (SQL) specific users of network and one or more types of destinations including applications, websites, webpages, timeline, one or more types of social network profile, feed and one or more types of graphical user interfaces (GUIs). In an embodiment in the event of single tap on particular region 538 of control 535 capture photo and send to said control associated pre-set one or more contacts, connections, groups, followers, one or more types of or structured query language (SQL) specific users of network and one or more types of destinations including applications, websites, webpages, timeline, one or more types of social network profile, feed and one or more types of graphical user interfaces (GUIs). In an embodiment in the event of single tap on particular region 536 of control 535 start recording of video, initiate timer and start pre-set duration timer, display countdown and in the event of expiration of said started timer associated pre-set duration timer, stop recording of video, save video and send to said control associated pre-set one or more contacts, connections, groups, followers, one or more types of or structured query language (SQL) specific users of network and one or more types of destinations including applications, websites, webpages, timeline, one or more types of social network profile, feed and one or more types of graphical user interfaces (GUIs). In an embodiment in the event of single tap on particular region 536 of control 535 start recording of video and in the event of further single tap on said particular region 536 of control 535 stop recording of video, save video and send to said control associated pre-set one or more contacts, connections, groups, followers, one or more types of or structured query language (SQL) specific users of network and one or more types of destinations including applications, websites, webpages, timeline, one or more types of social network profile, feed and one or more types of graphical user interfaces (GUIs).

In an embodiment enabling user to draw or define geofence on map, select place or location of place on map, select current location of mobile device or provide address or geo-coordinates and enable to select or create, customize, configure one or more visual media capture controls or multi-tasking visual media capture controls 582 and associate with said venue or place of event, set or provide schedules including date and time of event, provide target users criteria including allow to access said controls to any visitor of said event venue or place or allow to access only to invited and invitation accepted friends or contacts or in the event of acceptance of invitation added to event groups, one or more types of list including list of customers, authorized users or members or ticked holders, wherein server module 159 receives and stores said details in server 110 database 115. In the event of entering at place or venue of said event or pre-defined geofence, displaying said one or more visual media capture controls or multi-tasking visual media capture controls 582 for enabling visitors or authorized users or pre-created list associated users or members or customers to access said one or more visual media capture controls or multi-tasking visual media capture controls 582, displaying by server module 159 on client application 276, to capture photos and record videos and share with other visitors or authorized users or pre-created list associated users or members or customers or based on permission she with one or more contacts, connections, groups, followers, one or more types of or structured query language (SQL) specific users of network and one or more types of destinations including applications, websites, webpages, timeline, one or more types of social network profile, feed and one or more types of graphical user interfaces (GUIs).

In an embodiment enabling publisher to create publication of one or more visual media capture controls or multi-tasking visual media capture controls by providing publication name, details, name of particular television program and provide and associate name of particular television channel and provide and associate date and time or schedule and enable to select or create, customize, configure one or more visual media capture controls or multi-tasking visual media capture controls and associate with said particular television program at particular television channel at particular date and time or schedule wherein server module 159 receives and stores said details in server 110 database 115. In an embodiment displaying said one or more visual media capture controls or multi-tasking visual media capture controls during date and time or schedule of said particular television program at particular television channel, by server module 159 on client application 276 and enabling to access said displayed one or more visual media capture controls or multi-tasking visual media capture controls during date and time or schedule of said particular television program at particular television channel.

In an embodiment displaying day to day activities specific visual media capture controls or multi-tasking visual media capture controls for recording day to day activities, actions, interactions, transactions, usage, used or using or liked products and services, status, participations including eating foods at breakfast, lunch and dinner, viewing movie or television programs, conversing with guests or friends or relatives or known persons or visited persons (based on monitored and tracked location of user device and nearby user connected users devices), go to bad or wake up (record or store timings), breakfast, lunch, dinner, dress, markup, selfie, exercise or yoga, play sports, hair style, expression, style, make breakfast, lunch, and dinner, study, walk, running or jogging, visiting place including garden or shop or mall, visited friends or relatives or known person(s), go to school, go to work, go to shopping, read newspaper, liked news or article, eating outside, viewing movie or drama, attending event, visiting home of friend, playing music, dancing, shopping, reading book, wherein displaying day to day activities specific visual media capture controls or multi-tasking visual media capture controls, by server module 159 on client application 276, based on pre-set schedules or timings, calendar entries of user and connected users, monitored and tracked location of user device and nearby user connected users devices, schedule events or programs, current location specific place or associated event or festival or exhibition.

In an embodiment in the event of identifying particular place as movie theatre or drama theatre and identifying stay of user device at said identified place for pre-set duration then displaying said place or named movie or type of place specific or associated visual media capture controls or multi-tasking visual media capture controls.

In an embodiment enabling user to search and access one or more keywords, categories, sub-categories, named or type of location or place or point of interests or products or activities or status specific visual media capture controls or multi-tasking visual media capture controls.

Figure 6:
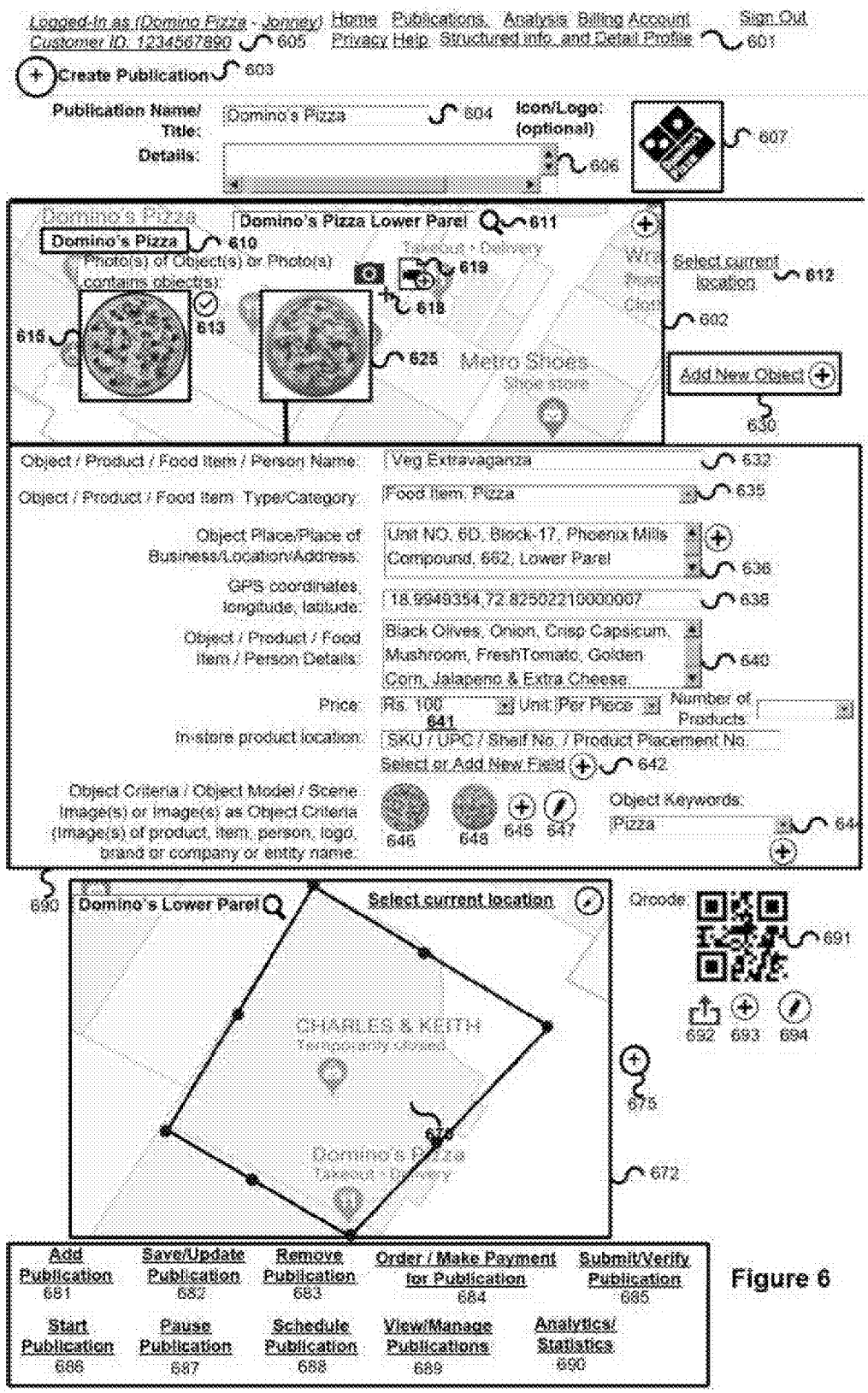
FIGS. 6-17 illustrates graphical user interface (GUI) for selecting location on map or current place of user device or draw geofence boundaries or provide address or geo-coordinates and associating one or more products and providing one or more object models or object images for each said product associated with said location of place of business or geofence or address or geo-coordinates. Providing graphical user interface (GUI) for viewing said products associated with particular place of business or geofence or address or geo-coordinates from augmented reality system or application and apply one or more types of pre-defined gesture including single tap on viewing product from augmented reality system or application or specific camera application to add to cart said selected or tapped or clicked product and after finishing shopping make order and make payment for said selected or added to cart ordered products.

FIG. 6 illustrates Graphical User Interface (GUI) for enabling user or publisher or sponsor or brand owner or seller or administrator of place of business or advertiser to create 603 one or more publication 604, provide name of publication 607, details of publication 606, logo, icon or image of brand or name of shop 607, search location or place 611 on map 602 or select current location 612 on map 602 and/or draw 670 on map 672 one or more geofence boundaries 670 for each place of business 610 or provide one or more addresses for one or more place of business 636 or provide geo-coordinates information including latitude, longitude 638. In an embodiment provide one or more schedules of publication or provide start date and time of publication 604 and end date and time of publication. In an embodiment enabling user to add 675 geofence boundary 670 or location information 636/638 for one or more places of business. Administrator or user can add 618/619 one or more photos 615/625, videos, details of one or more products including product name 632, product category 635, product price 641 and adds 645, updates 647 and associates one or more object models, object images 646/648, object keywords and object criteria 644 and associates with one or more locations 670/636/638/610 or select one or more locations 670/636/638/610 and associates and adds 618/619 one or more photos 615/625, videos, details of one or more products including product name 632, product category 635, product price 641 and adds 645, updates 647 and associates one or more object models, object images 646/648, object keywords and object criteria 644.

In an embodiment after creating publication 603, providing publication name 604, details 606, place of business location information 670/636/638/610, adding or updating details of one or more products or food items or persons or staffs and administrators or management persons of place of business and selecting and customizing associated one or more object models, and object images, administrator can save or update said publication 681 which receives and stores at server 110 database 115 by server module 153. In an embodiment administrator can make required payment 684 for said publication 604 and can submit or verify said publication 604 related information before making them available for users of network. In an embodiment after receiving indication of successful verification, server administrator can start or restart 2686 or pause 2687 publication or make available said publication 604 to users of network. In an embodiment administrator can provide schedule for publication 604. In an embodiment administrator can view list of publications, select particular publication and can add 681, update 682 and remove publication 683, publication name 604, details, 606, place of business location information 670/636/638/610, details of one or more products or food items or persons. In an embodiment after receiving indication of successful verification, administrator can start or restart 686 or pause 687 publication or make available said publication to users of network. In an embodiment administrator can provide schedule for publication 688.

Figure 7:
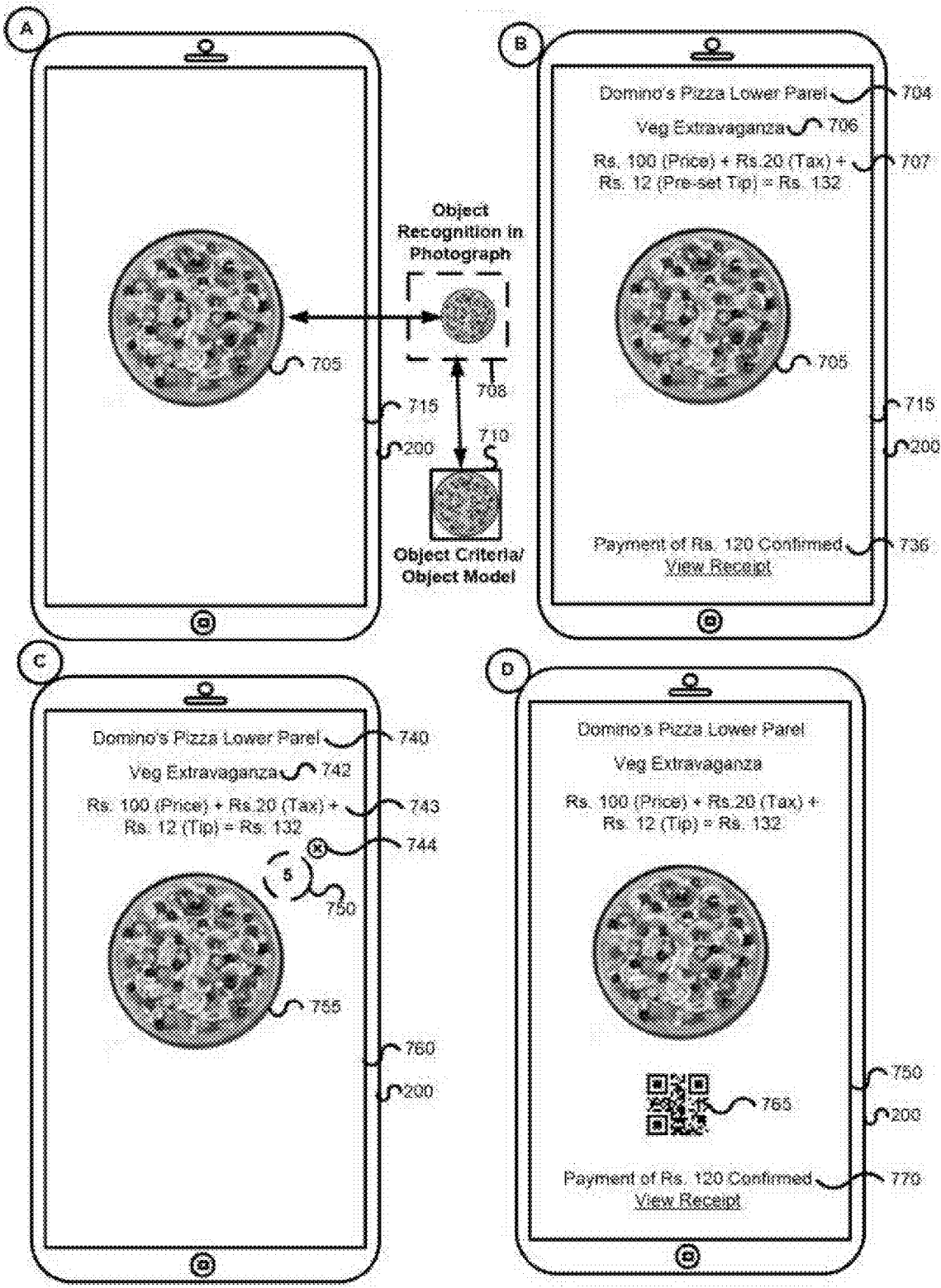

FIG. 7 illustrates Augmented Reality System Interface for making payment via augmented reality scanning. In an embodiment in the event of detecting that user mobile device 200 sufficiently stable and in the event of viewing particular object 705 or scene in specific camera application or augmented reality system 715/277 or in an embodiment conducting of augmented reality scanning via specific camera application or augmented reality system 715/277 from user device 200 for pre-set or particular duration, then initiate and start pre-set duration timer and after expiration of said started timer, server module 153, automatically receives said scanned data including automatically or manually captured one or more photos or videos or images of videos and voice, date and time of viewing or conducting of augmented reality scanning, current location of monitored and tracked user device while viewing of particular object or conducted augmented reality scan or capturing of photo or video, identity of user who viewing particular object or conducted augmented reality scan and recognizes said object by matching said received automatically or manually captured one or more photos or images of videos 708 with said received location or place of business or geofence associated identified object models and object images or object keywords or object criteria 710 and identify object associated product or food item or person's details and displaying on screen 715 said details including place of business name and location 704, one or more photos or videos of product or food item, product or food item name 706, price or total cost of product or food item 707 and based on place of business associated merchant account details and user associated payment information, automatically make payment by transferring fund or amount or total cost associated with or calculated for said identified product or food item from user's account to said merchant account associated with said place of business and displaying payment confirmation message and automatically generated receipts 736 based on said received and identified information. In an embodiment user can go away from viewing object 705 or go away from conducted augmented reality scanning of object 705 from specific camera application or augmented reality system 715/277 within pre-set duration to cancel said initiated transaction or making of payment. In an embodiment user can change orientation of mobile device 200 from portrait to landscape or from landscape to portrait orientation while viewing object 705 or conducted augmented reality scanning of object 705 from specific camera application or augmented reality system 715 within pre-set duration to cancel said initiated transaction or making of payment.

In an embodiment in the event of detecting that user mobile device 200 has conducted augmented reality scanning or viewing particular object 705 or scene in specific camera application or augmented reality system 715/277 from user device 200, server module 153, automatically receives said scanned data including automatically or manually captured one or more photos or videos or images of videos and voice, date and time of viewing or conducting of augmented reality scanning, current location of monitored and tracked user device while viewing of particular object or conducted augmented reality scan or capturing of photo or video, identity of user who viewing particular object or conducted augmented reality scan and recognizes said object by matching said received automatically or manually captured one or more photos or images of videos 708 with said received location or place of business or geofence associated identified object models and object images or object keywords or object criteria 710 and identify object associated product or food item or person's details and displaying on screen 760 said details including place of business name and location 740, one or more photos or videos of product or food item 755, product or food item name 6426, price or total cost of product or food item 743 and initiates, starts and displays timer (reverse order e.g. 5 second timer, display 5 then 4 then 3 then 2 then 1 then 0 after expiration of each second) 750, wherein timer associated with pre-set duration and in the event of expiration of said timer 750, automatically make payment by transferring fund or amount or total cost 743 associated with or calculated for said identified product or food item 755 from identified user's account to said identified place of business associated merchant account and displaying payment confirmation message and automatically generated receipts 736 and automatically generated code including QRcode 765 based on said received and identified information. In an embodiment user can apply one or more types of gestures including tap anywhere on screen 760 of user device 200 or tap on particular icon 744 or pre-defined area or region of screen 760 of user device 200 or provide pre-defined voice command to cancel started timer 750 to cancel payment transaction or pause timer 750 and in the event of again applying one or more types of gestures including tap anywhere on screen 760 of user device 200 or tap on particular icon 744 or pre-defined area or region of screen 760 of user device 200 or providing of pre-defined voice command, re-start said paused timer 750 and in the event of expiration of said timer 750, automatically make payment by transferring fund or amount or total cost 743 associated with or calculated for said identified product or food item 755 from identified user's account to said identified place of business associated merchant account and displaying payment confirmation message and automatically generated receipts 736 and automatically generated code including QRcode 765 based on said received and identified information.

Figure 8:
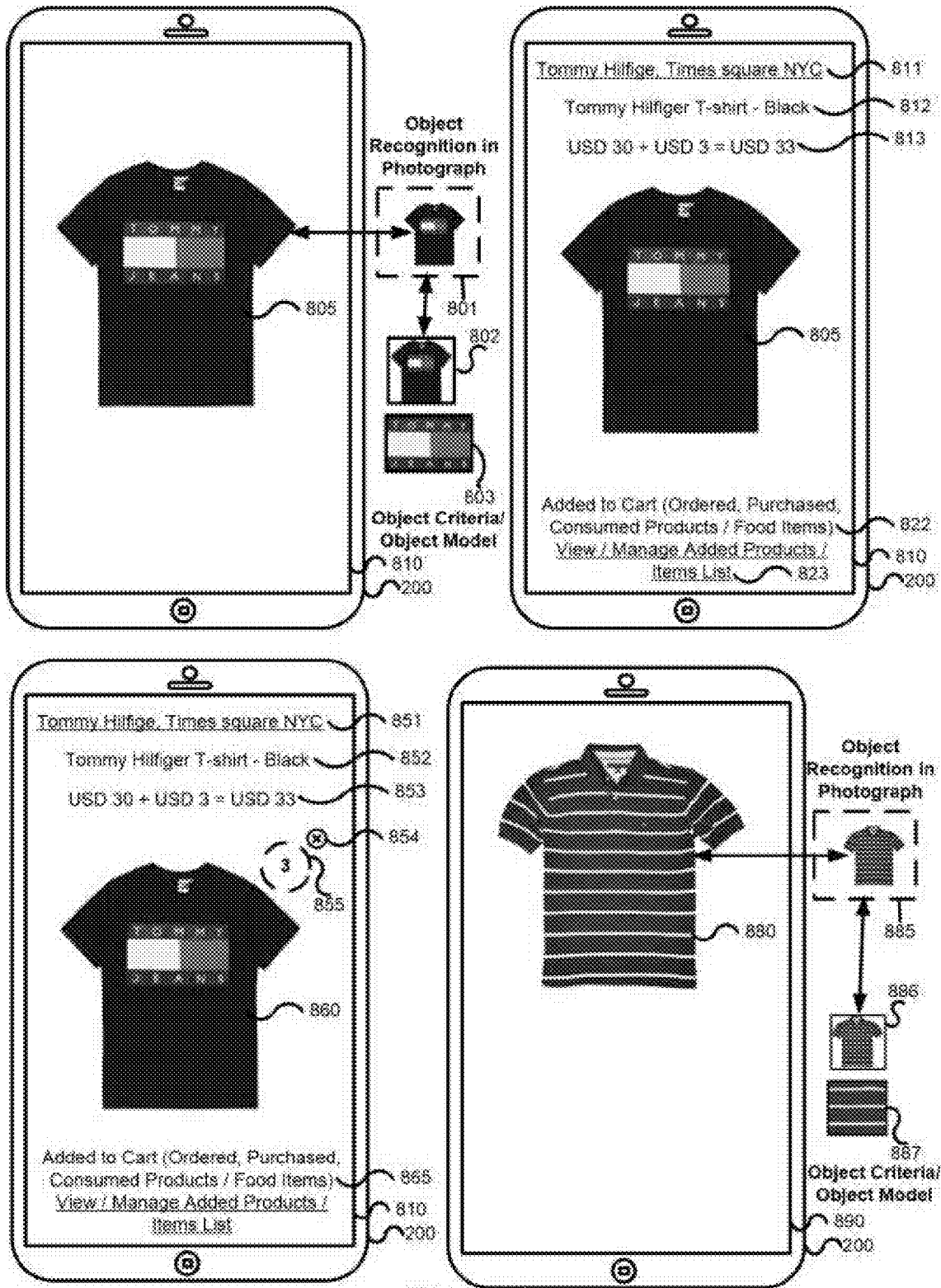
Figure 9:
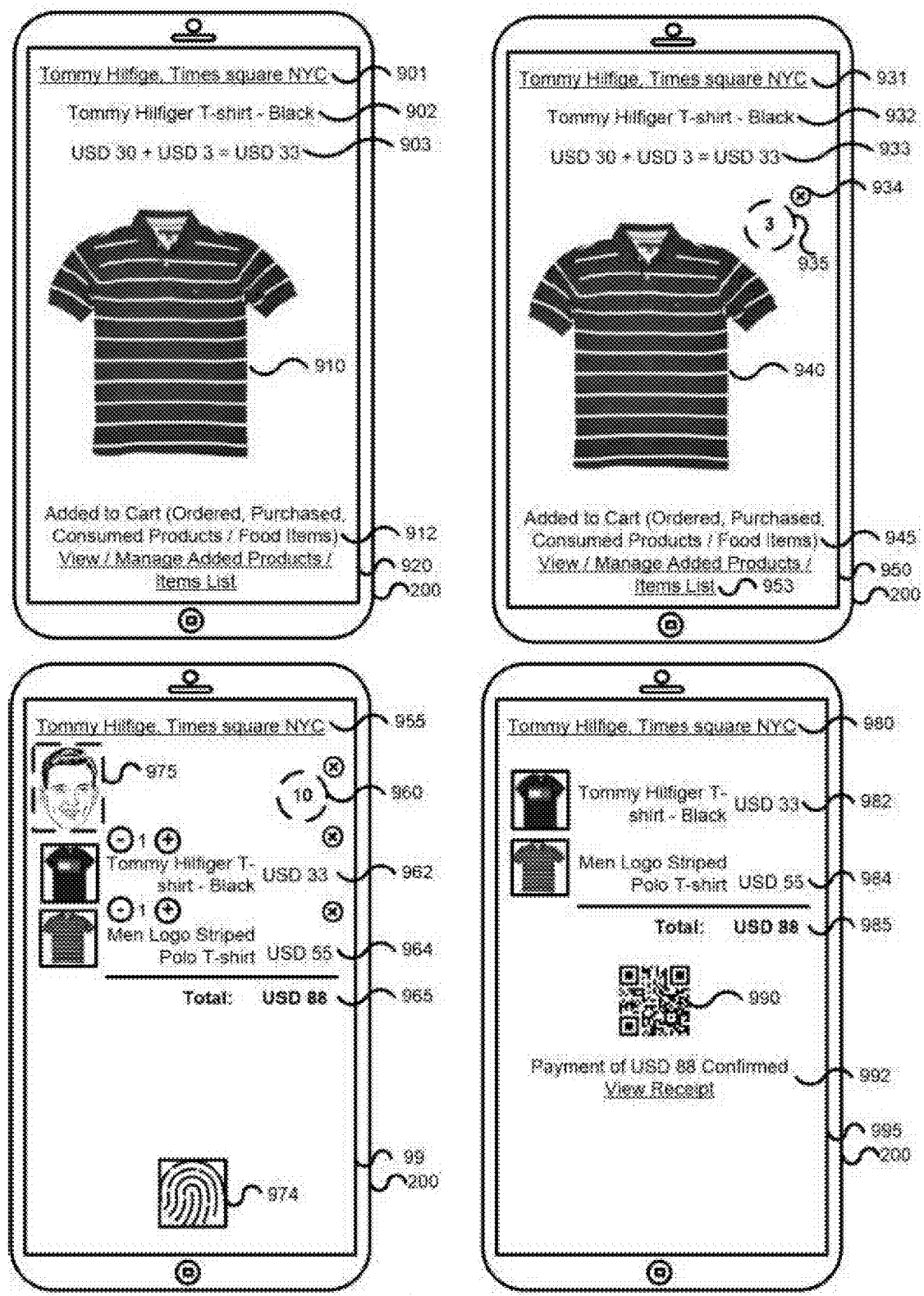

FIGS. 8-9 illustrates Augmented Reality System Interface 277 for adding to cart one or more products and making payment. In an embodiment in the event of detecting that user mobile device 200 sufficiently stable and in the event of viewing particular object 805 or scene in specific camera application or augmented reality system 810/277 or in an embodiment conducting of augmented reality scanning via specific camera application or augmented reality system 810/277 from user device 200 for pre-set or particular duration, then initiate and start pre-set duration timer and after expiration of said started timer, server module 153, automatically receives said scanned data including automatically or manually captured one or more photos or videos or images of videos of object 805 and voice, date and time of viewing or conducting of augmented reality scanning, current location of monitored and tracked user device 200 while viewing of particular object 805 or conducted augmented reality scan or capturing of photo or video, identity of user who viewing particular object 805 or conducted augmented reality scan from identified user device and recognizes said object 805 by matching said received automatically or manually captured one or more photos or images of videos 801 with said received location or place of business or geofence associated identified object models and object images or object keywords or object criteria 802/803 and identify object associated product 805 or food item or person's details and displaying on screen 810 said details including place of business name and location 811, one or more photos or videos of product 805, product 805 name 812, price or total cost of product 813 and added to cart said identified product and store said identified product details with identity of user and session identity and notifying user by displaying notification or displaying message 822 on screen 810 indicating confirmation of successfully added to cart said identified product with product details including product photo, product name, product price, tax, brand name and other one or more types of details. In an embodiment in the event of non-identifying product or identifying more than one matched product while or during matching of said received automatically or manually captured one or more photos or images of videos 801 with said received location or place of business or geofence associated identified object models and object images or object keywords or object criteria 802/803, server module generates appropriate message and notifying user or displaying said message on screen 810 indicating non-identifying of product or identifying more than one similar object and instructing user to scan unique part of product including design, logo, brand name, product name, small or medium or large size label, printed or cloth label, unique marker, code including bar code, QRcode or take help of staff to uniquely identify product based on object and optical characters recognition techniques.

In an embodiment user can go away from viewing object 805 or go away from conducted augmented reality scanning of object 805 from specific camera application or augmented reality system 810 within pre-set duration or before displaying confirmation message 822 indicating successfully adding to cart said recognized and identified product to cancel said initiated adding of product to cart action. In an embodiment user can change orientation of mobile device 200 from portrait to landscape or from landscape to portrait orientation or provide pre-defined voice command or apply one or more types of gestures anywhere on screen 810 or pre-defined area or particular icon on screen 810 while viewing object 805 or conducted augmented reality scanning of object 805 from specific camera application or augmented reality system 810 within pre-set duration or before displaying confirmation message 822 indicating successfully adding to cart said recognized and identified product to cancel said initiated adding of product to cart action.

In an embodiment user can view cart 823 and can remove one or more product added to cart, decrease or increase quantity or numbers of products added to cart, manfully add one or more products in cart, apply promotion code or redeemable points or offers, select free sample from eligible list of samples, claim offers and update one or more types of other details.

In an embodiment in the event of detecting that user mobile device 200 has conducted augmented reality scanning or viewing particular object 860 or scene in specific camera application or augmented reality system 810/277 from user device 200, server module 153, automatically receives said scanned data including automatically or manually captured one or more photos or videos or images of videos and voice, date and time of viewing or conducting of augmented reality scanning, current location of monitored and tracked user device while viewing of particular object or conducted augmented reality scan or capturing of photo or video, identity of user who viewing particular object or conducted augmented reality scan and recognizes said object by matching said received automatically or manually captured one or more photos or images of videos 801 with said received location or place of business or geofence associated identified object models and object images or object keywords or object criteria 802/803 and identify object associated product or food item or person's details and displaying on screen 810 said details including place of business name and location 851, one or more photos or videos of product or food item 860, product or food item name 852, price or total cost of product or food item 853 and initiates, starts and displays timer (in reverse order e.g. 5 second timer, display 5 then 4 then 3 then 2 then 1 then 0 after expiration of each second) 855, wherein timer associated with pre-set duration and in the event of expiration of said timer 855, added to cart said identified product and store said identified product details with identity of user and identity of session and notifying user by displaying notification or displaying message 865 on screen 810 indicating confirmation of successfully added to cart said identified product with product details including product photo, product name, product price, tax, brand name and other one or more types of details.

In an embodiment in the event of non-identifying product or identifying more than one matched product while or during matching of said received automatically or manually captured one or more photos or images of videos 801 with said received location or place of business or geofence associated identified object models and object images or object keywords or object criteria 802/803, server module generates appropriate message and notifying user or displaying said message on screen 810 indicating non-identifying of product or identifying more than one similar object and instructing user to scan unique part of product including design, logo, brand name, product name, small or medium or large size label, printed or cloth label, unique marker, code including bar code, QRcode or take help of staff to uniquely identify product based on object and optical characters recognition techniques.

In an embodiment user can apply one or more types of gestures including tap anywhere on screen 810 of user device 200 or tap on particular icon 854 or pre-defined area or region of screen 810 of user device 200 or provide pre-defined voice command to cancel started timer 855 to cancel adding to cart said recognized and identified product or pause timer 855 and in the event of again applying one or more types of gestures including tap anywhere on screen 810 of user device 200 or tap on particular icon 854 or pre-defined area or region of screen 810 of user device 200 or providing of pre-defined voice command, re-start said paused timer 855 and in the event of expiration of said timer 855, automatically add to cart said identified product and store said identified product details with identity of user and identity of session and notifying user by displaying notification or displaying message 865 on screen 810 indicating confirmation of successfully added to cart said identified product with product details including product photo, product name, product price, tax, brand name and other one or more types of details.

In an embodiment in the event of detecting that user mobile device 200 sufficiently stable and in the event of viewing another object or product 880 or scene in specific camera application or augmented reality system 890 or in an embodiment conducting of augmented reality scanning via specific camera application or augmented reality system 890 from user device 200 for pre-set or particular duration, then initiate and start pre-set duration timer and after expiration of said started timer, server module 153, automatically receives said scanned data including automatically or manually captured one or more photos or videos or images of videos of object 880 and voice, date and time of viewing or conducting of augmented reality scanning, current location of monitored and tracked user device 200 while viewing of particular object 880 or conducted augmented reality scan or capturing of photo or video, identity of user who viewing particular object 880 or conducted augmented reality scan from identified user device and recognizes said object 880 by matching said received automatically or manually captured one or more photos or images of videos 885 with said received location or place of business or geofence associated identified object models and object images or object keywords or object criteria 885/886 and identify object associated product 880 or food item or person's details and displaying on screen 890 said details including place of business name and location 901, one or more photos or videos of product 880, product 880 name 902, price or total cost of product 903 and added to cart said identified product and store said identified product details with identity of user and session identity and notifying user by displaying notification or displaying message 912 on screen 920 indicating confirmation of successfully added to cart said identified product with product details including product photo, product name, product price, tax, brand name and other one or more types of details. In an embodiment in the event of non-identifying product or identifying more than one matched product while or during matching of said received automatically or manually captured one or more photos or images of videos 801 with said received location or place of business or geofence associated identified object models and object images or object keywords or object criteria 886/887, server module generates appropriate message and notifying user or displaying said message on screen 912 indicating non-identifying of product or identifying more than one similar object and instructing user to scan unique part of product including design, logo, brand name, product name, small or medium or large size label, printed or cloth label, unique marker, code including bar code, QRcode or take help of staff to uniquely identify product based on object and optical characters recognition techniques.

In an embodiment user can go away from viewing object or product 880 or go away from conducted augmented reality scanning of object or product 880 from specific camera application or augmented reality system 890 within pre-set duration or before displaying confirmation message 912 indicating successfully adding to cart said recognized and identified product to cancel said initiated adding of product to cart action. In an embodiment user can change orientation of mobile device 200 from portrait to landscape or from landscape to portrait orientation or provide pre-defined voice command or apply one or more types of gestures anywhere on screen 890 or pre-defined area or particular icon on screen 890 while viewing object 880 or conducted augmented reality scanning of object 880 from specific camera application or augmented reality system 890 within pre-set duration or before displaying confirmation message 912 indicating successfully adding to cart said recognized and identified product to cancel said initiated adding of product to cart action.

In an embodiment user can view cart 920 and can remove one or more product added to cart, decrease or increase quantity or numbers of products added to cart, manfully add one or more products in cart, apply promotion code or redeemable points or offers, select free sample from eligible list of samples, claim offers and update one or more types of other details.

In an embodiment in the event of detecting that user mobile device 200 has conducted augmented reality scanning or viewing particular object 940 or scene in specific camera application or augmented reality system 850 from user device 200, server module 153, automatically receives said scanned data including automatically or manually captured one or more photos or videos or images of videos and voice, date and time of viewing or conducting of augmented reality scanning, current location of monitored and tracked user device while viewing of particular object or conducted augmented reality scan or capturing of photo or video, identity of user who viewing particular object or conducted augmented reality scan and recognizes said object by matching said received automatically or manually captured one or more photos or images of videos 885 with said received location or place of business or geofence associated identified object models and object images or object keywords or object criteria 886/887 and identify object associated product or food item or person's details and displaying on screen 850 said details including place of business name and location 931, one or more photos or videos of product or food item 940, product or food item name 932, price or total cost of product or food item 933 and initiates, starts and displays timer (in reverse order e.g. 5 second timer, display 5 then 4 then 3 then 2 then 1 then 0 after expiration of each second) 935, wherein timer associated with pre-set duration and in the event of expiration of said timer 935, added to cart said identified product and store said identified product details with identity of user and identity of session and notifying user by displaying notification or displaying message 945 on screen 950 indicating confirmation of successfully added to cart said identified product with product details including product photo, product name, product price, tax, brand name and other one or more types of details.

In an embodiment in the event of non-identifying product or identifying more than one matched product while or during matching of said received automatically or manually captured one or more photos or images of videos 885 with said received location or place of business or geofence associated identified object models and object images or object keywords or object criteria 886/887, server module 153 generates appropriate message and notifying user or displaying said message on screen 950 indicating non-identifying of product or identifying more than one similar object and instructing user to scan unique part of product including design, logo, brand name, product name, small or medium or large size label, printed or cloth label, unique marker, code including bar code, QRcode or take help of staff to uniquely identify product based on object and optical characters recognition techniques.

In an embodiment user can apply one or more types of gestures including tap anywhere on screen 890 of user device 200 or tap on particular icon 934 or pre-defined area or region of screen 890 of user device 200 or provide pre-defined voice command to cancel started timer 935 to cancel adding to cart said recognized and identified product or pause timer 935 and in the event of again applying one or more types of gestures including tap anywhere on screen 950 of user device 200 or tap on particular icon 934 or pre-defined area or region of screen 950 of user device 200 or providing of pre-defined voice command, re-start said paused timer 935 and in the event of expiration of said timer 935, automatically add to cart said identified product and store said identified product details with identity of user and identity of session and notifying user by displaying notification or displaying message 945 on screen 950 indicating confirmation of successfully added to cart said identified product with product details including product photo, product name, product price, tax, brand name and other one or more types of details.

In an embodiment after adding said products 805/880 user can apply one or more types of gestures including tap on view cart or provide voice command or change orientation of mobile device 200 from left to right or change from right to left to view cart details including added products photo, name, price 962/964 and total amount 965. In an embodiment automatically scroll list of added products if list is more than one page or screen, wherein enabling user to control or pre-set speed of automatically scrolling of list of added products.

In an embodiment in the event of viewing of cart, automatically initiate and start pre-set duration timer 960 and in the event of applying one or more types of gestures anywhere on screen 950/920 or particular region on screen 950/920 or icon or link or button 953 including tap on view cart 953 or provide voice command or change orientation of mobile device 200 from left to right or change from right to left, stop timer, initiate timer and enable user to continue shopping by opening augmented reality scanning system or specific camera application 810/990.

In an embodiment in the event of viewing of cart, automatically initiate and start pre-set duration timer 960 and in the event of expiration of timer 960, automatically make payment by transferring fund or amount or total cost 965 associated with or calculated for said added identified products 962/964 from said identified user's account to said identified place of business associated merchant account and displaying payment confirmation message and automatically generated receipts 992 and automatically generated code including QRcode 990 based on said received and identified information.

In an embodiment in the event of viewing of cart, automatically initiate and start pre-set duration timer 960 and for security reasons, verifying that user who conducted said payment transaction is registered user and owner of said mobile device 200 based on receiving one or more photos or videos of user's face or full or partial body parts 975 from front camera 975 of user device 200 while conducting of said payment transactions or before expiration of timer 960 and matching said received one or more photos or images of videos of user's face or full or partial body parts 975 with user associated pre-stored one or more photos or profile photos or object models or image models of user or identifying or recognizing human face in the received photograph or image 975 based on face recognition techniques and based on the identified human face satisfying the object criteria associated with the user in the stored data and in the event of expiration of timer 960, automatically make payment by transferring fund or amount or total cost 965 associated with or calculated for said added identified products 962/964 from said identified user's account to said identified place of business associated merchant account and displaying payment confirmation message and automatically generated receipts 992 and automatically generated code including QRcode 990 based on said received and identified information.

In an embodiment in the event of viewing of cart, automatically initiate and start pre-set duration timer 960 and for security reasons, receiving from user finger prints of user from fingerprint scanner 974 associated with fingerprint sensor of user device 200, wherein a fingerprint scanner is a type of technology that identifies and authenticates the fingerprints of an individual in order to grant or deny access to a computer system and based on received finger print verifying that user who has conducted said payment transaction is registered user and owner of said mobile device 200 based on matching said received fingerprint with pre-stored fingerprints while conducting of said payment transactions or before expiration of timer 960 and in the event of expiration of timer 960, automatically make payment by transferring fund or amount or total cost 965 associated with or calculated for said added identified products 962/964 from said identified user's account to said identified place of business associated merchant account and displaying payment confirmation message and automatically generated receipts 992 and automatically generated code including QRcode 990 based on said received and identified information.

Figure 10:
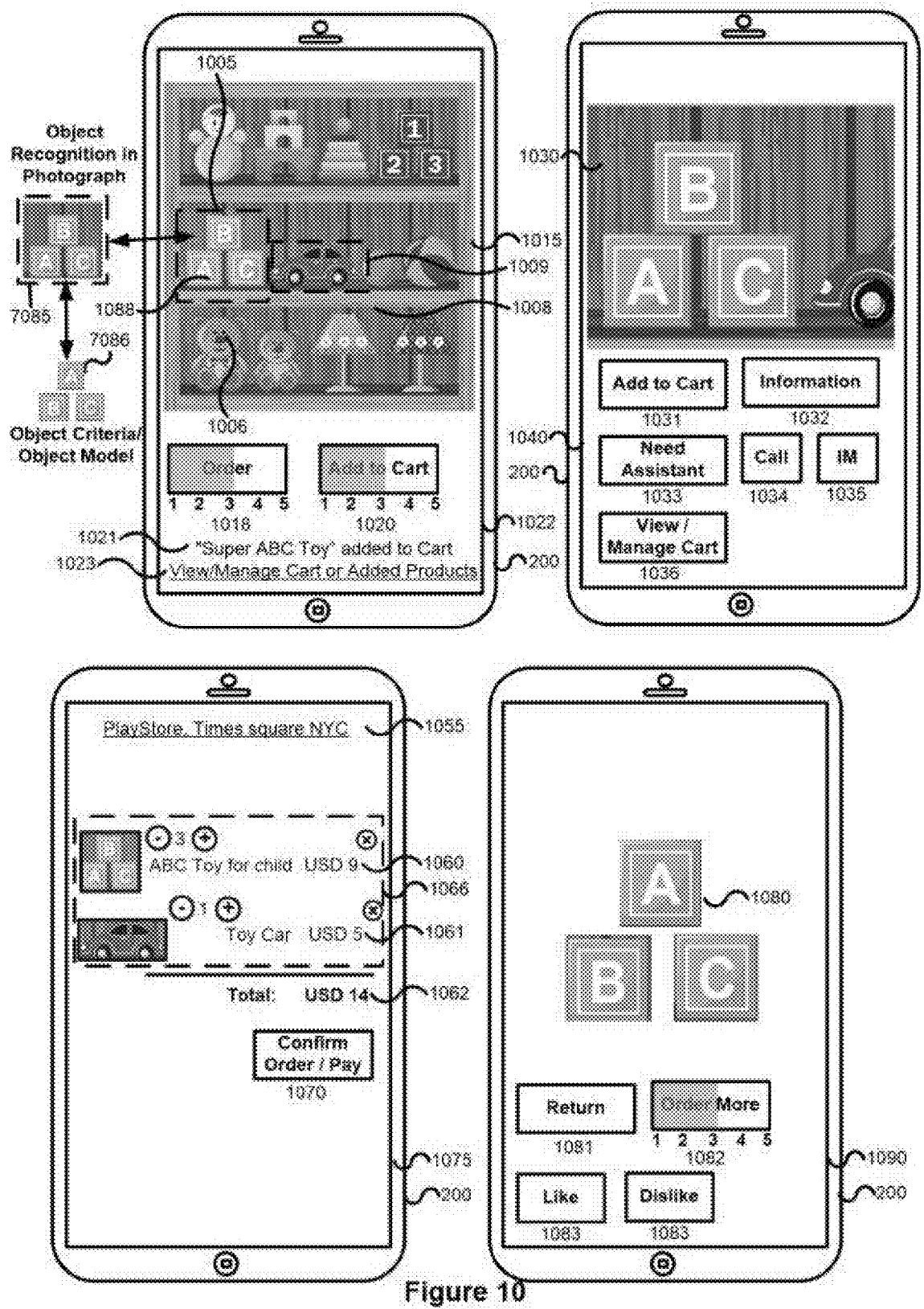

FIG. 10 illustrates augmented reality system for enabling user to view particular product from augmented reality system 277 and apply one or more types of gestures and touches on particular viewing product including single tap, double tap, drag on particular viewing product and drop on particular pre-defined region on screen of augmented reality system, swipe, flick, long press, press and tap, provide one or more pre-defined voice commands including add or add to cart particular brand name and number of quantity of particular product (e.g. "add two super water bottle"), provided one or more pre-defined eye commands including pre-defined type of eye movement like blink eye or move eye from left to right or right to left or close eye for pre-set duration and open eye and select particular product or one or more products and add to cart or order or purchase and make payment.

In an embodiment for example user can view products 1015 displayed in shelf of retail shop and in the event of apply particular or pre-defined one or more types of gestures or touches or multi-touches or senses including tap on particular product 1005 from viewing products 1015 from augmented reality system 1022, server module 153 receives identity of user who has conducted augmented reality scanning by using augmented reality system, monitored and tracked location of user device at the time of conducting of augmented reality scanning by using augmented reality system, date and time of augmented reality scanning by using augmented reality system, one or more raw photos or images 1015 with particular type of digital markings 1088 on particular area of said received raw photo or image 1015, wherein digitally integrating or embossing particular type of markings on particular area of raw photo or image 1015 based on applying of particular type of gestures or touches or multi touches (for example single tap) on particular area or on selected product 1005 on screen 1015 by user while viewing one or more products 1015 from augmented reality system 1022 and based on particular type of digital markings 1088 on said received raw photo or image 1015, server module 153, identifies or recognizes or detects selected product area or boundary or lines or identifies selected product area based on recognizing particular logo or brand name or text, specific color and distinguishing close proximity other products and identify unique area of selected product and extract square or product area related image 885 and match with said received location or place of business or geofence associated one or more object models or object images 886 based on object recognition and optical characters recognition (OCR) techniques and uniquely identify said selected product 1005 and identify associated one or more types of details or data including product name, brand name, one or more product photos or videos, product price, associated tax and other information and based on said received user applied particular pre-defined type of gestures or touches or multi touches (for example single tap) associated pre-stored or pre-configured command or type of action or call to action including select, add to cart, add to particular type of list including ad to wish list and add to inventory or deduct or remove from inventory list, make order, instruct home delivery, request to return or repair or change configuration like color or size or fittings, provide reaction including like or dislike, view delivery status, take, buy and make payment and any combination thereof (for example add to cart), server module 153, automatically conducts or take said associated one or more actions on said selected product 1005. For example, based on single tap 1006 on said selected product 1005, server module 153 adds said selected product to cart associated with said identified user who conducted augmented reality scanning by using augmented reality system or associated identified session. In another example based on single tap 1006 on said selected product 1005, server module 153 identifies and selects said product 1005 and based on received user action including order 1018 and/or make payment or add to cart 1020 from one or more types of controls including button, server module 153 conducts action or all-to-action or user provided action on said selected product 1005 (for example select product by tapping on product 1005 and tap on order button 1018 or swipe from left to right or tap on particular area associated with number within "Order" button 1018 to select "Order" button 1018 or instruct order as well as select number of quantity (for example order 3 quantity of selected product 1005). In an embodiment in the event of single tap 1006 on particular product 1005, purchase product, take product and automatically make payment for said recognized, identified and selected product 1005, wherein automatically make payment by transferring price of said identified product 1005 from identified user's account who has conducted said augmented reality scan to said identified place of business associated merchant account and displaying payment confirmation message 1021 and automatically generated receipts and automatically generated code including QRcode based on said received and identified information. Likewise, user can select one or more other product (for example select product 1009 by tapping 1008 on viewing products 1015 from augmented reality system 1022. In an embodiment user can remove ordered or selected or added to cart particular product by again viewing said product from augmented reality system and apply one or more types of pre-defined gestures or touches or multi touches or senses on said product to cancel order of said product or remove from cart said product or cancel or un-do selection of said product.

For example in the event of again viewing of product 1005 from augmented reality system 1022 and applying one or more types of gestures or multi touches or senses (for example apply double tap on product 1005), server module 153 receives identity of user who has conducted augmented reality scanning by using augmented reality system, monitored and tracked location of user device at the time of conducting of augmented reality scanning by using augmented reality system, date and time of augmented reality scanning by using augmented reality system, applied type of gesture or touch or multi-touch or senses, one or more raw photos or images 1015 with particular type of digital markings 1088 on particular area of said received raw photo or image 1015, wherein digitally integrating or embossing particular type of markings on particular area of raw photo or image 1015 based on applying of particular type of gestures or touches or multi touches (for example single tap) on particular area or on selected product 1005 on screen 1015 by user while viewing one or more products 1015 from augmented reality system 1022 and based on particular type of digital markings 1088 on said received raw photo or image 1015, server module 153, identifies or recognizes or detects selected product area or boundary or lines or identifies selected product area based on recognizing particular logo or brand name or text, specific color and distinguishing close proximity other products and identify unique area of selected product and extract square or product area related image 885 and match with said received location or place of business or geofence associated one or more object models or object images 886 based on object recognition and optical characters recognition (OCR) techniques and uniquely identify said selected product 1005 and cancel order of said product or remove from cart said product or cancel or un-do selection of said product. In an embodiment based on said received user applied particular pre-defined type of gestures or touches or multi touches (for example double tap) associated pre-stored or pre-configured command or type of action or call to action including cancel order of said product 1005 or remove from cart said product 1005 or cancel or un-do selection of said product 1005, server module 153, automatically conducts or take said associated one or more actions on said selected product 1005. For example, based on double tap 1006 on said selected product 1005, server module 153 cancels order of said product 1005 or cancels or un-do selections of said product 1005 or removes from cart said product 1005 associated with said identified user who conducted augmented reality scanning by using augmented reality system or associated identified session.

In an embodiment user can remove last added product from cart by changing orientation of device from landscape to portrait or from portrait to landscape. In an embodiment user can provide voice command to remove one or more products from cart.

In an embodiment user can view cart 1023 and can manually add or remove products from cart 1066 or increase or decrees number of quantities for particular added product in cart 1066 and can click on make payment or confirm order and make payment button 1070 and make payment of purchased products 1062.

In an embodiment in multi-user augmented reality system, multiple logged-in or authorized user can add or update one or more products to cart or order product and then payment can made by administrator user with conducting or making of payment of all users added products rights.

In an embodiment user can view particular product or one or more products 1015 from augmented reality system 1022 and can flick or shake or tilt device at particular pre-defined direction, angel for particular pre-defined number of degrees for particular pre-defined number of times to automatically zoom to view large or full size of said viewed particular product 1030 or first product 1005 from viewing products 1015 from augmented reality system 1022 based on identifying product area based on detecting lines, boarders, color, logo, brand name based on object or optical characters recognition techniques. In an embodiment after automatically zoom to full or large size of particular product 1030, user can apply one or more gestures, touches, multi-touches or senses to select, add to cart, order said product as discussed above. In an embodiment after automatically zoom to full or large size of particular product 1030 and can tap on particular control including button to take one or more associated actions or call-to-actions including add to cart 1031 said zoomed to large or full size product 1030, view product 1030 associated one or more types of information 1032 including photos, videos, stories, news feed items, call staff or salesperson 1033 of shop associated with said product 1030, make call 1034 to said product 1030 associated support person, send message 1035 to said product 1030 associated support person and view and manage cart 1036.

In an embodiment after purchase of product 1005/1030 from particular place associated with particular location or after receiving ordered product at shipping or mailing address including home or office location or other than said location or place of purchase or ordering of product, user can view said purchased product 1080 from augmented reality system 1090 and can apply one or more pre-defined gestures or touches or multi-touches or senses to take said particular pre-defined gesture or touch or multi-touch or sense associated one or more actions or call-to-actions including single tap to make further order, double tap to make request to return, swipe left on viewing product to like or swipe right on viewing product to dislike. In an embodiment based on logged past purchases and received scanned data including from augmented reality system, server module 153 identify one or more sources of purchase of scanned product 1080 including seller name, brand, shop name, location of seller or place of business for user selection and then enable user to apply one or more pre-defined gestures or touches or multi-touches or senses to take particular pre-defined gesture or touch or multi-touch or sense associated one or more actions or call-to-actions. In an embodiment user can conduct augmented reality scanning of particular purchased product 1080 from augmented reality scanning from other than location of purchase of said product 1080 and can select one or more associated actions and reactions and survey questions controls to take one or more actions, reactions and provide answers of survey question or select options by tapping or clicking on particular controls including tap on "Return" button 1081 to return said recognized and identified product 1080 to said recognized and identified product 1080 associated seller, tap on "Order More" 1082 to make order of said recognized and identified product 1080, tap on "Like" button to like said recognized and identified product 1080 and tap on "Dislike" button to dislike said recognized and identified product 1080.

Figure 11:
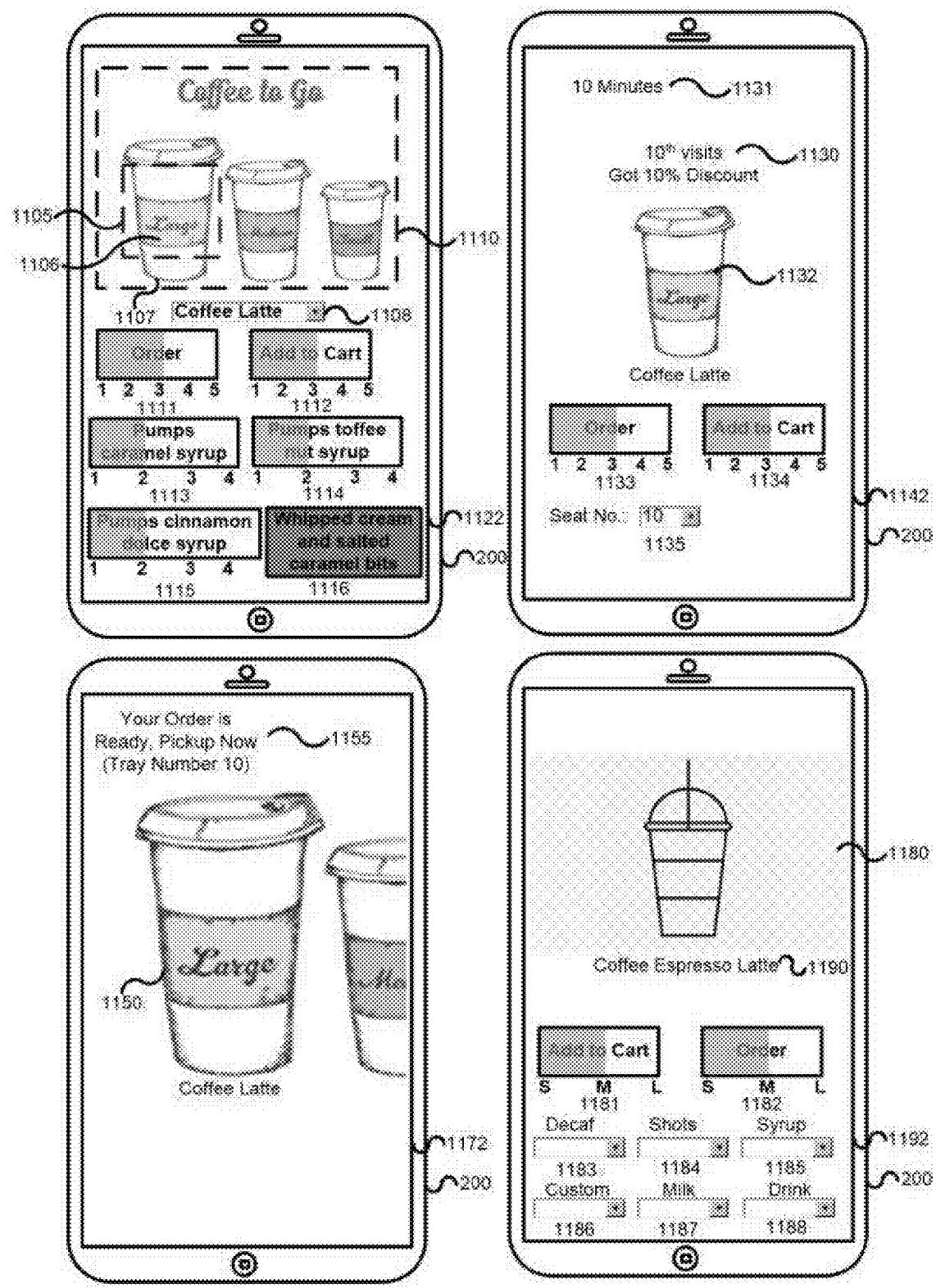

FIG. 11 illustrates examples of augmented reality system discussed in FIGS. 6-10. For example particular user visit particular cafe shop and in the event of conducting augmented reality scan or viewing food items or menu items (for example various coffee cups 1110) from physical menu or poster paste on walls or menu on table or any other type of physical presentation of menu from augmented reality system and apply particular type of gesture or touch or multi-touch or sense (for example single tap 1107) on particular type of object (for example large cup 1105) and select particular type of coffee 1108, server module 153, receives said scanned data, selections and user action data from user device 200 and recognizes and identifies location associated unique object and displays associated actions and reactions controls including order and add to cart actions or call-to-actions and associated options. For example, displays options "Pumps caramel syrup" 1113, "Pumps toffee nut syrup" 1114, "Pumps cinnamon dolce syrup" 1115 and "Whipped cream and salted caramel bits" 1116 on screen 1122. User can customize coffee by selection said one or more options 1113/1114/1115/1116 associated with large cup 1105 coffee latte 1106. User can make order of particular number of cups of coffee latte by tapping on particular region on control or tap on button 1111 and swipe from left to right to increase number or right to left to decrease selected numbers of cup of coffee. In an embodiment user can further tap on swipe right to left up-to end of region inside control 1111 to unselect or undo or cancel order. In an embodiment user can add to cart 1112 particular number of particular scanned object associated identified products including menu items or food items (for example sandwich, pizza burger, water bottle, different types of coffee, order raw coffee and like) and after finishing shopping make payment. In an embodiment user can view particular product or food item 1132 and make order or apply one or more times one or more types of gesture or touch or multi-touch including single tap on particular product 1132 to order particular number of said scanned object associated identified product or food item 1132 and automatically confirm order and make payment for said selected product and after providing order or making payment, user can provide particular seat number 1135 of user, so when order will ready server or waiter come to know where to serve said ready ordered food items or system provides approximate or estimated waiting period 1131 based on number and types of orders and each type of order associated approximate pre-set period of time of preparation and in the event of order is ready administrator or staff of coffee shop or place of business select particular order number and tray number and system generates notification and notifies user associated with said selected order number and provides said tray number 1155 so user can pickups tray associated with said tray number. In an embodiment in the event of conducting of augmented reality scanning or viewing of particular object including food item of menu item from augmented reality system, server module 153, provides user's number of visits at said scanned and identified product or food item seller associated place of business and based on rules provides customized offer for user 1130 including redeemable points, promotion code, discounts, cashbacks, samples, gifts, free or extra or additional products, coupons, vouchers and like. In an embodiment user can conduct augmented reality scanning or viewing of particular product 1132 and automatically provide order or conduct augmented reality scanning or viewing of particular product 1132 and apply one or more types of gestures or touch or multi-touch on viewing particular product or provide voice command or provide eye command to make order and after making order when order is ready and use gets ordered products, user can make payment by scanning said products via augmented reality system and automatically makes payment for said ordered or received or collected products or food items.

Likewise in another example user can view photo or image of particular food item and conduct augmented reality scanning or viewing of particular food item 1180 from augmented reality system 1192 and based on said received scanned data, sever module 153, identifies associated customization options 1183/1184/1185/1186/1187/1188 for enabling user to select and enable to order 1181 and select size by selecting or tapping on or swipe left to right on particular region of control 1181/1182 or add to cart 1181.

Figure 12:
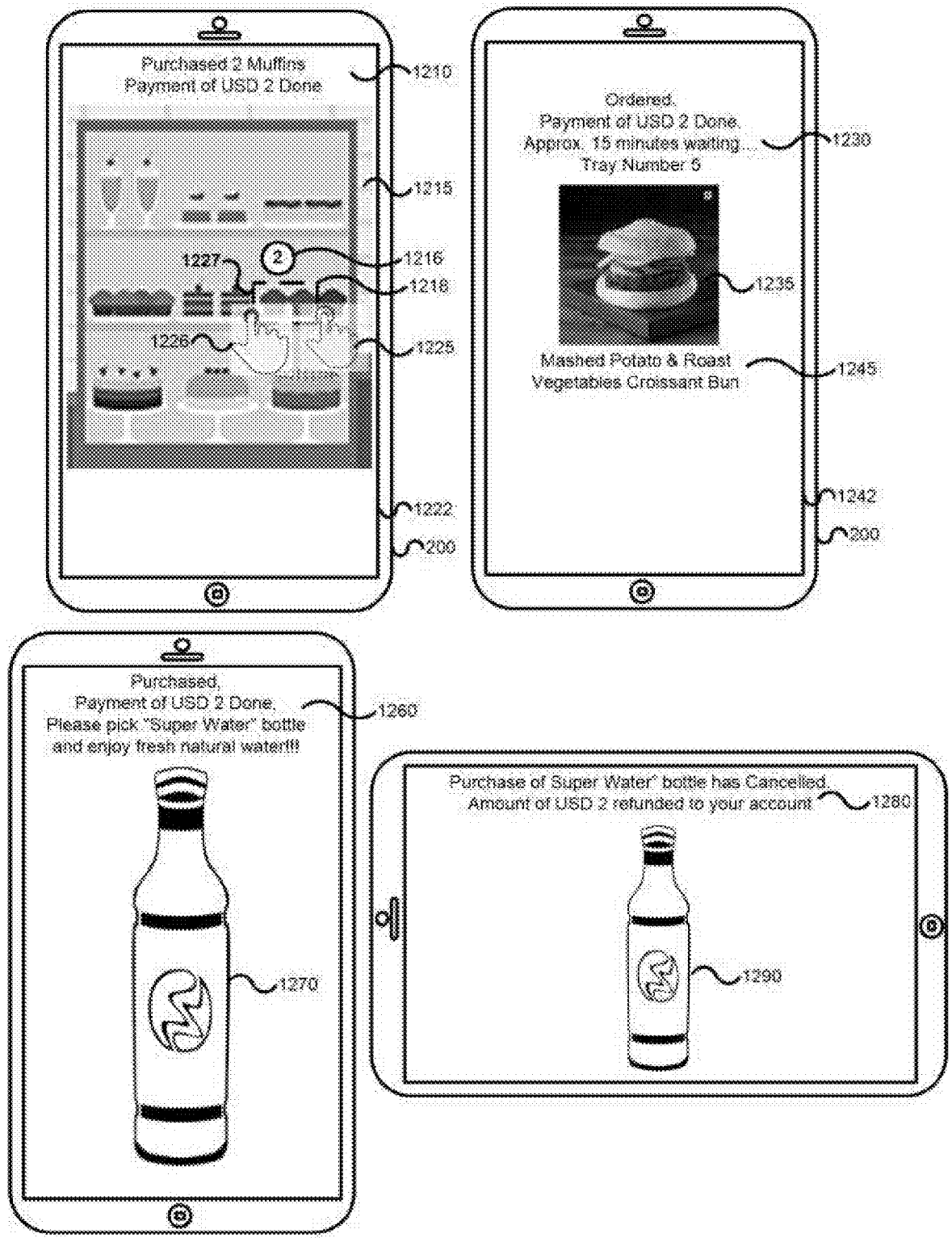
Figure 13:
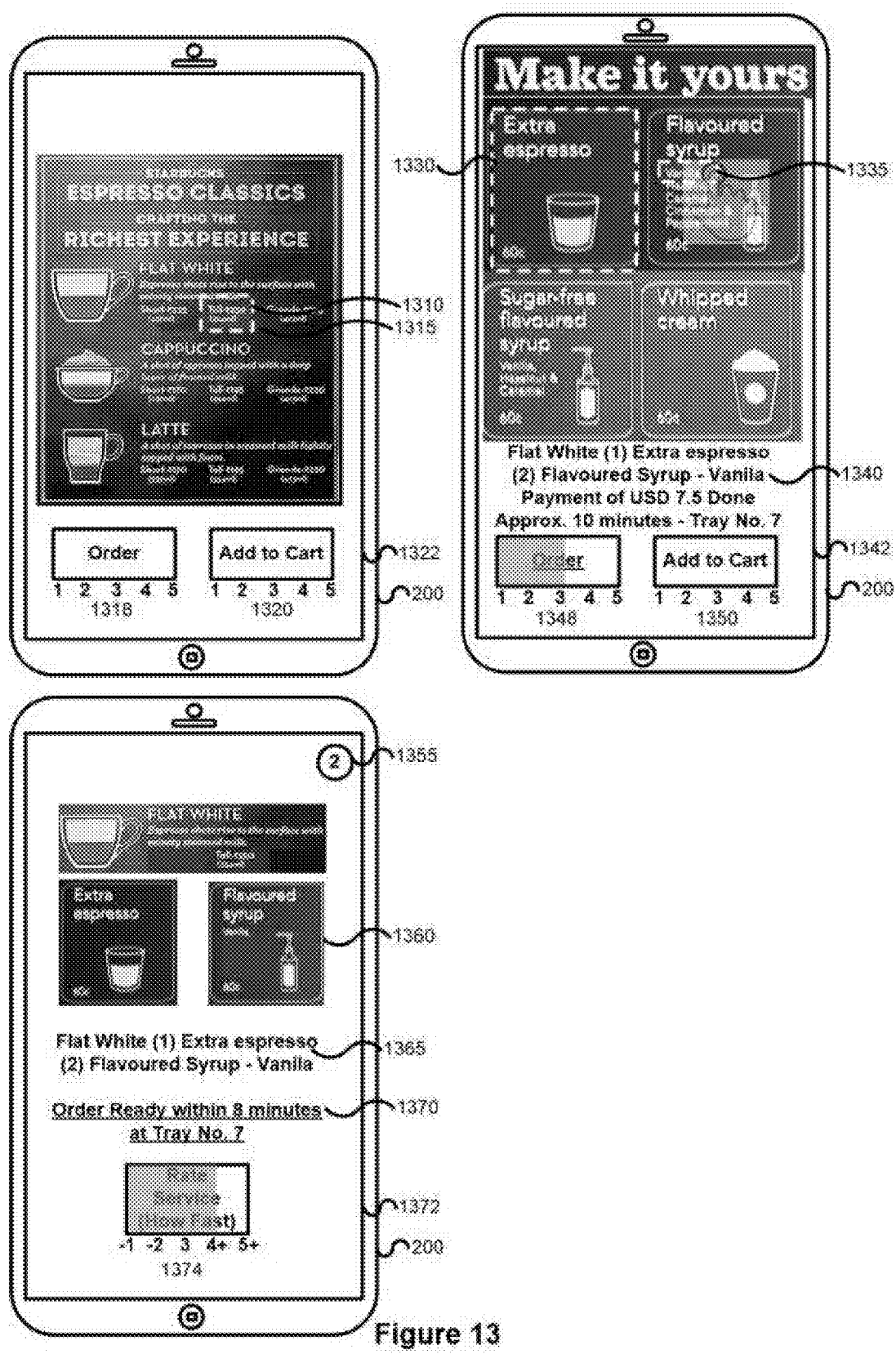
Figure 14:
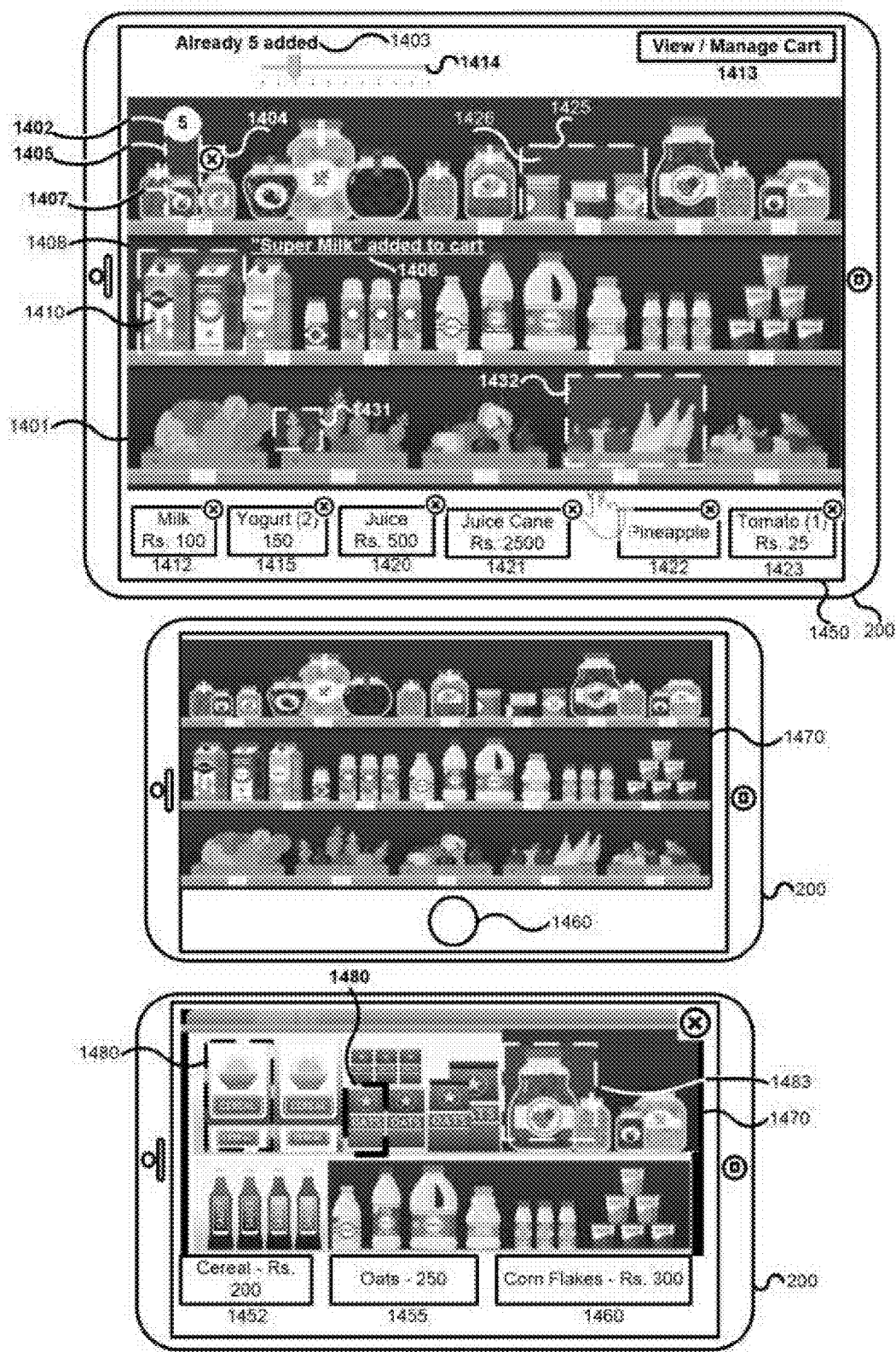
Figure 15:
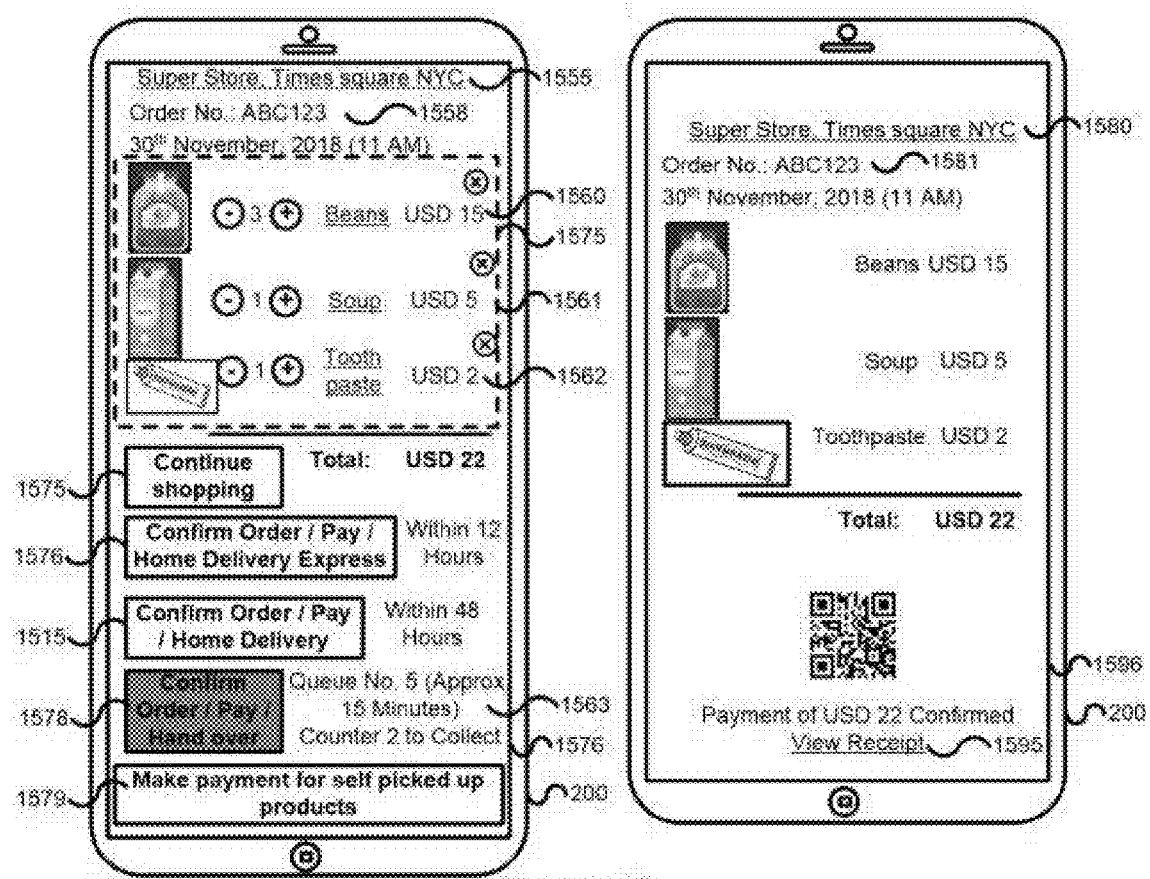

In an embodiment FIG. 12 illustrates augmented reality system, wherein user can view products in shelf 1215 from augmented reality system 1222 and can apply one or more types of gestures including long press or press for pre-set duration to select starting point and in the event of apply long press touch 1226 on screen 1215 digitally mark and display starting point marker 1227 on screen 1215 and swipe left to right without losing contact on screen 1215 and haptic contact release or release 1218 from screen 1215 to end selection 1218 and digitally mark end point and based on start and end marker mark, draw and display square surround selected products 1218 and keep mobile device 200 sufficiently stable to accurately provided starting point 1227 and end point 1218 and selected products surround marker on screen 1215 and automatically provide to server module 153 said viewed photo or image with digitally marked square area on said photo or image, user identity who has viewed said products in shelf 1215 from augmented reality system 1222, monitored and tracked location of user device at the time of viewing of said products in shelf 1215 from augmented reality system 1222, and date and time of scan and based on said received information, server module extracts marked area from said received photo or image 1215 and match said extracted part of photo or image which contains said selected area products with said received augmented reality scan associated location or place of business associated one or more object models or object images and identifies products and number of products and based on received user applied one or more types of gestures or touches or multi-touches or voice commands or eye commands associated one or more action, automatically conducts said action including automatically make order of said selected products, automatically make payment for said selected products by transferring calculated amounts of said products from said identified user associated account to said identified place of business associated merchant account and based on user preference hand over or ship said product at shipping address provided by user. In an embodiment in the event of viewing and selecting products 1218, server module 153 displaying selected one or more product names and number of said selected products and confirmation of order and making of payment of said selected or purchased or ordered products 1210.

In another example user can zoom in or zoom out and view product or food item 1235 from augmented reality system 1242 and can make order, make payment. User can view various types of messages, indications, instructions, actions, events, transactions and status including identifying object associate product or food item name and quantity, ordered, payment initiated, payment done, estimated duration to make order ready for serving to user or for pickup delivery or shipping at shipping address provided by said user, assigned tray number, assigned seat number, order ready, pick up order, ready for shipping, discount, statistics including number of times purchase of said product, amount of purchase of said product during particular period, number of times and amount of purchase of products from said place of business, customized offers for user.

In another example user can view particular product or full or major part of product or zoom and view full or major part of product or take photo or video of product from augmented reality system or image capturing and recording system and can automatically make payment of aid product and take and use the purchased product from shelf. In another example user can apply one or more types of pre-defined gestures, touches, multi-touches and senses on screen or provide pre-defined voice commands or eye commands or change orientation of mobile device 200 from landscape to portrait or from portrait to landscape to cancel order and request to refund and in the event of applying of one or more types of pre-defined gestures, touches, multi-touches and senses on screen or provide pre-defined voice commands or eye commands or change orientation of mobile device 200 from landscape to portrait or from portrait to landscape, server module 153 cancel said order and initiate and do refund of said paid amount to user's account and display message to user indicating cancelling of said order and refunding of amount 1280.

In an embodiment user can scan menu from board, paper form, wall or any other types of presentation medium and tap 1315 on particular menu item with intention to select menu item 1310 and then customized said selected food item 1310 by scanning and selecting one or more preferred options 1335/1330 of customizations from menu in paper form or on wall or board or any other types of presentation medium and tap on order button 1348 to make order and select number of quantity of said selected and customized food item. In an embodiment after making order, automatically make payment for ordered food item. In an embodiment after making order, automatically make payment for ordered food item after pre-set duration. In an embodiment after making order, automatically initiate time, start time, display countdown 1355 and in the event of expiration of timer, automatically make payment for ordered food item 1365. In an embodiment enable user to provide ratings 1374 for ordered and consumes said food items.

In another example when user enters into particular retail shop, user notifies with welcome message and details of retail shop including name and type of shop, location information and offers and in the event of tap on notification, start augmented reality system application for enabling user to view products in shelves, view associated information and customized offers for user and select one or more products by using augmented reality system application and based on one or more types of gestures or touches or multi touches or senses, add to cart, remove from cart, select numbers or quantity, bookmark, ask connected users or customers to buy or not, ask lowest price availability source, provide reactions including like, dislike, rate, and video comments, conduct one or more types of actions or call-to-actions, add to wish list, refer or share, ask past or current customers, make order, make payment for selected products. User can view products 1401 at particular shelf of retail shop by using augmented reality system application 1450 and can apply one or more types of gestures or touches or multi-touches or provide voice commends or provide eye commands or hover on particular product to select product 1450 and add to cart said each selected products. In an embodiment in the event of press for particular duration on particular product, initiate and start timer and based on expiration of pre-defined interval of period of time add one quantity of said selected product and in the event of haptic contact release from said selected or pressed product stop timer, initiate timer and stop adding quantity for said selected product. For example, in the event of pressing 1407 on product 1405 for 5 second, system selects said recognized and identified product and add to cart 5 quantity of said selected product, each addition of number of quantities take place after pre-set 1 second duration. In an embodiment user can enter name or brand of category or keywords associated with search product(s) and scan of view products of shelves of shop by using augmented reality system application and in the event of identifying of product based on object and optical character recognition, system automatically paly ringtone or notifies user for detecting said provided search query or one or more search keywords specific product. In an embodiment in the event of addition of product in cart, less said added product from inventory and in the event of removing of product from cart, add said removed product to inventory. In an embodiment real-time share information about added to cart products to one or more connected users, groups, past or current or range of date and time specific particular number of customers and real time view their votes, reactions including likes, dislikes, comments, video comments on screen. In an embodiment user can by using two fingers, pinch on particular area of screen and spread with two fingers 1426 to select one or more products 1425. In an embodiment user can free form draw 1410 on viewing products 1401 in screen 1450 to select one or more products 1410. In an embodiment in the event of again scan or view same product which previously added by user, automatically identifying said added to cart product and notifying 1403 user that user already added particular number of said product in cart, so if user wants to add additional product user can further apply one or more types of gestures or touches on said product to add or less number of product or remove product. In an embodiment in the event of again scan or view same product which previously added by user, automatically identifying said added to cart product and displaying remove icon 1404 on or surround said product 1405. In an embodiment user can swipe upward on particular product 1405 to add or swipe downward on particular product 1405 to decrease number of quantities of product added to cart. In an embodiment user can swipe upward on particular product 1405 to add or swipe downward on particular product 1405 to decrease number of quantities of product added to cart, wherein addition of or decreasing of number of quantities determined based on pre-defined length of swipe on screen. In an embodiment in the event of applying of various types of pre-defined gestures or touches or voice commands or eye commands or displaying or notifying message or various types of status, play associated ringtone, sound, music, song, and trigger particular type of vibration and enable user to select, update and set or customize one or more types of one or more ringtones, sounds, music, song, vibrations and volume of voice or sound. In an embodiment monitor, track, record and store video of said selected, added, ordered, purchased products or conducted actions, call-to-actions and provided reactions and answers of survey questions or selected options and numbers or range or ratings associated with survey with one or more types of details or data within particular session or at particular place, geofence, and place of business. In an embodiment in the event of successfully adding of user selected product to cart, server module 153 displays message indicating successfully adding of particular numbers or quantity of particular named or branded one or more products 1406. In an embodiment user can apply one or more types of pre-defined gestures, touches, voice and eye commands or particular product and provide suggestions, reviews, feedbacks, complaints, request changes or alternatives, request to decrees price, provide one or more types of actions including like, dislike, ratings, comments, video comments, provide indication of testing of sample of product and take one or more types of actions or call-to-actions including add to wish list, bookmark, make notes, ask for assistant, ask queries, send message, register, subscribe, make phone or video or VOIP call to associated person, connect or follow product or product associated brand, company, seller, and manufacturer, refer or share said product associated details including name, price, photos, videos, stories, contents, structured data, description, associated offer, associated one or more types of reaction details and statistics, seller name, map and direction and address to one or more connected users at one or more destinations. In an embodiment in the event of viewing and selecting particular product by using augmented reality system application and in the event of recognizing, identifying unique product and in the event of identifying non-availability of said selected product, notifying user or displaying message on screen indicating non-availability of said selected product and provide availability date, time and duration.

In an embodiment in multi user augmented reality system enabling administrator to add members, provide, update or set rights and privileges including select and add to cart products or particular selected types or named or brands of products from one or more selected types or named or brands of or locations or geofence or place of business, make or not allow to make payment, provide one or more types of reactions and answers of survey questions or selections of survey options and ratings and take one or more types of actions ad call-to-actions, so multiple users can select and add to cart multiple products from multiple locations or places of businesses and authorized user can remotely make payment after reviewing added products to cart.

In an embodiment on or more users select and add to cart or order one or more products from one or more locations of one or more place of businesses or named businesses or brans or sellers or shops and then finalize and update cart, apply promotion code and make payments.

In an embodiment monitoring, tracking and logging one or more types of activities, actions, reactions, interactions, status, transactions, events, communications, sharing associated with shopping via augmented reality system application.

In an embodiment user can view details of added products to cart 1412/1415/1420/1421/1422/1423 and can remove by taping on remove icon or apply one or more types of gestures, touches, senses, hover, voice or eye commands on controls 1412/1415/1420/1421/1422/1423 to remove added products to cart or add one product per applying of one or more types of gestures, touches, senses or provide voice command to particular number of particular named or branded product. In an embodiment user can use slide control 1414 or add (+) or less (−) icons to increase or add or decrees number of or quantity of selected product 1405.

In an embodiment user can select one piece of particular selected vegetable (for example one tomato 1432) by applying one or more types of pre-defined gestures, touches, senses, voice and eye commands (for example single tap on viewing of tomato from augmented reality system application).

In an embodiment instead of viewing one or more products from augmented reality system application for performing above discussed actions, user can take photo of particular shelf of shop showing or displaying one or more products 1470 by using media capture application or from camera by clicking on capture photo control or button or icon 1460 and conduct all operations (discussed above) including apply one or more types of gestures, touches, senses, voice and eye commands to select one or more products and add to cart, make payment, provide reactions, conduct one or more types of actions and call-to-actions.

In an embodiment in the event or providing pre-created list of products and then in the event of scanning shelves of products of one or more shops or place of business or retail shops, automatically identifying scanned products and automatically matching with list of products to automatically add to cart and make payment. Remaining products user can search and scan and add to cart and make payment.

In an embodiment user can tap on "View/Manage Cart" 1413 or apply one or more types of pre-defined gestures, touches, senses, voice commands and eye commands view cart including view details of added products to cart 975 including product photo or image, product name, number of quantities of product, amount or price of product and total billed amount. In an embodiment user can add or remove products, increases or decrees number of quantities of product. In an embodiment user can continue shopping by tapping on control 7765 and in the event of applying one or more types of pre-defined gestures, touches, senses, voice commands and eye commands on control 7765 or screen 7776, displaying augmented reality system application 1450 for enabling user to view, select and add to cart one or more products. In an embodiment user can confirm order or instruct server module 153 to make payment for said added products 1575 and instruct to express delivery of said purchased products to shipping address of user or instruct to normal delivery of said purchased products to shipping address of user 1567 or opt to hand over delivery or pickup said purchased products from place of business or directly from shop 1568. In an embodiment in the event of selecting hand over or pickup from shop option 1568, displaying queue number 1563 and need duration to collect user purchased products by staff of shop or counter number 1576 where user can collect said purchased products.

In an embodiment user can select "Make payment for self-picked up products" 1569 for making payments of self-picked up products. In an embodiment verify purchased products and collected products are same based on sufficiently matching weight of trolley plus weight of all purchased products (for example pre-store all products associated actual weight in kilogram) with weight of trolley plus weigh of collected products in trolley. Shop can make separate sell of very low weight products and costly products. Shop can also identify trusted customers based on past history of customer, purchase amount, profile, frequency of purchase and logged video of customers via cameras of shop.

In an embodiment user can self-remove RFID (radio frequency identification) tags associated or affixed with purchased products including cloths, furniture, electronic products, and costly products after collecting products and after making payment and after scanning products via RFID reader at exit. In an embodiment check or count self-removed number of RFID (radio frequency identification) tags with number of purchase products based on (radio frequency identification) reader.

RFID is used for item level tagging in retail stores. In addition to inventory control, this provides both protection against theft by customers (shoplifting) and employees ("shrinkage") by using electronic article surveillance (EAS), and a self-checkout process for customers. Tags of different type can be physically removed with a special tool or deactivated electronically once items have been paid for. On leaving the shop customers have to pass near an RFID detector; if they have items with active RFID tags, an alarm sounds, both indicating an unpaid-for item, and identifying what it is In an embodiment each product attached with RFID tags and after collecting products by user in trolley and after making payment and after scanning products via RFID reader at exit and after successful verification of purchased products, automatically snatched away or remove RFID tags from all purchased products in trolley by using high powered magnet.

In an embodiment monitoring, tracking, recording and storing in-store location information of purchased products by user within shop or place of business, wherein in-store location information comprises SKU (Stock Keeping Unit), UPC Code, shelf number, division number and within shelf product place number. If store contains only sample products then purchased product equivalent shelf number, shelf category and within shelf place number of each product of each user in warehouse or storage, so staff of shop can collect ordered product for customer. SKU numbers help map and organize store so shoppers and staff can easily find needed products. The first 2-3 digits/characters of each SKU number normally represent a top-level identifier. This can be a department, store category, or even a supplier. The middle section of SKU numbers to assign unique features, such as size, color, item type, or subcategory, to product and using sequential numbering (i.e.: 001, 002, 003) for the final series of a SKU number. Staff of store or order picking robot can search ordered product and pick goods according to customer orders from storage.

In an embodiment enabling user to search products within store based on name, brand, category, price, size, color, keywords and any combination thereof. In an embodiment search result comprise product details with floor ($1^{st}$, $2^{nd}$ an like), division number or type or name (man, woman, child or A or B and like), sub-category or type or section (cloth, handbag, vegetables, shop, stationary and like), shelf number (1, 2 or A, B or A1, A2 and like), within shelf product place number (1, 2 or A11, B12) like row or column number.

Figure 16:
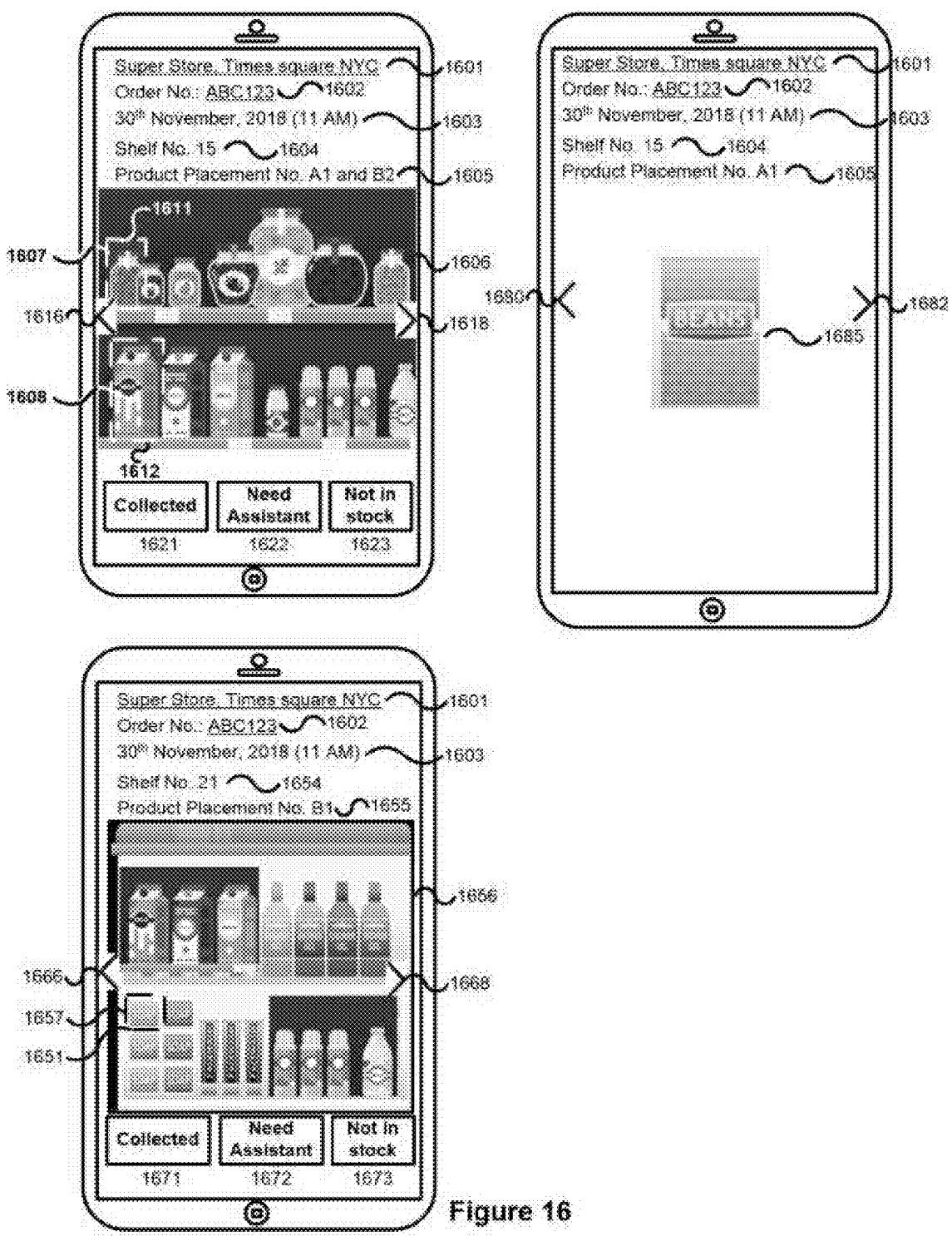
Figure 17:
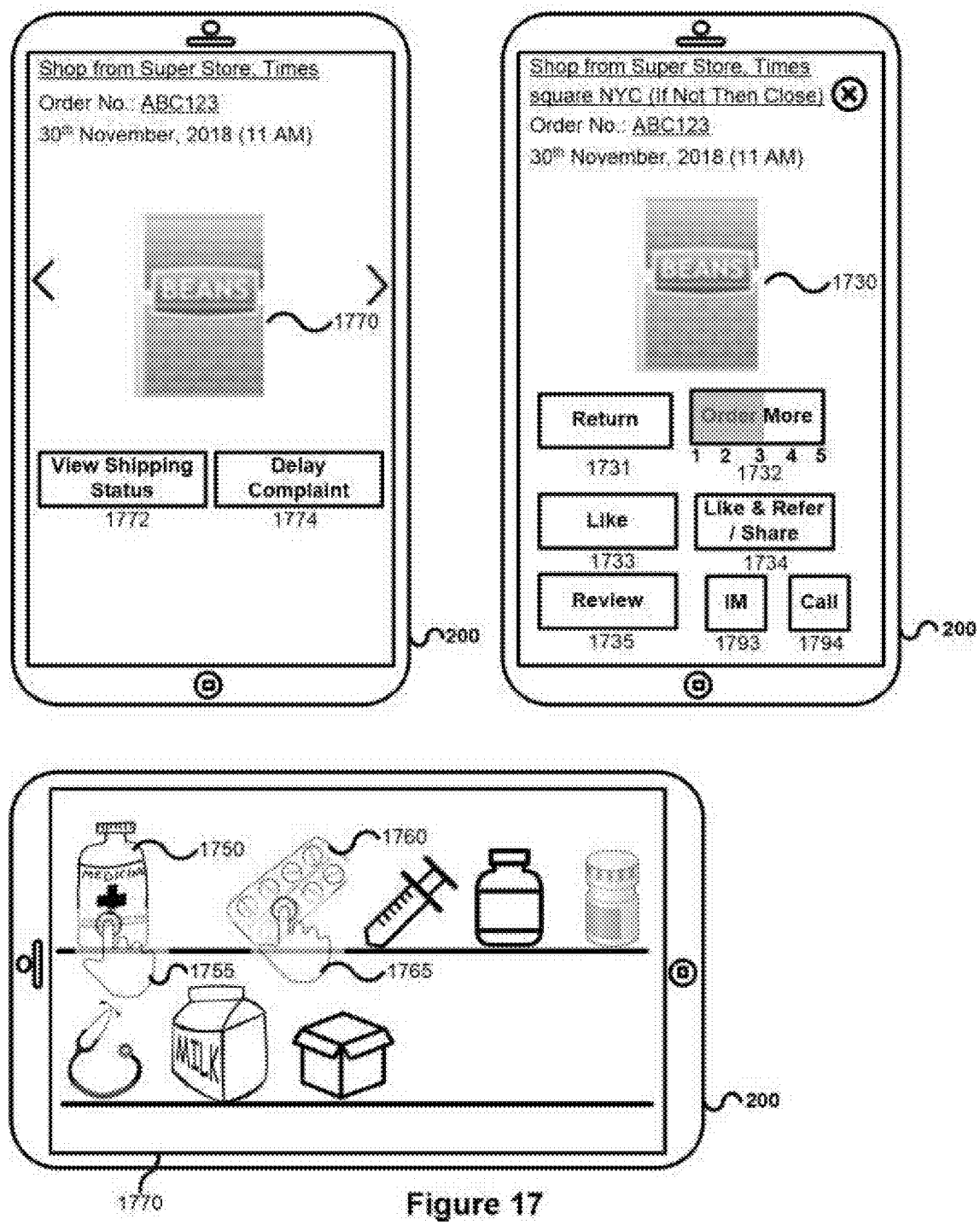

FIG. 16 illustrates Graphical User Interface (GUI) for enabling staff of particular shop to view individual ordered product details by particular user or as per order number 1602, wherein order details comprises shop name where user make order by using augmented reality system application 1601, order number 1602, name of customer or number of customers, date and time of order 1603. In an embodiment display each ordered product or first augmented reality scanned associated ordered one or more products 1606 associated automatically captured photo or image at the time of conducted augmented reality scan by using augmented reality system application or viewed products from augmented reality application by said user or customer or order number associated user at the time of selection and adding to cart one or more products with digitally marker 1607/1608 surround ordered one or more products, said image associated product details including unique identity of product, name or brand name of product, one or more photos of product, color and size of product, price of product, weight (unit of measure) of product and enabling authorized staff person to find said products based on provided in-store or in-storage products location information including SKU (Stock Keeping Unit), UPC Code, shelf number 1604, division number and within shelf product place number 1605 and collect or pick said products 1607/1608 and apply one or more types of gestures or touches or multi-touches or senses 1611/1612 on said products 1607/1608 or tap on "Collected" control or button 1621 to provided indication of collection of said products 1607/1608 to system or server module 153. Server module 153, identifies unique identity of product integrated or associated with marker 1607 associated image 1607. In an embodiment in the event of not founding order particular product staff person can tap on "Need Assistant" button 1622 to call experts person. In an embodiment staff person can tap on "Not in stock" button 1623 to provide indication that ordered product not in stock.

In an embodiment staff person can view next or second augmented reality scanned associated ordered one or more products associated automatically captured photo or image 1656 at the time of conducted augmented reality scan by using augmented reality system application or viewed products from augmented reality application by said user or customer or order number associated user at the time of selection and adding to cart one or more products with digitally marker 1657 surround ordered one or more products, said image associated product details including name or brand name of product, one or more photos of product, color and size of product, price of product, weight of product and enabling authorized staff person to find said products based on provided in-store or in-storage products location information including SKU (Stock Keeping Unit), UPC Code, shelf number 1654, division number and within shelf product place number 1655 and collect or pick said products 1657 and apply one or more types of gestures or touches or multi-touches or senses 1651 on said product 1657 or tap on "Collected" control or button 1671 to provided indication of collection of said product 1657 to system or server module 153. In an embodiment in the event of not founding order particular product staff person can tap on "Need Assistant" button 1622 to call experts person. In an embodiment staff person can tap on "Not in stock" button 1623 to provide indication that ordered product not in stock.

In an embodiment after purchasing and receiving of products, based on ordered products photos and associated details, user can view shipping status of ordered products 1772 and can submit delay complaints 1764.

In an embodiment after purchasing and receiving of products from particular place, based on logged history of purchases, user can scan one or more products and can tap on return button 1731 to request said recognized or identified scanned products associated seller and provide reason via visually show defects or provide comments or video comments, order 1732 particular number of quantities of said scanned products, provide one or more types of reactions including like 1733, dislike, ratings, comments including feedback and usage experience, video comments and reviews 1735, emoticons, refer or share 1734, make call 1793 or send or receive message 1794 with relevant person including support staff.

In an embodiment user can view or scan medicines or other products by using camera or augmented reality system or application 1770 and can apply one or more types of gestures including single tap 1755/1765 on one or more medicines 1750/1760 to make order and then make payment for ordered medicines or other products. In an embodiment user can scan doctor provided prescription to make order or linked system provides doctor provided prescription for particular user and based on said recognized prescribed medicines, enabling staff person to search, find and scan said prescribed medicines or other products by using camera or augmented reality system or application 1770 and can apply one or more types of gestures including single tap 1755/1765 on one or more medicines 1750/1760 and add to basket said scanned and selected medicines to collect order specific medicines and to provide indication or marked as collected items. In an embodiment provide details of location of prescribed or ordered medicines in shelves of medical store of enabling sue or staff person to search, find, scan and select and order prescribed medicines.

Figure 18:
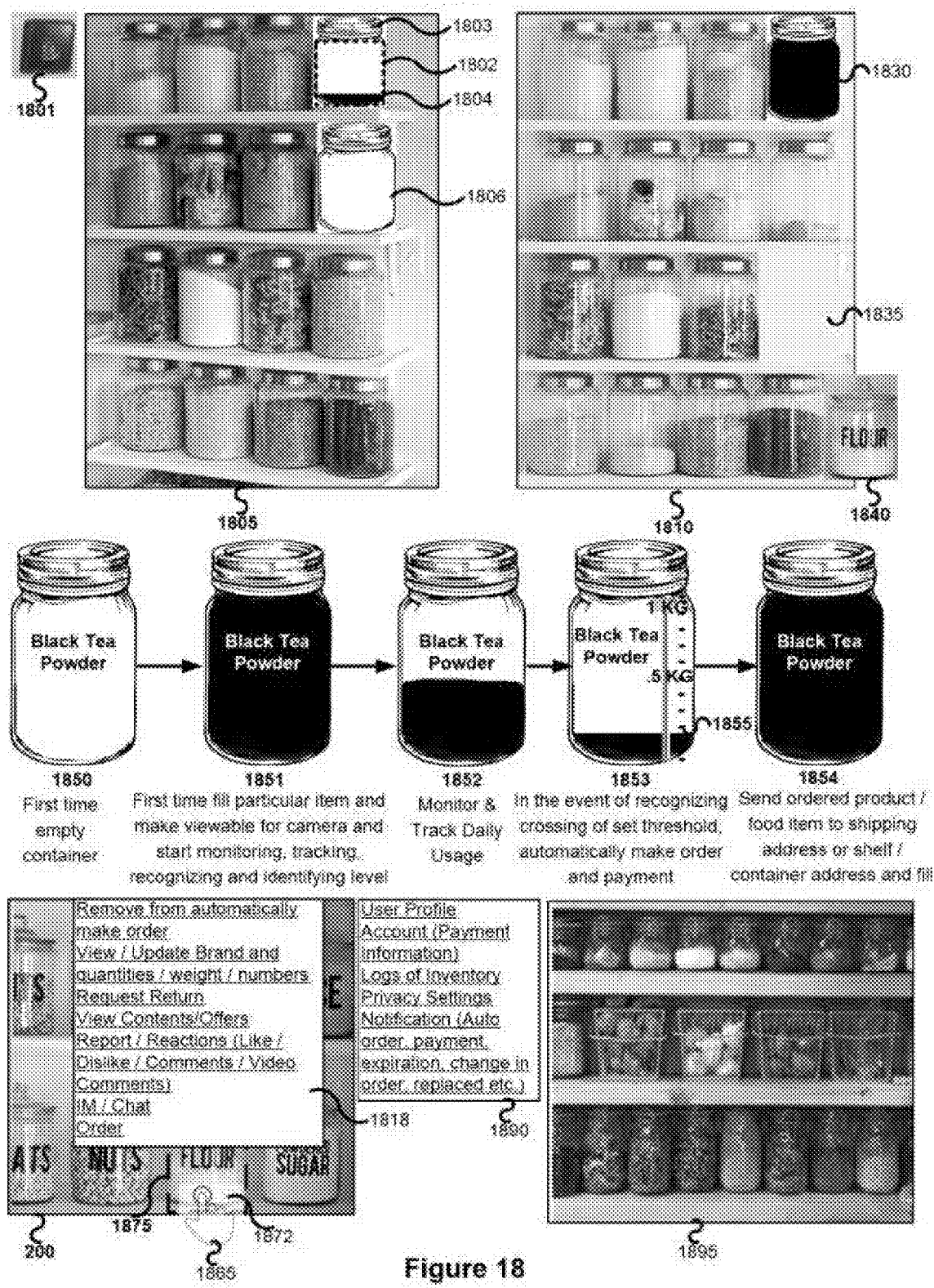
FIGS. 18-19 illustrates automatically monitoring and tracking levels and usage of inventory of filled raw material or ingredients or food item or packages in one or more storage containers or bins and in the event of detecting crossing of set threshold of pre-set level or numbers for one or more storage containers or bins, automatically place order for said products or raw material or ingredients or food item or packages. Providing graphical user interface (GUI) for enabling user to said storage containers or bins from camera and view usage and current level, automatically ordered products for one or more storage containers or bins, update and select particular branded products or raw material or ingredients or food item or packages for particular storage container or bin, and manage automatically monitored, tracked and ordered inventory.

FIG. 18 illustrates in an embodiment taking or capturing image or recording of video of shelf 1805 or one or more storage containers or bins from camera or smart camera or wi-fi camera 1801, wherein storage containers or bins comprises food storage container, glass jar or beans or open storage containers or bins which are sufficiently visible after keeping or filling various types of items, and products including food items, food packets like raw materials, raw foods, food packets, grains, beans, vegetables, dry fruits, and one or more type of raw ingredients. In an embodiment first time when all or one or more storage containers or bins are empty, then after filling of items or food items in one or more storage containers or bins 1805 or put already filled storage containers or bins in shelf and start camera 1801 and start taking or capturing image or recording of video of shelf 1805 or one or more storage containers or bins from camera or smart camera or wi-fi camera 1801, server module 153 receives said captured photo or recorded video from said camera 1801 and recognizes currently filled item or food item type, name, brand, level or numbers or quantities inside said recognized one or more storage containers or bins based on object or food or item recognition, and optical character recognition techniques, wherein server module 153 identifies or recognizes name, type, brand of item or food item based on label including food item or product name or number pasted on said one or more storage containers or bins or place of storage container in shelf, recognized name and type of food based on unique user associated uniquely identified shelf associated one or more object models or object images and associated updated name, type, brand, server module 153 identifies level based on identifying storage container based on edges and boarders of storage container and identifying fillable height, and width area 1802 in storage container 1803 and identify filled area in storage container 1803 and based on identified fillable height, and width area 1802 in storage container 1803 or identify empty space in storage container 1803 and currently filled area in storage container 1803, identifies approximate percentage or level of filled food item (for example if fillable height, and width area 1802 or empty space in storage container 1803 image is 4 times image of filled area 1805 then level is 20%). In an embodiment in the event of cross set threshold of food item (for example 20% or less) then automatically make order for said storage container associated identified or recognized name, type, and brand specific pre-set or identified empty or recognized numbers or quantity of item or product or food item to server module 153 and automatically make associated payment. Server module 153 receives said order and ship said branded, named product or food item on said shelf associated user account associated shipping address and fill said identified empty part equivalent quantities or weight or number specific food item or raw material or product in said storage container 1830 with said shipped product or food item. In an embodiment identifying level of storage container food based on graduation markings and measurement marked 1855 on container. In an embodiment identifying number of packets in container based on recognizing objects and counting number of objects in received one or more photos or images of video from camera 1801 based on object recognition, optical character recognition (OCR) techniques.

In an embodiment automatically start or restart or turn on and automatically end or pause or stop or turn off camera 1801 as per pre-set schedules and pre-set number of times and for pre-set duration set or updated by user or authorized person of application user of network. For example, automatically start camera only once at night for 5 seconds (pre-set duration set by user) for taking photos or recording video and send to server module 153 for recognizing storage containers or bins food item levels and automatically placing order of identified products which cross set threshold limit or level and after expiration of said 5 second automatically stop camera or turn off camera.

In an embodiment user can re-order storage containers or bins 1810 viewable in camera 1801, remove one or more storage containers or bins 35 from shelf 1810 from viewing of camera 1801, add one or more new storage containers or bins or glass beans or jar 1840 in shelf 1810 viewable from camera 1801.

In an embodiment user can select brand name with product or item or food item name, and instruct to provide selected particular numbers or quantitates or weight of selected name specific product or item or food item at the time of atomically making of order by system.

In an embodiment first time recognizing, by server module 153, storage container which cross set threshold and then in second time recognizing, by server module 153, empty storage container or much below threshold level then automatically notifying provider of said identified storage container associated particular named and branded food item to provide express shipping of said food item.

In an embodiment enabling user to select or upload one or more object models or object images of required one or more food items and associate said product or food item or item name, type, brand name, availability source name or shop name, specific location or place, required numbers, quantities and weight including weight in kilograms or liter or ounce, storage container name or number (optional).

In an embodiment enabling user to register with application 278 and providing one or more shelves location including selected place or location on map, address, geo-coordinates or geofence information, providing profile information, payment information, shipping and billing address.

In an embodiment enabling user to view camera 1801 capture updated or current photo or recorded video from smart device or smart phone or user device 200 (can view current level and filled products in various storage containers or bins) and enabling to apply one or more types of pre-defined gestures including single tap or click 1865 on particular selected storage container 1875 and in the event of applying one or more types of pre-defined gestures including single tap or click 1865 on particular selected storage container 1875, displaying associated menu or options including remove or stop or cancel or pause or restart automatically making order of said tapped or clicked or selected storage container 1875 associated product 1872, view and update or select and associate brand name and quantities or weight or numbers for said tapped or clicked or selected storage container 1875 associated product 1872, request to return said tapped or clicked or selected storage container 1875 associated product 1872 to provider of said tapped or clicked or selected storage container 1875 associated product 1872, view one or more types of data, contents like recipe, reactions and statistics of other users of network, recipe, health effects, alternative or suggested brands and associated price, offers and details, photos, videos, offers or custom offers including discount, report as bad quality, provide one or more types of reactions including like, dislike, comments, ratings, emoticons, and video comments to said tapped or clicked or selected storage container 1875 associated product 1872, send or receive message or make call to provider or users or connected users or customers or prospective customers of said tapped or clicked or selected storage container 1875 associated product 1872. In an embodiment enabling user to manually place order by tapping or clicking or selected storage container 1875 associated product 1872 and provide order details including name, brand, quantity and like.

In an embodiment in the event of recognizing more than one similar item or product or food item in storage containers or bins then notifying user with photo or video to paste label on said storage container to uniquely identify or recognizes said product or food item storage container.

In an embodiment enabling user to schedule shipping of automatically ordered products.

In an embodiment enabling user to stop or pause camera for disallowing automatically monitor, track and place order and automatically start or restart camera as per scheduled date and time.

In an embodiment enabling user to view logs including automatically ordered product name, brand, quantity, price, order date and time, associated payment details, availed offers, bill or invoice, receipt, expiration date and time.

In an embodiment automatically send notification or push notification to user in the event of automatically making of order of particular named, branded particular quantity of product or food item or item, making of payment, expiration date and time of product or food item, replacement of product for requested returned product or food item, suggest new products or food items.

In an embodiment storage container comprises various size and shapes for keeping various types of products or food items including milk, oil, vegetables like potatoes, tomatoes, and onions, beans, dry-fruits like apricot, almond, fruits like apple, pineapple, and strawberry, grains like rice and wheat, snacks like wafer, breads, tea, coffee, sugar, butter, spices, ready food products like Kellogg's oats and like.

In an embodiment in the event of expiration of product in storage container based on associated expire date and time, notifying user and based on settings automatically make order and replace and fill said expired product or food item.

In an embodiment in the event of non-founding of particle named or branded closed storage container or packaged items or products by camera 1801, automatically place order for said product.

In an embodiment enabling user to access historical inventory usage data for better prediction and planning.

In an embodiment monitors all the storage containers or bins and records daily consumption and replenishment statistics based on daily recognizing or identifying or measuring of level of each container of particular product based on object recognition techniques as discussed above. In an embodiment providing a graphical user interface (GUI) to see the current state of inventory and also offers analytics to view inventory history for the last seven days.

In an embodiment by using the mobile application 278 for tracking inventory, user can perform some container specific settings and register them with the server, wherein setting comprises a user-defined identifier for the container for easy identification like pasting or associating label including product name, brand or number, a threshold value (for example in kilograms) to indicate a critical level for container weight, expiry date and time. The server can track the expiration date and send a notification to the application when those contents have expired.

In an embodiment after refilling container notifying user and enable user to view refilled containers in mobile application 278 based on taking photo or video after refilled from camera 1801.

In an embodiment partial automated replenishment service, products can automatically be added to an online shopping basket, allowing the user to instruct server module 153 to buy by tapping or clicking on buy or checkout or order button or configure order including provide schedule delivery date and time, brand name and quantity for what they need when they need it.

So present invention dynamically track inventory or assets on the cloud with no manual intervention using object of food recognition and optical characters recognition (OCR) RIFD technology, track the amount of inventory that the restaurant or kitchen must maintain, raise flags or automatically or semi automatically place orders at critical levels, eliminate daily inventory counts, track and reduce loss, minimize human intervention and errors, access reportage on daily and hourly business fluctuations In an embodiment recording of video and identifying level of usage of raw food items from one or more storage container by particular person.

Figure 19:
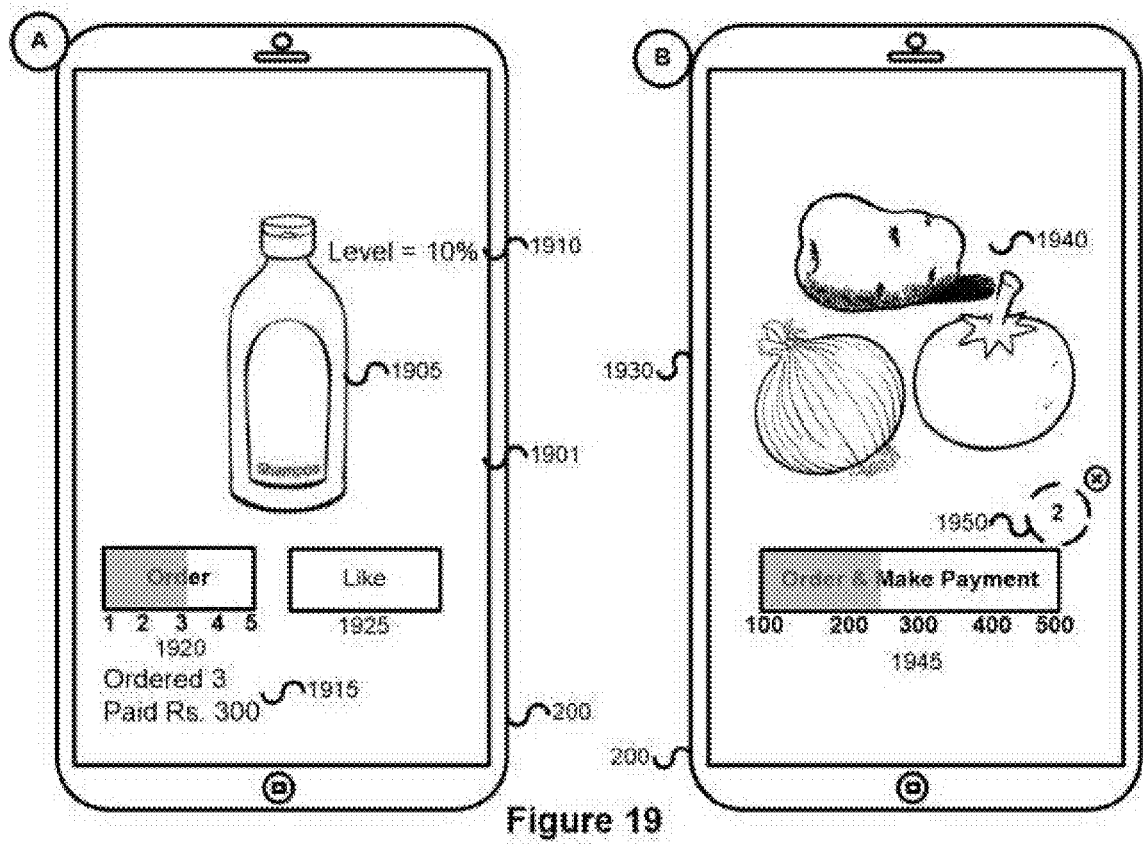
Figure 20:
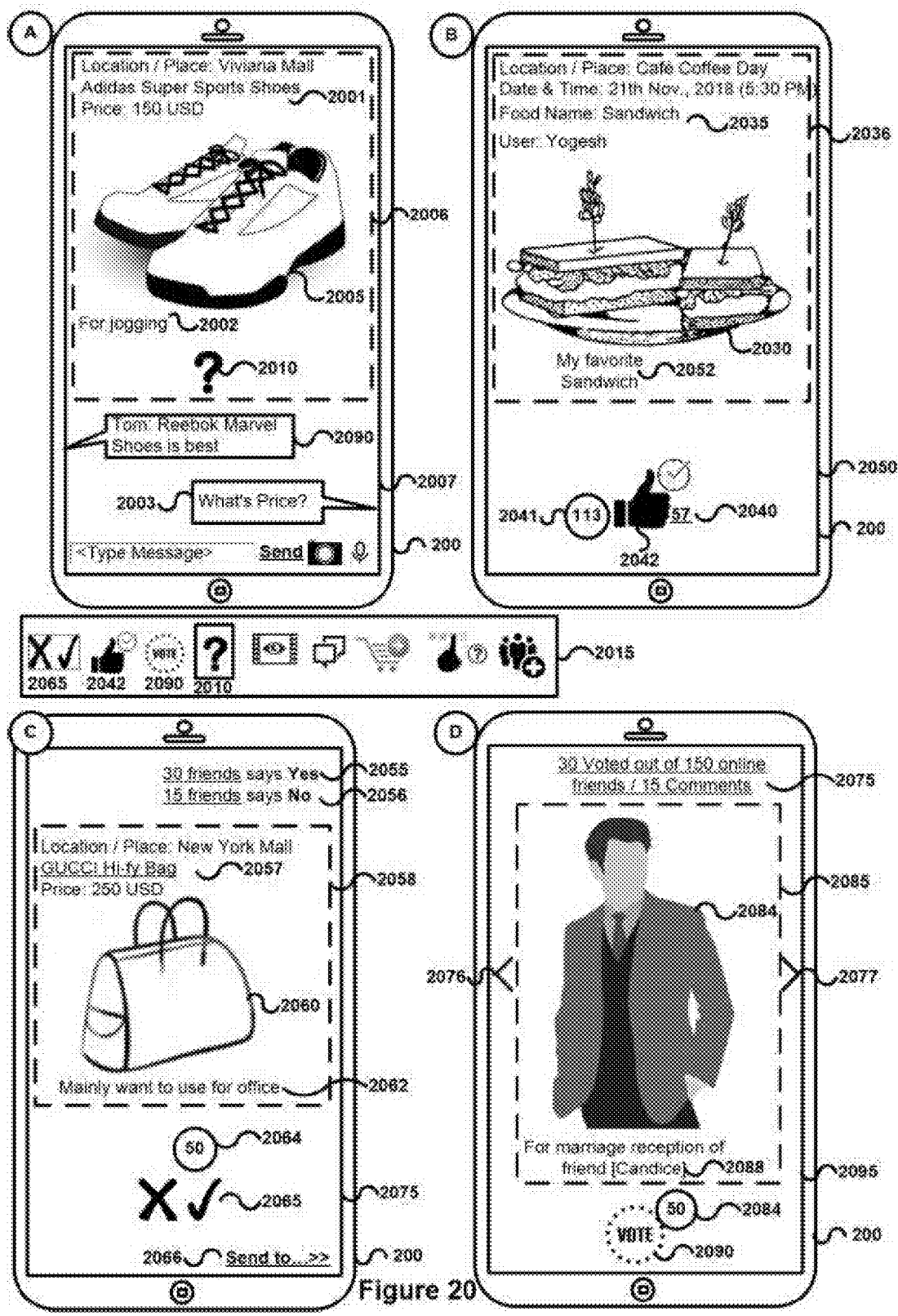
FIGS. 20-25 illustrates preparing one or more types of contents, media, post and message and select and attach or integrate or merge or embedded one or more controls from list of controls.
Figure 21:
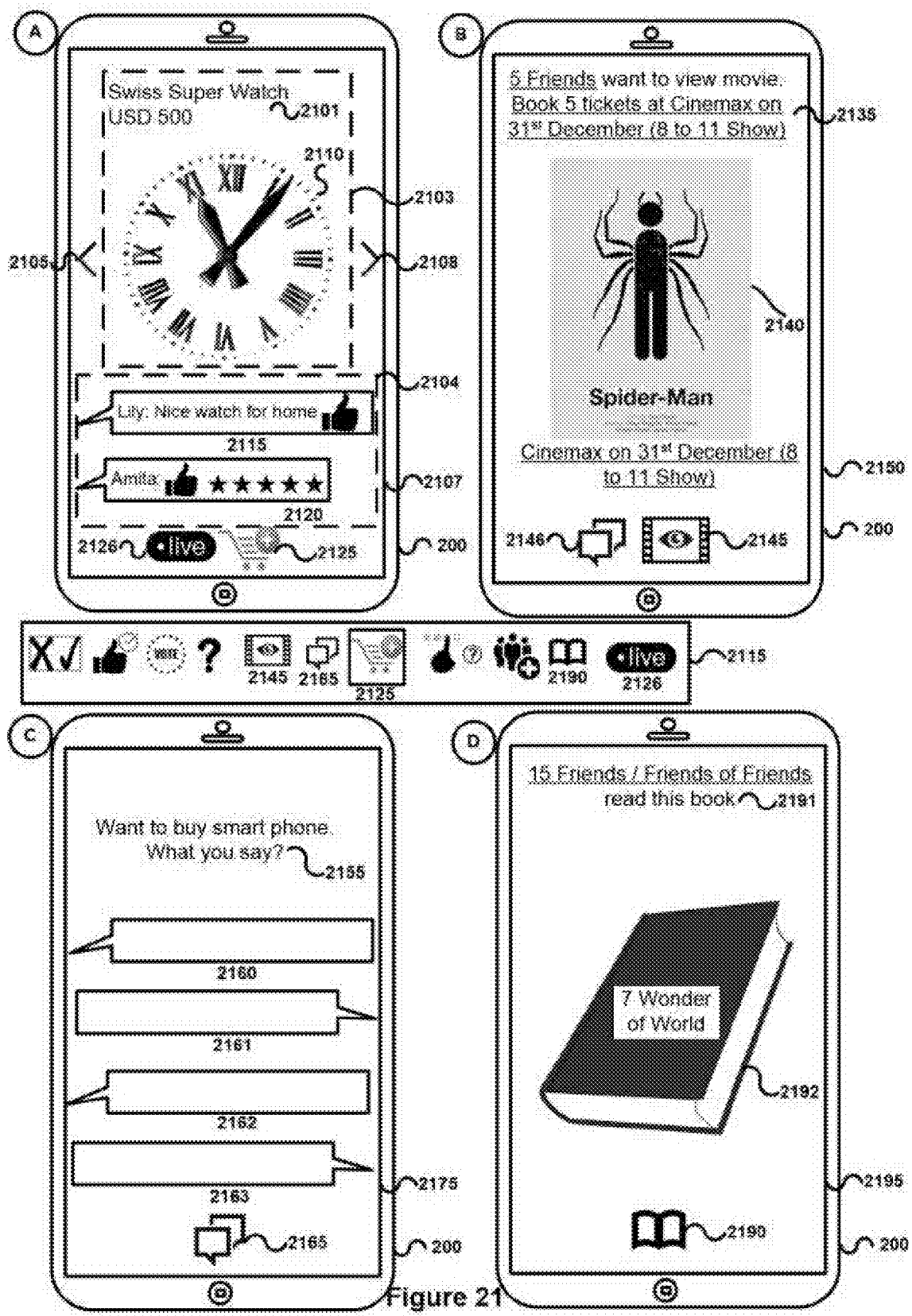

FIG. 19(A) illustrates Graphical User Interface (GUI) for enabling user to scan particular product 1905 and make particular number of orders of product 1905 by clicking or tapping on order button and selecting number. In an embodiment displaying amount, provider name, estimated delivery data and time and current level 1910/1915. In an embodiment enable to provide reaction 1925.

FIG. 19(B) illustrates Graphical User Interface (GUI), wherein in the event of scanning one or more food items including particular type of vegetables from augmented reality system or application, automatically start timer and in the event of expiration of said pre-set duration timer, automatically place order of said recognized and identified food items based on pre-set brand and provided quantities or weights and automatically make payment for said ordered food items.

FIGS. 20 to 25 illustrates various types of exemplary graphical user interface(s) 281 wherein in an embodiment enabling user to select, customize and associate or attach or integrate one or more types of actions and reactions controls with one or more types of contents, message, data, post, feed item, photo, video, text, location information, web address or link and any combination thereof. In an embodiment after associating or attaching or integrating one or more types of actions and reactions controls with one or more types of contents, message, data, post, feed item, photo, video, text, location information, web address or link and any combination thereof, user can send or share or broadcast one or more types of contents and message to selected one or more types of contacts or connections, groups, contacts of contact, all or selected users of network, location or place or geofence specific users, types or categories or sub-categories of users of network, filters users of network based selecting, updating and applying on one or more filters, query or natural query or structured query language (SQL) specific users of network, followers, and one or more types of destinations. In an embodiment server receives, stores, processes, notifies and displays said received content with associated or attached or integrated one or more types of actions and reactions controls. In an embodiment enable receiving user to access said one or more types of actions and reactions controls associated with said received one or more types of contents and message. In an embodiment monitor, track, log and store one or more types of data, metadata and content associated with said accessed one or more types of actions and reactions controls including provided reactions, participations, conducted actions and call to actions, sharing, communications including sent or received messages, triggering of events, conducting of transactions, collaborations, activities, providing or identifying or determining of status, interactions with entities, connections, tasks, workflow, behavior, applying of gestures and senses.

In an embodiment enabling searching user to search posted public contents of users of network and access search content or content item associated or attached or integrated one or more types of actions and reactions controls.

In an embodiment enabling users of network to follow other users of network to receive one or more types of posted content of content item with one or more types of actions and reaction controls by visiting or searching profile or contents of users of network including viewing preferences, interests, used or using or like to use types of products and services, interacted one or more types of entities, locations and places, past public posted contents with action and reaction control(s). In an embodiment enabling users of network to post one or more types of contents, messages, posts with one or more types of actions and reaction controls to followers of user for enabling followers of user to receive, view posted one or more types of contents, messages, posts and associated or attached o integrated one or more types of actions and reaction controls.

In an embodiment enabling user to customize one or more actions, call-to-actions and reactions controls, wherein customization includes select control icon, image, font, color, select and associate one or more functions, provide values of parameters of functions, apply presentation settings, privacy settings and preferences, customize interface.

For example user [Y] visits particular shop and take or select photo or video of product [Super Sports Shoes] 2005 or conduct augmented reality scanning of product [Super Sports Shoes] 2005, provide product name, price and details 2001, provide notes or requirement analysis 2002 or server module 156 automatically identifies product location or place information based on monitored and tracked user device's current location, and automatically identifies product name, photos or videos, color, price and details 2001 based on recognizing received photos or images of video and identifying associated data. User [Y] selects and customize particular control 2010 (for example question control) from list of controls 2015 and associate or attach or integrate control 2010 with content 2006. After preparing content and associating or attaching or integrating control 2010, user can selects one or more contacts, groups including friends, best friends, school or college friends, classmates, club members, relatives, neighbors, society members, co-workers and family, contacts of selected group, followers, particular number of past customers, particular number of current customers within particular data range, currently located visitors inside shop, type of product (for example running sports shoes) 2005 related users and current or past customers, users who liked or disliked said product 2005, users who conducted one or more types of call-to-action associated with said product 2005. For example, user [Y] selects best friends' group and friends of best friends' group and send said prepared content or post or customized post or actionable post 2006 to said selected best friends' group and friends of best friends' group. Server module 156 receives, stores, processes and sends or displays said content or post or customized post or actionable post 2006 to said selected best friends' group and friends of best friends' group, enabling them to exchanges messages including questions, answers and shared contents 2090/2093. In an embodiment user can change or update control vote 2011 and associate or update with content 2006 and in the event of updating or changing of control to vote control 2011, automatically update or change control of published or displayed content from all users' interfaces to vote control 2011 and now enabling them to provide vote on said displayed content 2006.

In an embodiment FIG. 20(B) illustrates real-time providing one or more types of actions and reactions within pre-set duration by using respective or corresponding action and reaction control. In an embodiment enabling user to select or prepare one or more types of contents or messages or post and select, associate or attach or integrate one or more types of actions, call-to-actions, reactions and survey questions and options controls and select, update, set and apply or associate duration with said selected one or more actions, reactions and survey questions and options controls for enabling receiving or viewing user to provide one or more types of reactions or select survey question to provide answer and select option from set of options or conduct one or more actions or call-to-actions within said pre-set duration. For example in the event of taking of one or more photos or videos 2030 of particular object including product or person or food item 2030 or viewing of particular object including product or person or food item 2030 from augmented reality system 2050 or conducting augmented reality scanning by using augmented reality system 2050, receiving by the sever module 156, identity of user who has conducted augmented reality scanning or taking of media 2030, monitored and tracked location of user device 200 and date and time from user device 200 at the time of conducting augmented reality scanning or taking of media 2030, user provided or automatically captured or recorded photos or images of videos 2030 and identifying one or more objects inside said received photos or images of videos 2030 and identifying said identified objects associated details or data and displaying said details 2035 on user interface 2034 of user device 200. User can provide or draft one or more types of contents 2052. After preparing message or post or content, user can send or publish or share said message or post or content 2036 to one or more selected contacts or connections, groups, followers, all or location or place specific or categories or query or natural query or structured query language (SQL) specific users of network. Server module 156 displays said post or message or content to each said target recipients or user selected users of network with associated or attached or integrated one or more types of actions, call-to-actions and reaction controls (for example real-time Like control) 2042 for enabling user to apply one or more types of gestures including single tap on said real-time Like control 2042 and initiate timer, start timer, and display timer countdown 2041 and in the event of expiration of said timer based on said started timer associated pre-set duration set by sender or publisher of said message 2040, remove or disable or hide message or content 2036 associated reaction control (for example real-time Like control) 2042. Each receiving or viewing user of message 2036 can view number of reactions (for example number of likes) 2040 provided by received users of message 2036.

FIG. 20(C) illustrates in another embodiment user can prepare content or post or message or news feed item 2058, wherein content or post or message or news feed item comprises location or place information, one or more photos, videos, text, web address or links, emoticons, profile or objects links, product information and select (for example Yes/No reaction or action control 2065) from list of actions, call-to-actions, reactions and survey controls 2015 and associate or attach or integrate or link with said drafted or prepared content or post or message or news feed item 2058 and set timer 2064 for allowing selected target recipients to access said content associated action or reaction controls for said pre-set duration only and send to selected one or more contacts or users of network or one or more types of destinations 2066. Server module 156 receives said content or post or message or news feed item 2058 and associated or linked or attached or integrated one or more actions, call-to-actions, reactions and survey controls 2065 and send or display to each recipient selected by sender. Receiving user can view said received or presented one or more types of content or post or message or news feed item 2058 and associated or linked or attached or integrated one or more actions, call-to-actions, reactions and survey controls 2065. In the event of applying one or more types of gesture including single tap on Yes or single tap on No control or voice command (for example "Yes" or "No") on said displayed control 2065, server module 156 receives said indication from user and stores and associate with unique sender identity, unique indication provider identity and unique content identity to database and update number of yes 2055 or number of no 2056 indication to all recipients or viewers of said content 2058. In an embodiment after receiving content 2058, receiving user can access said content 2058 associated, reaction control 2065 only for sender associated pre-set duration and in the event of expiration of said pre-set duration timer, disabling or disallowing access of said control 2065.

FIG. 20(D) illustrates in an embodiment user can take one or more photos or videos 2084, add or write notes 2088 and selects vote control 2090 from list of user call-to-actions, actions, reactions and survey controls 2015 and send to selected contacts of user (for example friends and family of user). Server module 156 receives said content 2085 and associated or embedded or integrated vote control 2090 and target recipients selected by sender or publisher. Server module 156 sends or displays said received content 2085 and associated or embedded or integrated vote control 2090 to each target recipients selected by sender or publisher. Receiving user can view received one or more contents or posts or messages or notification (for example message or post 2085) and each content or post or message or notification associated one or more user call-to-actions, actions, reactions and survey controls (for example vote control 2090) and in the event of apply gesture including single tap on said message or post 2085 associated control including vote control 2090 receiving by the server vote 2090 on uniquely identified content or post or message 2085 from said uniquely identified user and stores to database and updates number of votes 2075.

FIG. 21(A) illustrates exemplary graphical user interface (GUI), wherein after adding or updating one or more products to cart or providing details and taking photo or video or screenshots of ordered or liked or wish to buy (online or offline) or added products to cart or ordering one or more food items or adding or updating or preparing requirement specification list or adding or updating or preparing liked products and services list or adding or updating or preparing list of products or services required in particular event or travel, user can select, customize, and associate or integrate or attach or link or embed one or more actions, call-to-actions, reactions and survey controls (for example added to cart control 2125 for enable receiving user of post or message 2103 to provide comments, ratings, real-time like or dislike or provide emoticons before checkout or purchase or within pre-set duration of receiving or viewing of post or message 2103, buy or not buy decision, provide vote, ask sending user of post or message 2103 to buy for viewing or receiving user of post or message 2103 and live action or call-to-action required control 2126 which show to user up-to checkout and after checkout live control or icon disappears from all user who have received post or message 2103) from list of actions, call-to-actions, reactions and survey controls 2015 with one or more products added to cart (for example wall watch 2110) and send said added product details 2103 including one or more photos 2110, videos, product name, price, discount, associated offer, and description 2101 to one or more selected contacts or groups. Server module 156 receives details 2103 of said added or updated to cat one or more products by said user and associated or integrated or linked or embed "added to cart" control 2125 and live control or icon 2126 with associate interface 2104 for enabling viewing user to provide comments, ratings, real-time like or dislike or provide emoticons before checkout or purchase or within pre-set duration of receiving or viewing of post or message 2103, provide buy or not buy decision, provide vote, provide or share suggestions, advantages, disadvantages, experience with similar product, feedbacks, alternatives, low price source, and help in finding right products, ask sending user of post or message 2103 to buy for viewing or receiving user of post or message 2103, wherein live action or call-to-action required control 2126 which show to user up-to checkout and after checkout live control or icon disappears and disabling "added to cart" control 2125 from all user who have received post or message 2103 for providing indication or status that shopping is finished.

FIG. 21(B) illustrates another example wherein user or group admin or authorized user can prepare movie details 2140 and select, associate or integrate or link plan or task or work flow control 2145, provide one or more venue details and prospective date and times of viewing particular movie and send to one or more contacts or groups. Server module 156 receives and displays said movie viewing plan details to each target recipients selected by sender. Receiving user can confirm viewing of movie, select venue, date and time, provide message or notes. Server module receives indications from said one or more recipients, wherein indications comprises confirmation, selected venue, date and times and provided notes and share or update with all users who received movie details 2140. After receiving confirmation from number of contacts and final selection of venue and data and time by all contacts who have received said movie detail 2140, admin can book tickets for number of confirmed users and share payment amount details and enable participant users to make contribution of payment of movie tickets.

FIG. 21(C) illustrates another example wherein user can provide purchase requirement details 2155 and publish among friends and friends of friends or selected one or more contacts or groups, past or current users or customers, experts, sellers or other relevant users of network for receiving their feedbacks, alternatives, comments reviews, sources, discount offer details, group buying interest, similar products for enabling user to search source of purchase, name and type of product, map and direction of availability.

FIG. 21(D) illustrates another example wherein user can provide book details including photo, title, author name, year of publication, abstract and like 2192 and associate book control with message or post 2192 an send to one or more contacts or contacts of contacts or past readers or buyers and receive their view points about buying of book, indication of who read this book and ask him about book, borrow book, collectively buy book and like.

Figure 22:
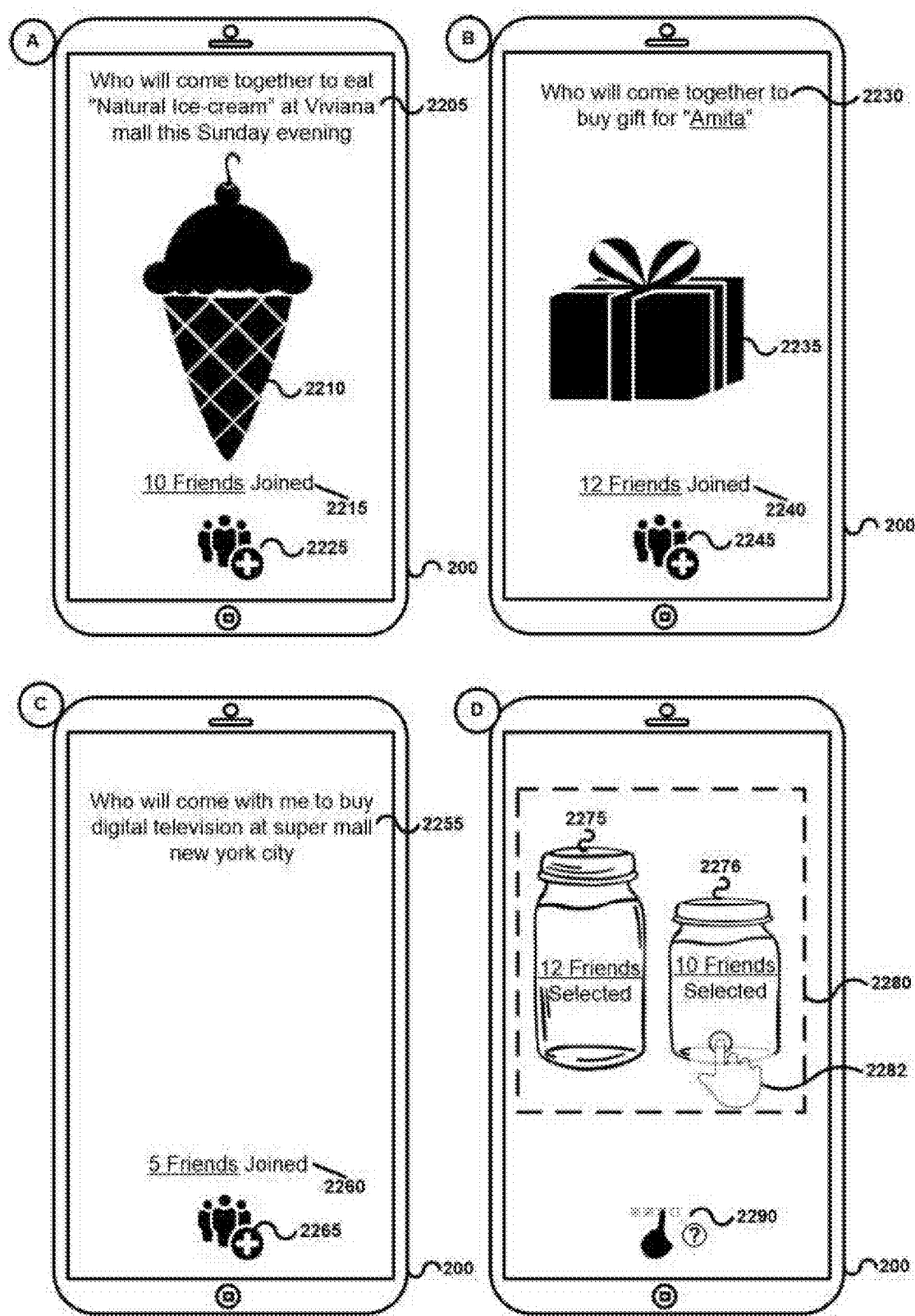
Figure 23:
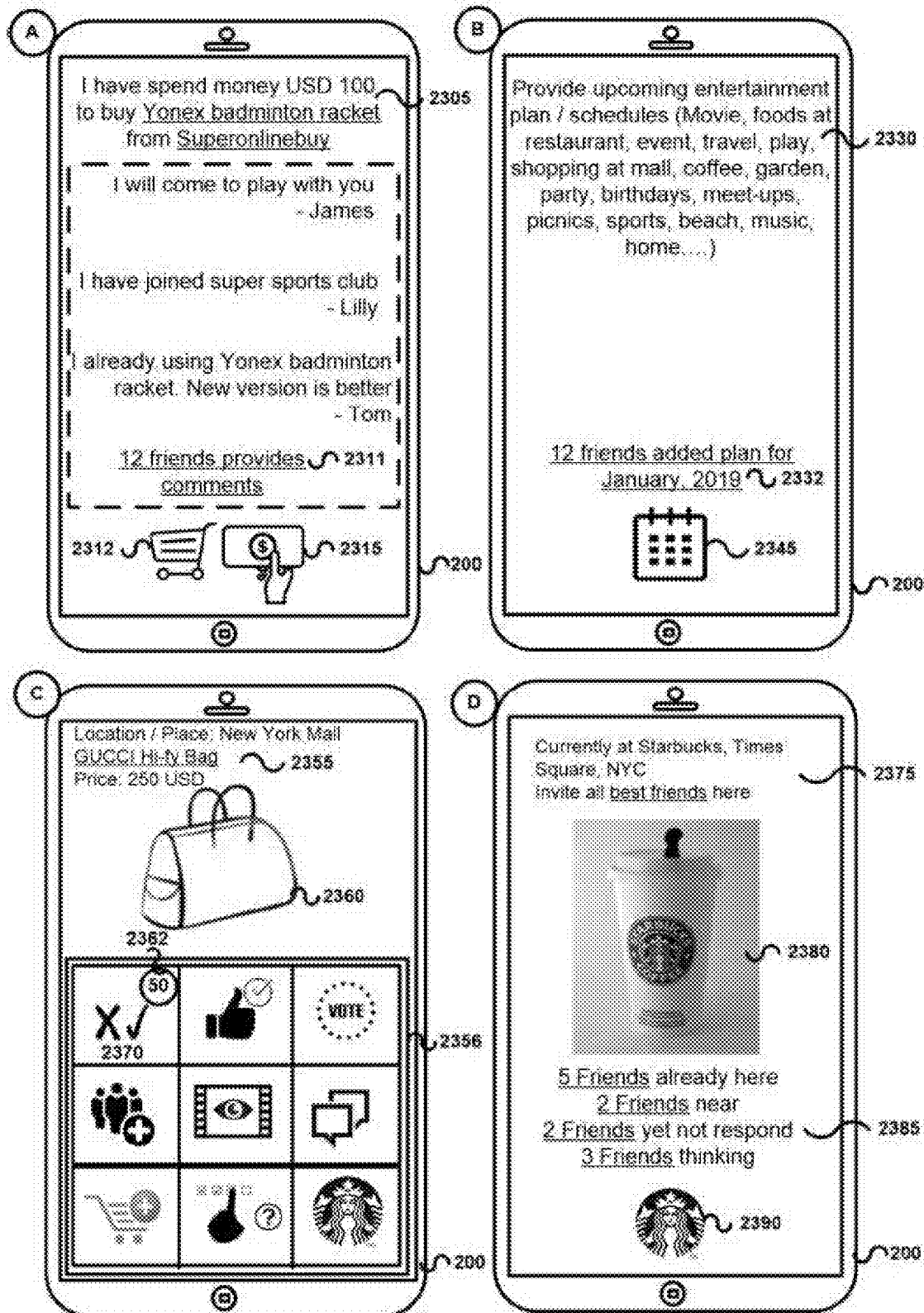
Figure 24:
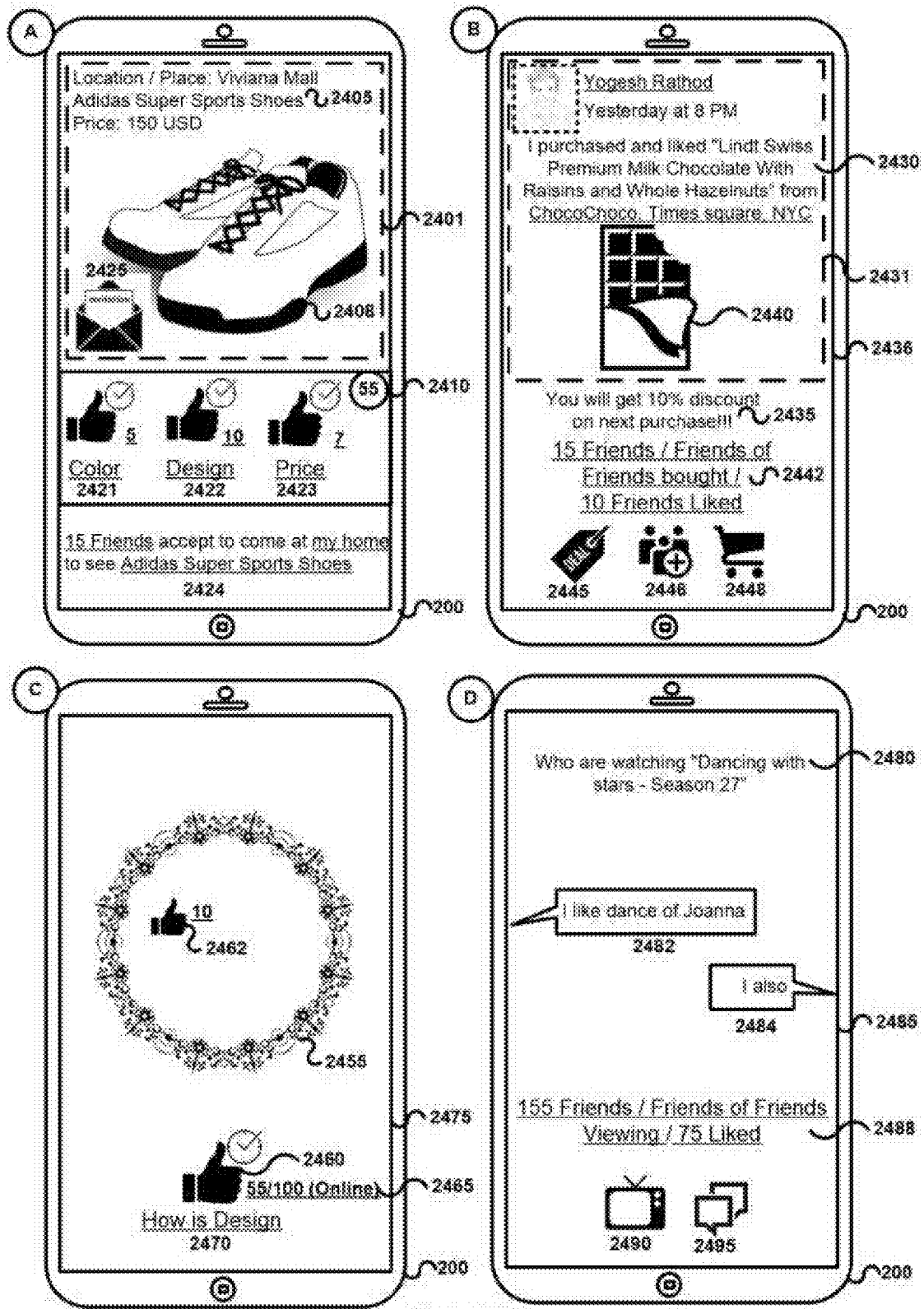
Figure 25:
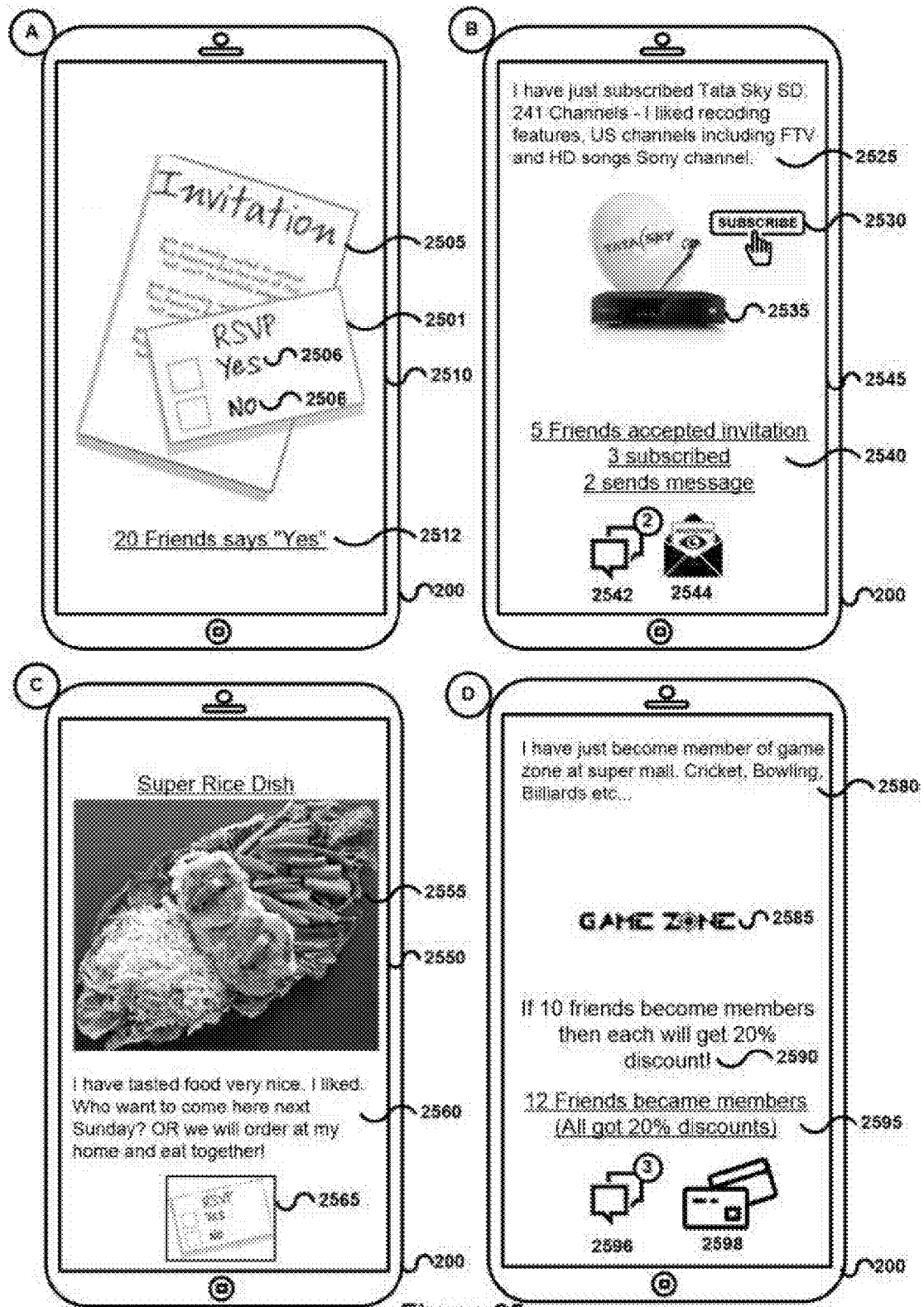

FIG. 22 illustrates user can send request message or post with invitation or request to join, come with user at particular place, attend, meet, come together for shopping or buying or ordering or booking or advance booking or participate in deals or becoming member or subscribing or negotiating or referring or viewing or testing or comparing products at one or more places. FIG. 22(A) illustrates example wherein user can request 2205 selected friends or groups or family members to come together with user to eat "Natural Icecream" at Viviana mall this Sunday evening and associate or integrate or link or attach control 2225 which enables receiving user of message to accept, confirm, provide indication of join or attend or come with user, patriciate with event at particular place. FIG. 22(B) illustrates another example wherein user can request 2230 selected friends or groups or family members to come together with user to buy gift for other friend for birthday and associate control 2245 for enabling receiving users of message or post 2230 to tap on control 2245 and provide indication of coming with user. Based on received indications from users on request, server module 156 updates and displays number of friends accepted invitation or request 2240. FIG. 22(C) illustrates another example wherein user can request 2230 selected friends or groups or family members to come together with user to buy television at super mall new york city and associate control 2265 for enabling receiving users of message or post 2255 to tap on control 2265 and provide indication of coming with user, chat or call with requested user. Based on received indications from users on request, server module 156 updates and displays number of friends accepted invitation or request 2260.

In another embodiment user can share message or post 2280 comprises photos or videos of two or more products and product details including name, brand, price and offer 2275/2276 with choice control 2290 to selected one or more friends and groups. Server module 156 receives said message or post with choice control 2290 and display to each target recipients for enabling them to apply gesture including single tap on particular product inside photo to provide indication to select or like or advise to buy tapped or clicked product. In the event of clicking or tapping on particular area on photo or image of video, system automatically digitally embedded or integrate or embossed particular type of pre-defined mark on clicked or tapped area on displayed photo or image of video and send to server module 156 which recognizes marked area associated product and provide indication to sender or all other users who received said post or message 2280 as per privacy setting provided by sender.

FIG. 23(A) illustrates in an embodiment user can prepare message or post comprises details about purchased products including one or more product names, brands, associated price, description, one or more photos or videos of products, location information of purchase, profile photo & link, date and time of purchase, source of purchase including online website name or offline shop name 2305 and associate purchased control 2312/2315 and send to one or more contacts or groups. Server module 156 receives said details and send and displays said post or message 2305 and associated purchased or bought or ordered or booked or used or subscribed control 2312/2315 to each target recipient. In the event of tapping or clicking on post or message 2305 and associated purchased or bought or ordered or booked or used or subscribed control 2312/2315, displaying interface with dynamically created groups of users of said products and connected or added or selected contacts of user and enable to communicate or send and receive messages including good or bad experience, sharing, news, updates, new products, alternatives, health effects, advantages, disadvantages, benefits, tips, usage, support, queries, answers, provide source and order link to dynamically created group members.

In another embodiment FIG. 23(B) illustrates admin user can create group and invite contacts to join group and in the event of acceptance of invitation by invitees, add said invitation accepted user to said group and enabling group members to provide details of their upcoming entertainment plans and schedules including watch particular movie, foods at particular restaurant, particular events including birthday, party, college event, class event, health and travel including walk, run, gym, yoga, dance, visit mall, garden, visit particular places, play particular sport, shopping at particular mall, coffee at particular shop, meet-ups, picnics, sports, visit particular beach, play music, meetups at home with location information, date and time and details. Shared and updated said details can view by each member of group and can invite each other's event or plan, communicate with each other, finalize plan.

In another embodiment FIG. 23(C) illustrates displaying of controls 2356 including collaborative controls, social network controls from one or more sources including developers, providers, servers, storage mediums, devices and networks. In another embodiment FIG. 23(C) illustrates brands or sponsors or advertisers can create, develop, upload, verify and publish their one or more action, call-to-actions, calendar and plan, task, and survey controls 2356 for enabling user to prepare one or more type of contents or posts or messages and associate or integrate or link or embed or attach said one or more controls published by particular brand or sponsor or advertiser or place of business and send to target recipients for enabling them to accept invitation to visit said brand associated place to view products, eat food items, view movie or play, participate in event, buy products or subscribe services. In an embodiment associate pre-define one or more geo-fence, places, addresses, location information and schedules with publication of one or more said controls. For example user [Y] prepares or draft message or post 2355 describing plan to visit and eat "Veg. Maharaja Mac" at Times Square McDonalds™ today at 7:00 PM and associate McDonalds™ brand published control 2370 and share with or send to one or more contacts or groups (for example best friends group) and enabling receiving or viewing user to tap or click on control 2370 to accept or not accept or reject invitation to join with user's plan to visit Times Square McDonalds™ today at 7:00 PM. In an embodiment server module 156 monitors, tracks and stores number of users selects said control 2370 and send to number of friends and number of friends accepts or rejects the invitation associated with message by using said brand published control 2370. In an embodiment publisher of said brand or place of business associated control 2370 to make payment based on number of users selects said control 2370, send said control 2370 to number of friends or contacts, and number of friends or contacts accepted or rejected the invitations, number of users who used said control or interacted with control actually visits and actually purchased at said place of business associated with said advertiser or brand or sponsor. In an embodiment enabling brand or sponsor or place of business to associate or provide rule-based offer to users of network or particular type or criteria specific user including discount on number and amount of purchases, number of visits, number of friends and like.

In an another embodiment FIG. 23(D) illustrates notifying visitors who visits at particular place or location of business to share said visited place of business associated and user's activity at that place of business associated details with said place of business provided or published control 2390 or in the event of visiting at particular place of business automatically generate post or message comprises said visited place of business and/or user's activity at that place of business associated details and automatically associated or integrated said place of business provided or published one or more controls 2390 or enabling user to check in place 2375 and share associated details including place name, location information, date and time, currently ordered or liked or purchased products details including product name, price, brand, description and one or more types of reactions 2380 and associated particular brand related one or more controls (for example "Starbucks™" control 2390 with one or more friends or contacts or groups and enable them to accept invitation by clicking on said control 2390 or said control 2390 associated interface. In an embodiment server module 156 monitors, tracks and stores current location of invitation accepted users' devices and inform all participated members or invitation accepted users about estimated time and distance to arrive, various types of status including numbers and names of friends who accepted or rejects invitations, arriving, arrived friends. In an embodiment publisher of said brand or place of business associated control 2370 to make payment based on number of users selects said control 2370, send said control 2370 to number of friends or contacts, and number of friends or contacts accepted or rejected the invitations, number of users who used said control or interacted with control actually visits and actually purchased at said place of business associated with said advertiser or brand or sponsor. In an embodiment enabling brand or sponsor or place of business to associate or provide rule-based offer to users of network or particular type or criteria specific user including discount on number and amount of purchases, number of visits, number of friends and like. In an embodiment in the event of visiting at particular place of business or entering into pre-defined geo-fence associated with particular place of business and in the vent of conducting of augmented reality scanning of particular product, automatically generates posts or message 2375/2380 based on recognized objects and identified objects or products associated product details, monitored and tracked location information of user device, date and time, place of business associated controls 2390 and automatically or manually send to one or more contacts o groups.

In and embodiment FIG. 24(A) illustrates preparing message and post 2401 about selected or liked or picked one or more products 2408/2405 and associate or integrate or attach or link one or more controls or customized control (for example three customized real-time like control 2421/2422/2423) with said post or message 2401, wherein customization of control includes change or update icon, size, color, place on message or post (drag and drop control anywhere on post or message), label or text, settings, set life and view duration, presentation settings, privacy settings, associate one or more functions and interfaces or customized functions and interfaces. User can send message or post 2401 and associated or integrated or linked or embedded or attached customized controls 2421/2422/2423 to one or more contacts or groups and enable them to select one or more controls from displayed controls 2421/2422/2423 within pre-set duration 2410. In an embodiment update status about said post or message associated product including viewing, selected, liked, comparing, get reactions from others, purchased or ordered or booked or subscribed or payment made. In an embodiment after sending message or post 2401, sending or publishing user can change or update or replace one or more controls which will update to all receiving users of said post or message 2401. For example, after purchase of product 2408 user can select and associate or integrate or link or embed or attach customized invitation controls 2425 to invite selected friends or contacts or groups to visit users' friend and see said purchase product 2408. Server module 156 generates and updates said shared message or post and associated one or more controls associates notifications, status, conducted reactions and statistics 2424.

In an embodiment enabling user to conduct augmented reality scanning of particular object by using augmented reality system. Server module 156 receives said augmented reality scanning of particular object associated automatically captured one or more photos or videos and recognize one or more objects inside said received one or more photos or images of videos and identifies associated one or more types of one or more actions, user to user call-to-actions, reactions, tasks, workflow, plans, instructions, commands, and survey specific controls and enabling user to select and associate or integrate or link or attach one or more controls with one or more messages or posts or photos or videos or one or more types of contents or data or media and send or share or publish to one or more contacts, groups, followers, all users of network, make it private or save s draft, one or more types or queries or structured queries language (SQL) specific users of network.

In an embodiment displaying place or location or geofence or address or geo-coordinates specific one or more types of one or more actions, user to user call-to-actions, reactions, tasks, workflow, plans, instructions, commands, and survey specific controls and enabling user to select and associate or integrate or link or attach one or more controls with one or more messages or posts or photos or videos or one or more types of contents or data or media and send or share or publish to one or more contacts, groups, followers, all users of network, make it private or save s draft, one or more types or queries or structured queries language (SQL) specific users of network.

FIG. 24(B) illustrates, in an embodiment user can prepare and draft message or post 2431 regarding purchase of particular product and associate or integrate or attach deal or group deals or group buying or order or buy call-to-action controls 2445/2446/2447 with said message or post 2431 and send to one or more contacts or connections or groups of contacts or followers or one or more types of users of network (based on privacy settings of users of network). Server module 156 receives said message or post 2431 and send to sender instructed one or more contacts or one or more types of users of network. Receiving user of said message or post 2431 can view said message or post 2431 and click or tap on deal control 2445 to participate in group deals to buy said product 2440 or click or tap on group buying icon to confirm buying of said product 2440. Sender of said message or post 2431 or authorized user or admin of group can purchase said product 2440 on behalf of all users who clicked or tapped on said group buying control 2446 by clicking on buy particular number of products interfaces associated with said control 2446. In an embodiment receiving user of message or post 2431 can tap or click on "Order" control 2448 to buy said message or post 2431 associated product 2440.

In another embodiment user can record video of one or more products (for example various user selected jewelry sets) 2455 and associate one or more actions, call-to-actions, tasks, survey and reactions controls (for example real-time like control 2460) can send said video 2455 to selected one or more contacts or connections or groups or one or more types of users of network including past customers and experts. Receiving user can view said video 2455 and tap on liked one or more products 2455 inside/on/in video (for example real-time like control 2460) before expiration of pre-set duration associated with said real-time like control 2460. In the event of tap on particular product 2455, integrate digital mark on tapped image area inside video and send to server module 156. Server module 156 receives said marked image and recognizes and identifies product or update number of likes on particular image inside video and provide updated video 2455 to all users who have received said video 2455.

FIG. 24(D) illustrates enabling user to publish or share about what user is currently watching (for example prepare message and post describing that user is currently watching "Dancing with stars—Season 27" in television 2480) and associates or integrates television control 2490 and message control 2495 and send to one or more contacts or groups. Receiving user can tap on television control to view associated interface, wherein said control associated graphical user interface (GUI) enables receiving user to provide indication that user is also watching said television program, want to chat with other users and starts chatting with other users who also viewing said television program, participate in particular deal, bookmark, add to wish list, order or buy or get appointment or add to cart or book or subscribe one or more products or services including cloth, accessories, food item, book movie or paly or event tickets showing in television program and make payment, provide one or more types of reactions or conducting actions or call-to-actions on currently viewing program associated actors, singers, advertised products by taking photo or tapping on particular object or person or product on image inside live video streaming or recorded video. System integrates digital mark on said tapped area on image inside live video streaming or recorded video and send to server module 156 and displaying said image and one or more types of actions, reactions controls and enabling user to provide comments, ratings, like or dislike and enable to bookmark, add to wish list, order or buy or get appointment or add to cart or book or subscribe one or more products or services including cloth, accessories, food item, book movie or play or event tickets showing in television program and make payment, wherein server module 156 recognizes and identifies said object or person or face or person or product in tapped or marked area on image inside live video streaming or recorded video and associate and store one or more types of reactions or bookmark, add to wish list, receive order or ship purchased product or provide appointment or book tickets or subscribe one or more products or services including cloth, accessories, food item, book movie or play or event tickets showing in television program and accept payment.

FIG. 103(A) illustrates in an embodiment user can prepare invitation 2505, associate or integrate control 2501 and send to one or more contact or groups and receive confirmation 2512 from said contact or group members.

FIG. 25(B) illustrates in an embodiment advertise or brand or seller or service provider can develop, upload, verify, register one or more actions, call-to-actions, survey, tasks and reactions controls and make them available for users of network or users who enter into particular geofence or location of place of business, so registered user can view, browse, search, match, select, download, install, make payment and then download and install and prepare one or more types of content or posts or messages and search, select from list or select from auto determined or select from displayed location or place or geofence associated one or more actions, call-to-actions, survey, tasks and reactions controls or select one or more actions, call-to-actions, survey, tasks and reactions controls base on recognizing one or more scanned object or person or products, wherein one or more actions, call-to-actions, survey, tasks and reactions controls comprises book, order, buy, add to cart, add to wish list, offer including discount, and free offer group deal, group buying, book tickets, book appointment, visit place, invite to place, subscribe, book particular type of on demand service. In an embodiment provided ready template with control for enabling user to prepare message or post based on template and associate control and send to one or more contacts or groups. For example, user prepares message or post 2525 and associates "Subscribe" action control 2530 for enabling receiving or viewing user of said message or post 2525 to subscribe said message or post associated service.

FIG. 25(C) illustrates In another embodiment in the event of visiting at particular place or place of business (for example particular restaurant particular location) by user or visitor, displaying said place or pre-defined geofence defined by said place of business associated authorized person associated one or more actions, call-to-actions, survey, tasks and reactions controls and enable user to prepare message or post 2555 based on provided one or more templates, associate custom message 2560 and associate "RSVP" control and send to one or more contacts or groups or followers or one or more types of users of network. Receiving user can tap on "RSVP" control and accept invitation, provide notes, send or receive messages, make payment for contribution, re-share to contacts of contacts.

FIG. 25(D) illustrates in an embodiment advertiser or sponsor or place of business can associate offer with one or more controls to enable user to associate and share control and in the event of acceptance of offer by particular number of users, provide particular offers including discount, free gifts, redeemable points, cash backs, voucher, coupon and like to all participated users or user who associate or attach or integrate control and share with contacts or contacts of contacts. For example, user prepare message or post 2580/ 2585 and associate digital membership card control 2598 and send to contacts of user. Receiving user of said message or post 2580/2585 and associate control 2598 can tap on control 2598 to participate with said offer 2590 and re-share said message to friends of receiver and friends of friends. In the event of acceptance of said offer by particular number of users provide or avail particular discount to all participated members 2595.

There are plurality types of use to user call-to-actions, actions, survey, tasks, workflow, collaboration, invitation, communication, participation, offer, activities, transaction and reactions controls possible including controls related to participate with one or more types of activities and controls related to provide one or more types of reactions or conduct actions or call-to-actions on selected or purchased or subscribed or want to purchase or subscribe one or more types of products or services including view movie <name>, come with me to drink <coffee at on>, Who want to join me <my gym>, become member of game zone so we can play together, Join or subscribe <service> I have subscribed or joined, become member of <sports club>, <Details/Type> of class joined. Do you want to join with me?, <Details/Type> of sports doing/playing/joined club. Do you want to join/play with me?, eat including currently eating, ordered, want to order, invite to eat or order, view or attend including viewing or attending or participating particular movie or drama or event or invite to attend or view or participate particular movie or drama or event, listen particular song, taste particular food, read particular book or wat to purchase particular book, travelling to particular locations or places, invite to travel at particular locations or places, currently or invite to walking, running or jogging, going at particular place, sports including currently playing or invite to play cycling, cricket, football, badminton, tracking, swimming, currently drinking or invite to drink coffee, tea, currently visit or visiting or invite to visit beach, garden, temple, shopping mall, movie, play, event, party, river, pond, mountain, points of interest (POI), tourist place <name, details>, play at <place>, festival party <fly kite/Christmas/ dewali>, tree plant, cleaning, reviewing, invite <birthday or anniversary party at > including send invitation, accept invitation, suggest activities, food, place and like, who come at my home <map and direction> for party, study, project discussion, fun, watch movie together, suggest, event, play chess, carom, view my painting, listen music, dance, car or bike round and like, meet <at place at on>, join or do yoga, gym, shopping inducing suggest where shop, going <place>, join for shopping at <place, currently shopping, view my purchased or liked products, view <particular television program with me>, check in place <what you say, join, who want to come next time hear>, brand related control for publishing details, plan, invite, accept and confirm invitation to join, make plan to drink coffee/eat food/ice-cream at particle brand shop (group discount, deals, offers), group shopping or group deals including cloths, mobile, joining sports club, class membership, consume or subscribe services or on demand services, subscribe book, magazine, newspaper, television channels, buy food packets like coco cola, lays, water, group purchase discount, offers, redeemable points, group visit and purchase at particular shop, department store, group online purchases or add to cart and group checkouts, search or match products, services, jobs, class, clients or customers, evaluation of available alternatives, requirement specification, queries including exchange questions and answers, past customers or connected users who liked or disliked (why), experience, price, availability, tips, discounts, offers, help in search, come together to help in buy, sharing (photos, comments, links, videos), share or discuss on news, currently waiting, status (reach at particular place or location), today's menu at each friend's home, suggest food item, hotel, airline, restaurant, cloth store or brand, shoes, bag, watch, perfume, accessories, rent office, rent home, purchase car and like, where related controls including where are you (send message and particular where control to ask to friends or contact) going at this Saturday or Sunday or vacation, where particular named or brand products available, where lowest price particular named or brand products available, where we can meet at this Sunday, when related controls including when we view movie, going for shopping, drink coffee, visit at particular place, who related controls including who are using particular product or service, who will come with me to shop particular product, how related controls including how to make particular food, how to use particular product.

Figure 26:
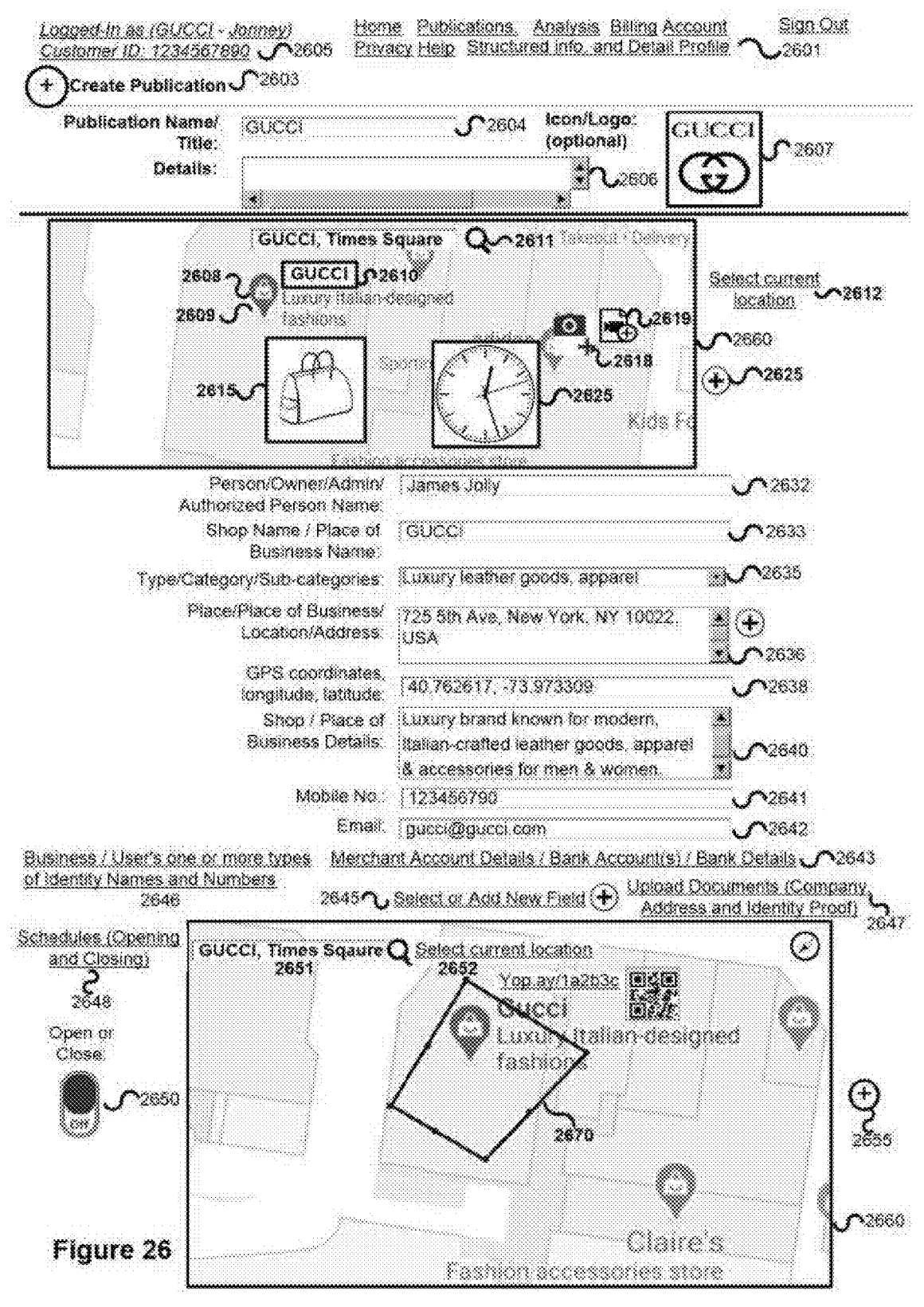

FIG. 26 illustrates Graphical User Interface (GUI) 279 for enabling place associated owner or merchant or authorized person or user or administrator or sponsor to select, update, customize, and publish one or more types of actions, call-to-actions, survey question and option controls and place of business associated payments and account information, one or more types of codes including QR code image associated with particular location, pre-defined or drawn geo-fence boundary, geo-coordinates, location point, address, selected location on place, one or more types of place, and particular place and associate one or more types of criteria, target users including all or specific customer or user or group or query or criteria or selections specific set of users, rules, schedules and privacy settings. So, in the event of visitor or user or customer when visits said place of business or searches on map then display said place of business or geofence or address or location information associated one or more types of actions, call-to-actions, survey question and option controls on/surround map or said place or geofence or location associate map.

In an embodiment administrator or user or sponsor or authorized user can create publication 2603 and provide publication name 2604, publication details 2606, logo of place of business 2607, provide location of place by employing one or more techniques including search and select location on map 2611 or select current location as place of business 2612 or provide address 2636 or location or geo co-ordinates 2638, or draw geofence boundary 2670 on map 2660 and associate one or more types of contents, data, merchant or user payments and account, controls, active links, user actions or call-to-actions information including select, add 2618/2619 and associate one or more types of contents including one or more photos and videos 2615/2625 with said location or place 2610 or geofence 2670, provide name 2632, shop or place of business name 2633, one or more types or categories 2635, description 2640, mobile number 2641, e-mail address 2642, location or defined geofence of place of business associated merchant account details or bank details 2643, merchant account details or bank details 2643 for creating QR code for enable customers to make payment, upload place of business related one or more types of address proof and identity proof 2647 including shop license, company incorporation documents, owner or seller's identity proof, provide opening and closing timings, schedules 2648, current opening or closing status 2650, select, customize and associate one or more actions, call-to-actions, reactions and survey controls 2775 with said place 2610 or geo-fence 2670 or address 2636 or geo-coordinates 2638, select 2643, generates 2647, upload 2742, edit 2744 and associate one or more selected 2721 types of code from list of types of codes 2725 including QR codes 2705, wherein associate type of QRcode specific one or more types of contents, data, one or more links or web links, metadata, one or more types of one or more functions or customized functions and associated selected or provided parameters and values, select and associate one or more types of target criteria including any users of network who visit said place of business or specific type of users including profile of user including age range, type of gender, education, skills, qualification, experience, income range, interests, language, home and work address and location, interacted or related type and named entities including company or organization or workplace name, school or college name, type of customer or visitor including all or selected or type of past customers, current customers, ticket holders, subscribers, members, particular type of membership or card holders, attendee, viewers, selected contacts or connections based on unique user names, user associated e-mail address or phone numbers or one or more types of unique identities and any combination thereof. In an embodiment administrator or user or authorized person can apply, select, update and provide one or more types of rules, parameters, contents, privacy settings and target criteria or criteria specific users of network for particular type of action or call-to-action or reaction control including button, link, image. For example, provide website address for "Website Link" control 2751, update landing page web address for "Web Page" control 2752. In an embodiment after providing said publication 2604 associated details user or administrator or sponsor or authorized person can submit said publication for verification 2785 or make payment for publication 2764 or associate payment information for automatically deducting billed amount from provided payment sources as per use and advertising models including pay per call-to-actions. After successfully verifying details server administrator or authorized person makes available said geofence or location information associated one or more types of actions, call-to-actions, reactions and survey controls for users of network, so in the event of searching on map particular place or visiting particular place or enter into particular geofence associated location, displaying said searched or visited place or location associated one or more types of actions, call-to-actions, reactions and survey controls or based on target criteria, schedules, rules, privacy settings associated with said visited place or location, displaying target criteria, schedules, rules, privacy settings, type of activity or type of status specific one or more types of actions, call-to-actions, reactions and survey controls associated with said location or geofence.

In an embodiment sever module 154 generates and display payment type 2721 QR code 2705 which contains merchant account(s) details in encrypted format, wherein verifying merchant payments and accounts details based on merchant provided details and identified merchant details or bank details 2643 and place of business or shop or owner or company or organization identity proof documents 2670 associated with said place of business or owner associated with said place of business.

In an embodiment enabling place or place of business owner or authorized person or merchant 2605 to create place 2610 on map by providing and verifying business and place of business details including business name 2633, categories and sub-categories 2635, icon 2609, logo 2607, description 2640, business hours 2648, business address (identify GPS coordinates or Geo coordinates or latitude and longitude coordinates and one or more types of geocodes) in the form of country specific address format 2636, GPS coordinates or Geo coordinates or latitude and longitude coordinates 2638, selected and marked pointer on map 2608, automatically identified location and associated address based on monitored and tracked current location of user mobile device, defined geofence, provided selected location 2608 or place 2610 on map 2660, contact person name 2632, contact information including phone number 2641, email address 2642, website uniform resource locator (URL), merchant information including merchant payments, accounts and bank details 2643 including country specific bank code and account number, bank account linked mobile number and other required details, unique number and requested details of one or more types of country specific identity proofs and one or more types of required documents for proving business name, business address and location, business owner, business contact information, and merchant information including bank account details 2647. After verifying said details, listing or publishing or make said verified 3240 place of business 2610 available on map for users of network and enable users to view current place (e.g. 2610/3265) or nearest place or nearby place(s) based on monitored and tracked location of user mobile device 200 and enable to view specific place or selected place (e.g. 2610/3265) associated details and select or click or tap on make payment or pay control including pay button 3261 and make payment of entered or pre-set or default or pushed particular amount from default or pre-set or selected or updated user's payment account from one or more or list of payment accounts related to one or more types of payment methods to said current or specific or selected place or place of business 3265 associated merchant's account or merchant's bank account or user's payment account (further discussed in detail in FIGS. 46-54), wherein payments account comprises bank code, bank account number, bank linked phone number, legal business name, type of business, one or more types of identity of business and owner of place of business.

In an embodiment user can create or add new publication 2781, save new or updated publications 2782, remove one or more created publications 2783, start publication 2786 for making them available for users of network or pause publication 2787 for not allowing accessing of publication for users of network, schedule publishing of selected or particular publication 2788 and view and manage already exists one or more publications 2789.

After making said publication 2604 available for user of network, in the event of visiting particular place by particular identified use of network, identifying by the server module 154 particular identified place or location of place of business or geofence associated with particular identified place of business based on check in place by user or monitored and tracked user device 200 location and displaying address or location information 2805 of said place of business or verified place of business and associated logo or brand name or shop name or sign and enabling user to select or enter or input or update payment amount 2810. After entering or providing amount of payment 2810, in the event of tapping or clicking on control including button or link or image 2820 or tapping or touching on finger print icon 2802 to provide user's finger print, server module 154, transfers provided amount 2810 from said device 200 associated logged or identified user's account to said identified location or place or geo-fence associated merchant's account based on identified user associated payment information and said identified location or place or geo-fence associated merchant's account details and displays or notifies information about payment transaction 2825.

In an embodiment at the time of viewing payment interface 2822/2852 or entering payment amount 2810 by user or viewing billed amount on screen 2852, front camera of user device 200 capture device 200 user's photo or records device 200 user's video and server module 154, identifies face inside said photo or image(s) of video based on face recognition techniques and in the event of matching identity of said detected face associated identified user with device 200 associated user or logged user allow said transaction or in the event of non-matching of identity of said detected face associated identified user with device 200 associated user or logged user disallow said transaction.

In an embodiment in the event of receiving of pushed data including billed amount or payment amount or bill or receipt 2840 from particular place of business 2830, automatically initiate, start and display started timer 2835 associated with pre-set duration (for example 30 seconds) and in the event of expiration of said timer (for example after 30 seconds of starting of said time), automatically trigger payment transaction by transferring billed or payment amount (for example 520 USD) from user device 200 associated logged-in account to said pushed data associated identified location or monitored and tacked current user device location associated merchant account based on identified user associated payment information and said identified location or place or geo-fence associated merchant's account details and displays or notifies information about payment transaction 2850. In an embodiment enable user to tap or click on control including button or link or image 2845 to transfer billed or payment amount (for example 520 USD) from user device 200 associated logged-in account to said pushed data associated identified location or monitored and tacked current user device location associated merchant account based on identified user associated payment information and said identified location or place or geo-fence associated merchant's account details and displays or notifies information about payment transaction 2850.

In an embodiment after making said publication 2604 available for user of network, in the event of visiting particular place by particular identified use of network, identifying by the server module 154 particular identified place or location of place of business or geofence associated with particular identified place of business based on check in place by user or monitored and tracked user device 200 location and displaying address or location information 2855 of said place of business or verified place of business, associated logo or brand name or shop name or sign and associated QR code 2868 and enabling user to select or enter or input or update payment amount 2860. After entering or providing amount of payment 2860, in the event of tapping or clicking on control including button or link or image 2870 or tapping or touching on finger print icon to provide user's finger print, server module 154, transfers provided amount 2860 from said device 200 associated logged or identified user's account to said identified location or place or geo-fence associated merchant's account based on identified user associated payment information and said identified location or place or geo-fence associated merchant's account details or said identified location or place or geo-fence associated QR code encrypted merchant account details and displays or notifies information about payment transaction 2875.

In an embodiment at the time of viewing payment interface 2872/2882 or entering payment amount 2860 by user or viewing billed amount on screen 2872, front camera of user device 200 capture device 200 user's photo or records device 200 user's video and server module 154, identifies face inside said photo or image(s) of video based on face recognition techniques and in the event of matching identity of said detected face associated identified user with device 200 associated user or logged user allow said transaction or in the event of non-matching of identity of said detected face associated identified user with device 200 associated user or logged user disallow said transaction.

In an embodiment in the event of receiving of pushed data including billed amount or payment amount or bill or receipt 2890 from particular place of business 2880, automatically initiate, start and display started timer 2885 associated with pre-set duration (for example 30 seconds) and in the event of expiration of said timer (for example after 30 seconds of starting of said time), automatically trigger payment transaction by transferring billed or payment amount (for example 520 USD) from user device 200 associated logged-in account to said pushed data associated identified location or monitored and tacked current user device location associated merchant account based on identified user associated payment information and said identified location or place or geo-fence associated merchant's account details and displays or notifies information about payment transaction 2875. In an embodiment enable user to tap or click on control including button or link or image 2895 to transfer billed or payment amount (for example 520 USD) from user device 200 associated logged-in account to said pushed data associated identified location or monitored and tacked current user device location associated merchant account based on identified user associated payment information and said identified location or place or geo-fence associated merchant's account details and displays or notifies information about payment transaction 2800.

In an embodiment in the event of receiving of less accurate GPS location information, by sever module 154, from monitored and tracked user device 200 and identifying by the user that displaying place information including place or shop or company or organization name or logo or address is different than current place of user then user can instruct sever module 154 to identify and display information about user surround places or nearby places to enable user to select particular place 2910 from list of places, enter payment amount 2905 and make payment by transferring entered amount (for example 220 USD) from user device 200 associated logged-in account to said selected identified location or place associated merchant account based on identified user associated payment information and said identified location or place or geo-fence associated merchant's account details and displays or notifies information about payment transaction 2925.

In an embodiment in the event of selecting particular place 2910 from list of displayed information of places, automatically initiate and start timer and display started timer countdown 2835, wherein timer associated with pre-set duration (for example 30 seconds) and in the event of expiration of said timer (for example after 30 seconds of starting of said timer), automatically trigger payment transaction by automatically transferring entered amount 2905 or billed or payment amount (for example 220 USD) from user device 200 associated logged-in account to said monitored and tacked current user device location associated merchant account based on identified user associated payment information and said identified location or place or geo-fence associated merchant's account details and displays or notifies information about payment transaction 2850.

In an embodiment in the event of receiving of less accurate GPS location information, by sever module 154, from monitored and tracked user device 200 and identifying by the user that displaying place information including place or shop or company or organization name or logo or address is different than current place of user then user can instruct sever module 154 to identify and display information about user surround places or nearby places to enable user to select particular place 2940 from list of places, view provided or pushed payment amount 2935 and make payment by transferring amount (for example 220 USD) from user device 200 associated logged-in account to said selected identified location or place associated QR code associated merchant account based on identified user associated payment information and said identified location or place or geo-fence associated QR code 2950 associated merchant's account details and displays or notifies information about payment transaction 2953.

In an embodiment in the event of selecting particular place 2940 from list of displayed information of places, automatically initiate and start timer and display started timer 2842 associated with pre-set duration (for example 30 seconds) and in the event of expiration of said timer (for example after 30 seconds of starting of said timer), automatically trigger payment transaction by transferring displayed amount 2935 or billed or payment amount (for example 220 USD) from user device 200 associated logged-in account to said monitored and tacked current user device location associated QR code associated merchant account based on identified user associated payment information and said identified location or place or geo-fence associated QR code 2950 associated merchant's account details and displays or notifies information about payment transaction 2850.

In an embodiment user can apply one or more types of gestures including single tap anywhere on screen 2976 or icon 2863 or pre-defined region of screen 2976 after starting of timer 2863 and before expiration of started timer 2863 and can stop or pause started timer 2863 to stop payment or again apply one or more types of gestures including single tap anywhere on screen 2976 or icon 2863 or pre-defined region of screen 2976 to start timer 2863 for automatically trigger payment transaction by transferring displayed amount 2935 or billed or payment amount (for example 220 USD) from user device 200 associated logged-in account to said monitored and tacked current user device location associated QR code associated merchant account based on identified user associated payment information and said identified location or place or geo-fence associated QR code 2950 associated merchant's account details.

In an embodiment after adding products in cart discussed in FIG. 68-81, in the event of view cart for making payments for said added products 2960/2961/2962 in cart, server module 154, automatically generates QR code or bill or cart or invoice or customer or user or transaction specific dynamic QR code 8660 and display said generated QR code or dynamic QR code on graphical user interface (GUI) 2976 and enabling user to tap or click on said generated and displayed QR code 8660 to make payment of said billed or cart total amount of payment for purchased or added to cart products 2960/2961/2962 by transferring said total amount 2962 from logged-in identified user's account to said QR code associated merchant's account, wherein QR code contains merchant details or merchant's bank details, transaction details and other details in encrypted format. After successful payment done, server module 154 generates and displays message 2995 or provides notification 2995 about said successful payment and generates and displays payment receipt 2996.

In an embodiment after adding products in cart discussed in FIG. 68-81, in the event of view cart for making payments for said added products 2960/2961/2962 in cart, server module 154, automatically generates QR code or bill or cart or invoice or customer or user or transaction specific dynamic QR code 8660 and display said generated QR code or dynamic QR code on graphical user interface (GUI) 2976 and after displaying said QR code, automatically initiate and start timer and display started timer countdown 2863, wherein timer associated with pre-set duration (for example 30 seconds) and in the event of expiration of said timer (for example after 30 seconds of starting of said time), automatically trigger payment transaction by automatically transferring entered amount 2962 or billed or payment amount (for example 22 USD) from logged-in account to said QR code associated merchant's account, wherein QR code contains merchant details or merchant's bank details, transaction details and other details in encrypted format. After successful payment done, server module 154 generates and displays message 2971 or provides notification 2971 about said successful payment.

In an embodiment in the event of opening or viewing particular Graphical User Interface (GUI) 3024, server module 154, identifies places nearby user device's 200 current location or identifies user surround places based on pre-set radius distance and monitored and tacked user device 200 current location or identifies place based on check in place by user and display searched places 3010/3012/3015 and enable to select particular place 3010 from displayed places 3010/3012/3015. User can select one or more types of details for sharing including user name 3001, mobile number 3002 and order details 3003 and can select particular place 3010 from displayed places 3010/3012/3015 and provide indication of check in 3016 said selected particular place 3010 from displayed places 3010/3012/3015 and select or tap on share control or button 3022 to share said selected details 3001/3002/3016 with said selected particular place 3010 from displayed places 3010/3012/3015. After successful sharing of said selected details, displaying message 3025. User can prepare, add to cart, view and update order 3020/3003. After receiving said shared details including user name or contact number or contact details, administrator or authorized staff of place of business can share bill or invoice or purchase details or payment amount with said user name or contact details for enabling them to make payment for said bill or invoice or purchased products.

In another embodiment administrator or owner or authorized user associated with place of business can login application and can identify nearby other users of network or application. In the event of receiving request from said logged in user or identifying administrator or owner or authorized user associated with place of business, server module 154, identifies users 3031/3032/3033 inside said logged in user associated place or place of business based on sufficiently matching logged in user associated place or place of business with said monitored and tracked location of user devices of users of network and display on Graphical User Interface (GUI) 3044 and enable to select particular user 3033 from list of displayed nearby users or users inside place of business 3031/3032/3033 and share 3040 said selected user 3033 associated bill or invoice or purchase product details or payment amount details with said selected user 3033. After sharing said selected user 3033 associated bill or invoice or purchase product details or payment amount details with said selected user 3033, said selected user 3033 receives notification on Graphical User Interface (GUI) 3085 or receives push notification 3050 on mobile device 200 and with one tap on said received notification 3050 can view said shared bill or invoice or purchase product details or payment amount details 3055 view said place associated or shared QR code 3060 and in the event of tapping on said displayed QR code 3060 transferring said bill or invoice associated total amount (for example 520 USD) from logged-in identified user's account to said QR code 3060 associated merchant's account, wherein QR code 3060 contains merchant details or merchant's bank details, transaction details and other details in encrypted format. After successful payment done, server module 154 generates and displays message 3070 or provides notification about said successful payment and generates and displays payment receipt 3070.

Figure 27:
Figure 28:
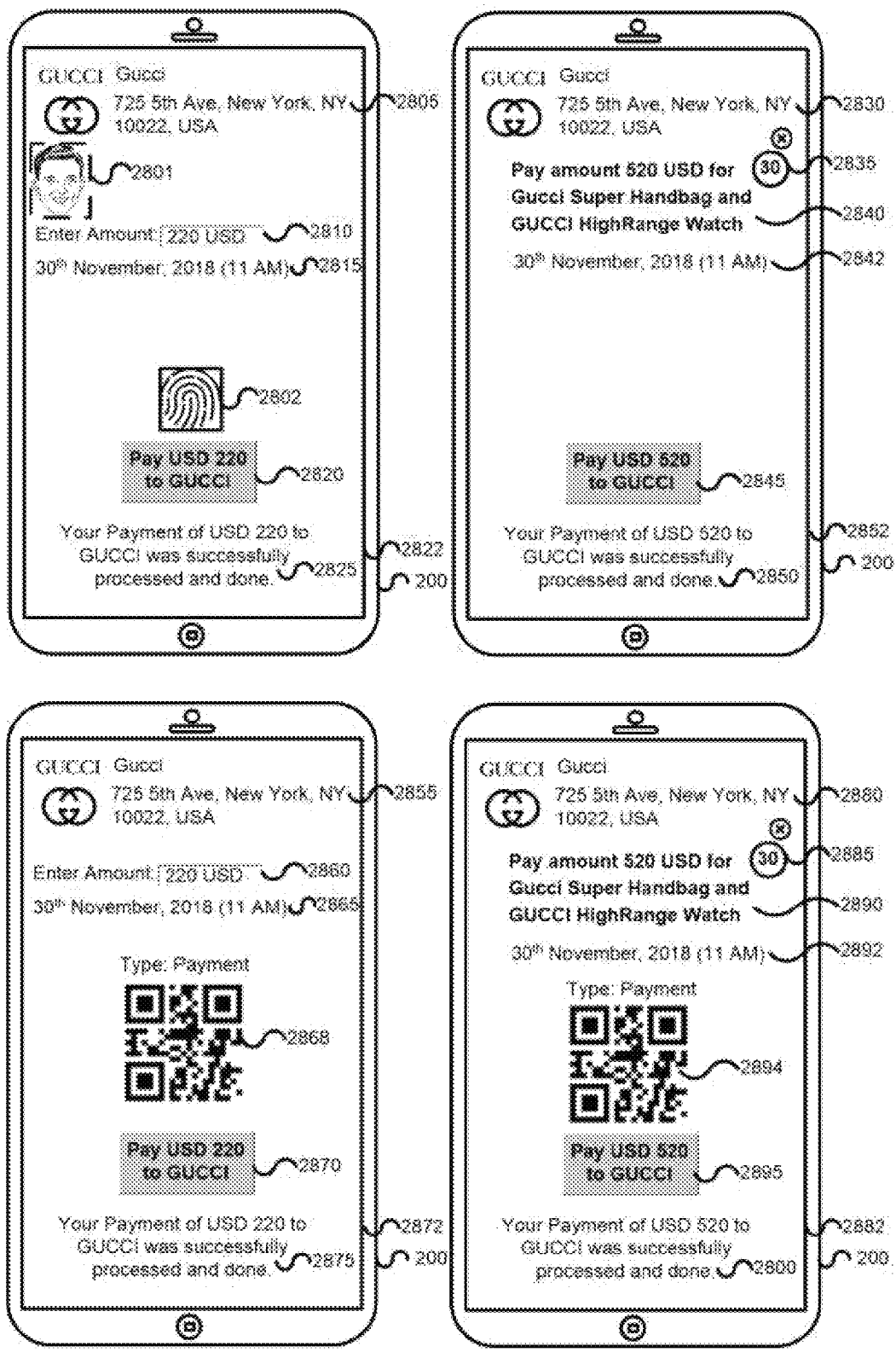
Figure 29:
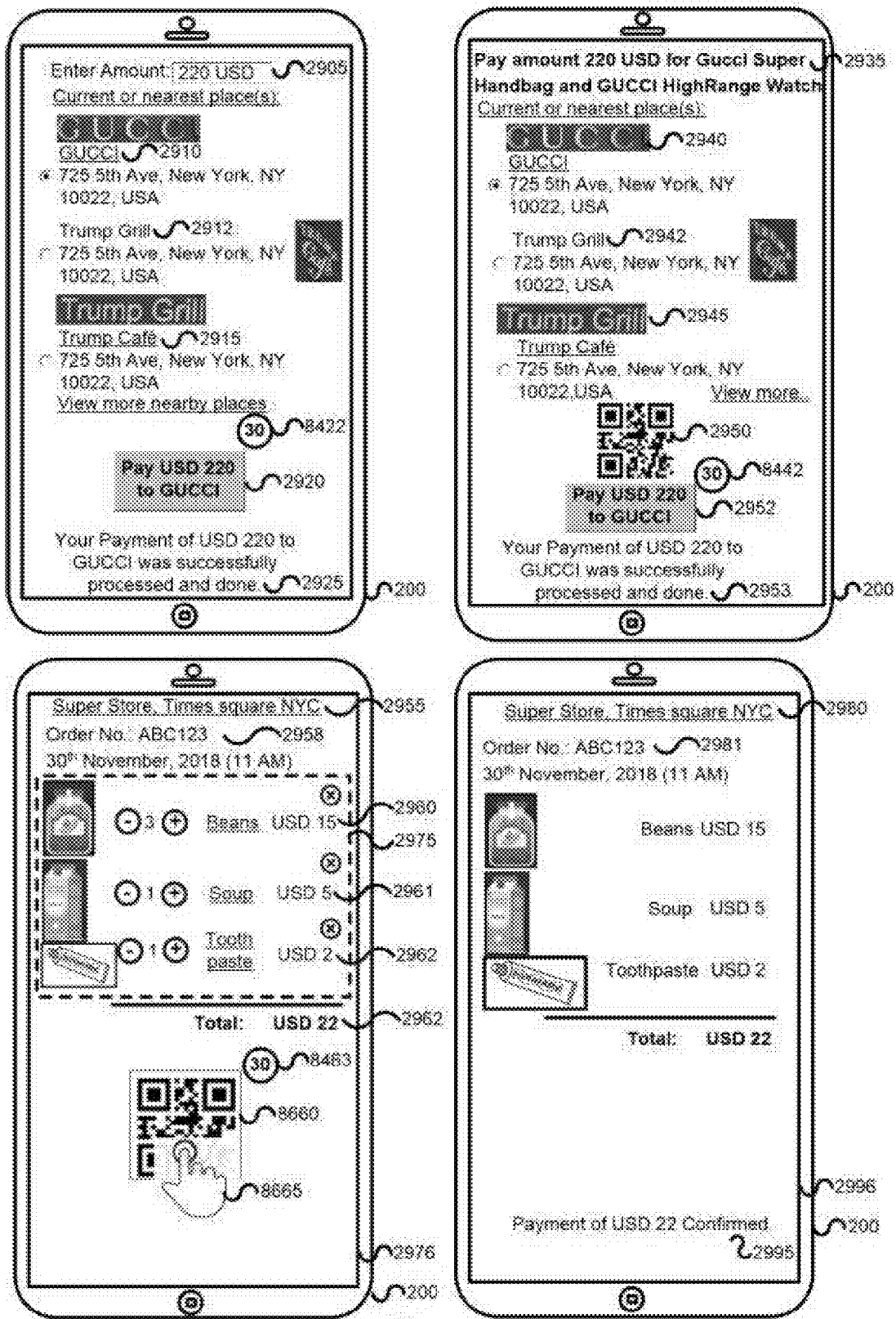
Figure 30:
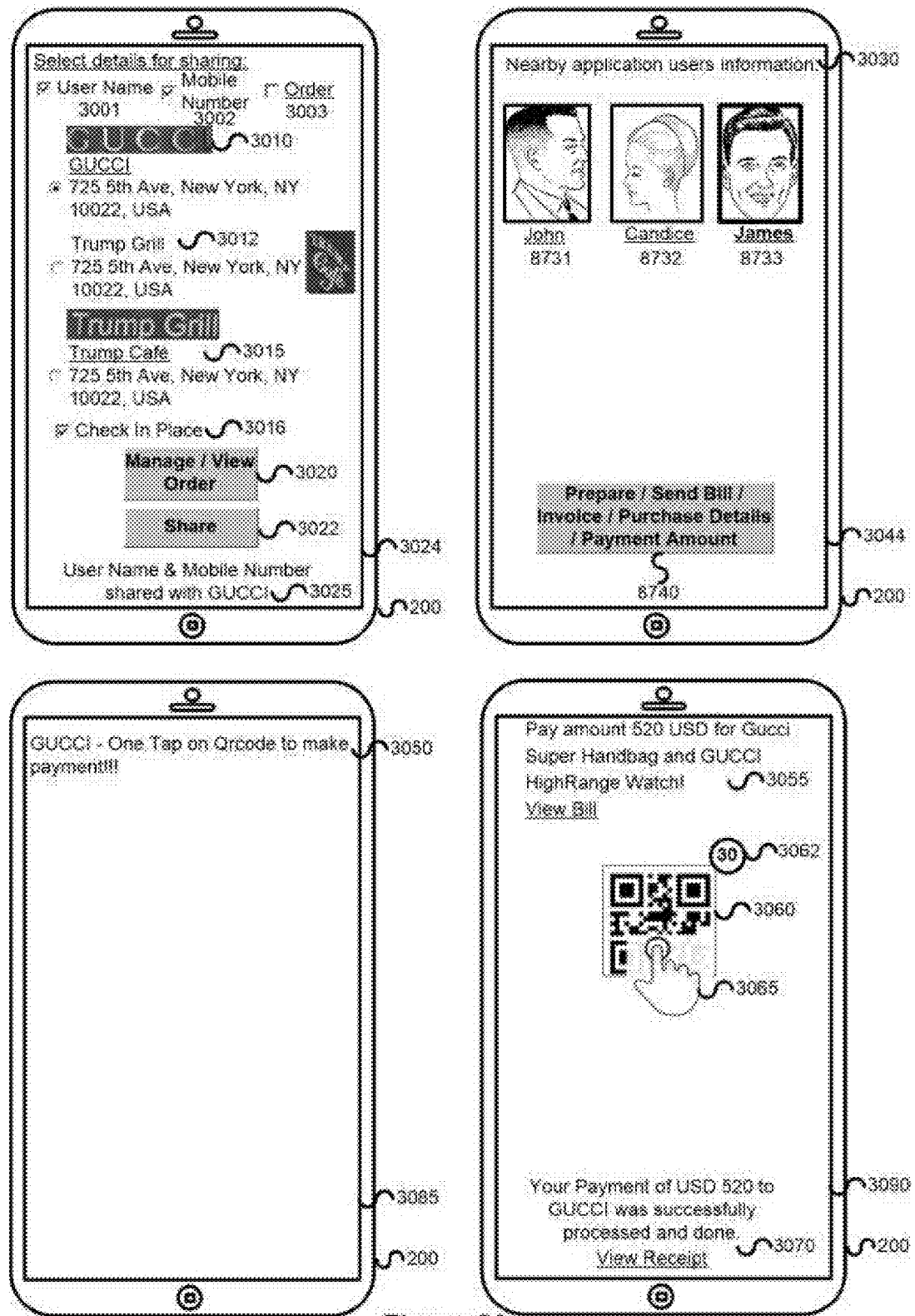
Figure 31:
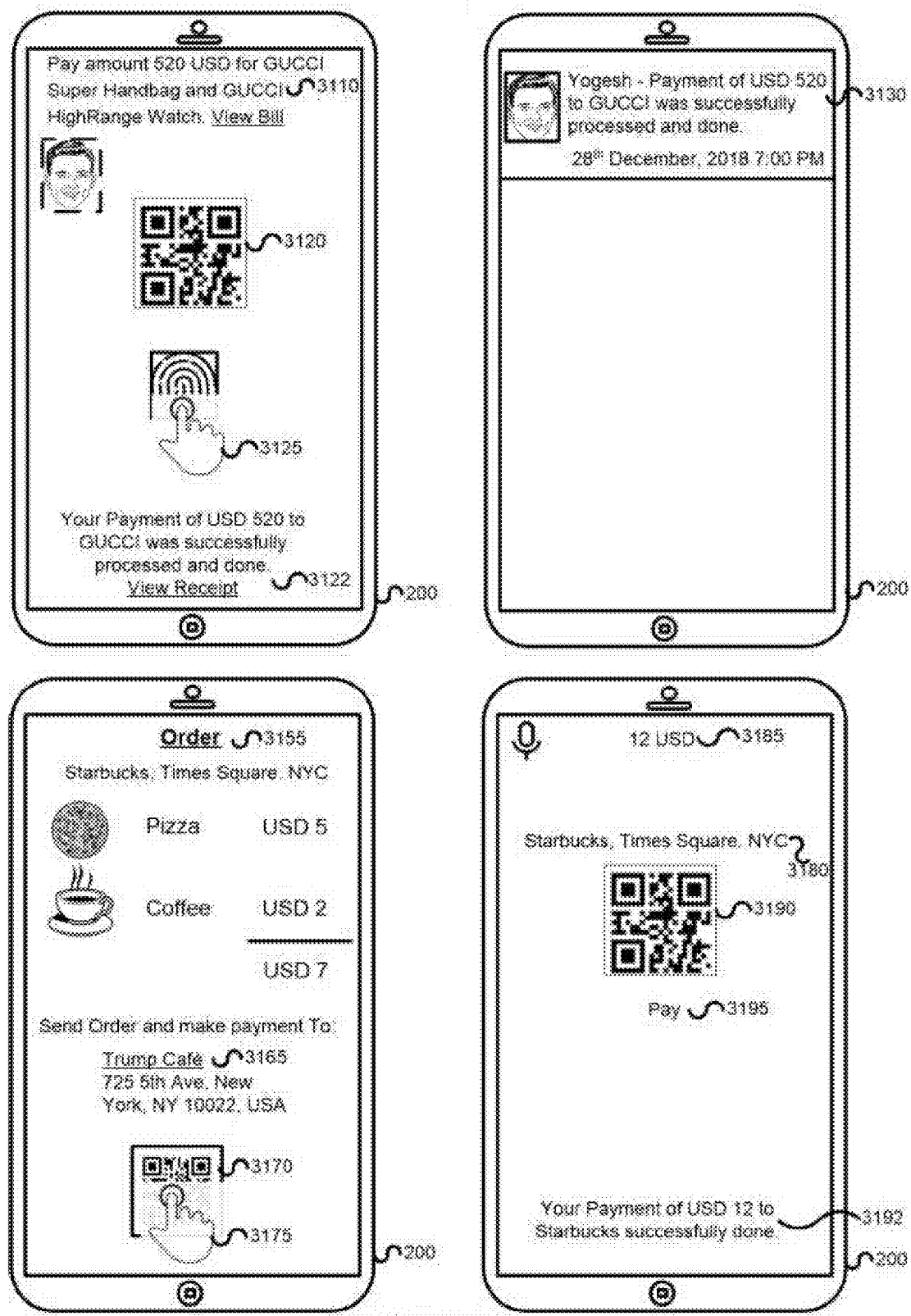
Figure 32:
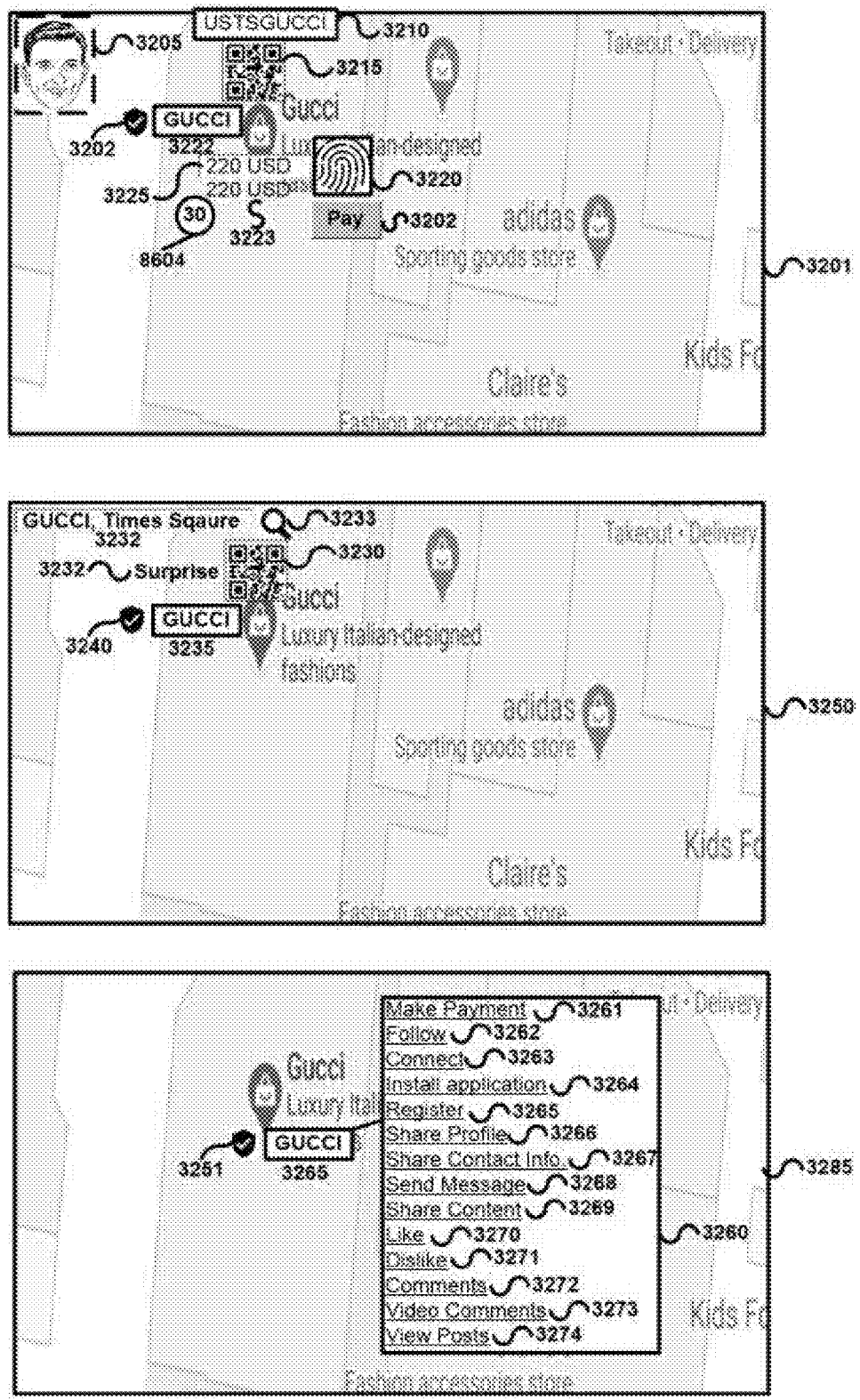

FIGS. 32-35 illustrates various examples and Graphical User Interface (GUI) for enabling user to view current location or checked in place or location or user surround locations or places or nearby places or notified location or place or searched locations or places associated QR codes and one or more types of actions, call-to-actions, reactions and survey controls (location or place specific QR code and/or selected customized controls publication discussed in detail in FIGS. 26-27) on digital map or one or more types of Graphical User Interface (GUI) or view user related or user specific or use associated or user's current identified or provided or determined activity or status or task or transaction or triggered particular event or detecting user's face based on face detection techniques or executing of particular or one or more rules or conducting of augmented reality scanning of particular object, design or code or mark or target criteria specific advertised or current date and time associated one or more calendar entries specific or conducted call-to-action specific one or more types of one or more QR codes and/or one or more types of actions, call-to-actions, reactions and survey controls from current location or checked in place or location or user surround locations or places or nearby places or notified location or place or searched locations or places associated one or more types of one or more or set of QR codes and/or one or more types of actions, call-to-actions, reactions and survey controls (location or place specific QR code and/or selected customized controls publication discussed in detail in FIGS. 26-27) on digital map or one or more types of Graphical User Interface (GUI).

In an embodiment in the event of visiting of particular shop (for example "GUCCI" shop at Times Square, 725 5$^{th}$ Avenue 3222), server module 154, identifies monitored and tracked said user device location associate place and identifies said identified place associated one or more types of one or more QR codes and associated Graphical User Interface (GUI), short location identification code 3210 and displaying on map graphical user interface (GUI) 3201 or one or more types of Graphical User Interface (GUI) 3201, said identified one or more QR codes 3215, for example displaying payment QR code 3215 for enabling viewing user or logged in user to enter amount 3225 and apply one or more types of gesture including single tap on QR code 3215 or place name 3222 or finger print control 3220 or button 3202 to make payment of said entered amount 3225. In the event of entering amount and applying one or more types of gesture including single tap on QR code 3215 or place name 3222 or finger print control 3220 or button 3202, automatically transferring said entered amount 3225 from logged-in user's account to said displayed QR code 3215 associated merchant's account. In an embodiment after entering amount 3225 and not editing or updating amount in text box for pre-set duration, automatically start timer and display countdown 3004 and in the event of expiration of said timer, automatically transferring said entered amount 3225 from logged-in user's account to said displayed QR code 3215 associated merchant's account.

In an embodiment authorized user or logged in user or administrator or publisher or sponsor can generates 2747 particular selected type 2722 of QR code 2705 for particular user or particular type of user or particular criteria specific users 2746 of network and associate with place of business including pre-defined or drawn geofence boundary 2670, marked or selected place on map 2610/2651, address 2636, and geo-coordinates 2638 and provides current 2650 or schedules 2648 of availability of said location or place or pre-defined go-fence associated one or more types of QR codes (for example customize "Surprise" 2722 QR code 2705 by associating one or more coupons, vouchers, offers and like) and publish said customized particular type of QR code. After publishing of said QR code, in the event of searching 3233 of place or location (for example "GUCCI, Times Square" 3232) from map 3250, server module 154 receives said query 3232 from identified or logged in searching user, displays searched location or place 3235 and displays associated QR code 3230 including "Surprise" QR code on or beside map location 3235 or prominent place on map 3250 and in the event of applying one or more type of gestures including single tap on said displayed QR code 3230, display or provide or enable to claim or save or store or bookmark one or more types of vouchers, coupons, promo code or promotional code, and offer associated with said QR code specific to searching or viewing user. In an embodiment in the event of visiting of said place 3235 by user, server module 154 identifies said place 3235 based on monitored and tacked current location of user device and display said saved or stored or bookmarked QR code or associated one or more types of vouchers, coupons, promo code or promotional code, and offer and redeem said one or more types of vouchers, coupons, promo code or promotional code, and offer while purchasing or ordering or making payment.

In an embodiment in the event of visiting of particular shop (for example "GUCCI" shop at Times Square, 725 5$^{th}$ Avenue 3265), server module 154, identifies monitored and tracked said user device location associate place and identifies said identified place associated one or more types of actions, call-to-actions, reactions and survey controls and associated Graphical User Interface (GUI) 8860 and displaying on map 3285. In an embodiment displaying on map 3285, one or more types of Graphical User Interface (GUIs) associated with said identified one or more types of actions, call-to-actions, reactions and survey controls 3260. For example user can click or tap on "Make Payment" to enter or make provided amount payment from user's account to said place 3265 associated merchant's account, click or tap on "Follow" to follow said place 3265 associated account or page or profile, click or tap on "Connect" 3263 to establish communication between user and said place 3265 associated user or account to share contact information, profile, contents and exchanges messages, click or tap on "Install application" 3264 to install said place 3265 associated application a per device type including android, iOS and windows, click or tap on "Register" 3265 to register user as member or subscriber or authorized user and provide contact details, click or tap on "Share Profile" 3266 to share user's profile with said place 3265 associated admin or user or account, click or tap on "Share Contact Info." 3267 to share user's contact information including user name, location, phone number, e-mail address, click or tap on "Send Message" to send message to said place 3265 associated admin or user or account, click or tap on "Share Content" to share stories, videos, posts, messages, photos, videos, microblog, location and links or web addresses, click or tap on "Like" 3270 to like or "Dislike" 3271 to dislike or provide comments 3272 or video reviews or stories 3273 to/on said place 3265 or place 3265 associated selected one or more products or staff persons or purchased products from list of purchased products by user from said place 3265, and click or tap on "View Posts" to view posts posted by authorized person or admin or user associated with of said place 3265.

In an embodiment in the event of visiting of particular shop (for example "GUCCI" shop at Times Square, 725 5$^{th}$ Avenue 3265), server module 154, identifies monitored and tracked said user device location associate place and identifies said identified place associated one or more types of actions, call-to-actions, reactions and survey controls and associated Graphical User Interface (GUI) and send notification or push notification on user device 200 and in the event of tap or click on said notification, displaying on map graphical user interface 3285 or one or more types of Graphical User Interface (GUI), said identified one or more types of actions, call-to-actions, reactions and survey controls 3260.

In an embodiment in the event of visiting of particular shop (for example "GUCCI" shop at Times Square, 725 5$^{th}$ Avenue 3265), server module 154, identifies monitored and tracked said user device location associate place and identifies said identified place associated one or more types of actions, call-to-actions, reactions and survey controls and associated Graphical User Interface (GUI) and displaying on map 3285 or one or more types of Graphical User Interface (GUI), said identified one or more types of actions, call-to-actions, reactions and survey controls 3260 and in the event of exiting from place or visiting other place or exiting from pre-defined geofence boundary then hide said displayed one or more types of actions, call-to-actions, reactions and survey controls and associated Graphical User Interface (GUI) from map and display currently visited place or location or geofence associated one or more types of actions, call-to-actions, reactions and survey controls and associated Graphical User Interface (GUI).

Figure 33:
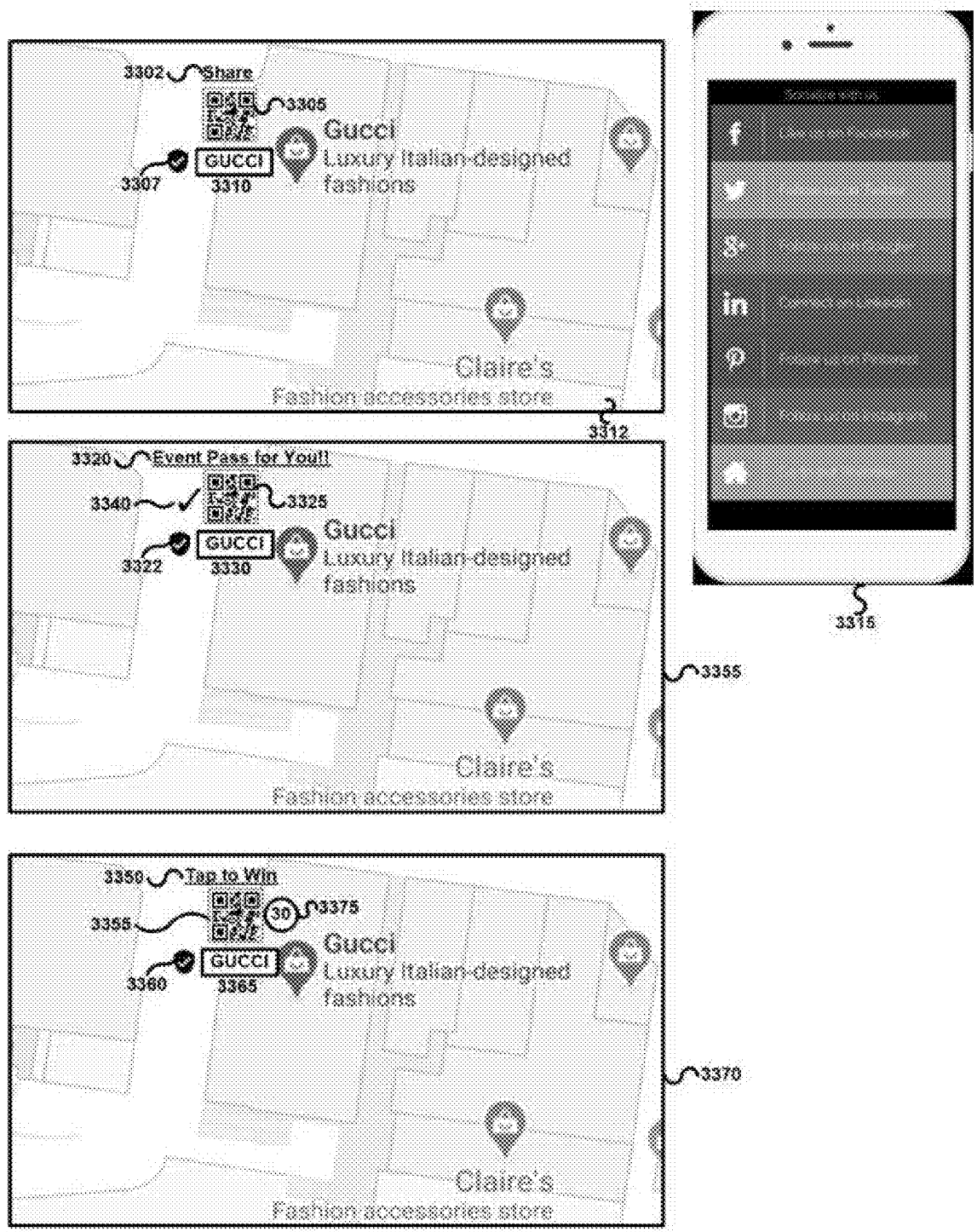
Figure 34:
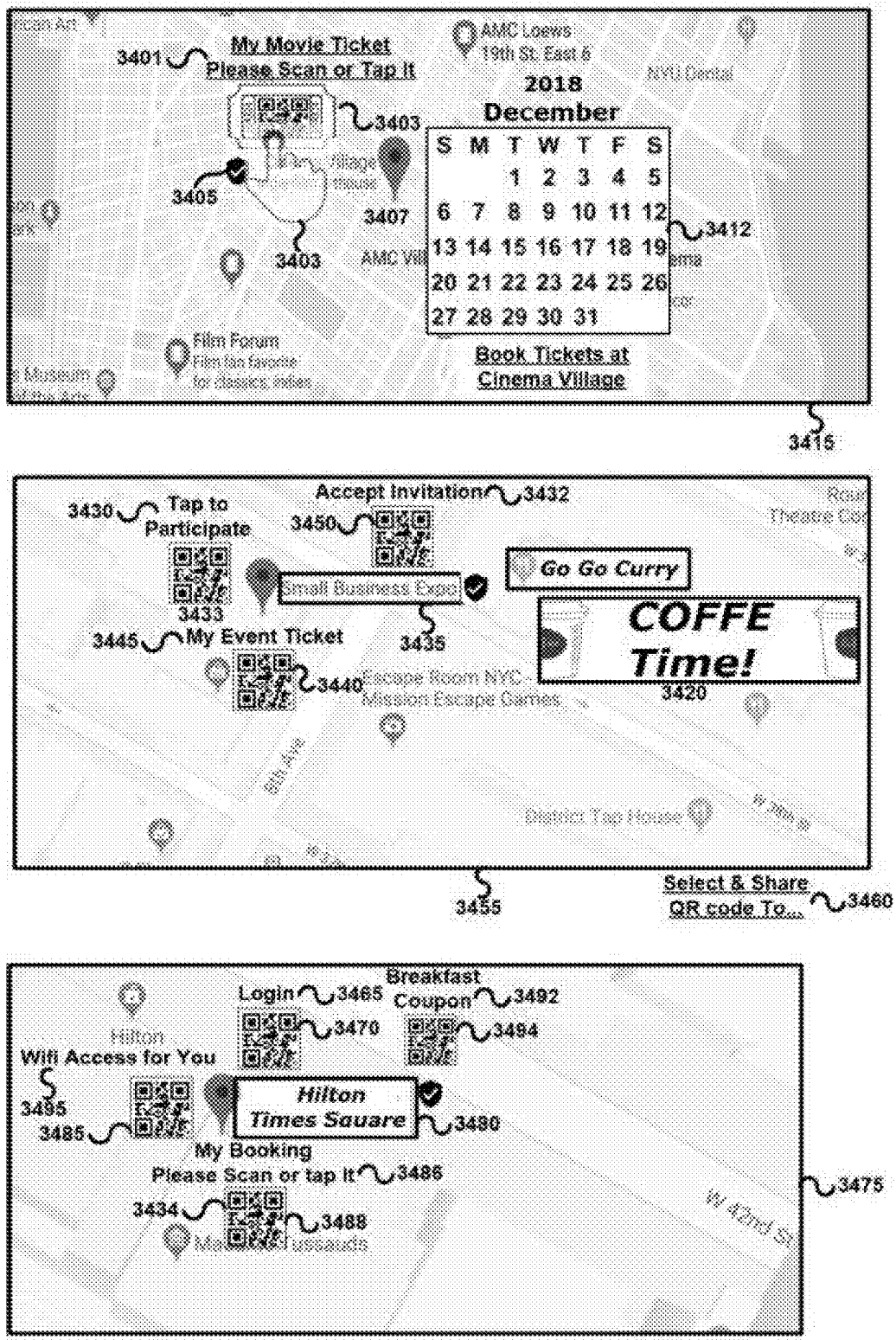
Figure 35:
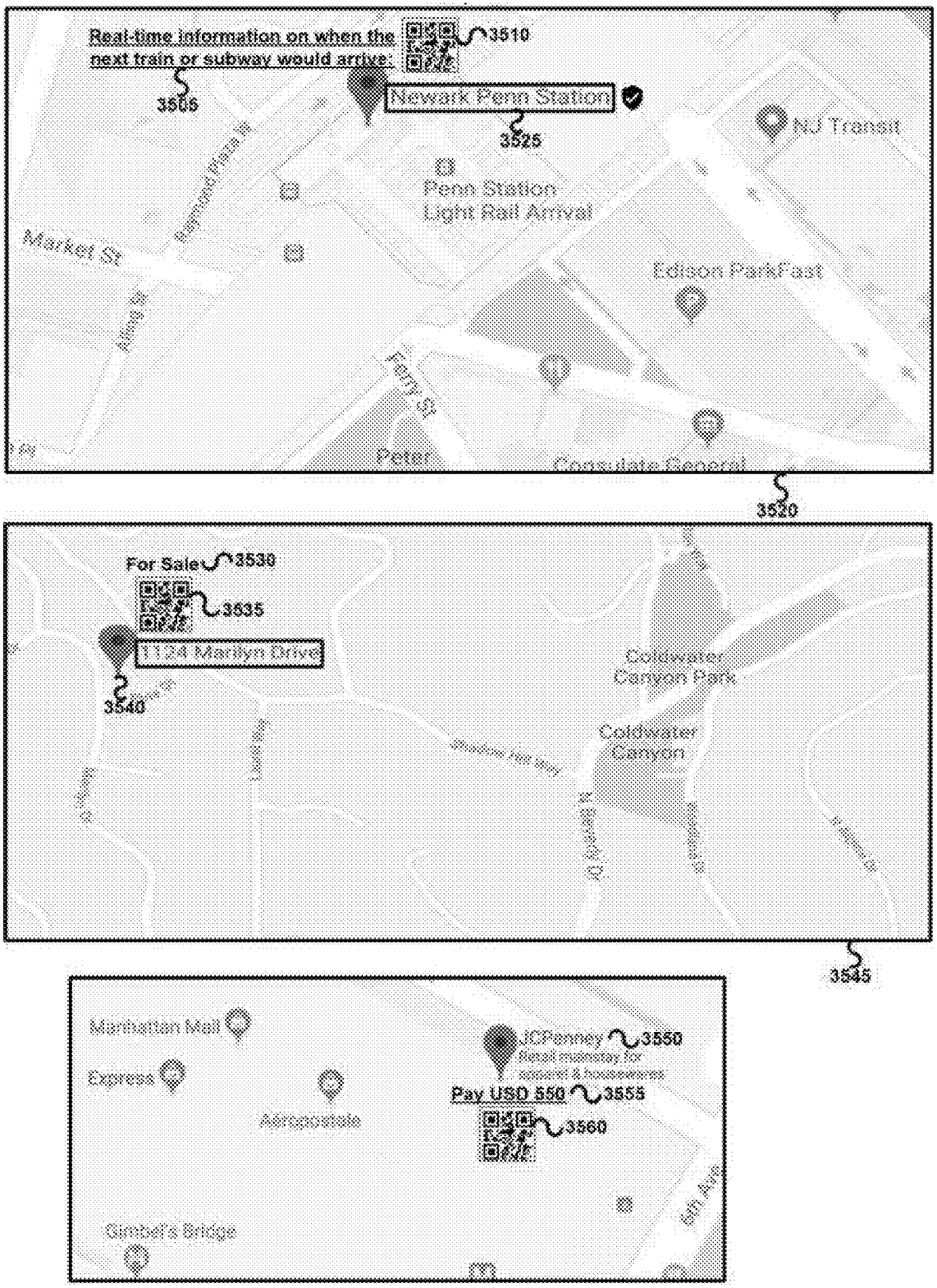

FIG. 33 illustrates map graphical user interface (GUI) wherein sponsor or publisher or user can publish one or more code inducing QR codes related to place of business or particular location or place or address or geo-coordinates or geofence for all users of network or for selected one or more users of network. For example, publisher publishes "Share" type 3302 QR code 3305 which contains all links of accounts of social networks 3315 in all places of business (for example all shops of "GUCCI" in world) on map 3312. So, location or place or address searching user of any shops of "GUCCI" 3310 can view said "Share" type 3302 QR code 3305 and can click on said "Share" type 3302 QR code 3305 to view all links of "GCCI" accounts of social networks 3315 for enabling accessing user to view profile page or page of "GCCI" on various social networks 3315. In an embodiment user ca re-share said "Share" type 3302 QR code 3305 to any other users via one or more sharing applications and services.

In another example sponsor or place of business 3330 can provide event pass 3320 in the form of QR code 3325 on map to selected users of network including frequent customers, particular location specific customers. Receiving user can visit event place and show said QR code 3325 displayed on user account's related map interface 8755 while entry at event place. Person at entry of event gate or at the time of check in at event place can apply one or more types of gesture including single tap or long press on said QR code to identify actual ticket holder, wherein in the event of applying one or more types of pre-defined gestures on QR code, match said QR code associated identified or decoded unique code with list of sold tickets related unique codes and identify actual ticket holder to allow user to enter in event place and associate and store particular type of flag with said ticket to mark said ticket as checked in 3340. In an embodiment user can apply one or more types of pre-defined gestures including single tap on QR code at the time of check in at event place. In the event of applying one or more types of pre-defined gestures including single tap on QR code at the time of check in at event place server module 154 receives QR code associated decoded unique ticket code and mobile phone number and monitored and track current location of user device and matches said decoded unique ticket code with sold ticket numbers and identify said unique code specific ticket and matches said received mobile phone number with said identified ticket associated mobile number and matches said received location information with location of event and associate and store particular type of flag with said ticket to mark said ticket as checked in 3340 to enables self-check in at event place. So present invention enables self-check in at event places, movie theater, exhibitions, tours, travels, restaurants, fair, functions, boat, bus, train, sports events or stadium and shows. In an embodiment displayed booked ticket associated QR code on map associated with user device installed application based on user provided mobile phone number at the time of booking and linking or attaching or integrating encrypted unique short link with each dynamic QR code for preventing copying, distributing and misusing QR code. In an embodiment automatically show current place based on monitored and tracked current location of user device and show associated QR codes on map. In an embodiment automatically show place having associated one or more QR codes for user based on monitored and tracked current location of user device.

In an embodiment enabling sponsor or advertise or particular place of business to create or generate or customize offer QR cod, provide target criteria, set life duration of QR code and publish said QR code. Server module 154 receives said QR code and display to target criteria specific users of network and initiate timer, start timer, display countdown 3375 and in the event of expiration of timer associated with said QR code based on pe-set life duration, remove or hide or disable said displayed QR code 3355 from graphical user interface (GUI) 3370 of receiving user of said QR code 3355.

In an embodiment user can search or select particular place on map (for example particular movie theater at particular location) and book particular number of movie tickets of particular movie at particular date and time or show and select particular number of seats by using said location or place associated ticket booking application or menu item or control including ticket booking button, wherein enabling place associated authorized person or admin or owner or seller or event organizer to associate one or more controls including ticket booking application or menu item or control including ticket booking button. In the event of booking particular number of tickets of particular movie at particular date and time or show related to particular place, server module 154 generates ticket and QR code 3403 and display said generates ticket and QR code 3403 at graphical user interface (GUI) 3415. When user visit said place then automatically pointing location 3407 of said place on map and displaying place associated tickets and QR code and enabling user to apply one or more types of pre-defined gestures including single tap 3403 on ticket or QR code or provide pre-defined voice commands to self-check in as discussed above.

In an embodiment displaying place specific QR codes to related users of network, wherein QR codes comprises one or more types of call to actions including display QR code which comprises name, date and time of particular exhibition at particular place, organizer name, exhibition details and enable to accept invitation 3450 to attend or participate 3430 said scheduled date and time associated particular exhibition at particular place 3435 or display provided free ticket in the form of QR code 3440 to selected users of network. In an embodiment enabling user to re-share one or more allowed to re-share QR codes 3460 to other users of network on their map 3455.

In another embodiment in the event of booking room at particular hotel situated at particular location, automatically generating hotel room booking QR code and associating with said location of hotel and display to said user who has booked room and at the time of visiting at said hotel displaying on map said visited place (for example said hotel) associated QR code 3488 and enable to apply one or more types of gestures including single tap on said displayed QR code to automatically check in room and collect room key at said place and after check in automatically generate QR code 3485 for wi-fi access and display said QR code on said place associated place for enabling user to tap on QR code to automatically login to access Wi-Fi service. In an embodiment at the time of registration or based on provided login information generating and displaying login QR code 3470 on location or place 3480 on map 3475 and enable to apply one or more types of gestures including single tap on said displayed QR code to automatically login and redirect to particular website or web page or access web site, web page associated with said location associated place or place of business 3480.

In an embodiment enabling authorized publisher to provide real-time updated information on map related to particular location on map, wherein information comprises news, new products details, posts, photos, videos, offers including sale, and discount, when the next train would arrive 3505, group deals, custom offers for particular user, microblog, real-time provided reactions, today's menu, today's event or show, real time offers including tap to win or scratch to win within pre-set duration. In an embodiment user can view on particular place or location or geofence on map associated one or more types of information, content. Data, logged activities, transactions, participations and status including current or past booked tickets, booked appointments, orders, offers for user, purchased products and services details, notes, bills or invoices, QR codes, calendar and schedules of meetings, provided reactions by user, posted photos or videos by user, associated task, status provided by user.

In an embodiment enabling merchant presentation of QR code 3560 on map of location of place of business of merchant 3550 to enable user to view payment amount, bill or invoice 3555 and with one tap on dynamic QR code 3560, make payment from user's account to said displayed QR code associated identified merchant account.

In an embodiment enabling user to selects check in place from list of location and then based on check in place by user, share user's mobile number with said check in place associated authorized user based on user's permission for enabling them to provide or push bill or invoice or payment amount for ordered products or consumes service and display said check in place associated QR code for identifying mobile number for sending order and automatically scanning said QR code to make payment from user's account to said QR code associated merchant's account.

In an embodiment in the event of enter into particular place of business or geofence or stay for pre-set duration or open application then automatically show said place or location associated QR code or allow to access merchant account information from serve for enabling user to make payment from user's account to QR code associated merchant's account or access from server said named or branded or place or location specific merchant's account information for making payment.

In an embodiment in the event of enter into particular place of business where products or services are available for purchase or geofence or stay for pre-set duration or frequently visited and place where user purchases frequently or open application then automatically send push notification and enabling to view and share mobile number for sharing order, bill, invoice and displaying said visited place specific one or more types of QR code including payment QR code for making user entered or provided bill or invoice or payment amount specific payment from user's account to said QR code associated merchant's account.

In an embodiment identifying proximity between the GPS or Bluetooth or near field communication (NFC) signals i.e. monitored and tracked location of mobile devices of merchant and one or more visitors or prospective customers who entered into place of business and enable them to share mobile numbers with each other (with permission) for sharing order, bill, invoice and displaying said visited place specific one or more types of QR code including payment QR code for making user entered or provided bill or invoice or payment amount specific payment from user's account to said QR code associated merchant's account.

In an embodiment attach or associate or integrate or embed short link or web address with QR code and in the event of applying one or more types of gestures including tap on said QR code, automatically open said attached or associated or integrated or embedded short link or web address associated web site or web page or web service or automatically execute said attached or associated or integrated or embedded short link or web address associated one or more functions and use said QR code associated data or automatically scan said QR code and execute associated one or more functions.

Figure 36:
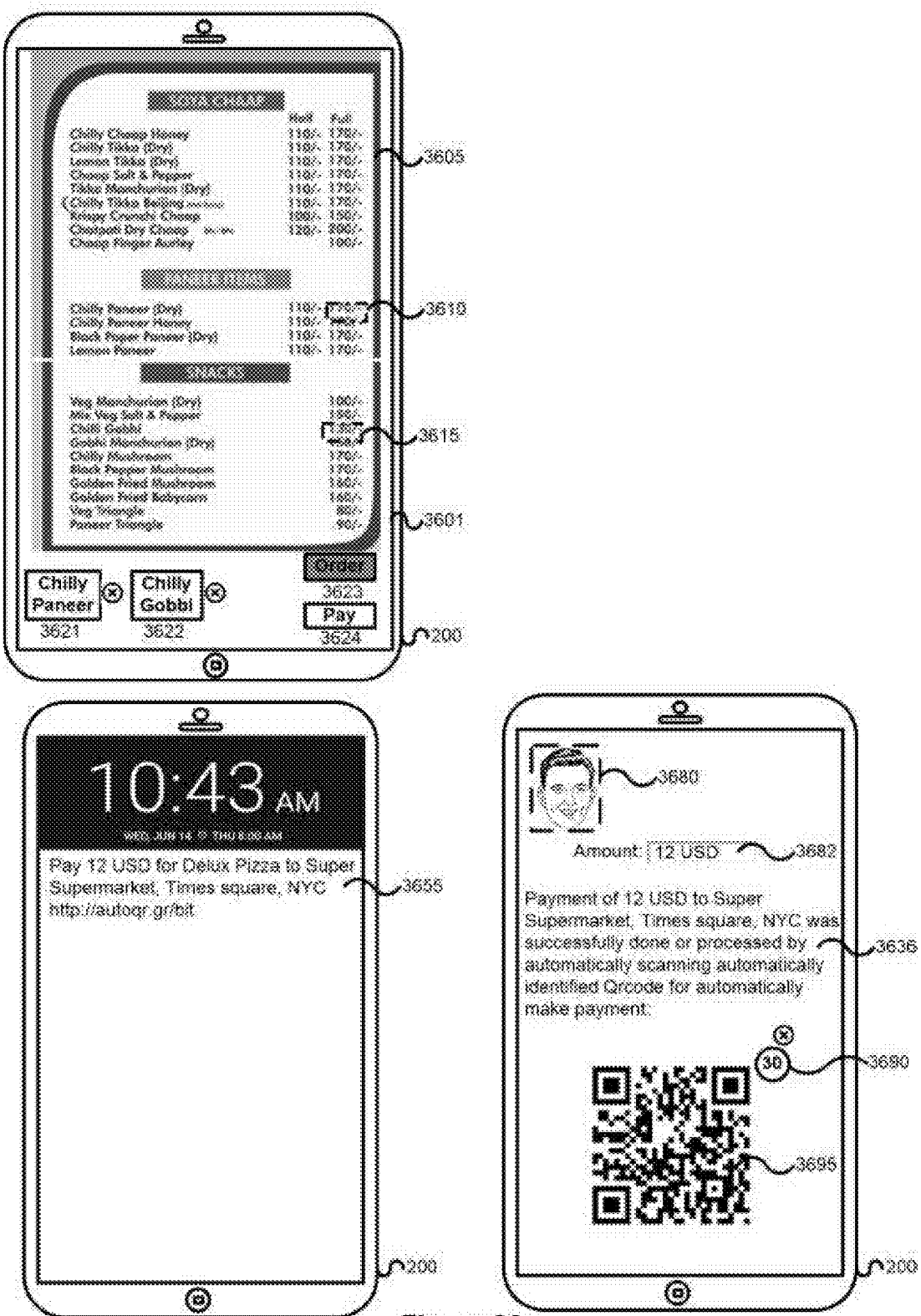

FIG. 36 illustrates in an embodiment in the event of entering or staying at particular place or location or geofence or select and check in particular place by user, identifying said place associated phone number and payment QR code. Use can view menu 3605 provided or associated with said place by using augmented reality system or application 3601 and can select particular menu item 3610/3615 from menu 3605 and in the event of tapping on order button 3623, automatically identify selected or ordered menu item names 3621/3622 and associated price based on optical character recognition (OCR) and automatically prepare message and send to said place associated mobile number associated user and make payment for said order from user's account to said place associated QR code associated merchant's account.

In an embodiment user can receive ordered products associated payment amount and short link or web address via short message service (SMS) or push notification 3655 and in the event of tapping on notification view provided amount or enter amount 3682 and tap on QR code 3695 to make payment by transferring said amount 3655 from user's account to said short link or web address associated QR code 3695 associated merchant's account or initiate and start timer associated with QR code 3695, display countdown 3690 and in the event of expiration of said timer make automatically payment by transferring said amount 3682 from user's account to said short link or web address associated QR code 3695 associated merchant's account. In an embodiment enabling user to apply one or more types of gestures including single tap anywhere on screen or on QR code 3695 or on particular region on screen to pause or restart timer or stop or cancel payment transaction.

Figure 37:
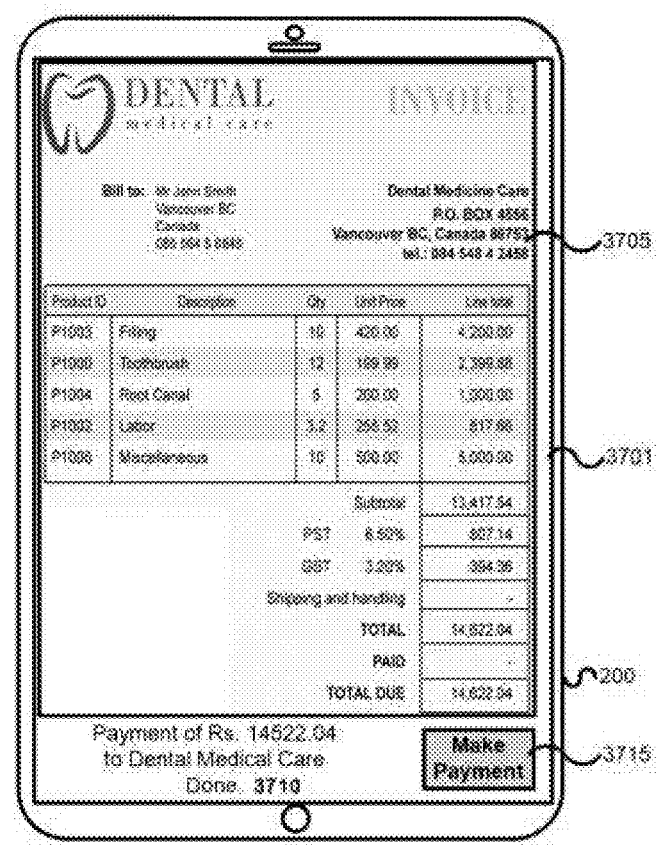
Figure 37:
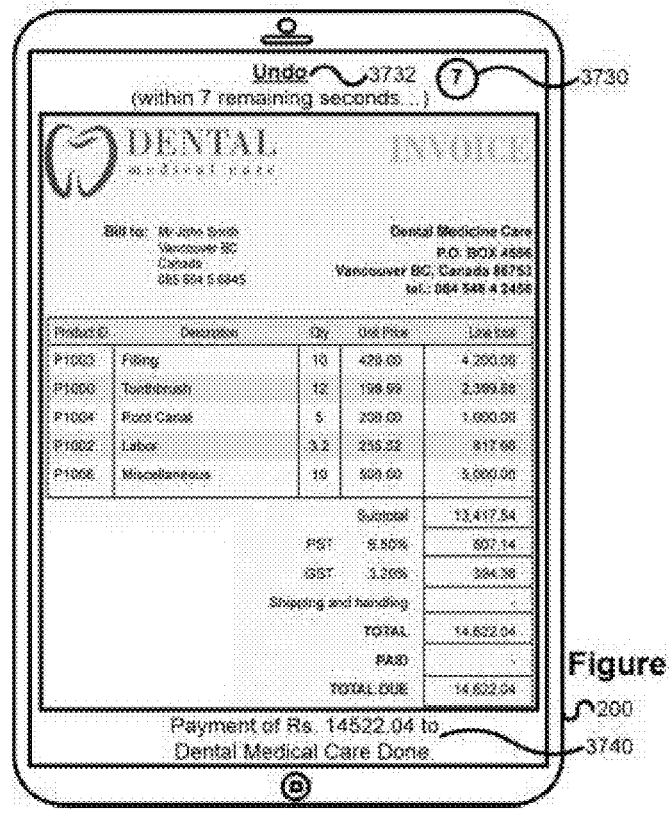

FIG. 37 illustrates in the event of scanning or viewing particular invoice or bill 3705 from augmented reality system or application 3701, automatically identify and display merchant account details based on recognizing and identifying location of place of business, address, logo, name, unique identity on bill or invoice based on object recognition and optical character recognition (OC) techniques enabling to make payment 3715 of billed or invoice amount or recognized amount 3710 from scanned user device's account to said bill or invoice associated unique merchant account details. In an embodiment user can un-do 3732 said payment made within pre-set duration 3730 and after expiration of said period providing payment confirmation message 3740.

Figure 38:
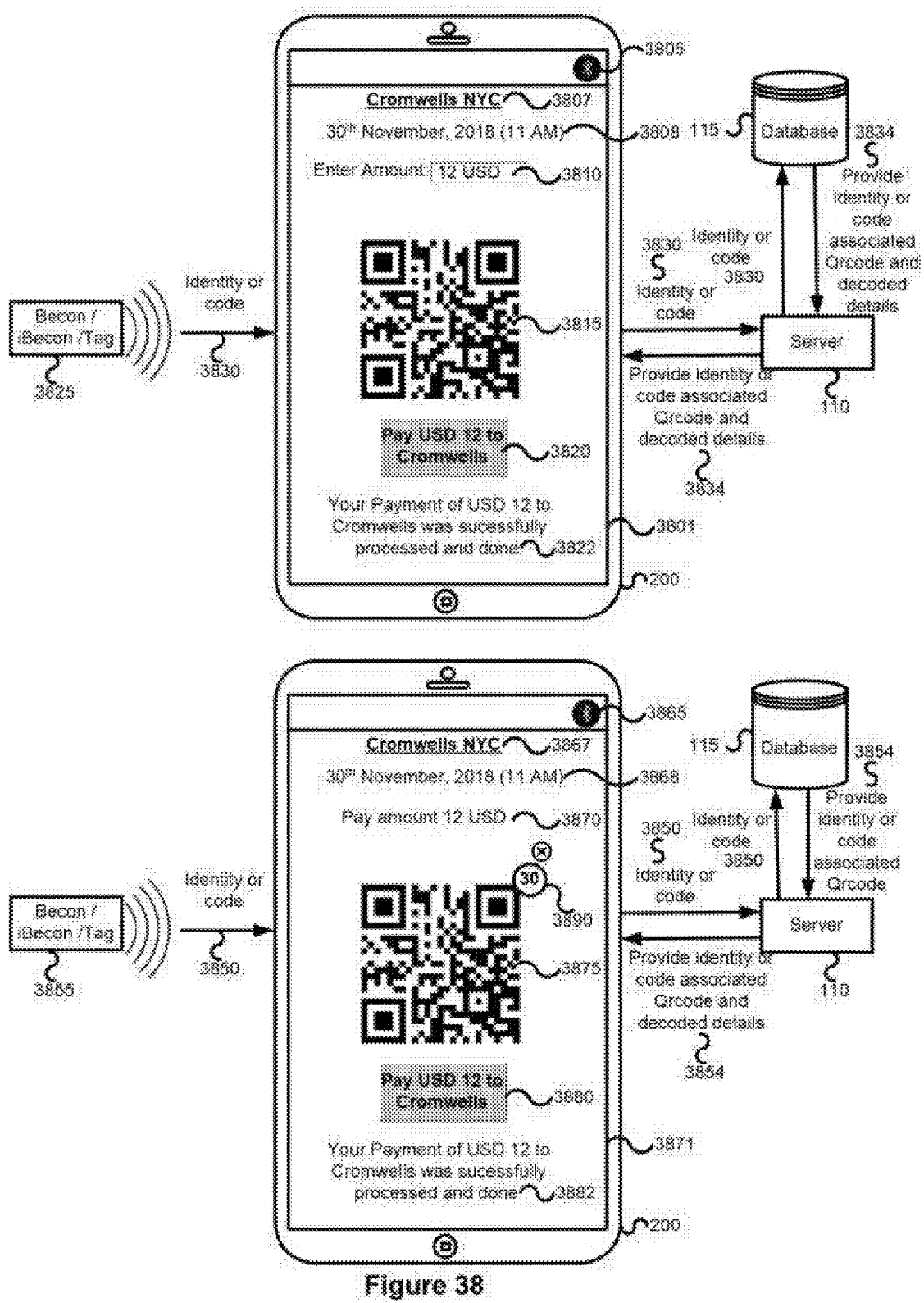

FIG. 38 illustrates in an embodiment in the event of receiving by user device 200 application 3801, unique code or identity 3830 from nearest beacon or iBeacon or one or more types of tags 3825, sending by the user device 200 application 3801, said received unique code or identity 3830 from nearest beacon or iBeacon or one or more types of tags 3825 to server module 154 of server 110. Server module 154 identifies said received unique code or identity 3830 associated QR code 3815 or identifies unique code or identity 3830 associated merchant name, brand, shop name, logo, address from server database 115 and sending to user device 200 application 3801 and display QR code 3815 and merchant name, brand, shop name, logo, address 3807 on graphical user interface (GUI) of application 3801. User can enter amount 3810 and can tap on payment button 3820. In the event of tapping on payment button 3820, server module 154 retrieves and decode encrypted information in QR code 3815 including merchant account details including and transfer said amount 3810 from identified user's account to said identified merchant's account and in the event of successful transfer of said amount, display message 3822. In an embodiment server module 154 identifies said received unique code or identity 3830 associated merchant name, brand, shop name, logo, address from server database 115 and sending to user device 200 application 3801 and display QR code 3815 and merchant name, brand, shop name, logo, address 3807 on graphical user interface (GUI) of application 3801. User can enter amount 3810 and can tap on payment button 3820. In the event of tapping on payment button 3820, server module 154 retrieves or retrieves and decrypt or decode said received unique code or identity 3830 associated merchant account details including and transfer said amount 3810 from identified user's account to said identified merchant's account and in the event of successful transfer of said amount, display message 3822.

In an embodiment in the event of receiving by user device 200 application 3871, unique code or identity 3850 from nearest beacon or iBeacon or one or more types of tags 3855, sending by the user device 200 application 3871, said received unique code or identity 3870 from nearest beacon or iBeacon or one or more types of tags 3875 to server module 154 of server 110. Server module 154 identifies said received unique code or identity 3850 associated QR code 3875 or identifies unique code or identity 3850 associated merchant name, brand, shop name, logo, address from server database 115 and sending to user device 200 application 3871 and display QR code 3875 and merchant name, brand, shop name, logo, address 3867 on graphical user interface (GUI) of application 3871. In an embodiment merchant identifies user device 200 and send bill or invoice or payment amount 3870. In the event of tapping on payment button 3880, server module 154 retrieves and decode encrypted information in QR code 3875 including merchant account details including and transfer said billed or invoice associated or provided or pushed payment amount 3870 from identified user's account to said identified merchant's account and in the event of successful transfer of said amount, display message 3882. In an embodiment server module 154 identifies said received unique code or identity 3850 associated merchant name, brand, shop name, logo, address from server database 115 and sending to user device 200 application 3871 and display QR code 3875 and merchant name, brand, shop name, logo, address 3867 on graphical user interface (GUI) of application 3871. In an embodiment merchant identifies user device 200 and send bill or invoice or payment amount 3870. In the event of tapping on payment button 3880, server module 154 retrieves or retrieves and decrypt or decode said received unique code or identity 3850 associated merchant account details including and transfer said billed or invoice associated or provided or pushed payment amount 3870 from identified user's account to said identified merchant's account and in the event of successful transfer of said amount, display message 3882. In an embodiment after receiving and displaying said unique code or identity 3850 associated merchant name, brand, shop name, logo, address 3867 on graphical user interface (GUI) of application 3871, automatically initiate timer, start pre-set duration timer, display pre-set duration timer countdown 3890 and in the event of expiration of said pre-set duration timer, automatically make payment by transferring said billed or invoice associated or provided or pushed payment amount 3870 from identified user's account to said identified merchant's account from decrypted or decoded QR code or access from server 110 database 115, so automatically scanning (in background) of automatically identified QR code based on particular type of code received by mobile from beacon and automatically make payment of automatically provided amount of purchase.

Present invention automatically identifying QRcode based on matching unique code received from digital chip including beacon or iBecon or tag with unique code associated QRcode or merchant account details, matching monitored and tracked current location information of user device with QRcode associated location information, recognized pre-defined voice including voice of seller or staff of particular location specific particular place of business based on voice recognition techniques, recognized scanned object or face based on received augmented reality scanned data based on object recognition techniques and optical character recognition techniques and any combination thereof and automatically displaying said automatically identified QRcode, automatically scanning said automatically identified QRcode and based on QR code associated data conducting one or more actions and transactions including display information, make payment. In an embodiment identifying contextual or requirement specific QR code based on user's logged activities, actions, participations, transactions, locations status check in place, communication or messages, location information including geo-fence, geo-coordinates, identification of place of business, voice command issued by merchant or authorized person, object recognition, face recognition of payee or authorized person on behalf of payee. So, there is no need to paste QR codes, no need to install different QR codes scanner applications or readers and no need to find and scan QR codes and it's secure. In an embodiment merchant or seller or service provider need to install only one tag or Beacon or iBeacon with Global Unique ID, Customer needs to turn on Bluetooth and need to in range (for example few centimeters or meters to 10 meters). In an embodiment in server based QR code identification and scanning, there is no need to install any application.

Embodiments of the present disclosure provide systems and methods for location including pre-defined geofence based mobile commerce for both consumers and merchants so that consumers can more easily shop and make purchases through a mobile device. A user location is determined through a user device, where the location information can be used by the merchant and/or a payment provider to identify merchants to the user, identify merchant associated or related one or more types of codes including QR code(s) to retrieve or decode or decrypt payment information to the user for easier user payments, and other location-based services. In one embodiment, merchants have the capability to create an electronic catalogue(s) of products and services, possibly directed to the user, via a communication network, such as via a mobile communication device (e.g., a cell phone) and/or the Internet. The electronic catalogue(s) may be integrated with purchase and payment options (e.g., an online payment processing service) for a user to purchase directly from the user's mobile communication device.

Figure 39:
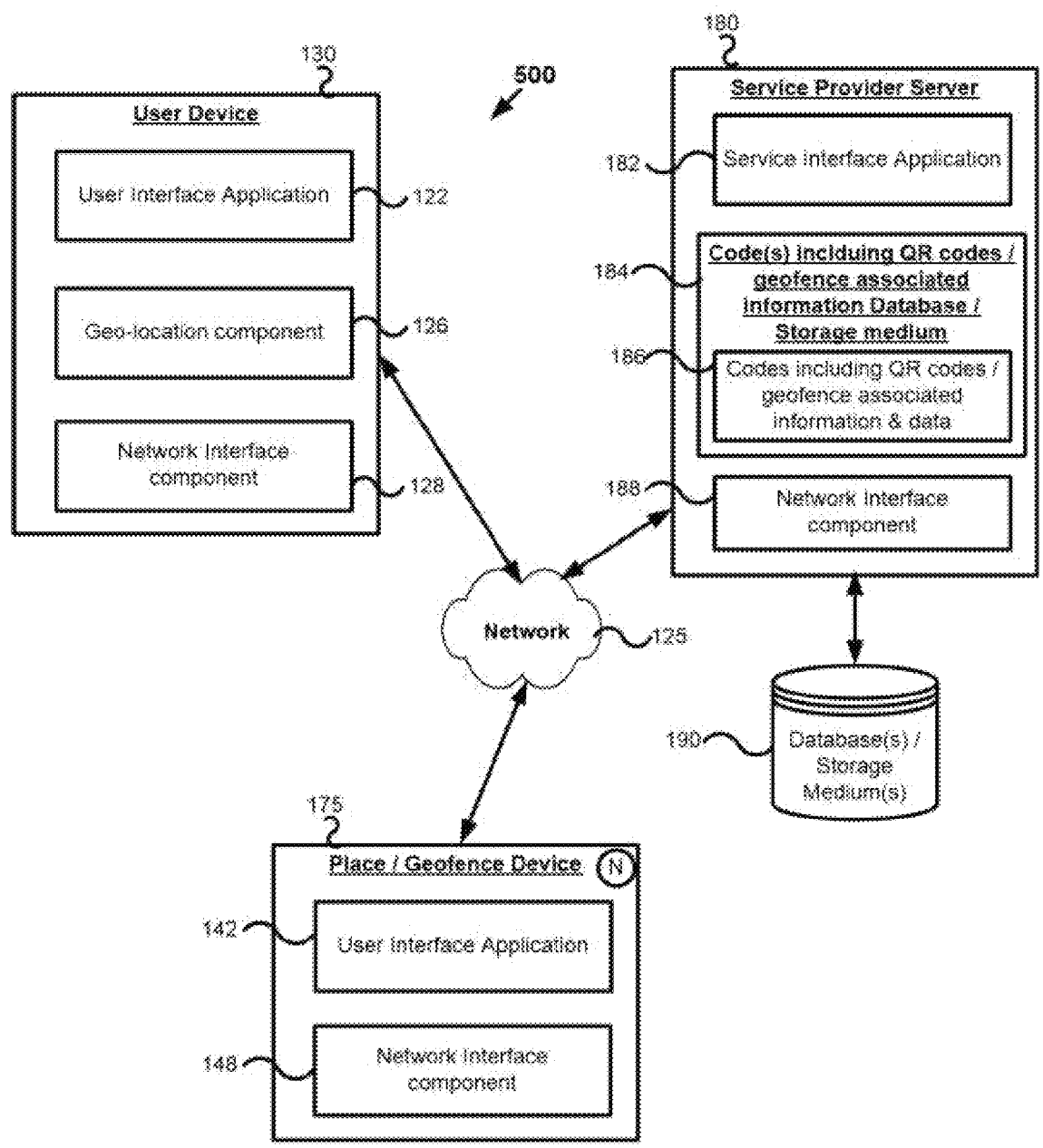
FIG. 39 is a block diagram of a system adapted to facilitate accessing of location based or geofence based one or more types of code(s) including QR code(s) over a network without need to scanning of code or QR code at physical location, according to one embodiment.
Figure 41:
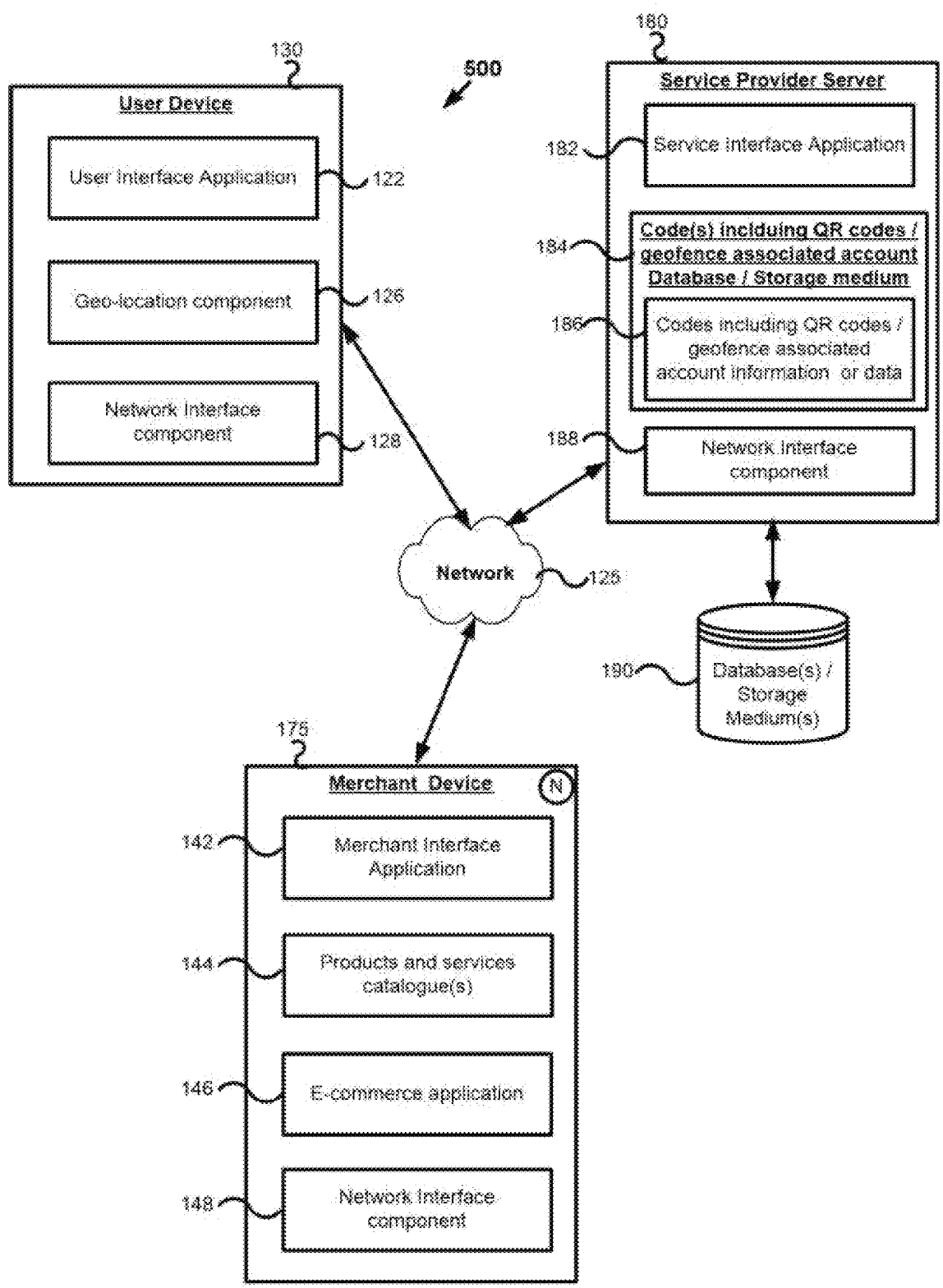
FIG. 41 is a block diagram of a system adapted to facilitate location based and/or geofence based mobile commerce over a network, according to one embodiment.

FIGS. 39 and 41 is block diagram a system 500 for facilitating financial transactions including location or pre-defined geofence based mobile commerce over a network 125, such as the Internet via, e.g., mobile communication networks. System 500 includes a user device 130 (e.g., a client or customer device) adapted to interface with one or more merchant devices 175 (e.g., devices associated with business entities offering items, products, and/or services for purchase), and a service provider 180 (e.g., a network based financial transaction service provider, such as a payment and settlement transaction provider) over network 125. Service provider 180 may be maintained by a payment provider.

Network 125, in one embodiment, may be implemented as a single network or a combination of multiple networks. For example, network 125 may include a wireless telecommunications network (e.g., cellular telephone network) adapted for communication with one or more other communication networks, such as the Internet. In other examples, network 125 may include the Internet, one or more intranets, landline networks, wireless networks, and/or one or more other appropriate types of communication networks. As such, in various implementations, user device 130, merchant device 175, and service provider server 180 may be associated with a particular link (e.g., a link, such as a URL (Uniform Resource Locator) to an IP (Internet Protocol) address).

User device 130, in various embodiments, may be implemented using any appropriate combination of hardware and/or software configured for wired and/or wireless communication over network 125. In one embodiment, user device 130 may be implemented as a mobile communication device (e.g., wireless cellular phone) adapted for communication with network 125. In other embodiments, user device 130 may be implemented as a personal computer (PC), a personal digital assistant (PDA), a notebook computer, and/or various other generally known types of wired and/or wireless computing devices for communication with network 125. User device 130 is typically mobile. It should be appreciated that user device 130 may be referred to as a client device or a customer device without departing from the scope of the present disclosure.

User device 130, in one embodiment, includes a user interface application 122, which may be utilized by a user to conduct network based financial transactions (e.g., remote network based commerce, such as shopping, purchasing, ordering, booking, subscribing, paying fees etc.) with merchant device 175 and/or the service provider server 180 over the network 125. For example, user interface application 122 may be implemented as a location including geofence based mobile commerce application to initiate, monitor, track, manage, and store information related to remote network based commerce for viewing, searching, matching, suggesting, and purchasing, ordering, booking, subscribing, paying fees of items, products, and/or services over the network 125. In one implementation, user device 130 may be linked to an account with the service provider for direct and/or automatic settlement of purchase requests between the user and the merchant via user interface application 122, in a manner as described herein.

In one embodiment, user interface application 122 comprises a software program, such as a graphical user interface (GUI), executable by a processor that is configured to interface and communicate with merchant device 175 and/or service provider server 180 via the network 125. In one aspect, user interface application 122 comprises a browser module that provides a network interface to browse information available over network 125. For example, user interface application 122 may be implemented, in part, as a web browser to view and search information available over network 125. In another example, the user is able to access websites or inventory associated with merchant device 175 to view, search, match, and select items, products, and/or services for purchase, where the user is able to purchase, hire, order, book, subscribe, pay fees for selected items, products, and/or services from merchant device 175 via service provider server 180. As such, the user may conduct network based financial transactions (e.g., location or geofence based mobile commerce for purchasing and offering payment for items, products, and/or services) from merchant device 175 via the service provider server 180.

User device 130, in one embodiment, includes a geo-location component 126 adapted to monitor and provide an instant geographical location (i.e., geo-location) of user device 130 to the service provider and/or the merchant. In one implementation, the geo-location of user device 130 may include global positioning system (GPS) coordinates, latitude/longitude/aptitude, zip-code information, area-code information, street address information, and/or various other generally known types of geo-location information. In one example, the geo-location information may be automatically obtained and/or provided by user device 130 via an internal or external GPS monitoring component. In one aspect, when interfacing with user device 130, the user may elect to provide or may be prompted to provide permission for the release of geo-location information. Accordingly, the user may have exclusive authority to allow transmission of geo-location information from user device 130 to merchant device 175 and/or the service provider server 180. In any instance, merchant device 175 and/or service provider server 180 may communicate with user device 130 via network 125 and request permission to acquire geo-location information from user device 130 for geo-location based mobile commerce. These and other aspects of the present disclosure are described in greater detail herein.

User device 130, in one embodiment, includes a network interface component (NIC) 128 adapted for communication with network 125. In various implementations, network interface component 128 may comprise a wireless communication component, such as a wireless broadband component, a wireless satellite component, or various other types of wireless communication components including radio frequency (RF), microwave frequency (MWF), and/or infrared frequency (IRF) components adapted for communication with network 125. In other various implementations, network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with network 125.

User device 130 may include a user identifier, which may be implemented, for example, as operating system registry entries, cookies associated with user interface application 122, identifiers associated with hardware of user device 130, and/or various other appropriate identifiers. The user identifier may include one or more attributes related to the user, such as personal information related to the user (e.g., one or more user names, passwords, photograph images, biometric ids, addresses, phone numbers, profile, logged activities, actions, transactions, status, preferences, requirement specifications, updates, messages etc.) and banking information (e.g., one or more banking institutions, credit card issuers, user account numbers, security data and information, etc.). In various aspects, the user identifier may be passed with a user login request or purchase request to service provider server 180 via network 125, and the user identifier may be used by service provider server 180 to associate the user with a particular user account maintained by service provider server 180.

Merchant device 175, in one embodiment, may be implemented using any appropriate combination of hardware and/or software configured for wired and/or wireless communication over network 125. In one embodiment, merchant device 175 may be implemented as a mobile communication device (e.g., wireless cellular phone) adapted for communication with network 125. In other embodiments, merchant device 175 may be implemented as a network server, a personal computer (PC), a personal digital assistant (PDA), a notebook computer, and/or various other generally known types of wired and/or wireless computing devices for communication with network 125.

Merchant device 175 may be maintained as one or more network servers by a business entity (e.g., merchant website etc.) offering various items, products, and/or services for purchase and payment over network 125. Accordingly, merchant device 175 may comprise at least one network based server in communication with network 125 having a merchant interface application 142, a products/services catalogues or database 144 for presenting and identifying one or more available items, products, and/or services for purchase to the user or service provider via network 125. In one aspect, the merchant server may be accessible via a mobile communication device (e.g., wireless cellular phone) for management purposes. For example, the merchant has the ability to access and interact with its own network based merchant server via a mobile communication device to manage merchant parameters, item listings, radius of coverage, user search statistics, etc. and generate reports related thereto.

In one embodiment, merchant device 175 includes merchant interface application 142, which may be utilized to conduct network based financial transactions (e.g., shopping, purchasing, ordering, subscriptions, paying fees) with one or more users and/or service provider server 180 over network 125. For example, merchant interface application 142 may be implemented as a location or geofence based mobile commerce application to initiate, monitor, track, manage, and store information related to network based commerce for the viewing, searching, matching and purchasing, ordering, hiring, subscribing of items, products, and/or services by users over network 125.

Merchant device 175 may be linked to an account with service provider server 180 for direct and/or automatic settlement of purchase requests between the merchant 175 and users via merchant interface application 142. In one embodiment, merchant interface application 142 comprises a software program, such as a GUI, executable by a processor that is configured to interface and communicate with one or more users and/or service provider server 180 via network 125. Merchant interface application 142 may also include a network interface module that makes information available to user device 130 over network 125. For example, merchant interface application 142 may be implemented, in part, as a website administrator to provide, list, and present information, such as products, services, offers, to user device 130 via network 125.

In another example, merchant device 175 is capable of providing one or more network based websites or smart client application to allow viewing, searching, matching, browsing catalogues, suggesting and selecting of items, products, and/or services for purchase by the user via user device 130, where the user is able to purchase items, products, and/or services from the merchant and make payments through service provider server 180. Accordingly, merchant device 175 may conduct financial transactions (e.g., location or geofence based mobile commerce for purchasing, ordering, booking, hiring, subscribing and offering payment for items, products, and/or services) with the user via merchant interface application 142 and service provider server 180, in a manner as described herein.

Merchant device 175 may include an e-commerce application 146, which may be configured to provide information related to products and/or services database 144 to user device 130 via network 125. For example, the user may interact with e-commerce application 146 through user interface application 122 to search and view various items, products, and/or services available for purchase, order, book, subscribe, hire from products/services database 144, where the offerings may be based on user location. E-commerce application 146 may include a checkout module, which may be configured to facilitate online financial transactions (e.g., geo-location or geofence based mobile commerce) by the user of items, products, and/or services identified by merchant server 175 for purchase. Accordingly, in one aspect, the checkout module of e-commerce application 146 may be configured to accept payment from the user over network 125 and process the payment via interaction with service provider server 180.

Merchant device 175, in various embodiments, may include at least one merchant identifier, which may be included as part of the one or more items, products, and/or services made available for purchase so that, e.g., particular items, products, and/or services are associated with a particular merchant. In one implementation, the merchant identifier may include one or more types of profiles related to the merchant, such as business and/or banking information. For example, the merchant identifier may be passed from a particular merchant to service provider server 180 when the user selects an item, product, and/or service for monitor, track status and/or purchase from the particular merchant. Merchant identifier 148 may be used by service provider server 180 to associate particular items, products, and/or services selected for purchase with a particular merchant account maintained by service provider server 180. As described in greater detail herein, the user may conduct financial transactions (e.g., selection, monitoring, purchasing, ordering, fees payment, booking, and/or providing payment for items, products, and/or services) with merchant server 175 via service provider server 180 over network 125.

In various embodiments, the business associated with merchant server 175 may need to establish at least one merchant account with service provider server 180. When establishing a merchant account, each of the one or more business entities may need to provide business information, such as owner name, owner address, social security number, date of birth, phone number, email address, etc., and financial information, such as banking information, merchant account information, credit card information, payment processing information, one or more types of codes including QR codes contains encrypted account information and other one or more types of information etc. In one embodiment, the business or merchant also provides location information including drawn or pre-defined geofence for one or more shop, sales area or retail store or collection center or booking stations or one or more types of place of business, where the user may be present for shopping. For example, the merchant may provide an address, a latitude, longitude and aptitude, or other information that enables the service provider to determine location ore defined geofence of the merchant.

Merchant device 175 may also include a network interface component (NIC) 148 adapted for communication with network 125. Network interface component 148 may include a wireless communication component, such as a wireless broadband component, a wireless satellite component, or various other types of wireless communication components including radio frequency (RF), microwave frequency (MWF), and/or infrared frequency (IRF) components adapted for communication with network 125. Network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with network 125.

Service provider server 180, in one embodiment, may be maintained or logged by an online transaction processing entity, which may provide processing for online financial transactions and/or information transactions between user device 130 and merchant device 175. Service provider server 180 may include a service interface application 182, which may be adapted to interact with user device 130 and/or merchant device 175 over network 125 to facilitate the selection, purchase, booking, subscription, ordering and/or payment of items, products, and/or services by user device 130. In one example, service provider server 180 may be provided by external payment service providers.

Service interface application 182 may include a payment processing module to process purchases, orders, bookings, subscriptions and/or payments for financial transactions between user device 130 and a merchant. In one embodiment, the payment processing module assists with resolving financial transactions through validation, delivery, and settlement. Accordingly, service interface application 182 in conjunction with the payment processing module is adapted to settle debt or arrears or obligation between the user and the merchant, wherein accounts may be directly and/or automatically debited and/or credited of monetary funds in a manner as accepted by the banking industry.

Service application 182, in one embodiment, may utilize a selection processing module to process and monitor user selection events during online shopping by the user via user device 130. The selection processing module allows service provider server 180 to process and monitor user selections during online navigation and shopping events over network 125. For example, service provider server 180 interfaces with user device 130 via, e.g., a browser window to monitor the user and user device 130 during navigation and shopping events on various merchant sites. The selection processing module may be used by service provider server 180 to monitor user selections of one or more items, products, and/or services.

Service provider server 180 may be configured to maintain one or more user accounts and merchant accounts, user accounts and merchant accounts information in the form of one or more types of code(s) including QR codes and user accounts and merchant accounts and associated pre-defined pre-drawn geofence in an account database 184, each of which may include account information 186 associated with one or more individual users and one or more merchants. For example, account information 186 may include private financial information of the user and the merchant, such as one or more account numbers, passwords, credit card information, banking information, or other types of financial information, which may be used to facilitate online financial transactions between the user and the merchant. Account database 184 may also include location and geofence information for the user and the merchant to assist in location-based transactions as discussed herein.

In one embodiment, the user and/or user device 130 may have identity attributes stored with service provider server 180, and the user and/or user device 130 may have credentials to authenticate or verify identity with service provider server 180. User attributes may include personal information and banking information, as previously described. In various other aspects, the user attributes may be passed to service provider server 180 as part of a login, selection, purchase, and/or payment request, and the user attributes may be utilized by service provider server 180 to associate the user and/or user device 130 with one or more particular user accounts maintained by service provider server 180.

Similarly, merchant device 175 may have identity attributes stored with service provider server 180, and merchant device 175 may have credentials to authenticate or verify identity with service provider server 180. In one aspect, merchant attributes may include business information, such as location(s), geofence(s) and banking information, as previously described. In various other aspects, the merchant attributes may be passed to service provider server 180 as part of a registration, login, and/or transaction request, and the merchant attributes may be utilized by service provider server 180 to associate merchant device 175 with one or more particular merchant accounts maintained by service provider server 180, as well as provide location-based services.

Service provider server 180 may include at least one network interface component (NIC) 188 adapted for communication with network 125 and any network based communication devices including network interface component 128 of user device 130 and network interface component 148 of merchant device 175. In various implementations, network interface component 188 may include a wireless communication component, such as a wireless broadband component, a wireless satellite component, or various other types of wireless communication components including radio frequency (RF), microwave frequency (MWF), and/or infrared frequency (IRF) components adapted for communication with the network 125. Network interface component 188 may be adapted to interface with a DSL (e.g., Digital Subscriber Line) modem, a PSTN (Public Switched Telephone Network) modem, an Ethernet device, and/or various other types of wired and/or wireless network communication devices adapted for communication with network 125.

Service provider server 180 may include one or more databases 190 for storing, monitoring, logging and tracking information related to transactions between the user, the merchant, and the service provider. For example, databases 190 may provide a historical logs, analytics and statistics of financial transactions (e.g., network based financial transactions, such as geo-location or geofence based mobile commerce) between user device 130, merchant device 175, and service provider server 180. As such, in one implementation, service interface application 182 may be adapted to monitor, track, log, store financial transaction information related to network based commerce between user device 130 and merchant device 175 and then access this financial information from databases 190 for analysis, maintenance, and settlement.

Figure 40:
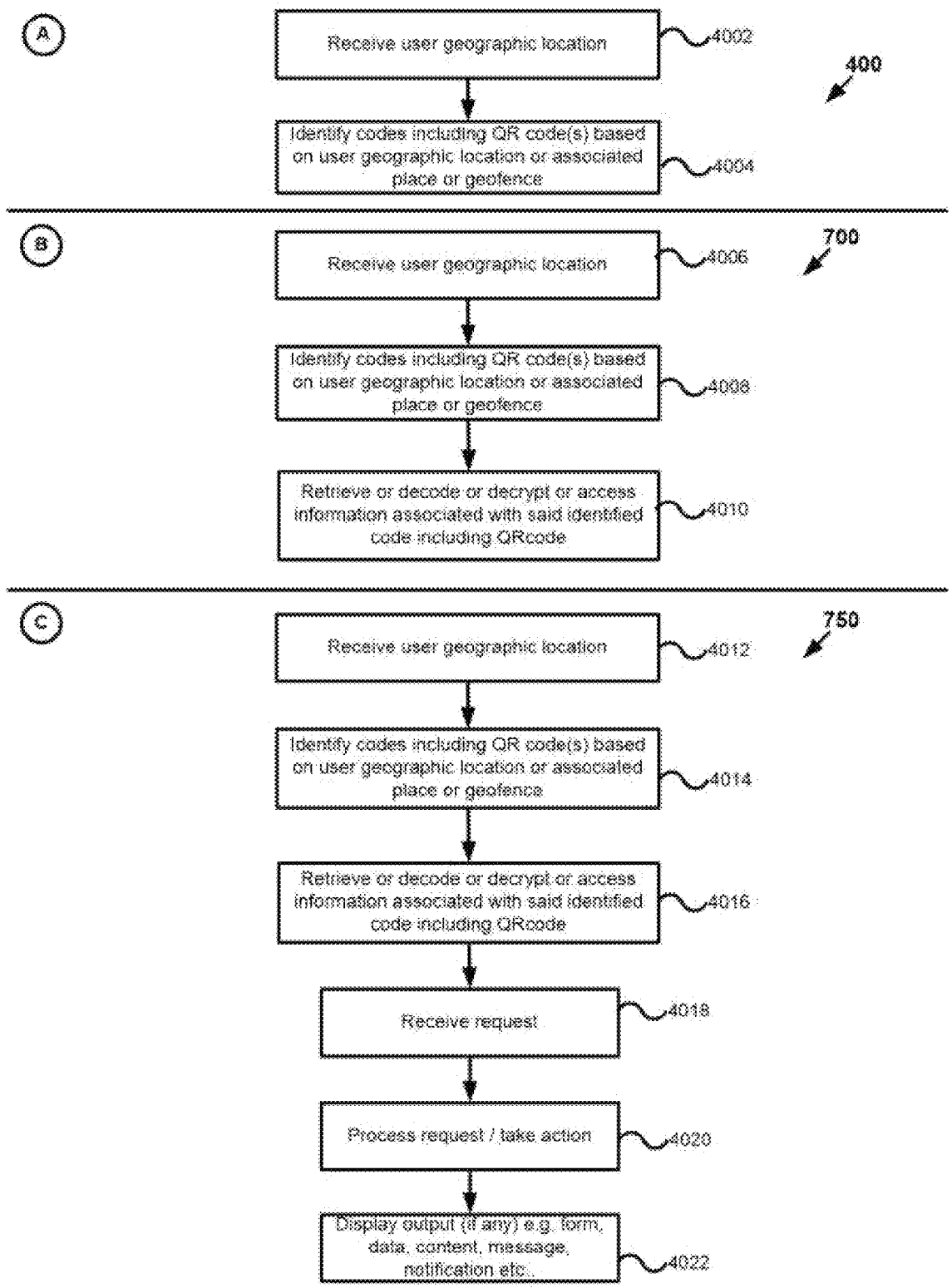
FIGS. 40(a-c) are a flowchart of steps performed in a location-based or geofence based accessing of one or more types of code(s) including QR code(s) for conduction one or more types of actions or call-to-actions, transactions, participations, communication, collaboration, according to one embodiment.

FIG. 40(*a*) is a flowchart 400 of steps performed. At step 4002, receive user geographic location 4002 based on location of user mobile device 200. At step 4004, identify codes including QR code(s) based on user geographic location or associated place or geofence. FIG. 40(*b*) is a flowchart 700 of steps performed. At step 4006, receive user geographic location 4002 based on location of user mobile device 200. At step 4008, identify codes including QR code(s) based on user geographic location or associated place or geofence. At step 4010, Retrieve or decode or decrypt or access information associated with said identified code including QRcode. FIG. 40(*c*) is a flowchart 750 of steps performed.

At step 4012, receive user geographic location 4002 based on location of user mobile device 200. At step 4014, identify codes including QR code(s) based on user geographic location or associated place or geofence. At step 4016, Retrieve or decode or decrypt or access information associated with said identified code including QRcode via scanning image of said QR code. At step 4018, receive request to automatically execute or take QR code associated identified one or more or series of action(s) or receive request to display action(s) or call-to-action(s) and instruct user to take action(s) from said displayed action(s). At step 4020, process request/take action. At step 4022, Display output of automatic or manual actions and processes (if any) including send message, make call, open website, share contact information, display form, data, content, message, notification and like.

Figure 42:
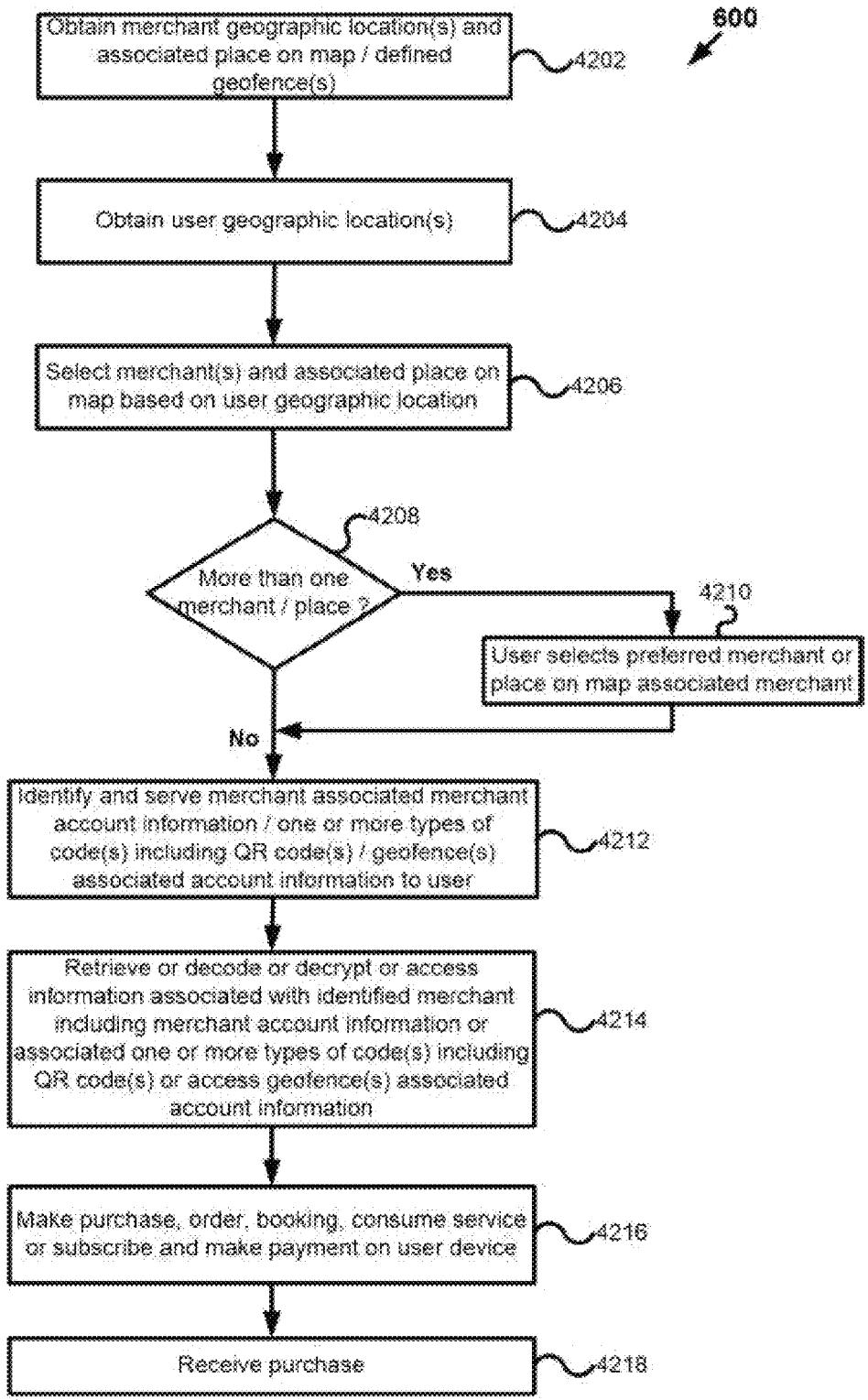
FIG. 42 is a flowchart of steps performed in a location-based and/or geofence based transaction, according to one embodiment.

FIG. 42 is a flowchart 600 of steps performed in a location-based transaction or geofence-based transaction over a network, according to one embodiment.

Merchant and user can create accounts or use existing accounts with the payment provider. In one embodiments, a merchant and user need not have an existing account in order to use the location-based transaction method.

At step 4202, one or more locations or geofence(s) for a merchant are obtained by a payment or service provider. The locations or geofence(s) may be where the merchant has products and/or services available for purchase, book, order, hire, subscribe such as a shop, station, center, club, movie or show theater, event place, place of business, patrol pump, toll, kiosk, storage, retail store. Thus, a merchant may have more than one location and/or geofence. The locations may be obtained through different means. For example, the merchant may be asked to enter specific addresses, which would be converted to GPS coordinates or latitude/longitude coordinates, to enter latitude/longitude/aptitude coordinates directly, or allow the payment provider to determine location from a device at each merchant location, such as through a GPS capability within the merchant device. The merchant device may be a smart phone, tablet, laptop and personal computer (PC) or other device that can transmit location information. The merchant may enter the location information or draw or define geofence(s) at any time, such as during a registration process with the payment provider or when a location or geofence modifies or is added.

At step 4204, the payment provider determines the location or geofence of a user through a user mobile device. For example, the user may be walking toward or at a merchant location or enters into or dwell or dwell for pre-set duration in pre-defined identified geofence. In one embodiment, the user has allowed the location of the device to be transmitted to and used by the payment provider. Thus, the user's device, which can be a smart phone or other device capable of computing and transmitting location information, enables the payment provider to obtain user (i.e., user device) location. User location may be continually transmitted to the payment provider or only at certain times, such as when the user logs into or opens an application for the payment provider.

With this information, the payment provider selects merchant(s), at step 4206, that are near the present user location or geofence. Proximity to the user may be set by the accuracy of location system, by the user, or by the payment provider. For example, the user may only want to know of merchants within pre-set number of meters or radius meters of the user, or the payment provider may select merchants that are within pre-set number of meters or radius meters of the user.

Next, a determination is made, at step 4208, whether there is more than one merchant within the user's location or user's location surround or near or within geofence. In one example, due to limited location accuracy or more merchants within limited area payment provider may identify more than one merchants.

If more than one merchant is identified, the payment provider may provide a list of the identified merchants to the user through the user device. The user may then select one or more preferred merchants at step 4210. In the above example, if the user is at a particular merchant shop or place of business, the user may select only that merchant or the user may select nearby merchants the user intends to visit after leaving the current shop or place of business. Selection may be accomplished in any number of ways, such as selecting from a list of merchant names, locations, logos, brand, products, services, place name.

Once one or more merchants have been identified, either because only a single merchant was located near the user or the user selecting from a list of nearby merchants, the payment provider transmits selected merchant associated one or more types of code(s) including QR code(s) or merchant associated geofence associated payment information of the identified merchants to the user at step 4212. The merchant payment information may be automatically decrypted or decoded from said code(s) including QR code(s) or provided into a payment request form for the merchant on the user device at step 4214. In one embodiment, the payment information includes information the user needs to identify the merchant to the payment provider to make a payment. In one embodiment, this may be an email address or phone number or name or unique identity or logo or brand name or place of business name of the merchant, an account number, a sequence of characters, or any other identifier. The identifier may be specific to the location/geofence or generally for the merchant. For example, the merchant may want separate accounts for different locations/geofences rather than a single account for all locations/geofences. The reasons may be the desire to keep purchases separated by location/geofence, such as when each location/geofence is a separate branches or department or shop or for easier accounting for individual store or department sales.

At step 4216, the user may make a purchase or order or book or subscribe and payment on the user's device. The user may select desired product(s) or service(s) through the user device, place them in a cart, and checkout, where the checkout process includes the merchant payment information already entered. Thus, the user may simply need to approve a payment amount or first enter a payment amount or input a payment amount via voice command or select default or pushed or pre-filled payment amount and then approve. Once the payment request is submitted, the payment provider processes the request and makes a determination whether to approve the payment request. This can be done through standard payment provider steps.

Assuming the payment request is approved, the payment provider may send a notification to the merchant and/or user that the payment has been made. The notification may include a receipt or bill or invoice or detail confirmation of the purchase. With the purchase having been paid for, the user may then receive the purchase at step 4218. For example, the user may simply need to show the receipt, identification, payment confirmation or other information that allows the merchant to release the purchase including products, tickets, subscription card or payment receipt and like to the user.

Therefore, the user can quickly and easily make a payment while at or near a store using the user's mobile device. The following example illustrates one use case. The user wants to purchase a double espresso from a nearby coffee shop. As the user nears the coffee shop, the user sees a list of retailers in the area, including the coffee shop on the user's mobile phone. After the user selects the coffee shop, the user sees a selection of coffees and other items on the phone. The user selects a double espresso and receives a total amount. The user enters an additional $1.00 for a tip and transmits the payment request to service provider, where the coffee shop account or payment identifier has been attached to the payment request without the user having to enter the identifier. The user receives a confirmation that the payment has been made. The user reaches the coffee counter, where the espresso has been made and is waiting. The user shows the receipt from the phone to the person at the counter and receives the espresso. As a result, the user did not have to wait in line to make an order and payment and receives the espresso.

Examples: hospital (medical store, food etc.), medical store, restaurant, patrol pump, toll, inside retail store particular department, hawker, etc.

Figure 43:
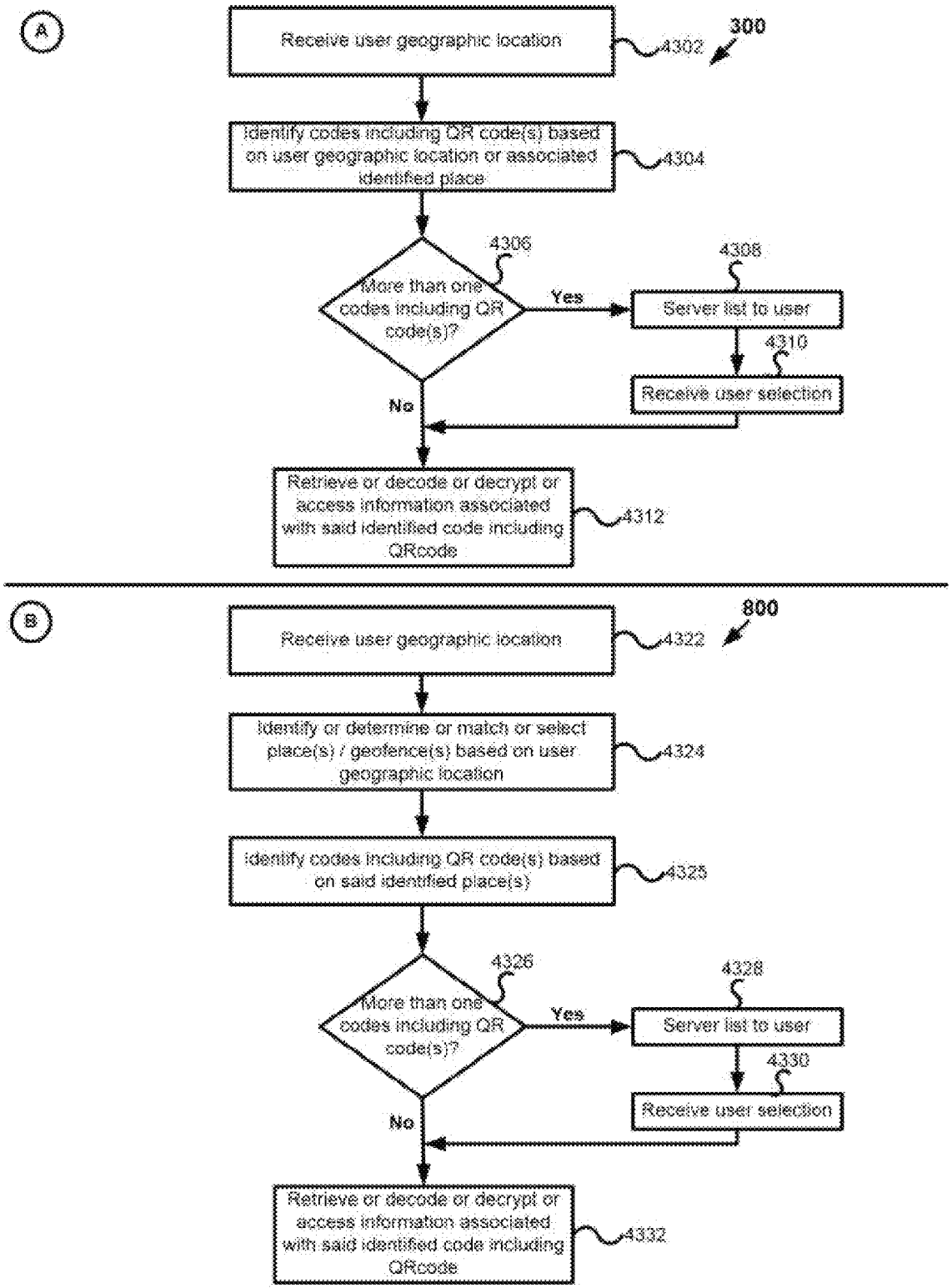
FIGS. 43(a-b) is a flowchart of steps performed in a location-based or geofence based accessing of one or more types of place associated one or more types of code(s) including QR code(s) for conduction one or more types of actions or call-to-actions, transactions, participations, communication, collaboration, according to one embodiment.

FIG. 43(a) is a flowchart 300 of steps performed. At step 4302, Receive user geographic location. At step 4304, Identify codes including QR code(s) based on user geographic location or associated identified place. At step 4306, If More than one codes including QR code(s) identified then at step 4308, Server list to user and at step 4310, Receive user selection. At step 4312, Retrieve or decode or decrypt or access information associated with said identified code including QRcode or user selected code including QRcode. FIG. 43(b) is a flowchart 800 of steps performed. At step 4322, Receive user geographic location. At step 4324, Identify or determine or match or select place(s)/geofence(s) based on user geographic location. At step 4325, Identify codes including QR code(s) based on said identified place(s). At step 4326, If more than one codes including QR code(s) then at step 4328, Server list to user and at step 4330, Receive user selection. At step 4332, Retrieve or decode or decrypt or access information associated with said identified code including QRcode or user selected code including QRcode.

Figure 44:
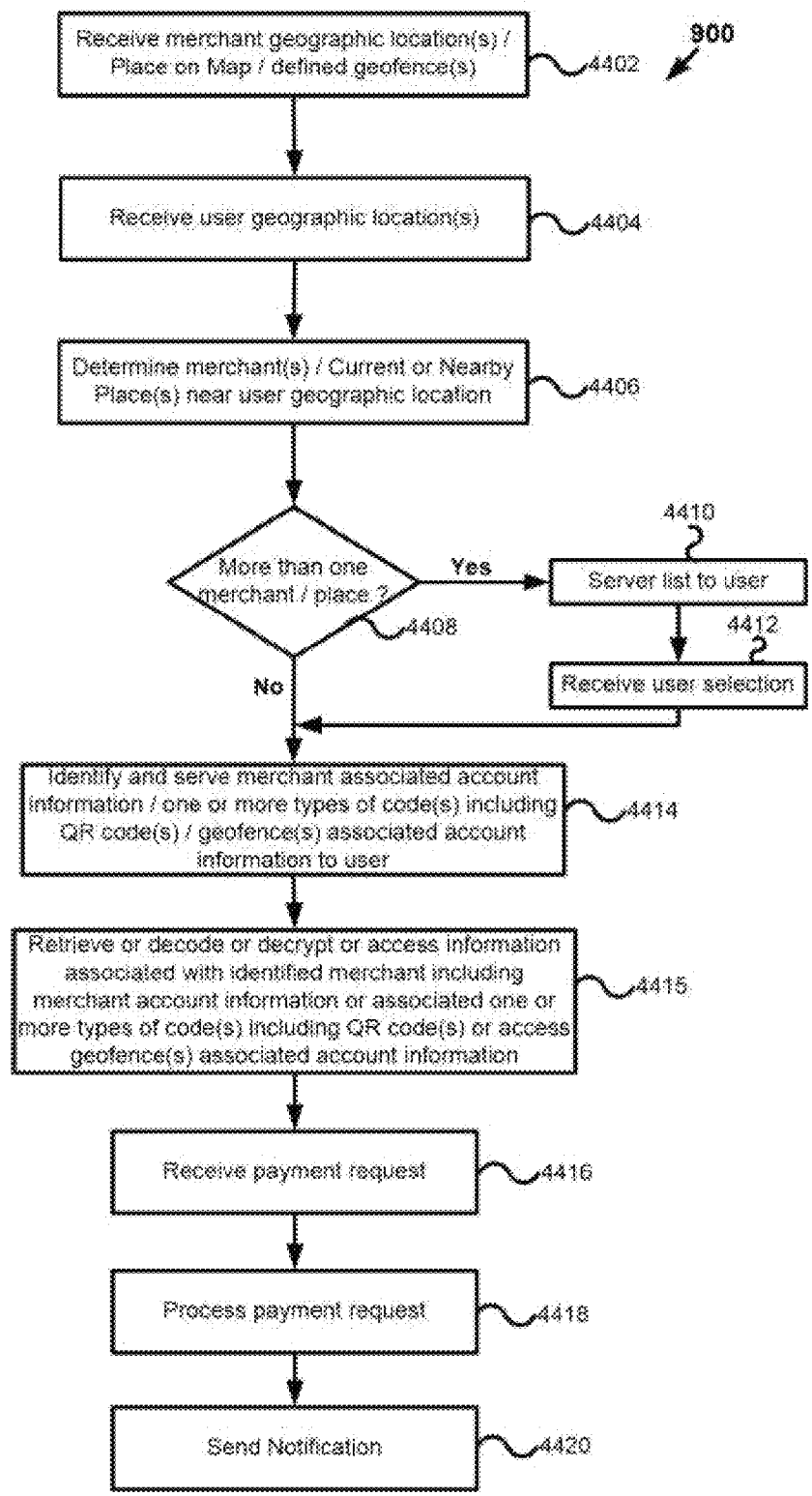
FIG. 44 is a flowchart of steps performed by a payment provider in a location-based transaction, according to one embodiment.

FIG. 44 is a flowchart 900 of steps performed by a payment provider in a location-based or geofence-based transaction, according to one embodiment. At step 4402, the payment provider receives location information and/or geofence information of a merchant shop, station, center, club, movie or show theater, event place, place of business, patrol pump, toll, kiosk, storage, retail store, as described above. If the merchant has multiple locations and/or geofences and within single retail store multiple sales counters, the merchant may specify whether a single account should be associated with all locations and/or geofences or different accounts are to be associated with different locations and/or geofences. For the latter, the merchant specifies a specific account for each location and/or geofence, where each location and/or geofence has a different account or two or more locations and/or geofences share the same account. The payment provider then associates each location and/or geofence with the designated account for the merchant. The payment provider may have millions of merchants, locations, geofences and account information stored in its database or within a cloud or third parties external storage mediums.

At step 4404, the payment provider receives the user's location through the user's mobile device, as discussed above. In one embodiment, the location is conveyed as latitude and longitude coordinates, although other forms of location information, such as an address, one or more types of unique code of location or geofence, unique place name may also be suitable.

The payment provider then determines which, if any, merchants are near the user's received location at step 4406. As discussed above with respect to step 4206 in FIG. 2, the payment provider may use any suitable criteria for determining what is "near" the user's location. If no merchants are nearby, the payment provider does not transmit any information to the user device. However, if one or more merchants are found nearby, as determined at step 4408, payment information for the merchant is conveyed to the user device.

If more than one merchant is near the user, the payment provider transmits a list of those merchants to the user device at step 4410. The list or other format allows the user to easily identify the merchants on the user's device. For example, the user may see photo(s) or video(s) of place of business and surround place of business, photo(s) and name(s) of owner, manager, server and admin, shop name, brand name, address, products and services list and photo(s) or video(s), logos or names of the merchants. The list also allows the user to easily select one or more merchants, such as by simply tapping on the list item or link or shop name or logo of the merchant.

After the user makes the selection(s), the information is served through the user device to the payment provider, which then receives the user's selection(s) at step 4412. The payment provider then determines the desired information for the selected merchant(s).

Next, at step 4414, the payment provider transmits at least QR code which contains encrypted account information or geofence associated account information to the user device. The account information will enable the user to make a payment request to the payment provider identifying the recipient without the user having to manually enter recipient account or identification information. The payment provider accesses and transmits the necessary information based on the merchant account information stored for the location. For example, the information may be an email address, a phone number, an account number, unique user name, or other identifying data.

The payment provider then waits for a payment request from the user. For example, after receiving desired merchant account or payment information, the user may make a payment request through the user's mobile device. This may entail simply entering a payment amount or entering a payment amount via voice command or use pushed amount or default amount or place of business specific default amount and confirming the payment or new or additional information.

Once transmitted, the payment provider receives the payment request at step 4416. The payment request may include an identifier of the merchant and/or account and an amount of payment. Additional information may include one or more user or device identifiers.

After the information is received, the payment provider processes the payment request at step 4418. If the information is insufficient or incorrect, the payment provider may request the user to re-enter or re-submit some or all of the payment request information. The payment provider may also request additional information, such as a password or other user authenticator. After processing, the payment provider determines whether to approve or deny the payment request, which can be based on any number of factors involved in such a process.

Once the determination is made, a notification is sent at step 4420 to the merchant and/or user. The notification may be sent via text, email, voice message, or other means to the user and/or merchant device. In this way, the user and/or merchant is notified of an approved payment or a denied payment. If approved, the notification may also include a receipt presentable on the user device. The user may then show the receipt, payment confirmation, user ID, or other data to the merchant to receive the goods at the merchant store location.

Figure 45:
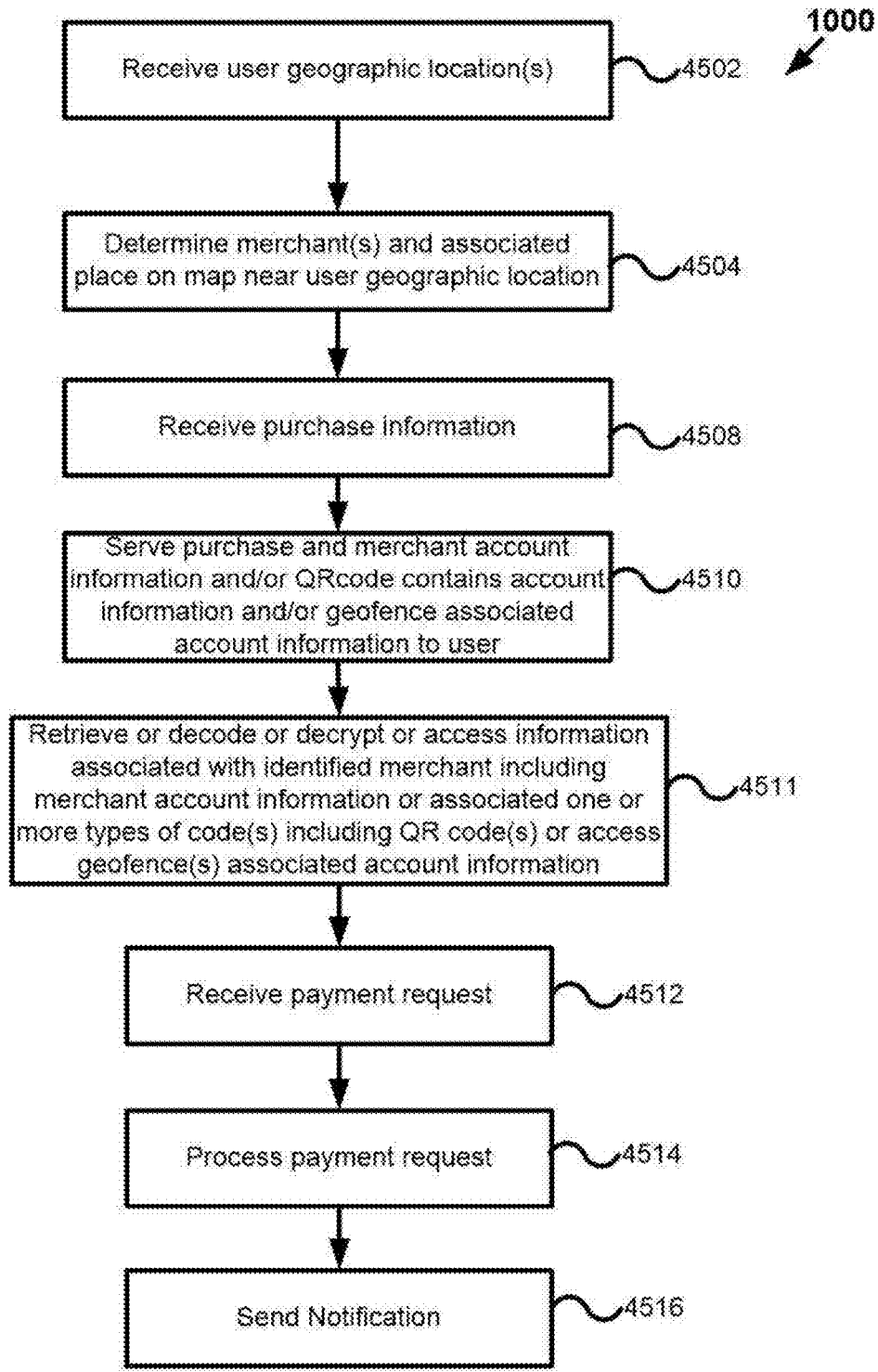
FIG. 45 is a flowchart of steps performed by a payment provider in a location-based transaction, according to another embodiment.

FIG. 45 is a flowchart 400 of steps performed by a payment provider in a location-based transaction, according to another embodiment. At step 4502, the payment provider receives a location of the user through the user device, such as described above. Next, the payment provider determines a merchant near the user at step 4504, again such as described above. In this example, only a single merchant is assumed, although one of ordinary skill in the art will appreciate that multiple merchants can be near the user location and modify this flowchart as needed.

Once the user is presented with list of products and/or services available for purchase the merchant location, the user may select desired items for purchase. This can be by tapping or otherwise selecting from a list of products and/or services on the user device, which may then be added to a cart. Once completed, the user may transmit the information to the payment provider, which is received by the payment provider at step 4508. The purchase information may include a list of items and prices.

Next, at step 4510, the payment provider may transmit an "invoice" to the user through the user device. For example, the invoice may include a total amount of the purchase, including tax and any other charges, and payment or account information of the merchant or payee. This may be in the form of an easily editable or readable interactive display, allowing the user to make changes if needed. Otherwise, the user may simply confirm or authorize the payment, such as by tapping on or otherwise selecting a button or link on the device.

The authorization is then transmitted to and received by the payment provider at step 4512. The payment is then processed at step 4514, as is known in the art. The payment provider may request the user to re-enter information or submit some new information if the payment request cannot be processed and/or approved. Once a final determination is made, the payment provider may send a notification to the user and/or the merchant at step 4516, such as described above. The user may then receive the purchases at the merchant store location.

As a result, the user can make purchases through the user mobile device, where such purchases may be tailored for the user. The user can then pick up the purchases without waiting in line for scanning and/or checkout. This gives the user a more personalized, faster, and more efficient shopping experience.

Figure 46:
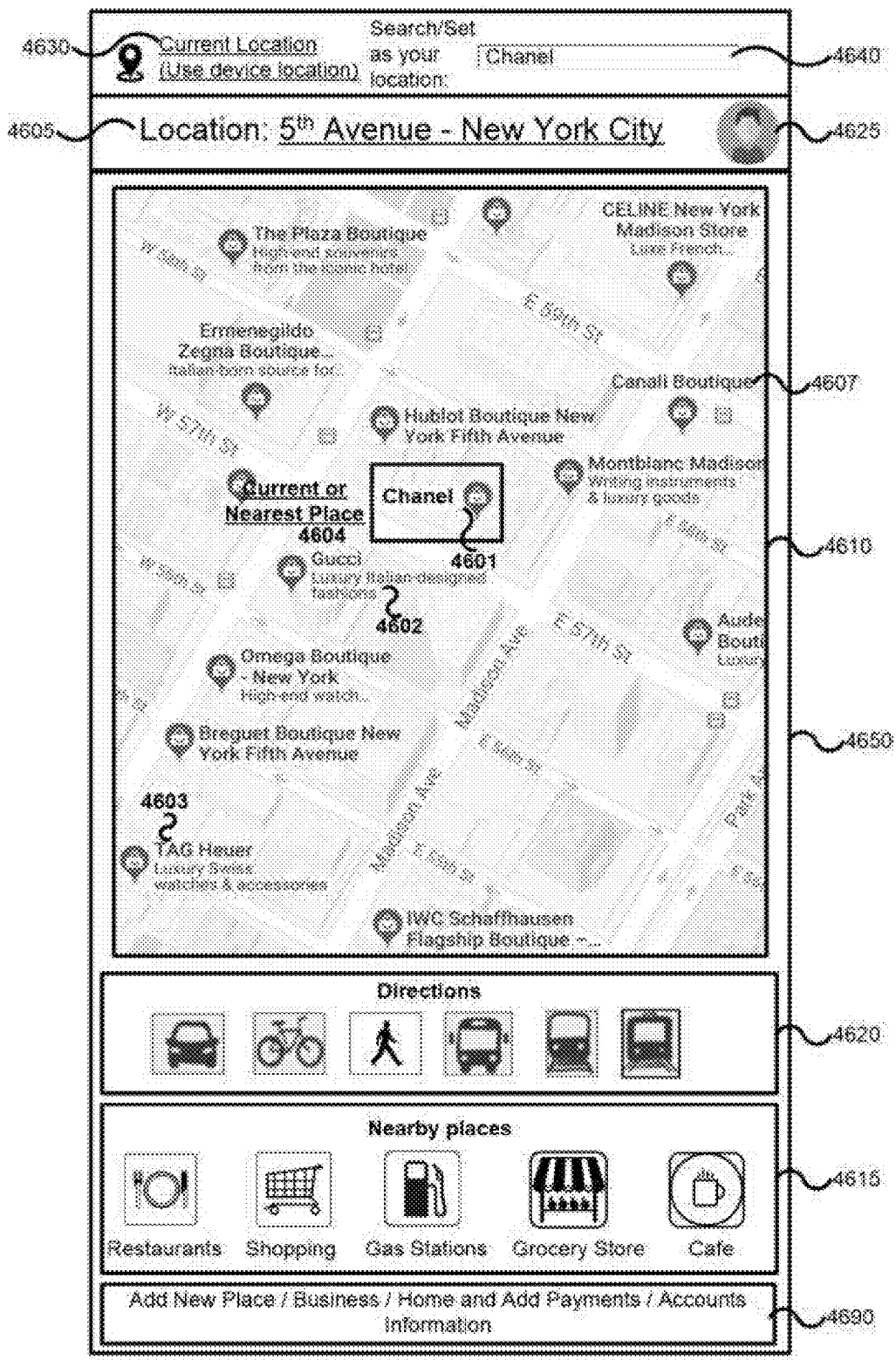
FIG. 46 is an exemplary map or diagram of an overview of an implementation of the invention in which user can view current location related place or place of business or can view nearby places surround user based on monitored and track user device or user mobile device location.

FIG. 46 illustrates an exemplary overview of an implementation of the invention in which, in an embodiment enabling user to add new place or place of business and or register or sign up or list or verify business or place 4601 by tapping or clicking on button or control 4690 from application 290 of client device 200. In the event of tapping or clicking on button or control 4690, displaying graphical user interface (GUI) or form or application or application feature 290 (*e*) which enables user to provide required information including business name, business category, address including country, street address, pin code, state, confirm that user wants to add a location customers can visit, like a store or office to show up said place or place of business on maps and enable to search when customers are looking for your business or place or place of business, show or select on map location of place or place of business by dragging and zooming the map and position the marker on the exact spot where place or business is located, confirm acceptance of terms of service and privacy policy associated with maps or maps service provider(s), select preferred verification option including verify business listing by mail, email, phone and based on verified website or verify business or place based on external verification service providers including verify place or place of business from mobile app by providing mobile number and entering one time password (OTP) received on said mobile device or automatically verifying by identifying received one time password (OTP) and providing bank account information including bank code and account number linked or associated with said mobile number, make payment for listing based on one or more types of memberships, subscriptions, payment models and modes. In another embodiment enable user to select particular place 4601 on map 4610 and claim place or place of business or request manage listing of said place 4690 by sending request to server 110 system and provide required one or more types of data or information or documents including to confirm business information including name, address, contact information, website, location information, business, identity of business, identity of place of business and identity of person who claimed or made said request whether said place owned to said requestor or not.

Server module 190 (*e*) of server 110 receives said details from user from application 190 (*e*) of client application 200. After verifying said details server module 190 (*e*) of server 110, allow to access said claimed user or publish or make available said newly created place 4601 on map 4610 for users of network or users of map or selected one or more types of users including selected contacts, groups, followers, members, subscribers, customers, one or more types of users of network or public.

In another embodiment server 110 module 190 (*e*) can directly create places on map based on various types of data from one or more sources including databases, external servers, applications, databases, and web services, wherein data comprises payment and account information and associated address or business address, name of business or place of business or store, categories, sub-categories and determined icons based on categories, sub-categories and types of business, contact information including phone number, email address, website name or address or URL and one or more types of information and data associated or related to place or address associated place, wherein identify geo coordinates or GPS coordinates including latitude and longitude based on said address for displaying or positioning or making place searchable or locating place or place associated or related one or more types of information and call-to-actions on map. After creating places server 110 module 190 (*e*) notifying and allowing corresponding owner or authorized person to access and manage said created place including accept payments from customers including location based payments, view logs of transactions, provide additional information, user interactions and actions including visits, transaction, order, purchase, book and reactions including provide ranks, like and comments to/with place, allow to define geofence and download and install merchant application, instantly automatically register with the application and manage said place and access features including bank settlement, send payment request, view logs including transaction identity, date & time, reference number, payer id or name or phone number based on privacy settings of payer, type of payment (full, partial, pay later, pending, instalment or EMI, scheduled payments as per mutual agreements or rules based payments e.g. group deals—if number of users purchased particular products or particular amount of purchasing of products within pre-set duration then discount, refer other users and pay less on your purchase (referral marketing) and like), amount received, associated bills or invoice or purchased products and service details, provide credits, pay later and installment facilities, provide offers and custom offers.

User can view current location specific place(s) 4630 or searched places 4640 or nearby places 4630 surround current location of user device based on monitored and tracked location of user device 200 or current location of user or user device 200 including mobile device 200. In an embodiment in the event of clicking or tapping on "Current Location" (user device location) option 4630 or in response to receiving, from the presence-sensitive display, an indication of a input detected by the presence-sensitive display at a location of the presence-sensitive display associated with the icon or graphical representation for example "Current Location" (user device location) option 4630 from the application 290 of the client device 200, displaying current location associated place or place of business 4601 on map 4610, wherein current location is determined based on monitored and tracked location of user device 200 including mobile device 200. In another embodiment user can search 4640 on map 4650, places and associated details 4601, 4602 and 4603 based on inputting or selecting or providing one or more types of search queries 4640 including keywords, specific businesses or place name (e.g. Chanel 4640), types of places (e.g. coffee near central park), or can narrow results by using the city and state (e.g. groceries in new York city, NY), narrow results by using a zip code (e.g. Chanel in 10010), find an intersection (e.g. 23rd and mission), address, city, state, country, or airport (e.g. 1234 parkway NYC, LAX, Los Angeles Airport, or Gateway of India, Mumbai), Latitude and longitude coordinates (e.g. 41.40338, 2.17403), friends and other contacts (e.g. Yogesh Rathod, Amita, Lily James) and in response to receiving said search query or selection 4640, displaying on map 4610 search results including searched places or businesses 4601, 4602 and 4603 on map 4610, so user can select any place or business (e.g. user select "Channel" 4601) displayed on map 4650. In an embodiment user can navigate map 4610 and can select any place or business 4601 or 4602 or 4603 from millions of places of businesses of world on map 4610. In an embodiment user can use auto fill option while search 4640. In an embodiment user can select place or specific business 4601 from map 4610. In another embodiment user can set or select location 4640 based on search queries or selections 4640 and in the event of settings or selections of particular location 4640 including specific place or business, identified location or place based on full or part address, one or more keywords, taxonomies, categories and types, contact information including phone number, email address, website name, and user name, contact person name, connections or contact name of user, brand name, product name, service name, defined geofence name, geocodes, geo coordinates or latitude and longitude coordinates or GPS coordinates specific 4640, displaying on map 4610 said inputted or searched or pre-set or selected location 4640 surround searched places and businesses 4610 including places within the predefined radius or within the threshold distance of the location of the user or automatically determined nearby places based on automatically determination of user activities, actions, events, interactions, transactions, status, updates, reactions including liked products and services, schedules, calendar entries, communications, messages and emails, past logs of activities, actions, events, interactions, transactions, and user profile data, user contacts and associated data, preferences, settings, privacy settings, interacted, visited, interacted, transacted, liked, bookmarked, searched places and associated data and contents including products and services purchased, ordered, transacted, reacted including liked by user or connections of user including friends and family.

In an embodiment the user may provide a search query 4640 related to a type of business 4615 that the user desires to locate within a particular range of location in the digital map 4610. In an embodiment the user may initiate a search of businesses 4640 located within the predefined radius or within the threshold distance of the location of the user or user device 200.

The server 110 may search via server module 190 (c) a database 115 of businesses, along with associated business name, categories, sub-categories, logo, one or more types of contents including photos, videos, and text, products and services offered and associated details including name, categories, price, offer and like, business hours, ratings, reviews, business location information including location on visual digital map, address, defined geofence on visual digital map and business contact information including phone number, website URL, and email address based on one or more types of search queries, selections and current location of user mobile device.

Search engine 190 (c) may execute a query 4640, received from a user at a client 200 from map 4610 application 290 (b), on the entity location information stored in the repository 115 and may provide a graphical digital map 4610 based on the executed query 4640.

Using the graphical interface 4650, a user may search 4640 the location listings to identify entities, such as businesses e.g. 4601, that are the most relevant to a given search query 4640 and that are located within an entire area of a map 4610 view presented to the user at user device 200.

In an embodiment in the event of selecting option "Current Location" 4630, displaying current location specific place or business or place of business 4601 on map 4610, wherein identifying current location specific place based on monitored and tracked user device accurate location by employing or accessing accurate location detection or identification technologies. Recent changes in hardware and standards make one-meter accuracy possible. In Android location in smartphones, introduces Wi-Fi round-trip time technology and standards, and the Wi-Fi application programming interfaces. Technology hardware standards and Android application programming interfaces (APIs) are all evolving simultaneously to enable an improved location accuracy that has not previously been possible when using smartphones. There continues to be improvement, and now indoor accuracy is better than 10 meters, but round-trip time (RTT) is the technology that will take accuracy to the one-meter level. In terms of GPS accuracy in the open sky, the GPS accuracy from mobile device or phone is about five meters, and that's been constant for a while. But with raw GNSS measurements from the phones, this can now improve, and with changes in satellite and receiver hardware, the improvements can be dramatic. One-meter measurement accuracy can be made available in smartphones by using the key technologies including Wi-Fi RTT, GPS dual-frequency and carrier phase measurements, other currently or in future available location accuracy technology. To help mobile device or phone get a more accurate location, user can apply location settings (For example user can Turn Improve Location Accuracy on or off). For example when user have Google Location Accuracy turned on than phone uses GPS, Wi-Fi, Mobile networks, Sensors and other location accuracy technologies or sources to get the most accurate location. To help apps get better location info, user can let their phone scan for nearby Wi-Fi access points or Bluetooth devices.

Figure 47:
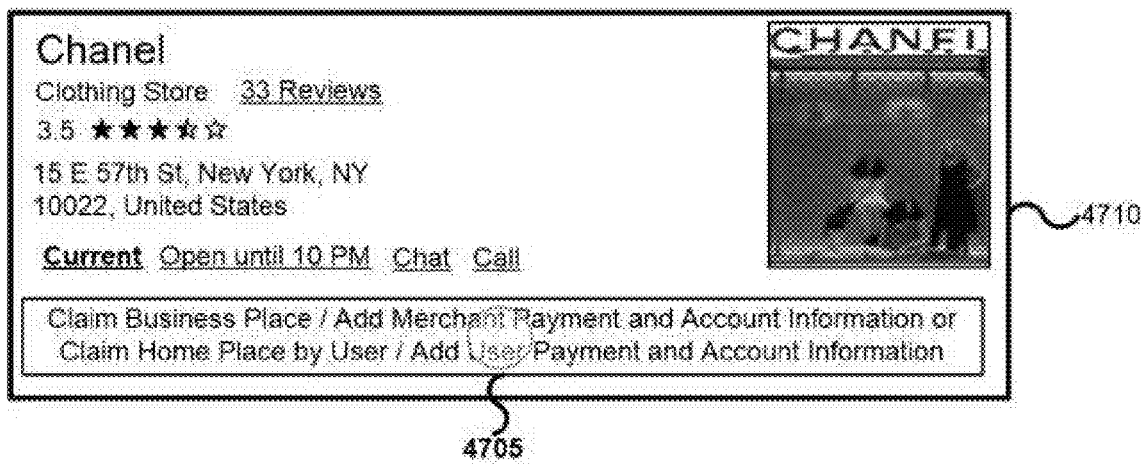
FIG. 47 is an exemplary graphical user interface or application or application feature or web page wherein merchant can create new place on map, claim existing specific place on map and/or register merchant account by providing required merchant account details.
Figure 48:
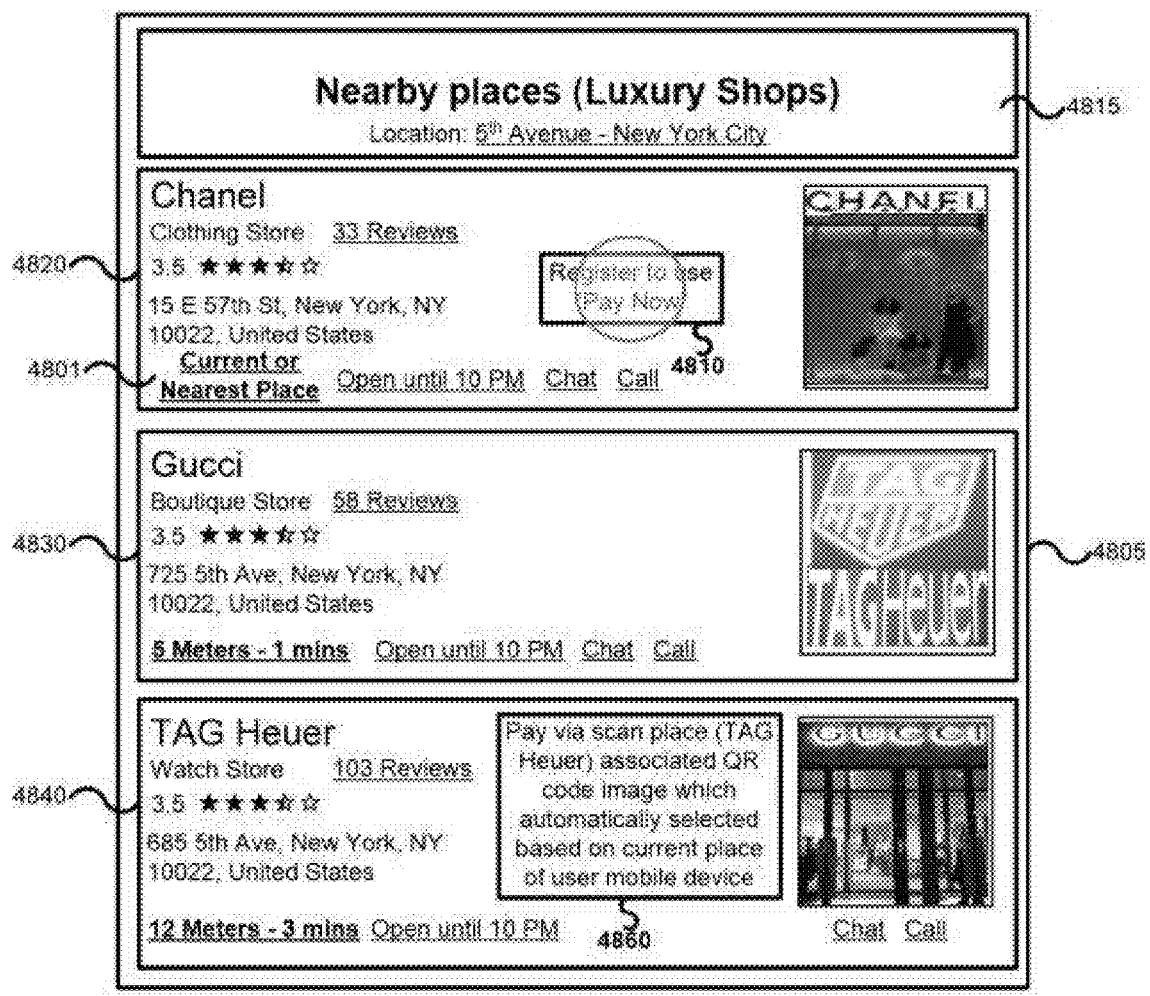
FIG. 48 is an exemplary graphical user interface or application or application feature or web page wherein unregistered user can view registration control for enabling user to register user account for making payments from user's account to physical location associated place associated merchant's account, wherein identifying current place of business is based on location of the user mobile device.
Figure 49:
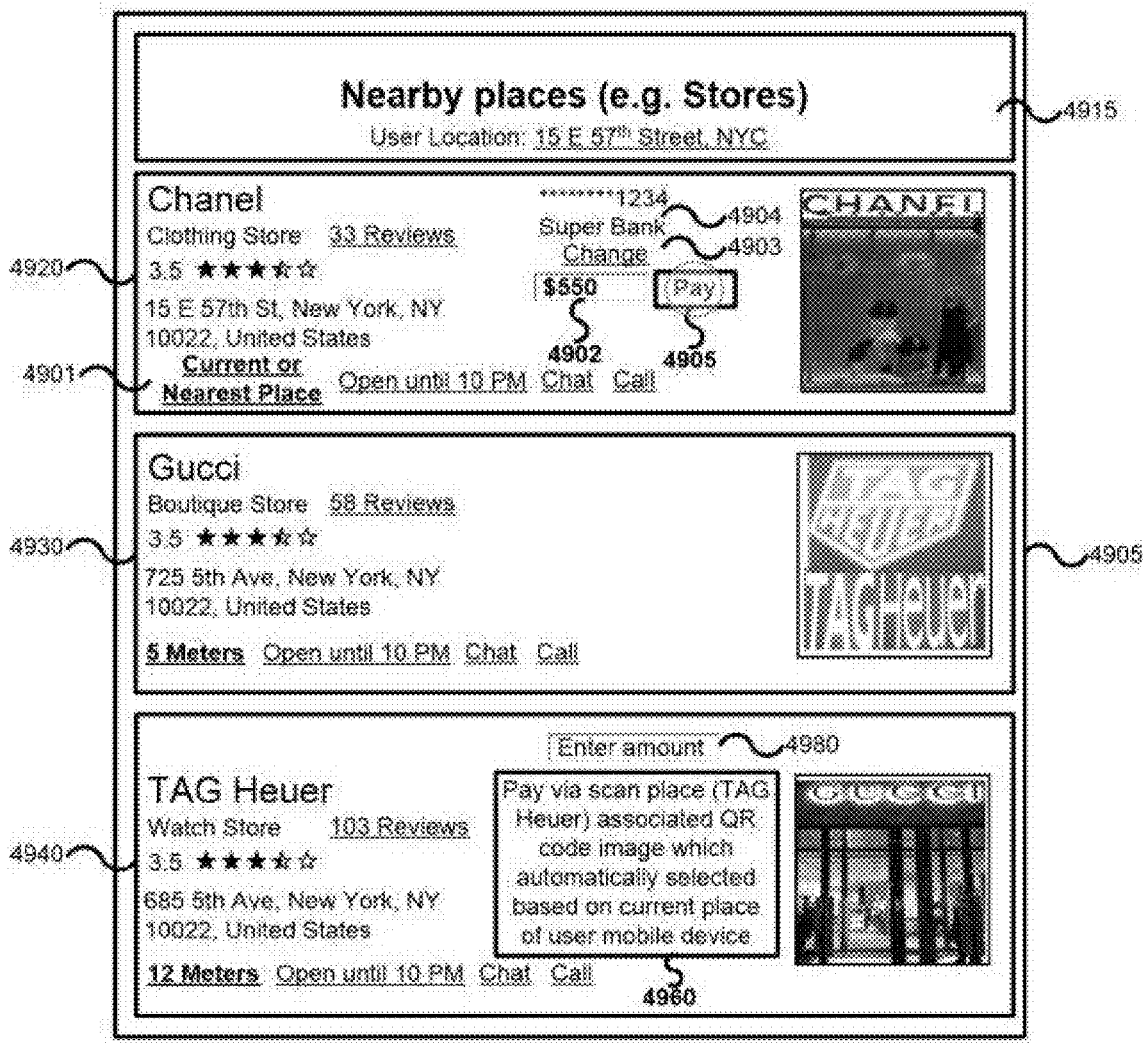
FIG. 49 is an exemplary graphical user interface or application or application feature or web page wherein registered user can view current location of user device associated place or nearby place which sorted as per nearest place first order. User can select current place or very near place or select particular place from nearby places from map or list and can make in-store payment to said selected place associated registered merchant at physical place of said place or offline store by transferring or sending or paying particular entered or default or pre-set or pushed amount of payments from user's account to physical location associated place associated merchant's account.
Figure 50:
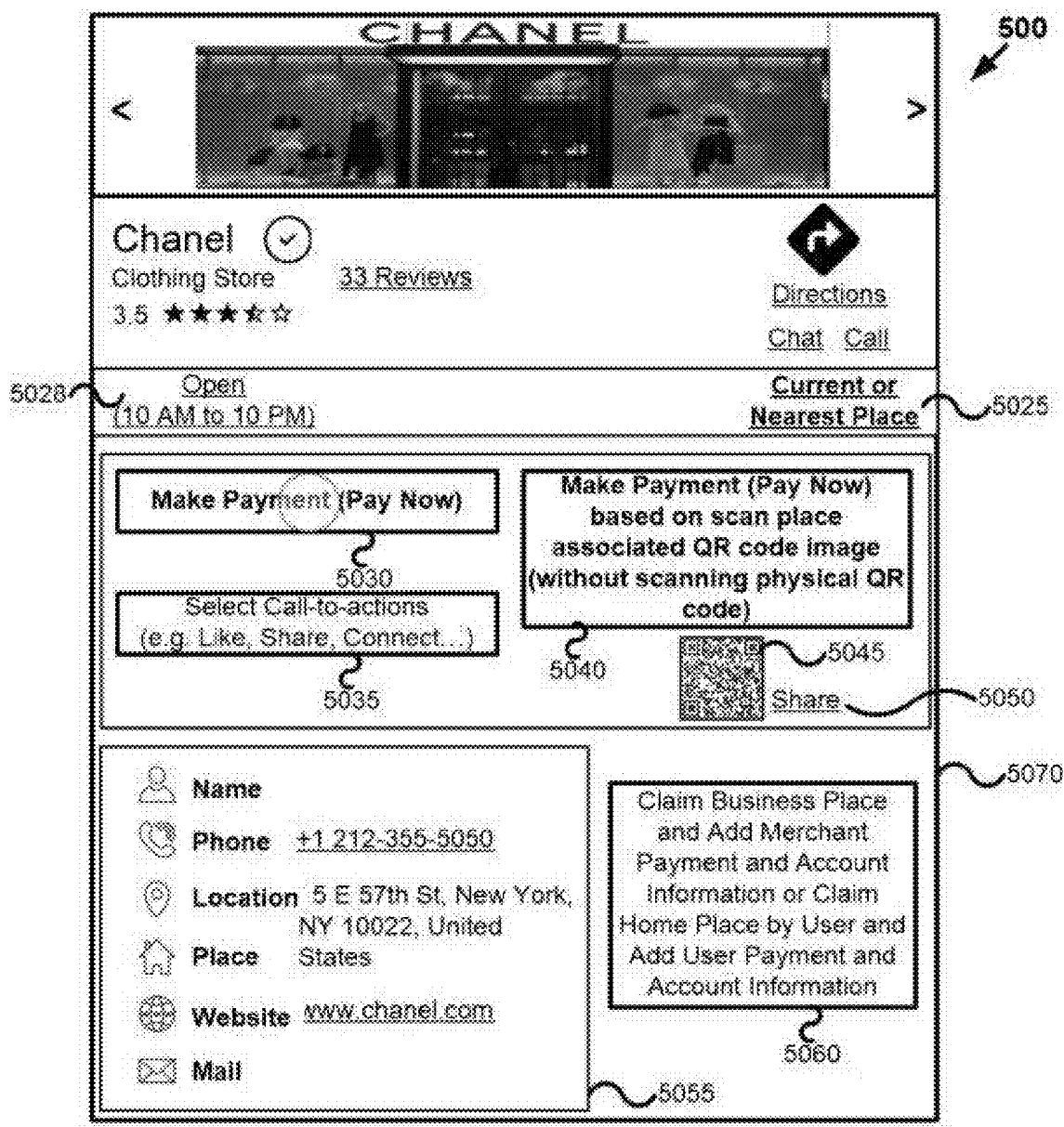
FIGS. 50-51 is an exemplary graphical user interface or application or application feature or web page wherein in the event of visiting particular place at physical location of place, displaying current place or nearby places to registered user to view current place or selected place associated details and enable to make payment to said selected place associated registered merchant by transferring or sending or paying particular entered or default or pre-set or pushed amount of payments from user's account to physical location associated place associated merchant's account.
Figure 51:
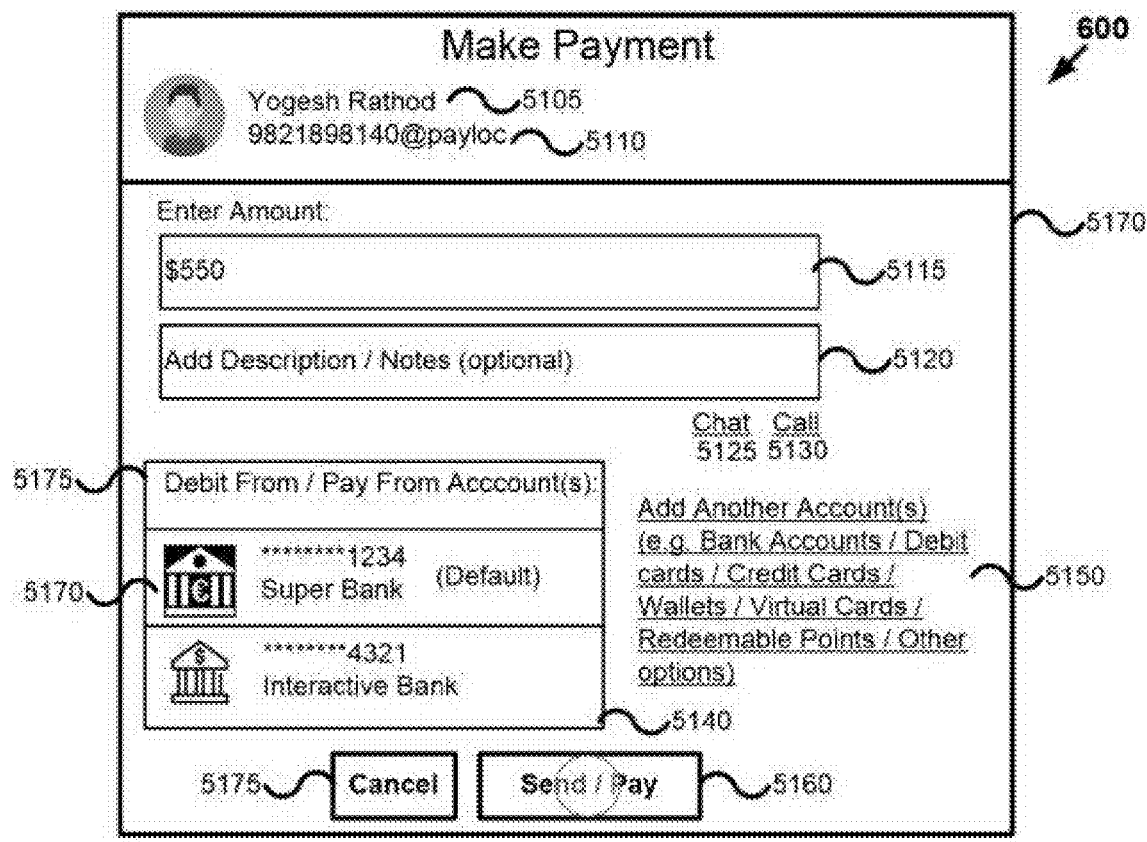

FIG. 47 illustrates sending request of registration from client application 290 (*a*) to server 110 module 190 (*a*) for accepting place location based payments made by particular place of business associated merchant or from user or authorized user who owned specific place. In an embodiment after creating or claiming and verifying specific place or place of business or business 4601 on map 4610, said place or place of business owner or admin or authorized person log-in and can select place 4601 on map 4610 by selecting current location (if said person or mobile device of said person is at present located inside or near said place of business) or searching place name (e.g. "channel") or full or part of address of place or unique user name or phone number or email address or website URL or defined geofence name or geocode 4640. In the event of selecting particular place e.g. place 4601, server module 190 (*c*) of server 110, receives request to access said selected place 4601 associated one or more types of information including place name, icon, logo, categories, ratings, photos, business hours of operation and identifies distance from user (current or very nearby or within particular number(s) of meters or pre-set measurement) based on monitored and tracked current location of user mobile device and displaying said retrieved information, data, content, media and user action(s) including merchant registration control including button 4705 to logged-in user only in graphical user interface (GUI) 4710.

In an embodiment merchant registration or payments acceptance registration take place while sending request to create place by providing place as well as merchant information including merchant account's details or providing place associated user's account details. In an embodiment place owner or authorized user can create new place of business or claim existing specific place of business owned and run and authorized by place owner or authorized user on behalf of owner or particular type of entity and enable location based payments services while registration and claiming of place. So, creating, claiming, verifying place and registering as merchant for enabling place associated location-based payments services for said place associated customers both happen together.

In an embodiment already exist place owner or authorized user can Logged-in and can view merchant registration control including button 4705 for accepting location based payments or transactions and in the event of tapping or clicking on said merchant registration control including button 4705, displaying graphical user interface for enabling merchant to register, wherein graphical user interface enables user to provide details including Business Name, Registration name, personal details, including first and last name, and copies of personal ID documents, Mobile Number including Mobile Number linked with bank account, Email address (optional), Shop Name/Display Name, Select Business Category, Select Business Sub Category, contact person name and contact information, country specific Business Address format including Shop/Office Number, Street Name, Area/Sector/Village, Pin code, City/Town, State, government identification numbers for person identity proof, financial information and tax identification information and business identity and permission proof including social security number, pan card number, Aadhaar number, account information including bank account information including country specific Bank code, Bank Identifier Code, SWIFT code and account number, debit card number, upload image of payments QR code generated and verified by one or more external sources. In an embodiment verify one or more types of details including phone number, one or more types of identities, business name, associated place on map, address with one or more external sources based on associated application programming interface (APIs). In an embodiment user is auto-filled with already available and verified details from one or more sources including place associated details. In an embodiment after providing said details to server 110, server module 190 (*a*) verifies said details, received from client application 290 (*a*), and send verification one-time password (OTP). In an embodiment user can create PIN number. In an embodiment after successfully verification by employing one or more types of standard APIs including external service providers, banking and government APIs, enable merchant to accept in-store or at offline store payments from user.

FIGS. 48-51 illustrates user registration for making payments to current location associated place or user selected place from nearby places or searched places on map by sending registration and verification request from client application 290 (*a*) to server 110 module 190 (*a*) with required details and making payments to current or nearest or selected location associated place from user's account to place associated account. In an embodiment user need to register for making location based in-store or offline store payments and make payment to selected place on map. When un-registered searches any place on map including view current place at particular place or place of business for making location based payments or transactions then displaying, to unregistered user, "Register to use Pay Now" button 4810 for registration with server 110 via server module 190 (*a*). For example when un-registered searches nearby "Luxury shops" from location 5$^{th}$ avenue, NYC, server module 119 (*c*) displays search results 4805 or user can select particular place 4601 on map 4610 or view current 4604/4801 place 4601/4820 of user based on monitored and tracked current location of user mobile device 200 then displaying, to unregistered user, "Register to use Pay Now" button 4810 for registration with server 110 via server module 190 (*a*), wherein unregistered user can view "Register to use Pay Now" and "Pay Now" button only if said place of business owner or merchant registered with the server 110 and verified and enabled location based payments and transactions service. User can provide registration details for creating account including Mobile Number, Create Password and Email ID (Optional) to server 110 module 190 (*a*), server 110 module 190 (*a*) send verification OTP to user for completing registration. User can add one or more types of payment method including add and verify one or more debit cards, credit cards, wallets, and bank accounts including provide bank account code and account number. In an embodiment server 110 module 190 (*a*) generates one or more types of code and unique identity and unique URL or link including QR code, virtual private address (VPA) for enabling making or sending and receiving payments including making payments in-store or particular selected place or place of business or store from user's account to said location associated place associated merchant's account.

After registration, user can log-in and logged in user can use the in-store or offline store or place location based payments feature. When particular user physically reached at particular physical place or place of business or store (e.g. "Channel, 15 E 57th St, New York, N.Y. 10022, United States") then based on monitored and tracked current location of user device 200, server 110 module 190 (*c*) identifies nearby places based on default or pre-defined or user defined distance of the location of the user and displaying and highlighting places on the map or on a list to the user device if more than one seller is within the predetermined distance of the location of the user. User can view current 4901 or top nearest place 4901 and associated details 4920 first on map and can select other displayed or highlighted place from searched places 4602/4603/4930/4940. User enter amount or use default or pushed amount 4902 by merchant and can initiate payment by clicking or tapping on "Pay" button 4905. In the event of clicking or tapping on "Pay" button 4905, server 110 module 190 (*d*) receives and processes said payment request and debiting said amount 4902 from the user's account and crediting said amount 4902 to said selected place 4601/4920 associated merchant's account or transferring particular amount of fund 4902 from selected 4904 or pre-set 4904 or updated 4903 account from one or more types of accounts related to one or more payment methods to said selected place 4601/4920 associated merchant's account. Server 110 module 190 (*c*) employs one or more types of location accuracy technologies to exactly identify current place of user based on monitored and tracked user device continuously updated or current location or location or due to some reason non-detection or identification of exact current place of user based on monitored and tracked user device continuously updated or current location or location, server 110 module 190 (*c*) displays list of nearby places 4905 from user device's 200 or user's location. User gets payment sent confirmation notification via one or more communication methods including push notification, SMS, message, email, voice message, phone call playing auto recorded voice. Likewise, merchant gets payments received confirmation notification via one or more communication methods including push notification, SMS, message, email, voice message, phone call playing auto recorded voice. User can also get invoice or receipt or bill via one or more communication methods including push notification, SMS, message, email in digital data entries, document, image and .pdf form, via voice message and phone call playing auto recorded voice.

In an embodiment displaying current location of user device associated identified place 4601 on map 4610 based on monitored and tracked location of the use or user device including mobile device. In the event of clicking or tap on graphical representation or icon or visual geofence or area of place or name of place 4601 on map 4610, displaying graphical user interface 500 (FIG. 50) for enabling user to view verified information including said selected place associated name including shop name, brand name, company name, business name, logo, photos including exterior or interior of said place, category, sub-category, ratings, reviews, contact information, business hours, status of place including open 5028 current place 5025 and one or more types of call-to-actions including share, make call, send message, share contact information, connect and reactions including like, comments and one or more types of emoticons and "Pay Now" control (accessible button, link, image) or user action or call-to-action. User can view place 4601 surround areas, road names and places on map and immediately identify current place 4601 on map 4610 and user can view or read said details and identify current place name and with trust can select "Pay Now" button 5030 from graphical user interface 5070. In the event of clicking or tap on "Pay Now" button 5030, displaying payment graphical user interface 600 (5170) for making payment. User can enter amount in textbox or use or edit default amount or pushed amount 5115. User can add and edit notes, transaction details or description in textbox 5120. In an embodiment user can make call 5130 or converse via chat 5125 to said place associated authorized staff or admin. User can add, edit, remove one or more types of payments methods and associated details including bank account details including bank code and account number as per country, debit cards, credit cards, wallets, virtual cards, redeemable points and one or more types of payments. User can scan one or more types of cards including debit cards, credit cards to add details of said scanned debit cards, credit cards. User can payment methods or use pre-set or default payments method and account (e.g. Bank account 5170) for making payments. After entering amount 5115 or selecting payment method and mode 5175 or use default or pushed amount 5115 and default method and account 5170, user can tap or click on send/pay control or button 5160 for making payments of said amount 5115 from said pre-set or selected user's account 5170 to said selected place associated merchant's account. In an embodiment user can cancel making of payment by clicking or tapping on cancel control or cancel button 5175.

In an embodiment user can add bank account by tapping on the Add New Bank button. Select the bank which user want to link with from the list of available banks. Server will automatically fetch user's account details and will link it to user's account. Then user can set their PIN e.g. UPI PIN in India by tapping on the set UPI PIN button. Then user enters card details. (Last six digits of Debit/ATM card number and Expiry Date) and enter received verification OTP and set PIN e.g. UPI PIN in India. After adding and verifying bank account user can transact directly using PIN e.g. UPI PIN in India.

User can make payments via one or more types of unique identity, URL or namespace or address or code e.g. in India 'Pay with Virtual Payment Address'. User can enter amount or use default or pre-set or pushed amount, user can view beneficiary's virtual private address (VPA) associated with current place or nearest place or nearby places or nearby contacts or nearby users based on monitored and tracked location of the user mobile device, provide remarks and choose the VPA from list that user would like to debit and click on 'Submit' to make payment from user's account to said selected VPA associated account.

In an embodiment place including place of business or home owner or authorized person or admin or merchant can provide virtual private address (VPA), selected place or pointer on map, address or defined geofence or geo coordinates or geocodes associated with said place and send to server module for verification, server verifies whether virtual private address (VPA) associated with said place or owner or authorized person associate with said place or not based on one or more types of associated information or requested or provided information and employing one or more types of verification APIs to verify place, place address, place associated person's identity and relationship with place. After successfully verification, server module stores and associate virtual private address (VPA) with said place or place address or place geo coordinates and enables place visitors to view place associated virtual private address (VPA) and enter amount and make or send payments from user's account to said virtual private address (VPA) associated linked account.

In an embodiment enabling user to save, bookmark and share place location or address or geo coordinates or geocodes or map pointer associated QR code, merchant account details and one or more types of unique code or URL or address including virtual private address (VPA) for enabling user to copy and paste or enter information to other payment applications.

In an embodiment if system indicated current place is not actual current place then user can select place from map or nearby places on map or from list of nearby places or user can search and select proffered place rom map or list.

In an embodiment merchant associated with particular place of business can upload digital image or file of existing verified interoperable QR code and register and verify with server 110 via server module 190 (*f*) for creating merchant account by providing bank account linked mobile number and select or create or claim place on map and verify via receiving verification one time password (OTP). After verification server module 190 (*f*) decode readable data from QR code and store said data and associate said uploaded and stored QR code with said merchant associated place and associated details including verified identity of place, owner, merchant, bank account, mobile phone number.

Figure 52:
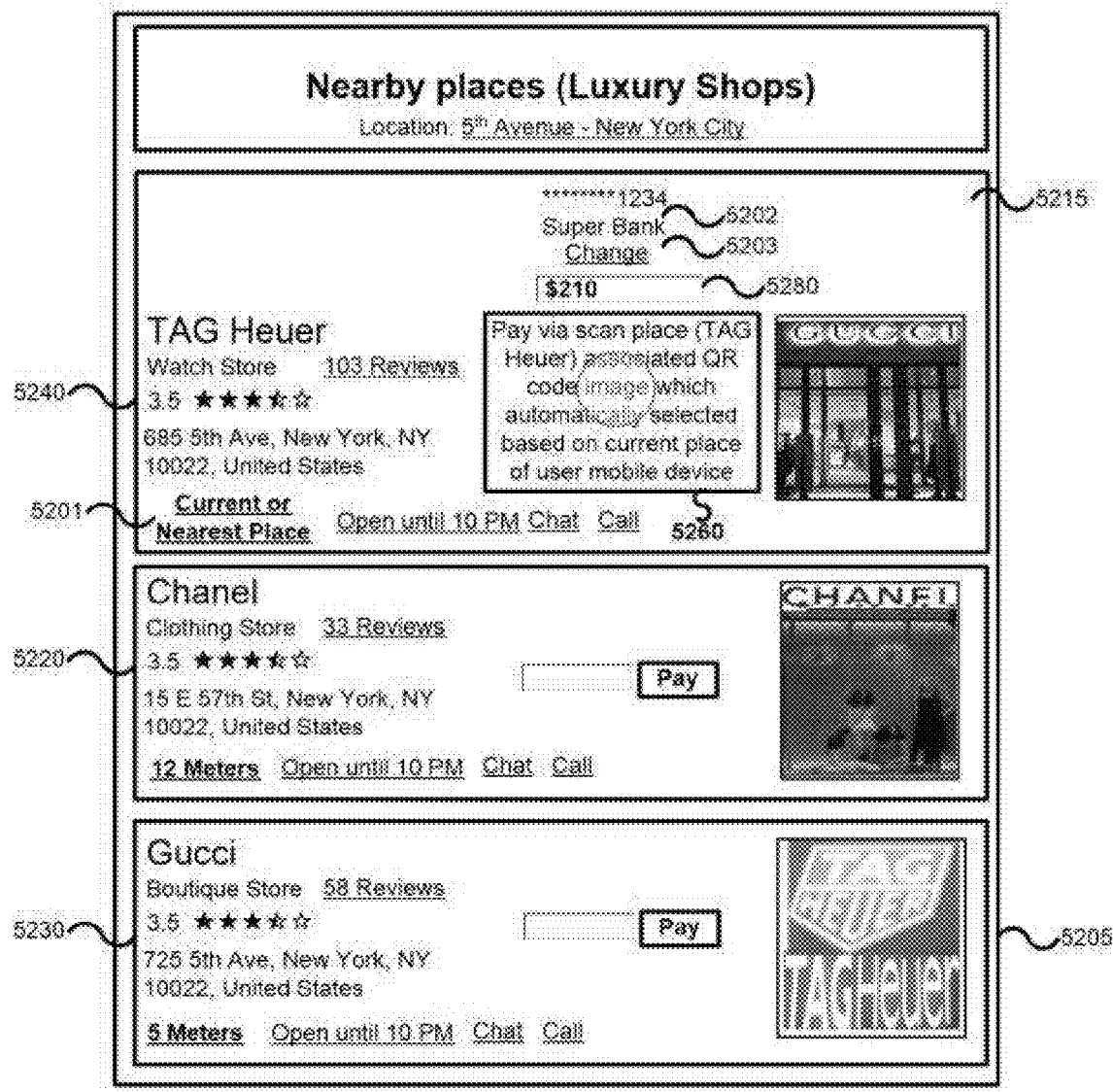
FIG. 52 is an exemplary graphical user interface or application or application feature or web page wherein in the event of visiting particular place at physical location of place, displaying current place or nearby places to registered user to view current place or selected place associated details and enable to make payment to said selected place associated registered merchant by transferring or sending or paying particular entered or default or pre-set or pushed amount of payments from user's account to physical location associated place associated merchant's account, wherein identifying merchant's account information is based on identifying said current or selected place associated QR code and decoding said identified QR code associated merchant account information.

In an another embodiment, FIG. 52 illustrates exemplary graphical user interface (GUI) for explaining embodiment wherein for example when registered user physically visit particular place (e.g. TAG Heuer, 685 5th Ave, New York, N.Y. 10022) and tap on "current location" option 4630 on map 4610 then displaying on map, current place or nearest place(s) (for example 4603) on map or list 5240 based on monitored and tracked location information of a user from the user mobile device 200 and enable user to tap on current place 4603/5240 associated "Scan Location of Place associated QR code Image" button 5260. User can enter amount 5280 or use pushed amount 5280 or use default amount 5280 and tap on "Scan Location of Place associated QR code Image" button 5260 for directly making payment from the user's account to the place associated merchant's account. In the event of clicking or tapping on "Scan Location of Place associated QR code Image" button 5260, server 110 module 190 (*d*) receives and processes said payment request by decoding merchant's account information from said identified and scanned place of location associated merchant associated QR code and debiting said amount 5280 from the user's account and crediting said amount 5280 to said selected place 5240/4603 associated said identified merchant's account or transferring particular amount of fund 5280 from selected 5202 or pre-set 5202 or updated 5203 account from one or more types of accounts related to one or more payment methods to said selected place 5240/4603 associated merchant's account. Server 110 module 190 (*c*) employs one or more types of location accuracy technologies to exactly identify current place of user based on monitored and tracked user device continuously updated or current location or location or due to some reason non-detection or identification of exact current place of user based on monitored and tracked user device continuously updated or current location or location, server 110 module 190 (*c*) displays list of nearby places 525 from user device's 200 or user's location. User gets payment sent confirmation notification via one or more communication methods including push notification, SMS, message, email, voice message, phone call playing auto recorded voice. Likewise, merchant gets payments received confirmation notification via one or more communication methods including push notification, SMS, message, email, voice message, phone call playing auto recorded voice. User can also get invoice or receipt or bill via one or more communication methods including push notification, SMS, message, email in digital data entries, document, image and .pdf form, via voice message and phone call playing auto recorded voice.

In an embodiment identify current place based on providing destination in direction, check-in by user or accompanied user, searching or viewing information on map related to particular place, unique place code provided by one or more types of tags or beacons or RFID tags, location or information related to place provided by linked applications, services via APIs and web services, providing place name via voice and recognizing said voice via voice recognition technology.

Figure 53:
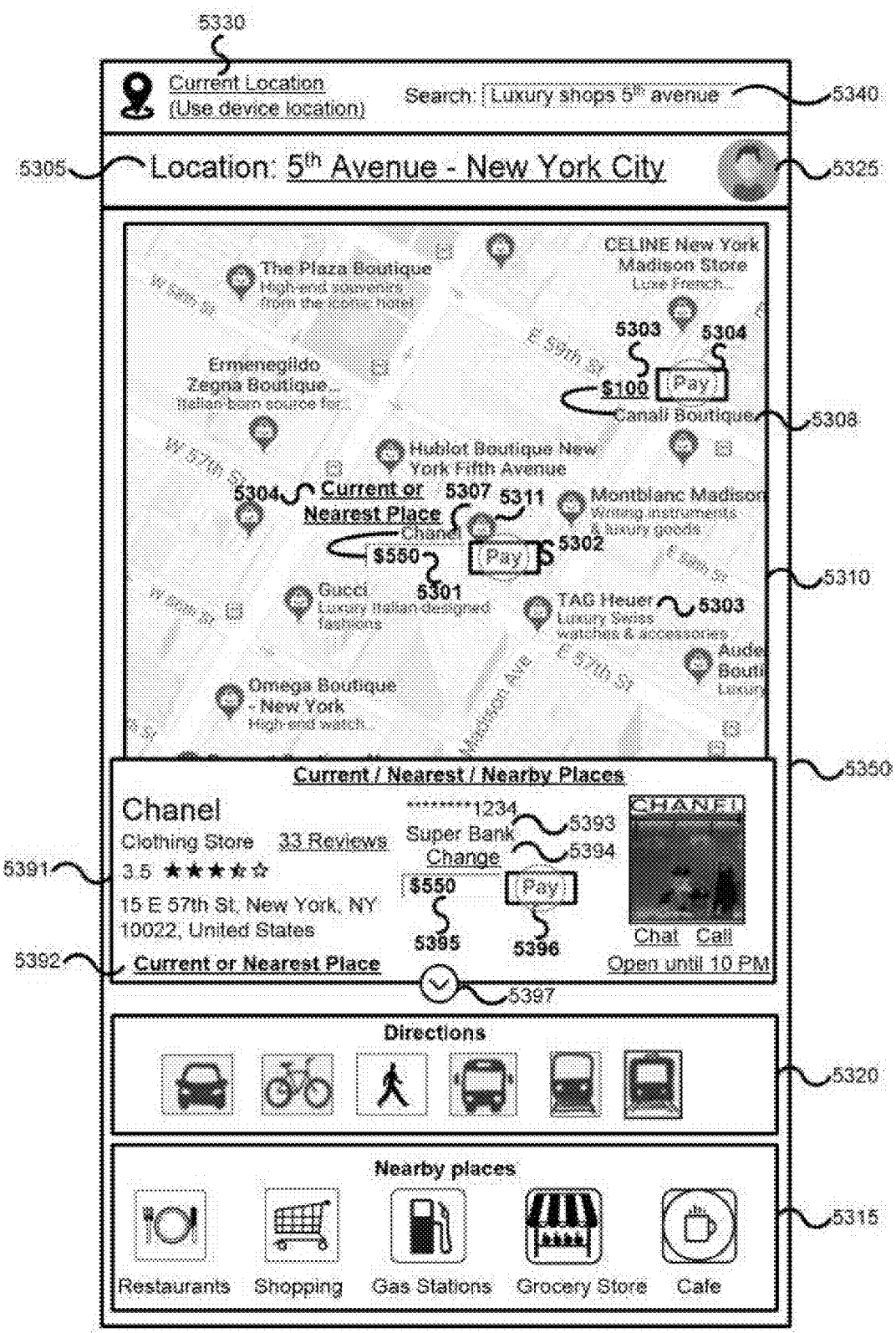
FIG. 53 is an exemplary map wherein register user can view current location of user device related place and view surround or nearby places or search and view search query specific location associated one or more places and surround or nearby places and can directly enter amount via particular place associated textbox and make payment by tapping on pay control or button associated with said place for making said entered or default or pre-set or pushed amount payments from user's default or pre-set or updated account to said place associated merchant's account.

In an embodiment FIG. 53 showing a map 5310 presented to user based on current location or user device location 5330. Map displaying current location 5330 associated place 5307 or nearby places 5307/5308/5309 based on current location or user mobile device location 5330. Map can also display search query 5340 specific searched places 5307/5308/5309 on map 5310. User can navigate map and can view and access any place of world on map. User can view place 5307 associated place icon 5311, place name 5307, place category, place short description, place associated textbox to enter amount 5301 or view pushed or default or pre-set amount and pay control including pay button 5302. In the event of inputting amount in place 5307 associated text box 5301 and selecting or clicking or tapping on pay control or pay button 5302, initiating payment and transferring said inputted amount 5301 from user's pre-set or selected account and method of payment to said place 5307 associated merchant's account or debiting said inputted amount 5301 from the user's pre-set or selected account and method of payment and crediting said inputted amount 5301 to the merchant's account including merchant bank account or debit card account.

In an embodiment in the event of entering at location of particular specific place (e.g. Chanel 5307) or defined geofence associated with location of particular specific place (e.g. Chanel 5307) and dwelling at said place for pre-set duration then identifying current place or nearest place and send notification to user with pre-set or default ringtone notifying user about current place and in the event of clicking or tapping on notification, displaying said identified current place or nearest place associated details in graphical user interface (GUI) 5391 displayed on prominent place of map and enabling user to enter amount or use or select default or pre-set or pushed billed amount 5395 by merchant from merchant application, wherein merchant can manually select user based on nearby users and each nearby user associated details including name, nick name, one or more photos, videos for sending or pushing amount and bill or invoice of purchased products and consumed services. User can view place associated details to confirm that user want to make payments to right place. User can make payment of particular amount 5395 from user selected or pre-set or default account 5393 including bank account or credit card or debit card or wallet to said place 5307 associated account including bank account.

In an embodiment after exiting from particular place (e.g. "Chanel" 5307) without making of payment for purchased products and services, notifying user about non-payment of billed amount.

In another embodiment user can pre-set amount with particular type and named or selected place including school, college, class. For example, making payment of particular amount of fees to selected school, college class. So, when user decide to make payment, user just need to tap on particular place associated pay button for making payment of pre-set amount from user's account to merchant's account.

In another embodiment merchant related to specific place or place of business 5308 can view in-store nearby customers or users and can select specific customer or user from list of said in-store 5308 nearby customers or users and send or push bill or invoice or amount 5303 to/in user's graphical user interface (GUI) 5303/4902/5115/5280/5470 for enabling user to make payment of said pushed amount 5303 from user's account to said place 5308 associated merchant's account by selecting or clicking or tapping on said place 5308 associated pay control including pay button 5304 or just tap on amount 5303 for providing payment confirmation or based on settings displaying and starting pre-set duration of timer and in the event of expiration or ending of said started pre-set duration of timer, automatically make payment of said pushed amount 5303 from user's account to said place 5308 associated merchant's account.

Figure 54:
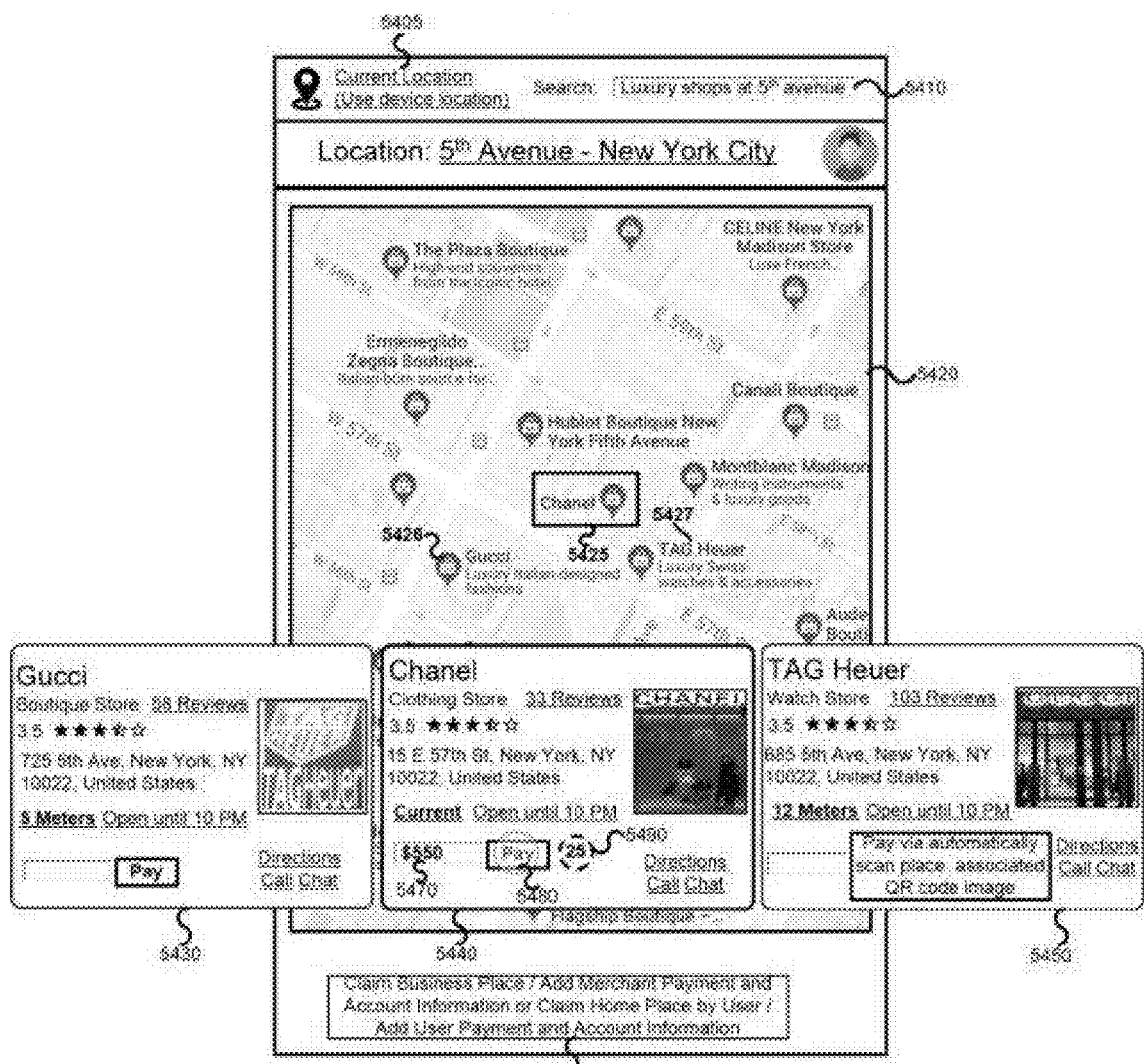
FIG. 54 is an exemplary map wherein register user can search one or more types of places located in same region or different regions and can select particular place from overlay graphical user interfaces associated with each corresponding place from search result. User can view details and can make payments by entering particular amount or use default or pre-set or pushed amount from user's account to said selected graphical user interface associated place associated merchant's account.

In an embodiment FIG. 54 showing a map 5420 displaying current location 5405 associated nearby places 5425/5426/5427 based on user mobile device 200 location 5330. Map 5420 can also display search query 5410 specific each searched place 5425/5426/5427 situated on different locations on map 5420 associated corresponding graphical user interface (GUI) 5430/5440/5450 comprises respective place associated information and pay control for making payment. When user click or tap on particular graphical user interface (GUI) 5440 then linked map 5420 automatically jump to and display visual representation or name of clicked graphical user interface (GUI) 5440 associated place 5425 on map 5420 so user can easily jump on selected place from searched places on map and can visually view map location, directions, address information, surround places and nearby places on map. User can select place associated graphical user interface (GUI) 5440 and can make payment of particular amount 5470 from user's account to said place or place of business associated merchant's account by clicking or tapping on associated pay control or pay button 5480. In another embodiment enable user to allow automatically make payments from user's account to place associated merchant's account or user's account and set timer of particular duration via settings to enable automatically make payment of inputted or default or pre-set or pushed amount 5480 from user's account to place associated merchant's account or user's account based on one or more types of selected or pre-set or default trigger(s), wherein triggers comprises start said pre-set duration timer when receiving of payment request or pushed particular amount or payment request or bill or invoice, start said pre-set duration timer when exiting from particular place or pre-defined geofence, start said pre-set duration timer after entering amount and non-inputting or non-editing amount textbox 5470 for pre-set duration, start said pre-set duration timer after tapping on received payment notification, start said pre-set duration timer after opening of payment application or payment graphical user interface (GUI) displaying current place, start said pre-set duration timer after providing voice command for making payment or instructing to make payment of particular amount, start said pre-set duration timer when looking at camera display and detection of face or particular type of face expression for making payment. Based on said settings, in the event of triggering or detecting of particular event or trigger, automatically start pre-set duration timer 5490 and in the event of expiration of said timer 5490, automatically make payments of pre-set or default or entered or pushed amount 5470 from user's account to place associated merchant's account or other user's account.

In an embodiment Server 110 can interact with external service providers via one or more types of communication interfaces, wherein external service providers comprises affiliates and third parties including any agent, contractor or third party service provider that provides services including verify user and merchant provided registration details including user and place identity, address, provided country specific various types of identities, phone number, linked bank account, help with fraud prevention, anti-money laundering checks, credit checking, bill collection, data entry, database management, promotions, marketing, customer service, technology services, products and services alerts and payment extension services or to provide trade financing services, banks, card associations, payment networks or acquiring institutions, and others, including those involved in processing of payments and conducting transactions through server 110 services and law enforcement agencies, insurers, government and regulatory authorities or any other organizations to which server 110, or any affiliate or third party service provider, is under an obligation to make disclosure under the requirements of any applicable law, regulation or commercial arrangement. The server 110 services and website of server 110 may provide links to other websites and services (Linked services and websites including other online merchant sites) for users' convenience and information. These services and websites may operate independently from server 110.

Figure 55:
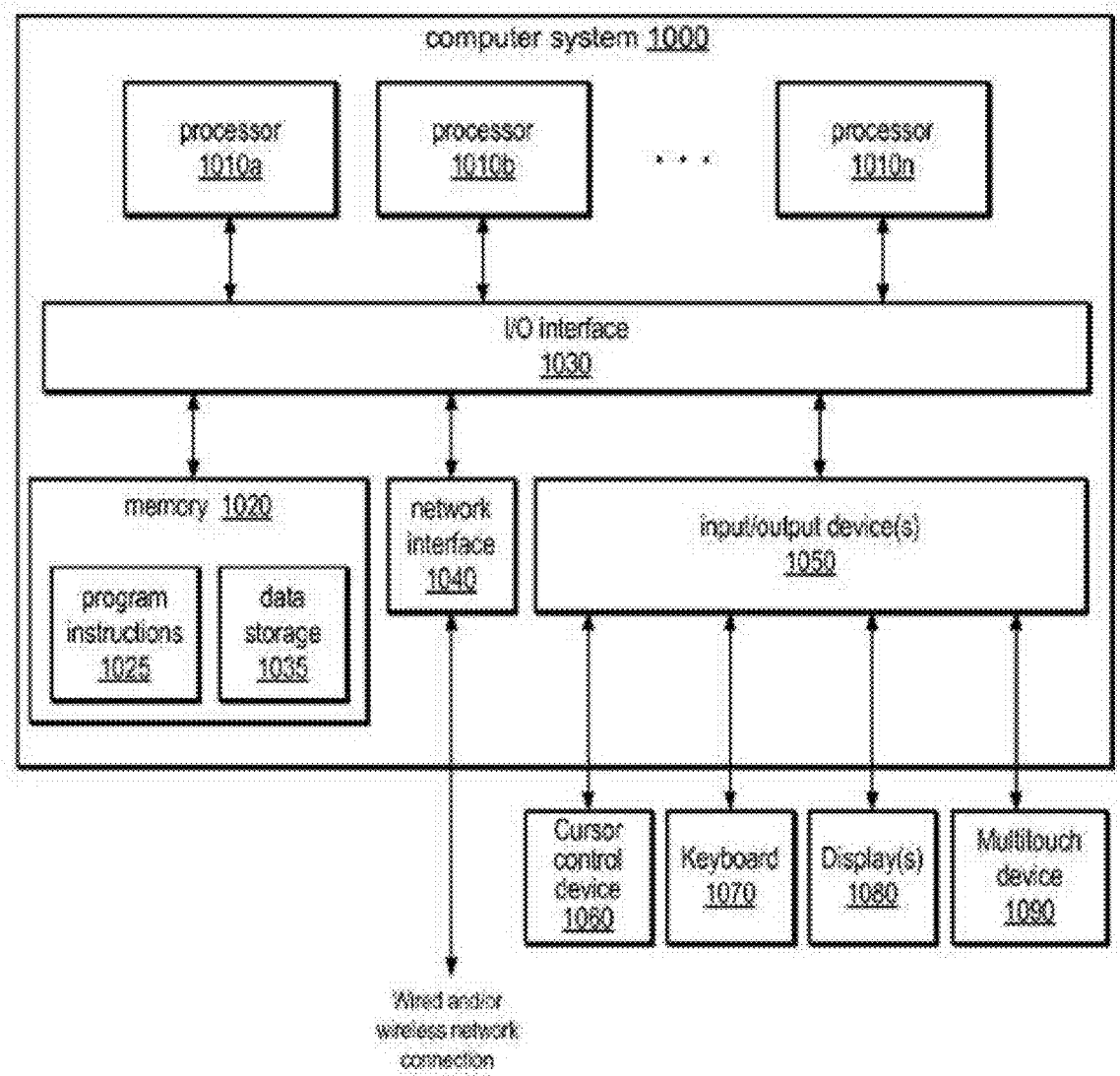
FIG. 55 is a block diagram of a computer system suitable for implementing one or more embodiments of the present disclosure.

Various components of embodiments of methods as illustrated and described in the accompanying description may be executed on one or more computer systems, which may interact with various other devices. One such computer system is illustrated by FIG. 55. In different embodiments, computer system 1000 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired and/or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired and/or wireless connection, such as over network interface 1040.

As shown in FIG. 55, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. 554re Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

In an embodiment a program is written as a series of human understandable computer instructions that can be read by a compiler and linker, and translated into machine code so that a computer can understand and run it. A program is a list of instructions written in a programming language that is used to control the behavior of a machine, often a computer (in this case it is known as a computer program). A programming language's surface form is known as its syntax. Most programming languages are purely textual; they use sequences of text including words, numbers, and punctuation, much like written natural languages. On the other hand, there are some programming languages which are more graphical in nature, using visual relationships between symbols to specify a program. In computer science, the syntax of a computer language is the set of rules that defines the combinations of symbols that are considered to be a correctly structured document or fragment in that language. This applies both to programming languages, where the document represents source code, and markup languages, where the document represents data. The syntax of a language defines its surface form. Text-based computer languages are based on sequences of characters, while visual programming languages are based on the spatial layout and connections between symbols (which may be textual or graphical or flowchart(s)). Documents that are syntactically invalid are said to have a syntax error. Syntax—the form—is contrasted with semantics—the meaning. In processing computer languages, semantic processing generally comes after syntactic processing, but in some cases semantic processing is necessary for complete syntactic analysis, and these are done together or concurrently. In a compiler, the syntactic analysis comprises the frontend, while semantic analysis comprises the backend (and middle end, if this phase is distinguished). There are millions of possible combinations, sequences, ordering, permutations & formations of inputs, interpretations, and outputs or outcomes of set of instructions of standardized or specialized or generalized or structured or functional or object-oriented programming language(s).

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability. Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

I claim:

1. A method comprising:
generating, using the hardware processor, a map, wherein the generated map comprises plotting on the generated map a selectable and actionable graphical representation or graphical indicator of each identified or determined place of the plurality of places on maps;
causing the map to be displayed on a display screen of a client computing device;
displaying on generated map, by the hardware processor via the network interface component and the network, the place associated information including selectable and actionable graphical representation or graphical indicator of each identified place and associated place name;
generating for the place on map, using the hardware processor, a payment graphical user interface based on the place associated data including place name, place icon, user identity, user payment accounts details including pre-set payment account, place associated merchant identity and merchant account details, wherein generated payment graphical user interface comprises the place associated details including place icon, place name, merchant account details and interfaces and controls including input or selection control or box or interface for selecting or inputting amount, user payment accounts interface for pre-set, select, add, remove and update one or more user payment accounts and control including payment button for making payment;
associating, using the hardware processor, the payment graphical user interface with the place on the map;
enabling a user, from the client computing device, to select place or location and access associated generated payment graphical user interface for entering or selecting payment amount and sending request for making payment of particular amount from the identified user payment account to the place associated identified merchant account including merchant bank account or merchant debit card account by selecting a payment control;
receiving, by the hardware processor, from the selected place or location associated payment graphical user interface of the client computing device, a payment request, wherein the payment request comprises payment information including payment amount, identity of a user, identity of user selected or pre-set payment account to identify associated payment account information and identity of selected place on map associated merchant to identify associated merchant account information;
processing, by the hardware processor, the payment request based on the received payment information, without the user having to enter the account information related to merchant; and
debiting, by the hardware processor, payment amount from the user's payment account and crediting, by the hardware processor, payment amount to the merchant's account including merchant bank account or debit card account.

2. The method of claim 1 wherein enabling user to use the displayed particular place associated displayed graphical user interface to input or enter or select amount or use pre-set or default or pushed amount.

3. The method of claim 1 wherein displaying payment graphical user interface at prominent place or beside particular place icon or image or name or area.

4. The method of claim 1 wherein in the event of selecting particular place, displaying payment graphical user interface.

5. The method of claim 1 wherein in the event of selecting particular place, displaying graphical user interface or payment control and in the event of selecting graphical user interface or payment control, displaying payment graphical user interface.

6. The method of claim 1 wherein in the event of receiving instruction to make payment, debit said amount from the user's payment account and credit said amount to the merchant's account including merchant bank account or merchant debit card account, wherein the server is managed by or connected or integrated with a payment provider.

7. The method of claim 1 wherein displaying map graphical user interface to enabling user to select current location associated place or current place or select place from nearby places or select place from selected category specific nearby places or search and select place or select sub-place or select floor and select place from indoor maps or select place from list of places including favorite, liked, bookmarked, visited, transacted, plan to visit places.

8. The method of claim 1 wherein identifying user device current location associated place or place of business or merchant based on sufficiently matching monitored and tracked current location of user client device with location information associated with the places from places database, wherein location information associated with the place comprises at least one of address, geo-coordinates or GPS coordinates, unique geo code, pre-set pointer on maps, pre-defined geofence.

9. The method of claim 1, wherein identifying the payment account for the user comprises: identifying a plurality of payment accounts associated with a user account for the user; displaying, to the user client device, a plurality of indicators associated with the plurality of payment accounts; and receiving, from the user client device, a selected indicator from the plurality of indicators associated with the plurality of payment accounts.

10. The method of claim 1 wherein monitoring and tracking user device current location; generating, using the hardware processor, a map, wherein the generating the map based on monitored and tracked user device current location.

11. The method of claim 1 wherein receiving, by a hardware processor of a server coupled to a user mobile device via a network interface component and a network, location information from a user from the user mobile device; determining, by the hardware processor, one or more places that are within the threshold distance of the location provided by the user; generating, using the hardware processor, a map, wherein the generating the map based on received location information.

12. The method of claim 11 wherein location information comprises current location, automatically determined location, selected or inputted area or suburb, city, pin code, locality, road, nearby place or point of interest, selected location on map, selected point on map, draw location on map, full or partial address and one or more type of location code.

13. The method of claim 1 wherein enabling to associating one or more codes including QR codes with identified location or place, wherein identifying location or place based on at least one of monitored and tracked current location of client device, selected location, place, pointer on map, selected floor on map and selected place or location from indoor maps, defined or drawn geofence on map, provided geocode or GPS coordinates, unique geocode and address, wherein said codes including QR code comprises encrypted merchant account information including bank account or debit card account details; storing one or more codes including QR codes with said identified location or place in a storage medium; receiving request to decode, selected place on map or identified place including current place associated pre-stored code including QR code, without user need to scan QR code; decoding QR code associated encrypted merchant account information including bank account or debit card account details; and identifying merchant account information including bank account or debit card account details.

14. A system comprising:
a network interface component; a non-transitory memory storing instructions; and one or more hardware processors coupled to the non-transitory memory and configured to read the instructions from the non-transitory memory to cause the system to perform operations comprising:
generate, using the hardware processor, a map, wherein the generated map comprises plot on the generated map a selectable and actionable graphical representation or graphical indicator of each identified or determined place of the plurality of places on maps;
cause the map to be displayed on a display screen of the client computing device;
display on generated map, by the hardware processor via the network interface component and the network, the place associated information including selectable and actionable graphical representation or graphical indicator of each identified place and associated place name;
generate for the place on map, using the hardware processor, a payment graphical user interface based on the place associated data including place name, place icon, user identity, user payment account including pre-set payment account, place associated merchant identity and merchant account details, wherein generated payment graphical user interface comprises the place associated details including place icon, place name, merchant account details and interfaces and controls including input or selection control or box or interface for selecting or inputting amount, user payment accounts interface for pre-set, select, add, remove and update one or more user payment accounts, and control including payment button for making payment;
associate, using the hardware processor, the payment graphical user interface with the place on the map;
enable a user, from the client computing device, to select place or location and access associated generated payment graphical user interface for entering or selecting payment amount and sending request for making payment of particular amount from the identified user payment account to place on map associated identified merchant account including merchant bank account or merchant debit card account by selecting a payment control;
receive, by the hardware processor, from the selected place or location associated payment graphical user interface of the client computing device, a payment request, wherein the payment request comprises payment information including payment amount, identity of a user, identity of user selected or pre-set payment account to identify associated payment account information and identity of selected place on map associated merchant to identify associated merchant account information;
process, by the hardware processor, the payment request based on the received payment information, without the user having to enter the account information related to merchant; and debit, by the hardware processor, payment amount from the user's payment account and credit, by the hardware processor, payment amount to the merchant's account including merchant bank account or debit card account.

15. The system of claim 14 wherein enable user to use the displayed particular place associated displayed graphical user interface to input or enter or select amount or use pre-set or default or pushed amount.

16. The system of claim 14, wherein display payment graphical user interface at prominent place or beside particular place icon or image or name or area.

17. The system of claim 14, wherein in the event of selecting particular place, display graphical user interface or payment control and in the event of selecting graphical user interface or payment control, display payment graphical user interface.

18. The system of claim 14, wherein in the event of receiving instruction to make payment, debit said amount from the user's payment account and credit said amount to the merchant's account including merchant bank account or merchant debit card account, wherein the server is managed by or connected or integrated with a payment provider.

19. The system of claim 14, wherein displaying map graphical user interface to enable user to select current location associated place or current place or select place from nearby places or select place from selected category specific nearby places or search and select place or select sub-place or select floor and select place from indoor maps or select place from list of places including favorite, liked, bookmarked, visited, transacted, plan to visit places.

20. The system of claim 14, wherein identify user device current location associated place or place of business or merchant based on sufficiently matching monitored and tracked current location of user client device with location information associated with the places from places database, wherein location information associated with the place comprises at least one of address, geo-coordinates or GPS coordinates, unique geo code, pre-set pointer on maps, pre-defined geofence.

21. The system of claim 14, wherein identify the payment account for the user comprises: identifying a plurality of payment accounts associated with a user account for the user; displaying, to the user client device, a plurality of indicators associated with the plurality of payment accounts; and receiving, from the user client device, a selected indicator from the plurality of indicators associated with the plurality of payment accounts.

22. The system of claim 14 wherein monitor and track user device current location; generating, using the hardware processor, a map, wherein the generate the map based on monitored and tracked user device current location.

23. The system of claim 14 wherein receive, by a hardware processor of a server coupled to a user mobile device via a network interface component and a network, location information from a user from the user mobile device; determine, by the hardware processor, one or more places that are within the threshold distance of the location provided by the user; generate, using the hardware processor, a map, wherein the generate the map based on received location information.

24. The system of claim 23 wherein location information comprises current location, automatically determined location, selected or inputted area or suburb, city, pin code, locality, road, nearby place or point of interest, selected location on map, selected point on map, draw location on map, full or partial address and one or more type of location code.

25. The system of claim 14 enable to associate one or more codes including QR codes with identified location or place, wherein identifying location or place based on at least one of monitored and tracked current location of client device, selected location, place, pointer on map, selected floor on map and selected place or location from indoor maps, defined or drawn geofence on map, provided geocode or GPS coordinates, unique geocode and address, wherein said codes including QR code comprises encrypted merchant account information including bank account or debit card account details; store one or more codes including QR codes with said identified location or place in a storage medium; receive request to decode, selected place on map or identified place including current place associated pre-stored code including QR code, without user need to scanning QR code; decode QR code associated encrypted merchant account information including bank account or debit card account details; and identify merchant account information including bank account or debit card account details.

26. A method of payment, comprising:
receiving, by a hardware processor of a server coupled to a user mobile device via a network interface component and a network, location information from a user from the user mobile device or location information provided by the user;
determining, by the hardware processor, one or more places that are within the threshold distance of the location provided by user mobile device or provided by the user;
generating, by the hardware processor, list of identified or filtered nearby places with details;
displaying, by the hardware processor, list of identified nearby places and associated details;
displaying, by the hardware processor via the network interface component and the network, nearby places, wherein sorting list of nearby places based on distance from monitored and tracked user device current location or updated user device current location;
generating for each place in list, using the hardware processor, payment graphical user interface based on place associated data including place name, place icon, user identity, user payment account including pre-set payment account, place associated merchant identity and merchant account details, wherein generated payment graphical user interface comprises place associated details including place icon, place name, merchant account details and interfaces and controls including input or selection control or box or interface for selecting or inputting amount, user payment accounts interface for pre-set, select, add, remove and update one or more user payment accounts and control including payment button for making payment;
associating, using the hardware processor, a payment graphical user interface with each place in list;
receiving, by the hardware processor via the network interface component and the network, selection of place or list item or request to access place or list item associated payment graphical user interface;
displaying, by the hardware processor via the network interface component and the network, selected place associated payment graphical user interface for entering or selecting payment amount and sending request for making payment of particular amount from the identified user payment account to the place associated identified merchant account including merchant bank account or merchant debit card account by selecting a payment control;
receiving, by the hardware processor, from the selected place or location associated payment graphical user interface of the client computing device, a payment request, wherein the payment request comprises payment information including payment amount, identity of a user, identity of user selected or pre-set payment account to identify associated payment account information and identity of selected place on map associated merchant to identify associated merchant account information;
processing, by the hardware processor, the payment request based on the received payment information, without the user having to enter the account information related to merchant; and
debiting, by the hardware processor, payment amount from the user's payment account and crediting, by the hardware processor, payment amount to the merchant's account including merchant bank account or debit card account.

27. The method of claim 26 wherein generating, by the hardware processor, list of identified or filtered nearby places with details in relevant categories; displaying, by the hardware processor, list of identified nearby places and associated details in relevant categories; receiving, by the hardware processor via the network interface component and the network, selection of category from list of categories; and displaying, by the hardware processor via the network interface component and the network, selected category associated nearby places, wherein sorting selected category associated list of nearby places based on distance from monitored and tracked user device current location or updated distance from monitored and tracked user device current location or continuously updated location.

28. The method of claim 26 wherein location information comprises current location, automatically determined location, selected or inputted area or suburb, city, pin code, locality, road, nearby place or point of interest, selected location on map, selected point on map, draw location on map, full or partial address and one or more type of location code.

29. The method of claim 26 wherein displaying a place details including updated distance from monitored and tracked user device current location or continuously updated location, the place or place of business name, category, location or full or partial address, logo or icon or image, place business hours and current status including open or close, and ratings, maps and address, photos, ratings and reviews, description, contact information including phone number, email and website.

* * * * *